(12) United States Patent  (10) Patent No.: US 9,300,593 B2
Thakkar et al.  (45) Date of Patent: Mar. 29, 2016

(54) SCHEDULING DISTRIBUTION OF LOGICAL FORWARDING PLANE DATA

(71) Applicant: Nicira, Inc., Palo Alto, CA (US)

(72) Inventors: Pankaj Thakkar, Santa Clara, CA (US); Teemu Koponen, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 331 days.

(21) Appl. No.: 13/756,483

(22) Filed: Jan. 31, 2013

(65) Prior Publication Data
US 2013/0212243 A1 Aug. 15, 2013

Related U.S. Application Data

(63) Continuation of application No. 13/589,077, filed on Aug. 17, 2012.

(60) Provisional application No. 61/551,425, filed on Oct. 25, 2011, provisional application No. 61/551,427, (Continued)

(51) Int. Cl.
G06F 15/173 (2006.01)
H04L 12/863 (2013.01)
(Continued)

(52) U.S. Cl.
CPC ............ H04L 47/50 (2013.01); G05B 11/01 (2013.01); G06F 9/45558 (2013.01); G06F 15/177 (2013.01); H04L 12/5693 (2013.01); H04L 41/0226 (2013.01); H04L 41/042 (2013.01); H04L 41/20 (2013.01); H04L 41/50 (2013.01);
(Continued)

(58) Field of Classification Search
CPC ...................................................... H04L 47/50
USPC .......................................... 709/204, 220, 223
See application file for complete search history.

(56) References Cited

U.S. PATENT DOCUMENTS 5,504,921 A 4/1996 Dev et al.
5,550,816 A 8/1996 Hardwick et al.
(Continued)

FOREIGN PATENT DOCUMENTS

AU 2012328697 4/2014
AU 2012328699 4/2014
(Continued)

OTHER PUBLICATIONS

Das, Suarav, et al., "Unifying Packet and Circuit Switched Networks with OpenFlow," Dec. 7, 2009, 10 pages.
(Continued)

*Primary Examiner* — Joseph E Avellino
*Assistant Examiner* — Marshall McLeod
(74) *Attorney, Agent, or Firm* — Adeli LLP

(57) ABSTRACT

A controller for managing several managed switching elements that forward data in a network is described. The controller includes an interface for receiving input logical control plane data in terms of input events data. The controller includes a converter for converting the input logical control plane data to output logical forwarding plane data by processing the input events data. The logical forwarding plane data is for subsequent translation into physical control plane data. The controller includes an input scheduler for (1) categorizing the input events data into different groups based on certain criteria and (2) supplying the input events data into the converter in a manner that each different group of input events data is processed separately by the converter.

20 Claims, 76 Drawing Sheets

Related U.S. Application Data filed on Oct. 25, 2011, provisional application No. 61/577,085, filed on Dec. 18, 2011, provisional application No. 61/595,027, filed on Feb. 4, 2012, provisional application No. 61/599,941, filed on Feb. 17, 2012, provisional application No. 61/610,135, filed on Mar. 13, 2012, provisional application No. 61/635,056, filed on Apr. 18, 2012, provisional application No. 61/635,226, filed on Apr. 18, 2012, provisional application No. 61/647,516, filed on May 16, 2012.

(51) Int. Cl.
*H04L 12/24* (2006.01)
*H04L 12/721* (2013.01)
*G05B 11/01* (2006.01)
*G06F 15/177* (2006.01)
*H04L 12/54* (2013.01)
*H04L 12/717* (2013.01)
*G06F 9/455* (2006.01)

(52) U.S. Cl.
CPC ............... *H04L 45/38* (2013.01); *H04L 45/42* (2013.01); *H04L 45/66* (2013.01); *G06F 2009/45595* (2013.01)

(56) References Cited

U.S. PATENT DOCUMENTS

| | | |
|---|---|---|
| 5,729,685 A | 3/1998 | Chatwani et al. |
| 5,751,967 A | 5/1998 | Raab et al. |
| 5,796,936 A | 8/1998 | Watabe et al. |
| 6,055,243 A | 4/2000 | Vincent et al. |
| 6,104,699 A | 8/2000 | Holender et al. |
| 6,366,582 B1 | 4/2002 | Nishikado et al. |
| 6,512,745 B1 | 1/2003 | Abe et al. |
| 6,539,432 B1 | 3/2003 | Taguchi et al. |
| 6,680,934 B1 | 1/2004 | Cain |
| 6,768,740 B1 | 7/2004 | Perlman et al. |
| 6,785,843 B1 | 8/2004 | McRae et al. |
| 6,941,487 B1 | 9/2005 | Balakrishnan et al. |
| 6,963,585 B1 | 11/2005 | Le Pennec et al. |
| 7,042,912 B2 | 5/2006 | Ashwood Smith et al. |
| 7,046,630 B2 | 5/2006 | Abe et al. |
| 7,096,228 B2 | 8/2006 | Theimer et al. |
| 7,120,728 B2 | 10/2006 | Krakirian et al. |
| 7,197,572 B2 | 3/2007 | Matters et al. |
| 7,209,439 B2 | 4/2007 | Rawlins et al. |
| 7,263,290 B2 | 8/2007 | Fortin et al. |
| 7,283,473 B2 | 10/2007 | Arndt et al. |
| 7,342,916 B2 | 3/2008 | Das et al. |
| 7,450,598 B2 | 11/2008 | Chen et al. |
| 7,460,482 B2 | 12/2008 | Pike |
| 7,478,173 B1 | 1/2009 | Delco |
| 7,483,370 B1 | 1/2009 | Dayal et al. |
| 7,512,744 B2 | 3/2009 | Banga et al. |
| 7,555,002 B2 | 6/2009 | Arndt et al. |
| 7,606,260 B2 | 10/2009 | Oguchi et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,010,696 B2 | 8/2011 | Sankaran et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,089,871 B2 | 1/2012 | Iloglu et al. |
| 8,131,852 B1 | 3/2012 | Miller et al. |
| 8,144,630 B1 | 3/2012 | Orr |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,230,050 B1 | 7/2012 | Brandwine et al. |
| 8,239,572 B1 | 8/2012 | Brandwine et al. |
| 8,265,075 B2 | 9/2012 | Pandey |
| 8,312,129 B1 | 11/2012 | Miller et al. |
| 8,320,388 B2 | 11/2012 | Louati et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,578,003 B2 | 11/2013 | Brandwine et al. |
| 8,612,627 B1 | 12/2013 | Brandwine |
| 8,621,058 B2 | 12/2013 | Eswaran et al. |
| 8,644,188 B1 | 2/2014 | Brandwine et al. |
| 8,705,513 B2 | 4/2014 | Van Der Merwe et al. |
| 8,762,501 B2 | 6/2014 | Kempf et al. |
| 9,137,107 B2 | 9/2015 | Koponen et al. |
| 9,154,433 B2 | 10/2015 | Koponen et al. |
| 9,178,833 B2 | 11/2015 | Koponen et al. |
| 2002/0093952 A1 | 7/2002 | Gonda |
| 2002/0161867 A1 | 10/2002 | Cochran et al. |
| 2002/0194369 A1 | 12/2002 | Rawlins et al. |
| 2003/0041170 A1 | 2/2003 | Suzuki |
| 2003/0069972 A1 | 4/2003 | Yoshimura et al. |
| 2003/0204768 A1 | 10/2003 | Fee |
| 2004/0044773 A1 | 3/2004 | Bayus et al. |
| 2004/0047286 A1 | 3/2004 | Larsen et al. |
| 2004/0054680 A1 | 3/2004 | Kelley et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0021683 A1 | 1/2005 | Newton et al. |
| 2005/0027881 A1 | 2/2005 | Figueira et al. |
| 2005/0083953 A1 | 4/2005 | May |
| 2005/0132044 A1 | 6/2005 | Guingo et al. |
| 2005/0147095 A1 | 7/2005 | Guerrero et al. |
| 2005/0220096 A1 | 10/2005 | Friskney et al. |
| 2006/0026225 A1 | 2/2006 | Canali et al. |
| 2006/0028999 A1 | 2/2006 | Iakobashvili et al. |
| 2006/0092940 A1 | 5/2006 | Ansari et al. |
| 2006/0092976 A1 | 5/2006 | Lakshman et al. |
| 2006/0182033 A1 | 8/2006 | Chen et al. |
| 2006/0182037 A1 | 8/2006 | Chen et al. |
| 2006/0193266 A1 | 8/2006 | Siddha et al. |
| 2006/0221961 A1 | 10/2006 | Basso et al. |
| 2007/0220358 A1 | 9/2007 | Goodill et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0040467 A1 | 2/2008 | Mendiratta et al. |
| 2008/0049614 A1 | 2/2008 | Briscoe et al. |
| 2008/0049621 A1 | 2/2008 | McGuire et al. |
| 2008/0071900 A1 | 3/2008 | Hecker et al. |
| 2008/0165704 A1 | 7/2008 | Marchetti et al. |
| 2008/0189769 A1 | 8/2008 | Casado et al. |
| 2008/0212963 A1 | 9/2008 | Fortin et al. |
| 2008/0225853 A1 | 9/2008 | Melman et al. |
| 2008/0240122 A1 | 10/2008 | Richardson et al. |
| 2008/0291910 A1 | 11/2008 | Tadimeti et al. |
| 2008/0301303 A1 | 12/2008 | Matsuoka |
| 2009/0031041 A1 | 1/2009 | Clemmensen |

(56) References Cited

U.S. PATENT DOCUMENTS

| | | |
|---|---|---|
| 2009/0043823 A1 | 2/2009 | Iftode et al. |
| 2009/0083445 A1 | 3/2009 | Ganga |
| 2009/0113031 A1 | 4/2009 | Ruan et al. |
| 2009/0122710 A1 | 5/2009 | Bar-Tor et al. |
| 2009/0150521 A1 | 6/2009 | Tripathi |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046530 A1 | 2/2010 | Hautakorpi et al. |
| 2010/0046531 A1 | 2/2010 | Louati et al. |
| 2010/0061231 A1 | 3/2010 | Harmatos et al. |
| 2010/0115101 A1 | 5/2010 | Lain et al. |
| 2010/0125667 A1 | 5/2010 | Soundararajan |
| 2010/0131636 A1 | 5/2010 | Suri et al. |
| 2010/0153554 A1 | 6/2010 | Anschutz et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0205479 A1 | 8/2010 | Akutsu et al. |
| 2010/0214949 A1 | 8/2010 | Smith et al. |
| 2010/0257263 A1 | 10/2010 | Casado et al. |
| 2010/0275199 A1 | 10/2010 | Smith et al. |
| 2010/0290485 A1 | 11/2010 | Martini et al. |
| 2010/0322255 A1 | 12/2010 | Hao et al. |
| 2011/0016215 A1 | 1/2011 | Wang |
| 2011/0026521 A1 | 2/2011 | Gamage |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0261825 A1 | 10/2011 | Ichino |
| 2011/0296052 A1 | 12/2011 | Guo et al. |
| 2011/0299534 A1 | 12/2011 | Koganti et al. |
| 2011/0299537 A1 | 12/2011 | Saraiya et al. |
| 2011/0310899 A1 | 12/2011 | Alkhatib et al. |
| 2011/0317559 A1 | 12/2011 | Kern et al. |
| 2012/0014386 A1 | 1/2012 | Xiong et al. |
| 2012/0147894 A1 | 6/2012 | Mulligan et al. |
| 2012/0185553 A1 | 7/2012 | Nelson |
| 2012/0236734 A1 | 9/2012 | Sampath et al. |
| 2012/0239790 A1 | 9/2012 | Doane et al. |
| 2013/0024579 A1 | 1/2013 | Zhang et al. |
| 2013/0054761 A1 | 2/2013 | Kempf et al. |
| 2013/0058346 A1 | 3/2013 | Sridharan et al. |
| 2013/0103817 A1 | 4/2013 | Koponen et al. |
| 2013/0103818 A1 | 4/2013 | Koponen et al. |
| 2013/0114466 A1 | 5/2013 | Koponen et al. |
| 2013/0117428 A1 | 5/2013 | Koponen et al. |
| 2013/0117429 A1 | 5/2013 | Koponen et al. |
| 2013/0163427 A1 | 6/2013 | Beliveau et al. |
| 2013/0163475 A1 | 6/2013 | Beliveau et al. |
| 2013/0208623 A1 | 8/2013 | Koponen et al. |
| 2013/0211549 A1 | 8/2013 | Thakkar et al. |
| 2013/0212148 A1 | 8/2013 | Koponen et al. |
| 2013/0212235 A1 | 8/2013 | Fulton et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0219037 A1 | 8/2013 | Thakkar et al. |
| 2013/0219078 A1 | 8/2013 | Padmanabhan et al. |
| 2013/0227097 A1 | 8/2013 | Yasuda et al. |
| 2013/0332602 A1 | 12/2013 | Nakil et al. |
| 2013/0332619 A1 | 12/2013 | Xie et al. |
| 2014/0016501 A1 | 1/2014 | Kamath et al. |
| 2014/0019639 A1 | 1/2014 | Ueno |

FOREIGN PATENT DOCUMENTS

| | | |
|---|---|---|
| CA | 2849930 | 5/2013 |
| EP | 0737921 | 10/1996 |
| EP | 1653688 | 5/2006 |
| EP | 2748977 | 7/2014 |
| EP | 2748990 | 7/2014 |
| JP | 2003-069609 | 3/2003 |
| JP | 2003-124976 | 4/2003 |
| JP | 2003-318949 | 11/2003 |
| JP | 2006-229967 | 8/2006 |
| WO | WO 2005/112390 | 11/2005 |
| WO | WO 2008/095010 | 8/2008 |
| WO | WO 2010/103909 | 9/2010 |
| WO | WO 2012/093429 | 7/2012 |
| WO | WO 2013/184846 | 12/2013 |

OTHER PUBLICATIONS

Das, Suarav, et al. "Simple Unified Control for Packet and Circuit Networks," Month Unknown, 2009, pp. 147-148, IEEE.

Portions of Prosecution History of U.S. Appl. No. 13/589,077, Jul. 21, 2014, Koponen, Teemu, et al.

Portions of Prosecution History of U.S. Appl. No. 13/661,010, Aug. 12, 2014, Koponen, Teemu, et al.

International Preliminary Report on Patentability and Written Opinion for PCT/US2012/062004, May 8, 2014 (mailing date), Nicira, Inc.

International Preliminary Report on Patentability and Written Opinion for PCT/US2012/062005, May 8, 2014 (mailing date), Nicira, Inc.

International Preliminary Report on Patentability and Written Opinion for PCT/US2012/062007, May 8, 2014 (mailing date), Nicira, Inc.

Wang, Wei-Ming, et al., "Analysis and Implementation of an Open Programmable Router Based on Forwarding and Control Element Separation," Journal of Computer Science and Technology, Sep. 2008, pp. 769-779, vol. 23, No. 5.

WO 2013/063329 with International Search Report, May 2, 2013, Nicira, Inc.

WO 2013/063330 with International Search Report, May 2, 2013, Nicira, Inc.

WO 2013/063332 with International Search Report, May 2, 2013, Nicira, Inc.

Adya, Atul, et al., "Cooperative Task Management without Manual Stack Management," Jun. 2002, 14 pages, Proceedings of the Usenix Annual Technical Conference, Monterey, CA, USA.

Andersen, David, et al., "Resilient Overlay Networks," Oct. 2001, 15 pages, 18th ACM Symp. On Operating Systems Principles (SOSP), Banff, Canada, ACM.

Anderson, Thomas, et al., "Overcoming the Internet Impasse through Virtualization," Apr. 2005, pp. 34-41, IEEE Computer Society.

Anhalt, Fabienne, et al., "Analysis and evaluation of a XEN based virtual router," Sep. 2008, pp. 1-60, Unite de recherché INRA Phone-Alpes, Montbonnot Saint-Ismier, France.

Anwer, Muhammad Bilal, et al., "Building A Fast, Virtualized Data Plane with Programmable Hardware," Aug. 17, 2009, pp. 1-8, VISA'09, Barcelona, Spain, ACM.

Author Unknown, "Cisco Nexis 1000V Series Switches," Date Unknown but prior to Jul. 29, 2010, 2 pages, Cisco Systems, Inc., http://web.archive.org/web/20100729045626/http://www.cisco.com/en/US/Products/ps9902/index.html.

Author Unknown, "Citrix Launches New XenServer Release as Market Share Growth Continues," Oct. 6, 2010, 3 pages, Citrix Systems, Inc. (http://www.citrix.com/English/ne/news/news.asp?newsID=2304355).

Author Unknown, "HP OpenView Enterprise Management Starter Solution," Jun. 2006, p. 1-4, Hewlett-Packard Development Company, HP.

Author Unknown, "HP OpenView Operations 8.0 for UNIX Developer's Toolkit," Month Unlknown, 2004, pp. 1-4, Hewlett-Packard Development Company, HP.

Author Unknown, "HP Web Jetadmin Integration into HP OpenView Network Node Manager," Feb. 2004, pp. 1-12, HP.

(56) References Cited

OTHER PUBLICATIONS

Author Unknown, "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.

Author Unknown, "Introduction to VMware Infrastructure: ESX Server 3.5, ESX Server 3i version 3.5, VirtualCenter 2.5," Revision Dec. 13, 2007, pp. 1-46, VMware, Inc., Palo Alto, California, USA.

Author Unknown, "Open vSwitch, An Open Virtual Switch," Date Unknown but prior to Dec. 30, 2010, 2 pages, http://www.openvswitch.org/, Open vSwitch.

Author Unknown, "OpenFlow Switch Specification, Version 0.9.0 (Wire Protocol 0x98)," Jul. 20, 2009, pp. 1-36, Open Networking Foundation.

Author Unknown, OpenFlow Switch Specification, Version 1.0.0 (Wire Protocol 0x01), Dec. 31, 2009, pp. 1-42, Open Networking Foundation.

Author Unknown, "Single Root I/O Virtualization and Sharing Specification, Revision 1.0," Sep. 11, 2007, pp. 1-84, PCI-SIG.

Author Unknown, "Virtual Machine Device Queues," White Paper, Month Unknown, 2007, pp. 1-4, Intel Corporation.

Author Unknown, "VMare for Linux Networking Support," Date Unknown but prior to Nov. 17, 1999, pp. 1-5, VMWare, Inc.

Ballani, Hitesh, et al., "Making Routers Last Longer with ViAggre," NSDI'09: 6th USENIX Symposium on Networked Systems Design and Implementation, Apr. 2009, pp. 453-466, USENIX Association.

Barham, Paul, et al., "Xen and the Art of Virtualization," Oct. 19-22, 2003, pp. 1-14, SOSP'03, Bolton Landing New York, USA.

Bavier, Andy, et. al., "In VINI Veritas: Realistic and Controlled Network Experimentation," SIGCOMM'06, Sep. 2006, pp. 1-14, Pisa, Italy.

Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.

Caesar, Matthew, et al., "Design and Implementation of a Routing Control Platform," NSDI '05: 2nd Symposium on Networked Systems Design & Implementation, Apr. 2005, pp. 15-28, Usenix Association.

Cai, Zheng, et al., "The Preliminary Design and Implementation of the Maestro Network Control Platform," Oct. 1, 2008, pp. 1-17, NSF.

Casado, Martin, et al. "Ethane: Taking Control of the Enterprise," SIGCOMM'07, Aug. 27-31, 2007, pp. 1-12, ACM, Kyoto, Japan.

Casado, Martin, et al., "Rethinking Packet Forwarding Hardware," Seventh ACM SIGCOMM' HotNets Workshop, Nov. 2008, pp. 1-6, ACM.

Casado, Martin, et al., "SANE: A Protection Architecture for Enterprise Networks," In proceedings of Usenix Security, Aug. 2006, pp. 1-15.

Casado, Martin, et al., "Scaling Out: Network Virtualization Revisited," Month Unknown, 2010, pp. 1-8.

Casado, Martin, et al., "Virtualizing the Network Forwarding Plane," Dec. 2010, pp. 1-6.

Congdon, Paul, "Virtual Ethernet Port Aggregator Standards body Discussion," Nov. 10, 2008, pp. 1-26, HP.

Cooper, Brian F., et al., "PNUTS: Yahoo!'s Hosted Data Serving Platform," VLDB'08, Aug. 24-30, 2008, pp. 1-12, ACM, Auckland, New Zealand.

Davoli, Renzo, "VDE: Virtual Distributed Ethernet," TRIDENTCOM'05, Feb. 23-25, 2005, pp. 1-8, IEEE Computer Society.

Dixon, Colin, et al., "An End to the Middle," Proceedings of the 12th conference on Hot topics in operating systems USENIX Association, May 2009, pp. 1-5, Berkeley, CA, USA.

Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.

Enns, R., "NETCONF Configuration Protocol," Dec. 2006, pp. 1-96, IETF Trust (RFC 4741).

Farinacci, D., et al., "Generic Routing Encapsulation (GRE)," Mar. 2000, pp. 1-9, The Internet Society (RFC 2784).

Farrel, A., "A Path Computation Element (PCS)—Based Architecture," Aug. 2006, pp. 1-41, RFC 4655.

Fischer, Anna, "[PATCH][RFC] net/bridge: add basic VEPA support," Jun. 2009, pp. 1- 5, GMANE Org.

Garfinkel, Tal, et al., "A Virtual Machine Introspection Based Architecture for Intrusion Detection," In Proc. Network and Distributed Systems Security Symposium, Feb. 2003, pp. 1-16.

Greenberg, Albert, et al., "A Clean Slate 4D Approach to Network Control and Management," ACM SIGCOMM Computer Communication Review, Oct. 2005, 12 pages, vol. 35, No. 5.

Greenberg, Albert, et al., "VL2: A Scalable and Flexible Data Center Network," SIGCOMM'09, Aug. 17-21, 2009, pp. 51-62, ACM, Barcelona, Spain.

Greenhalgh, Adam, et al., "Flow Processing and the Rise of Commodity Network Hardware," ACM SIGCOMM Computer Communication Review, Apr. 2009, pp. 21-26, vol. 39, No. 2.

Gude, Natasha, et al., "NOX: Towards an Operating System for Networks," ACM SIGCOMM Computer communication Review, Jul. 2008, pp. 105-110, vol. 38, No. 3.

Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.

Hamilton, James, et al., "Datacenter Networks are in my Way," Principals of Amazon Series, Oct. 28, 2010, pp. 1-14.

Hinrichs, Timothy L., et al., "Practical Declarative Network Management," WREN'09, Aug. 21, 2009, pp. 1-10, Barcelona, Spain.

Hunt, Patrick, et al., "ZooKeeper: Wait-free Coordination for Internet-Scale Systems," Proc. of Usenix Annual Technical Conference, Month Unknown, 2010, pp. 1-14.

Ioannidis, Sotiris, et al., "Implementing a Distributed Firewall," CCS'00, Month Unknown, 2000, pp. 1-10, ACM, Athens, Greece.

Joseph, Dilip, et al., "A Policy-aware Switching Layer for Date Centers," Jun. 24, 2008, 26 pages, Electrical Engineering and Computer Sciences, University of California, Berkeley, CA, USA.

Kamath, Daya, et. al., "Edge virtual Bridge Proposal, Version 0. Rev. 0.1," Apr. 23, 2010, pp. 1-72, IEEE.

Keller, Eric, et al., "The 'Platform as a Service' Model for Networking," Month Unknown, 2010, pp. 1-6.

Kim, Changhoon, et al., "Floodless in Seattle: A Scalable Ethernet Architecture for Large Enterprises," SIGCOMM'08, Aug. 17-22, 2008, pp. 3-14, ACM, Seattle, Washington, USA.

Kohler, Eddie, et al., "The Click Modular Router," ACM Trans. on Computer Systems, Aug. 2000, 34 pages, vol. 18, No. 3.

Koponen, Teemu, et al., "Onix: A Distributed Control Platform for Large-scale Production Networks," In Proc. OSDI, Oct. 2010, pp. 1-14.

Lakshminarayanan, Karthik, et al., "Routing as a Service," Month Unknown, 2004, pp. 1-15, Berkeley, California.

Luo, Jianying, et al., "Prototyping Fast, Simple, Secure Switches for Ethane," Month Unknown, 2007, pp. 1-6.

McKeown, Nick, et al., "OpenFlow: Enabling Innovation in Campus Networks," ACS SIGCOMM Computer communication Review, Apr. 2008, pp. 69-74, vol. 38, No. 2.

Mogul, Jeffrey C., et al., "API Design Challenges for Open Router Platforms on Proprietary Hardware," Oct. 2008, pp. 1-6.

Mysore, Radhka Niranjan, et al., "PortLand: A Scalable Fault-Tolerant Layer 2 Data Center Network Fabric," Proc. of SIGCOMM, Aug. 17-21, 2009, pp. 1-12.

Pelissier, Joe, "Network Interface Virtualization Review," Jan. 2009, pp. 1-38.

Pelissier, Joe, "VNTag 101," May 2008, pp. 1-87.

Pettit, Justin, et al., "Virtual Switching in an Era of Advanced Edges," Sep. 2010, 7 pages.

Pfaff, Ben., et al., "Extending Networking into the Virtualization Layer," Proc. of HotNets, Oct. 2009, pp. 1-6.

Rosen, E., et al., "Applicability Statement for BGP/MPLS IP Virtual Private Networks (VPNs)," The Internet Society, RFC 4365, Feb. 2006, pp. 1-32.

Sherwood, Rob, et al., "Can the Production Network be the Testbed?," Month Unknown, 2010, pp. 1-14.

(56) References Cited

OTHER PUBLICATIONS

Sherwood, Rob, et al., "Carving Research Slices Out of Your Production Networks with OpenFlow," ACM SIGCOMM Computer Communications Review, Jan. 2010, pp. 129-130, vol. 40, No. 1.
Sherwood, Rob, et al., "FlowVisor: A Network Virtualization Layer," Oct. 14, 2009, pp. 1-14, OPENFLOW-TR-2009-1.
Spalink, Tammo, et al., "Building a Robust Software-Based Router Using Network Processors," Month Unknown, 2001, pp. 216-229, ACM, Banff, CA.
Tavakoli, Arsalan, et al., "Applying NOX to the Datacenter," Proc. HotNets, Month Unknown, 2009, 6 pages.
Touch, J., et al., "Transparent Interconnection of Lots of Links (TRILL): Problem and Applicability Statement," May 2009, pp. 1-17, IETF Trust, RFC 5556.
Turner, Jonathan S., "A Proposed Architecture for the GENI Backbone Platform," ANCS'06, Dec. 3-5, 2006, 10 pages, ACM, San Jose, California, USA.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Wang, Yi, et al., "Virtual Routers on the Move: Live Router Migration as a Network-management Primitive," SIGCOMM 08, Aug. 17-22, 2008, 12 pages, ACM, Seattle, Washington, USA.
Yang, L., et al., "Forwarding and Control Element Separation (ForCES) Framework," Apr. 2004, pp. 1-40, The Internet Society.
Yu, Minlan, et al., "Scalable Flow-Based Networking with DIFANE," In Proc. SIGCOMM Aug. 2010, 16 pages.
Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.
Foster, Nate, et al., "Frenetic: A Network Programming Language," ICFP '11, Sep. 19-21, 2011, 13 pages, Tokyo, Japan.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 1 of 2, pp. 1-79.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 2 of 2, pp. 80-167.
Loo, Boon Thau, et al., "Declarative Routing: Extensible Routing with Declarative Queries," In Proc. of SIGCOMM, Aug. 21-26, 2005, 14 pages, Philadelphia, PA, USA.
Loo, Boon Thau, et al., "Implementing Declarative Overlays," In Proc. of SOSP, Oct. 2005, 16 pages, Brighton, UK.
Shenker, Scott, et al., "The Future of Networking, and the Past of Protocols," Dec. 2, 2011, pp. 1-30, USA.
Updated portions of prosecution history of U.S. Appl. No. 13/589,077, Jan. 20, 2015, Koponen, Teemu, et al.
Portions of prosecution history of U.S. Appl. No. 13/589,078, Jan. 23, 2015, Koponen, Teemu, et al.
Portions of prosecution history of U.S. Appl. No. 13/756,501, Mar. 17, 2015, Koponen, Teemu, et al.
Portions of prosecution history of U.S. Appl. No. 13/756,500, Mar. 27, 2015, Koponen, Teemu, et al.
Portions of prosecution history of U.S. Appl. No. 13/756,487, Mar. 18, 2015, Koponen, Teemu, et al.
Portions of prosecution history of U.S. Appl. No. 13/660,999, Jan. 26, 2015, Koponen, Teemu, et al.
Portions of prosecution history of U.S. Appl. No. 13/661,002, Mar. 13, 2015, Koponen, Teemu, et al.
Updated portions of prosecution history of U.S. Appl. No. 13/661,010, Feb. 23, 2015, Koponen, Teemu, et al.
Portions of prosecution history of AU2012328697, Mar. 2, 2015 (mailing date), Nicira, Inc.
Portions of prosecution history of EP12843934.6, Oct. 6, 2014 (mailing date), Nicira, Inc.
Portions of prosecution history of AU2012328699, Mar. 25, 2014 (mailing date), Nicira, Inc.
Portions of prosecution history of EP12844417.1, Oct. 7, 2014 (mailing date), Nicira, Inc.
Raganai, Chaparadza, et al., "An Architectural Reference Model for Autonomic Networking Cognitive Networking and Self-Management," Mar. 2012, 179 pages, The European Telecommunications Standards Institute, Sophia-Antipolis, France.
Portions of prosecution history of U.S. Appl. No. 13/756,485, Aug. 24, 2015, Koponen, Teemu, et al.
Portions of prosecution history of U.S. Appl. No. 13/756,486, Aug. 31, 2015, Thakkar, Pankaj, et al.
Portions of prosecution history of U.S. Appl. No. 13/756,488, Sep. 11, 2015, Thakkar, Pankaj, et al.
Portions of prosecution history of U.S. Appl. No. 13/756,494, Aug. 24, 2015, Koponen, Teemu, et al.
Portions of prosecution history of U.S. Appl. No. 13/756,496, Aug. 18, 2015, Fulton, Brian J., et al.
Portions of prosecution history of U.S. Appl. No. 13/756,499, Sep. 22, 2015, Padmanabhan, Amar, et al.
Updated portions of prosecution history of U.S. Appl. No. 13/589,077, Oct. 7, 2015, Koponen, Teemu, et al.
Updated portions of prosecution history of U.S. Appl. No. 13/589,078, Sep. 3, 2015, Koponen, Teemu, et al.
Updated portions of prosecution history of U.S. Appl. No. 13/660,999, Aug. 5, 2015, Koponen, Teemu, et al.
Updated portions of prosecution history of U.S. Appl. No. 13/661,002, Oct. 27, 2015, Koponen, Teemu, et al.
Updated portions of prosecution history of U.S. Appl. No. 13/661,010, Oct. 20, 2015, Koponen, Teemu, et al.
Updated portions of prosecution history of U.S. Appl. No. 13/756,487, Sep. 11, 2015, Koponen, Teemu, et al.
Updated portions of prosecution history of U.S. Appl. No. 13/756,500, Jun. 29, 2015, Koponen, Teemu, et al.
Updated portions of prosecution history of U.S. Appl. No. 13/756,501, Aug. 26, 2015, Koponen, Teemu, et al.
Updated portions of prosecution history of AU2012328697, Aug. 7, 2015 (mailing date), Nicira, Inc.
Portions of prosecution history of CA 2849930, Aug. 19, 2015 (mailing date), Nicira, Inc.
Updated portions of prosecution history of EP12843934.6, Jun. 6, 2015 (mailing date), Nicira, Inc.
Updated portions of prosecution history of AU2012328699, Mar. 31, 2015 (mailing date), Nicira, Inc.
Updated portions of prosecution history of EP12844417.1, Jun. 19, 2015 (mailing date), Nicira, Inc.
Fernandes, Natalia C., et al., "Virtual Networks: isolation, performance, and trends," Annals of Telecommunications, Oct. 7, 2010, pp. 339-355, vol. 66, Institut Telecom and Springer-Verlag, Paris.

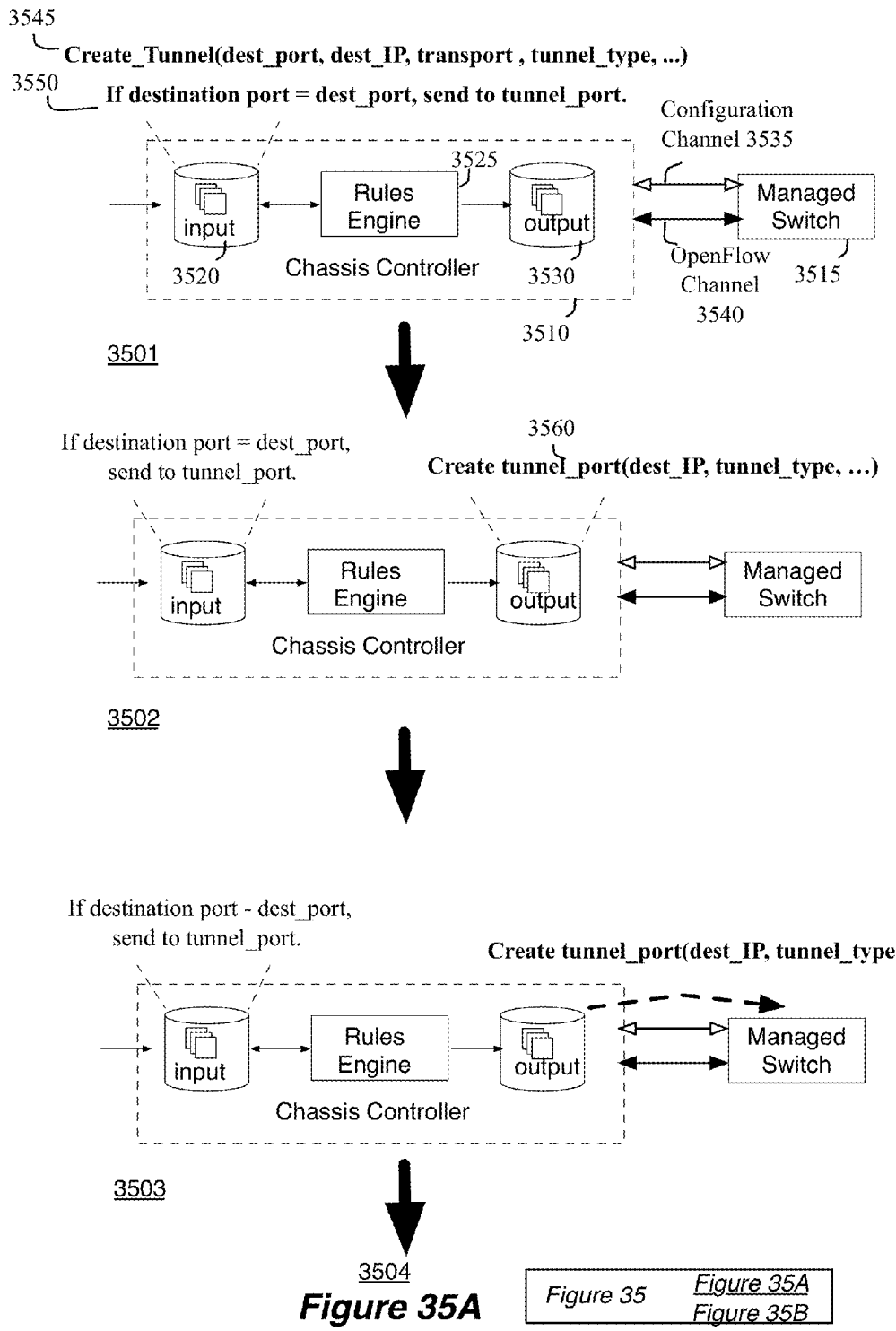

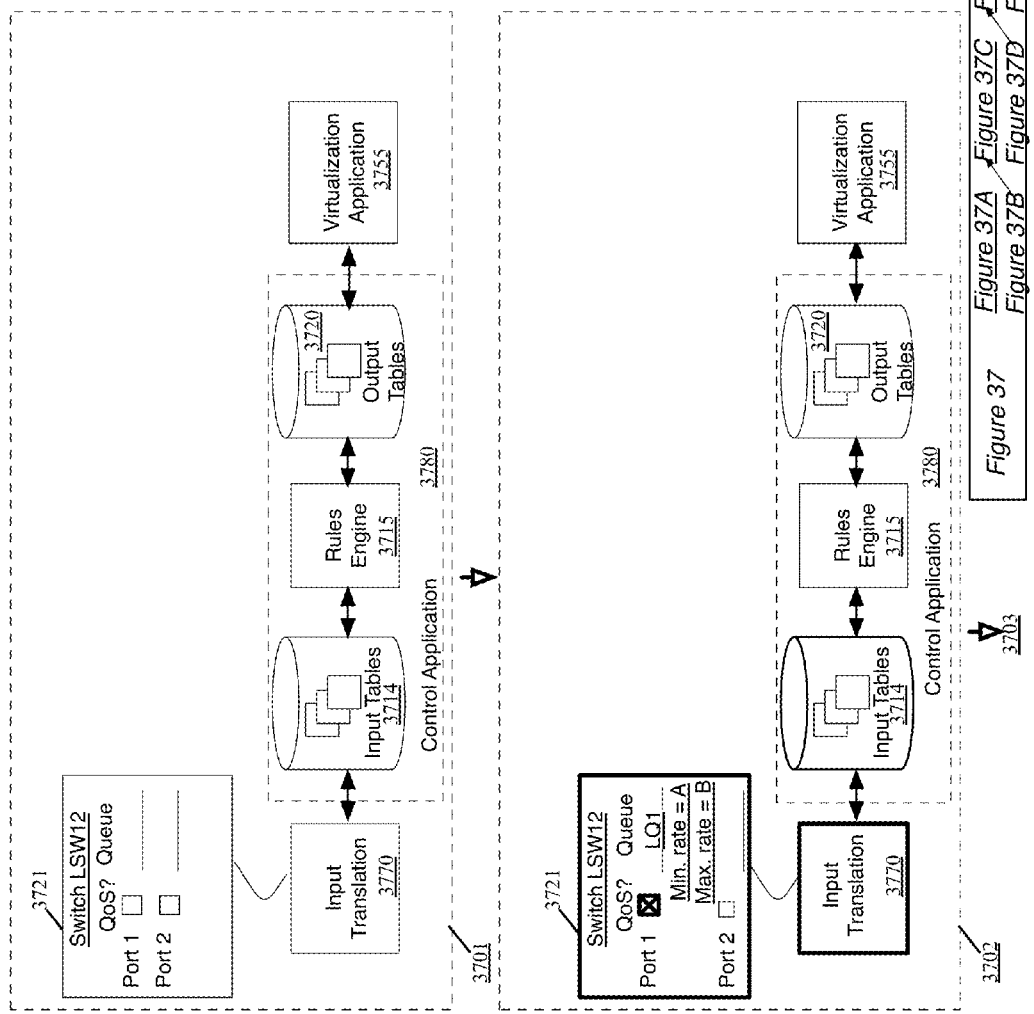

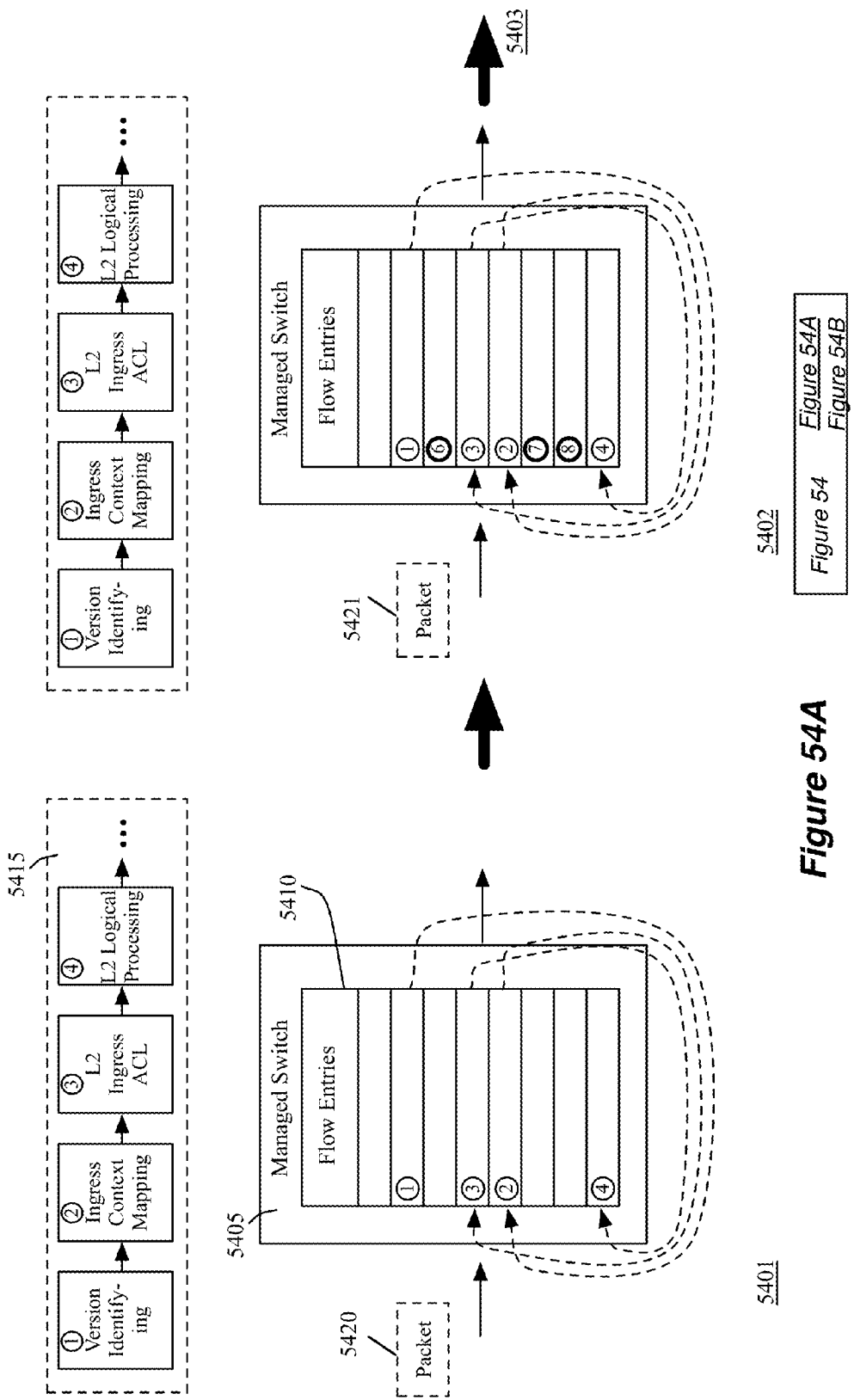

SCHEDULING DISTRIBUTION OF LOGICAL FORWARDING PLANE DATA

CLAIM OF BENEFIT TO PRIOR APPLICATIONS

This application is a continuation application of U.S. patent application Ser. No. 13/589,077, filed on Aug. 17, 2012, now issued as U.S. Pat. No. 9,178,833. U.S. patent application Ser. No. 13/589,077 claims the benefit of U.S. Provisional Application 61/551,425, filed Oct. 25, 2011; U.S. Provisional Application 61/551,427, filed Oct. 25, 2011; U.S. Provisional Application 61/577,085, filed Dec. 18, 2011; U.S. Provisional Application 61/595,027, filed Feb. 4, 2012; U.S. Provisional Application 61/599,941, filed Feb. 17, 2012; U.S. Provisional Application 61/610,135, filed Mar. 13, 2012; U.S. Provisional Application 61/635,056, filed Apr. 18, 2012; U.S. Provisional Application 61/635,226, filed Apr. 18, 2012; and U.S. Provisional Application 61/647,516, filed May 16, 2012. This application claims the benefit of U.S. Provisional Application 61/595,027, filed Feb. 4, 2012; U.S. Provisional Application 61/599,941, filed Feb. 17, 2012; U.S. Provisional Application 61/610,135, filed Mar. 13, 2012; U.S. Provisional Application 61/635,056, filed Apr. 18, 2012; U.S. Provisional Application 61/635,226, filed Apr. 18, 2012; and U.S. Provisional Application 61/647,516, filed May 16, 2012. U.S. patent application Ser. No. 13/589,077, now issued as U.S. Pat. No. 9,178,833, and U.S. Provisional Applications 61/551,425, 61/551,427, 61/577,085, 61/595,027, 61/599,941, 61/610,135, 61/635,056, 61/635,226, and 61/647,516 are incorporated herein by reference.

BACKGROUND

Many current enterprises have large and sophisticated networks comprising switches, hubs, routers, servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals results in hampering at least one of the others. For instance, one can easily provide network mobility for virtual machines within an L2 domain, but L2 domains cannot scale to large sizes. Furthermore, retaining user isolation greatly complicates mobility. As such, improved solutions that can satisfy the scalability, mobility, and multi-tenancy goals are needed.

BRIEF SUMMARY

Some embodiments of the invention provide a network control system that allows several different logical datapath sets to be specified for several different users through one or more shared forwarding elements without allowing the different users to control or even view each other's forwarding logic. These shared forwarding elements are referred to below as managed switching elements or managed forwarding elements as they are managed by the network control system in order to implement the logical datapath sets.

In some embodiments, the network control system includes one or more controllers (also called controller instances below) that allow the system to accept logical datapath sets from users and to configure the switching elements to implement these logical datapath sets. These controllers allow the system to virtualize control of the shared switching elements and the logical networks that are defined by the connections between these shared switching elements, in a manner that prevents the different users from viewing or controlling each other's logical datapath sets and logical networks while sharing the same switching elements.

In some embodiments, each controller instance is a device (e.g., a general-purpose computer) that executes one or more modules that transform the user input from a logical control plane to a logical forwarding plane, and then transform the logical forwarding plane data to physical control plane data. These modules in some embodiments include a control module and a virtualization module. A control module allows a user to specify and populate a logical datapath set, while a virtualization module implements the specified logical datapath set by mapping the logical datapath set onto the physical switching infrastructure. In some embodiments, the control and virtualization modules are two separate applications, while in other embodiments they are part of the same application.

In some of the embodiments, the control module of a controller receives logical control plane data (e.g., data that describes the connections associated with a logical switching element) that describes a logical datapath set from a user or another source. The control module then converts this data to logical forwarding plane data that is then supplied to the virtualization module. The virtualization module then generates the physical control plane data from the logical forwarding plane data. The physical control plane data is propagated to the managed switching elements. In some embodiments, the control and virtualization modules use an n Log engine to generate logical forwarding plane data from logical control plane data and physical control plane data from the logical forwarding plane data.

The network control system of some embodiments uses different controllers to perform different tasks. For instance, in some embodiments, there are three or four types of controllers. The first controller type is an application protocol interface (API) controller. API controllers are responsible for receiving configuration data and user queries from a user through API calls and responding to the user queries. The API controllers also disseminate the received configuration data to the other controllers. These controllers serve as the interface between users and the network control system. A second type of controller is a logical controller, which is responsible for implementing logical datapath sets by computing universal flow entries that are generic expressions of flow entries for the managed switching element that realize the logical datapath sets. A logical controller in some embodiments does not interact directly with the physical switching elements, but pushes the universal flow entries to a third type of controller, a physical controller.

Physical controllers in different embodiments have different responsibilities. In some embodiments, the physical controllers generate customized flow entries from the universal flow entries and push these customized flow entries down to the managed switching elements. In other embodiments, the physical controller identifies for a particular managed, physical switching element a fourth type of controller, a chassis controller, that is responsible for generating the customized flow entries for a particular switching element, and forwards the universal flow entries it receives from the logical controller to the chassis controller. The chassis controller then generates the customized flow entries from the universal flow entries and pushes these customized flow entries to the managed switching elements. In yet other embodiments, physical controllers generate customized flow entries for some managed switching elements, while directing chassis controllers to generate such flow entries for other managed switching elements.

Depending on the size of the deployment managed by a controller cluster, any number of each of the four types of controller may exist within the cluster. In some embodiments, a leader controller has the responsibility of partitioning the load over all the controllers and effectively assigning a list of logical datapath sets for each logical controller to manage and a list of physical switching elements for each physical controller to manage. In some embodiments, the API responsibilities are executed at each controller in the cluster. However, similar to the logical and physical responsibilities, some embodiments only run the API responsibilities on a subset of controllers. This subset, in some such embodiments, only performs API processing, which results in better isolation between the API operations and the rest of the system.

In some embodiments, the computation results (i.e., the creation of flows) not only flow from the top of the hierarchy towards the switching elements, but also may flow in the opposite direction, from the managed switching elements to the logical controllers. The primary reason for the logical controller to obtain information from the switching elements is the need to know the location of various virtual interfaces or virtual network interfaces (VIFs) among the managed switching elements. That is, in order to compute the universal flow entries for a logical datapath set, the logical controller is required to know the physical location in the network of the managed switching elements and the VIFs of the managed switching elements.

In some embodiments, each managed switching elements reports its VIFs to the physical controller responsible for the switch. The physical controller then publishes this information to all of the logical controllers. As such, the information flow from the switching elements to the logical controllers is done in a hierarchical manner, but one that is upside down compared to the hierarchy used for computing the flow entries. Because this information may potentially reach more and more controllers as it traverses up the hierarchy, the information should be limited in volume and not overly dynamic. This allows the publication of the information to avoid becoming a scalability bottleneck for the system, while enabling the information to be obtained by the upper layers of the hierarchy as soon as (or very shortly after) the information is generated at the switching elements.

There are other uses for publishing information upwards, beyond the need to know the location of the VIFs in the network. In some embodiments, various error-reporting subsystems at the controllers benefit from obtaining error reports from the switching elements (in the case that such errors exist). As with the VIF information, the switching elements of some embodiments only publish minimal information about the errors in order to limit the information volume (e.g., a simple piece of data indicating that "chassis X has some error"). Any interested controller may then pull additional information from the switch.

Instead of requiring all the information needed by the controllers to be published proactively, the network control system of some embodiments has the controllers "pull" the information from the lower layers as needed. For certain types of information, it may be difficult to determine in advance whether the information is needed by any of the controllers and, if it is needed, which of the controllers needs the information. For this sort of information, the controllers of some embodiments "pull" the information instead of passively receiving information automatically published by the lower layers. This enables the network control system in such embodiments to avoid the overhead of publishing all the information even when the information is not needed. The overhead cost is paid only when the information is actually needed, when the controllers pull the information.

Examples of information better off pulled by the controllers than automatically published by the managed switching elements include the API operations that read information from the lower layers of the system. For instance, when the API requests statistics of a particular logical port, this information must be obtained from the switch to which the particular logical port maps. As not all of the statistical information would be consumed constantly, it would be a waste of CPU resources to have the switching elements publishing this information regularly. Instead, the controllers request this information when needed. Some embodiments combine the use of the upwards-directed publishing (push-based information dissemination) with the pull-based dissemination. Specifically, the switching elements publish a minimal amount of information indicating that more information is available, and the controllers at the upper layers can then determine when they need to pull the additional information.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 35A and 35B conceptually illustrate in seven different stages an example operation of a chassis controller that translates universal tunnel flow instructions into customized instructions for a managed switching element to receive and use.

FIGS. 37A, 37B, 37C, 37D, 37E, 37F, and 37G conceptually illustrate an example of enabling QoS for a port of a logical switch.

FIGS. 54A and 54B conceptually illustrate a managed switching element and a processing pipeline performed by the managed switching element to process and forward packets coming to the managed switching element.

DETAILED DESCRIPTION

Figure 1:
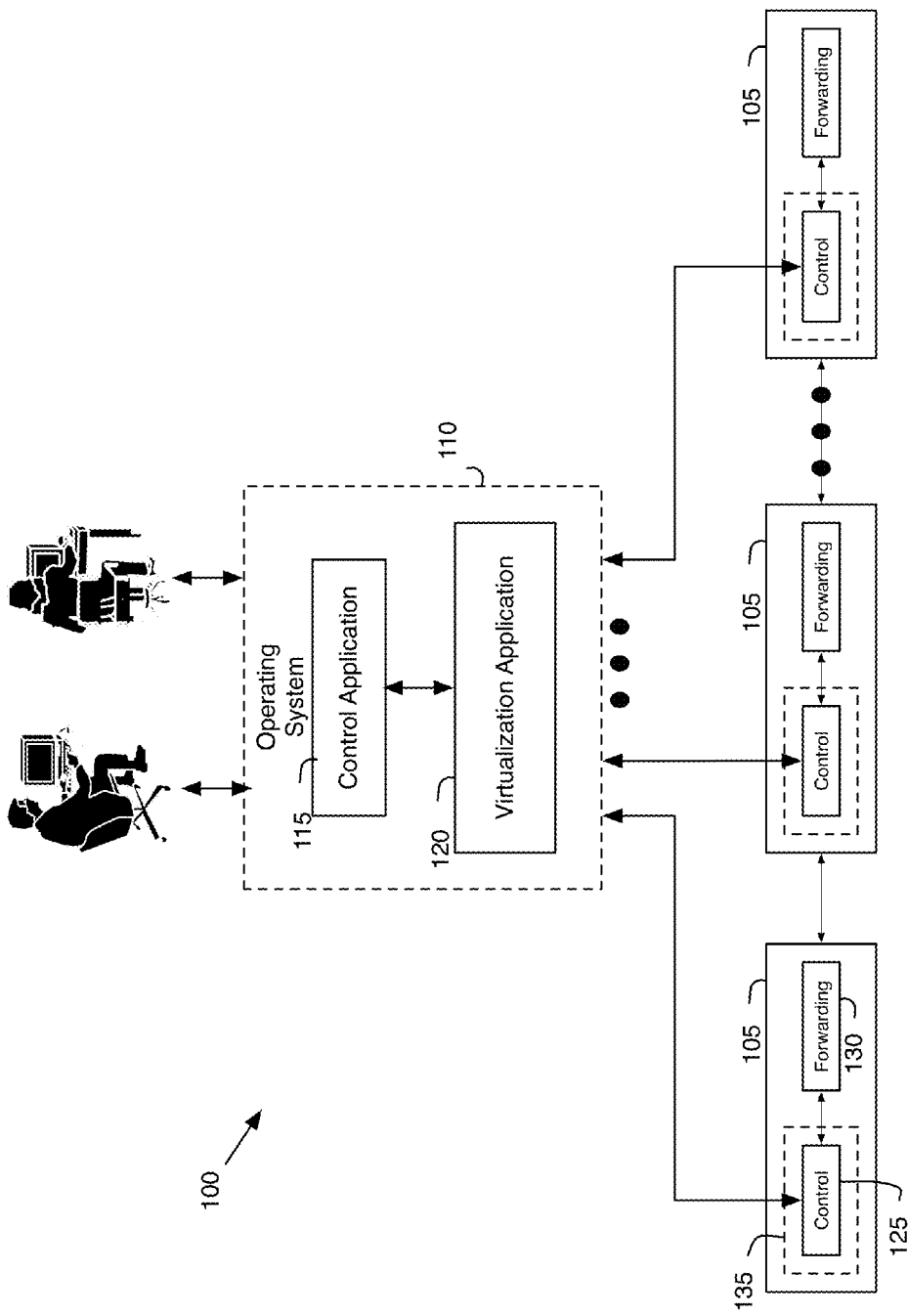
FIG. 1 illustrates a virtualized network system of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network control system that allows several different logical datapath sets to be specified for several different users through one or more shared forwarding elements without allowing the different users to control or even view each other's forwarding logic. The shared forwarding elements in some embodiments can include virtual or physical network switches, software switches (e.g., Open vSwitch), routers, and/or other switching devices, as well as any other network elements (such as load balancers, etc.) that establish connections between these switches, routers, and/or other switching devices. Such forwarding elements (e.g., physical switches or routers) are also referred to below as switching elements. In contrast to an off the shelf switch, a software forwarding element is a switching element that in some embodiments is formed by storing its switching table(s) and logic in the memory of a standalone device (e.g., a standalone computer), while in other embodiments, it is a switching element that is formed by storing its switching table(s) and logic in the memory of a device (e.g., a computer) that also executes a hypervisor and one or more virtual machines on top of that hypervisor.

These managed, shared switching elements are referred to below as managed switching elements or managed forwarding elements as they are managed by the network control system in order to implement the logical datapath sets. In some embodiments described below, the control system manages these switching elements by pushing physical control plane data to them, as further described below. Switching elements generally receive data (e.g., a data packet) and perform one or more processing operations on the data, such as dropping a received data packet, passing a packet that is received from one source device to another destination device, processing the packet and then passing it to a destination device, etc. In some embodiments, the physical control plane data that is pushed to a switching element is converted by the switching element (e.g., by a general purpose processor of the switching element) to physical forwarding plane data that specify how the switching element (e.g., how a specialized switching circuit of the switching element) processes data packets that it receives.

In some embodiments, the network control system includes one or more controllers (also called controller instances below) that allow the system to accept logical datapath sets from users and to configure the switching elements to implement these logical datapath sets. These controllers allow the system to virtualize control of the shared switching elements and the logical networks that are defined by the connections between these shared switching elements, in a manner that prevents the different users from viewing or controlling each other's logical datapath sets and logical networks while sharing the same managed switching elements.

In some embodiments, each controller instance is a device (e.g., a general-purpose computer) that executes one or more modules that transform the user input from a logical control plane to a logical forwarding plane, and then transform the logical forwarding plane data to physical control plane data. These modules in some embodiments include a control module and a virtualization module. A control module allows a user to specify and populate a logical datapath set, while a virtualization module implements the specified logical datapath set by mapping the logical datapath set onto the physical switching infrastructure. In some embodiments, the control and virtualization modules express the specified or mapped data in terms of records that are written into a relational database data structure. That is, the relational database data structure stores both the logical datapath input received through the control module and the physical data to which the logical datapath input is mapped by the virtualization module. In some embodiments, the control and virtualization applications are two separate applications, while in other embodiments they are part of the same application.

The above describes several examples of the network control system. Several more detailed embodiments are described below. First, Section I introduces a network controlled by distributed controller instances. Section II then describes the virtualized control system of some embodiments. Section III follows with a description of scheduling in the control system of some embodiments. Next, Section IV describes the universal forwarding state used in some embodiments. Section V describes the use of transactionality. Next, Section VI describes the distribution of network state between switching elements in some embodiments of the control system. Section VII then describes logical forwarding environment for some embodiments. Finally, Section VIII describes an electronic system with which some embodiments of the invention are implemented.

I. Distributed Controller Instances

As mentioned, some of the embodiments described below are implemented in a novel network control system that is formed by one or more controllers (controller instances) for managing several managed switching elements. In some embodiments, the control application of a controller receives logical control plane data (e.g., network control plane), and converts this data to logical forwarding plane data that is then supplied to the virtualization application. The virtualization application then generates the physical control plane data from the logical forwarding plane data. The physical control plane data is propagated to the managed switching elements.

In some embodiments, the controller instance uses a network information base (NIB) data structure to send the physical control plane data to the managed switching elements. Several examples of using the NIB data structure to send the data down to the managed switching elements are described in U.S. patent application Ser. Nos. 13/177,529, now issued as U.S. Pat. No. 8,743,889, and 13/177,533, now issued as U.S. Pat. No. 8,817,620, which are incorporated herein by reference. As described in the U.S. application Ser. Nos. 13/177,529 and 13/177,533, a controller instance of some embodiments uses an n Log engine to generate logical forwarding plane data from logical control plane data and physical control plane data from the logical forwarding plane data. The controller instances of some embodiments communicate with each other to exchange the generated logical and physical data. In some embodiments, the NIB data structure may serve as a communication medium between different controller instances. However, some embodiments of the invention described below do not use the NIB data structure and instead use one or more communication channels (e.g., RPC calls) to exchange the logical data and/or the physical data between different controller instances, and to exchange other data (e.g., API calls) between the controller instances. The following describes such a network control system in greater detail.

The network control system of some embodiments uses different controllers to perform different tasks. The network control system of some embodiments includes groups of controllers, with each group having different kinds of responsibilities. Some embodiments implement a controller cluster in a dynamic set of physical servers. Thus, as the size of the deployment increases, or when a particular controller or physical server on which a controller is operating fails, the cluster and responsibilities within the cluster are reconfigured among the remaining active controllers. In order to manage such reconfigurations, the controllers in the cluster of some embodiments run a consensus algorithm to determine a leader controller. The leader controller partitions the tasks for which each controller instance in the cluster is responsible by assigning a master controller for a particular work item, and in some cases a hot-standby controller to take over in case the master controller fails.

Within the controller cluster of some embodiments, there are three or four types of controllers categorized based on three kinds of controller responsibilities. The first controller type is an application protocol interface (API) controller. API controllers are responsible for receiving configuration data and user queries from a user through API calls and responding to the user queries. The API controllers also disseminate the received configuration data to the other controllers. These controllers serve as the interface between users and the network control system. In some embodiment, the API controllers are referred to as input translation controllers. A second type of controller is a logical controller, which is responsible for implementing logical datapath sets by computing universal flow entries that realize the logical datapath sets. Examples of universal flow entries are described below. A logical controller in some embodiments does not interact directly with the physical switching elements, but pushes the universal flow entries to a third type of controller, a physical controller.

Physical controllers in different embodiments have different responsibilities. In some embodiments, the physical controllers generate customized flow entries from the universal flow entries and push these customized flow entries down to the managed switching elements. In other embodiments, the physical controller identifies for a particular managed, physical switching element a fourth type of controller, a chassis controller, that is responsible for generating the customized flow entries for a particular switching element, and forwards the universal flow entries it receives from the logical controller to the chassis controller. The chassis controller then generates the customized flow entries from the universal flow entries and pushes these customized flow entries to the managed switching elements. In yet other embodiments, physical controllers generate customized flow entries for some managed switching elements, while directing chassis controllers to generate such flow entries for other managed switching elements.

Depending on the size of the deployment managed by a controller cluster, any number of each of the four types of controller may exist within the cluster. In some embodiments, the leader controller has the responsibility of partitioning the load over all the controllers and effectively assigning a list of logical datapath sets for each logical controller to manage and a list of physical switching elements for each physical controller to manage. In some embodiments, the API responsibilities are executed at each controller in the cluster. However, similar to the logical and physical responsibilities, some embodiments only run the API responsibilities on a subset of controllers. This subset, in some such embodiments, only performs API processing, which results in better isolation between the API operations and the rest of the system.

In some embodiments, the design spectrum for the computing the forwarding state by the controllers spans from either a completely centralized control system to a completely distributed control system. In a fully centralized system, for example, a single controller manages the entire network. While this design is simple to analyze and implement, it runs into difficulty in meeting practical scalability requirements. A fully distributed network control system, on the other hand, provides both redundancy and scaling, but comes with the challenge of designing a distributed protocol per network control problem. Traditional routing protocols distributed among the routers of a network are an example of such a distributed solution.

In the virtualization solution of some embodiments, the network controller system strikes a balance between these goals of achieving the necessary scaling and redundancy without converging towards a fully decentralized solution that would potentially be very complicated to both analyze and implement. Thus, the controllers of some embodiments are designed to run in a hierarchical manner with each layer in the hierarchy responsible for certain functionalities or tasks. The higher layers of the hierarchy focus on providing control over all of the aspects managed by the system, whereas the lower layers become more and more localized in scope.

At the topmost level of the hierarchy in some embodiments are the logical controllers. In some embodiments, each logical datapath set is managed by a single logical controller. Thus, a single controller has full visibility to the state for the logical datapath set, and the computation (e.g., to generate flows) for any particular logical datapath set is "centralized" in a single controller, without requiring distribution over multiple controllers. Different logical controllers are then responsible for different logical datapath sets, which provides the easy scalability at this layer. The logical controllers push the results of the computation, which are universal flow-based descriptions of the logical datapath sets, to the physical controllers at the next layer below.

In some embodiments, the physical controllers are the boundary between the physical and logical worlds of the control system. Each physical controller manages a subset of the managed switching elements of the network and is responsible for obtaining the universal flow information from the logical controllers and either (1) generating customized flow entries for its switching elements and pushing the customized flow entries to its switching elements, or (2) pushing the received universal flow information to each switching element's chassis controller and having this chassis controller generate the customized flow entries for its switching element and push the generated flow entries to its switching element. In other words, the physical controllers or chassis controllers of some embodiments translate the flow entries from a first physical control plane (a universal physical control plane) that is generic for any managed switching element used to implement a logical datapath set into a second physical control plane (a customized physical control plane) that is customized for a particular managed switching element associated with the physical controller or chassis controller.

As the number of switching elements (e.g., both hardware and software switching elements) managed by the system increases, more physical controllers can be added so that the load of the switch management does not become a scalability bottleneck. However, as the span of the logical datapath set (i.e., the number of physical machines that host virtual machines connected to the logical datapath set) increases, the number of the logical datapath sets for which a single physical controller is responsible increases proportionally. If the number of logical datapath sets that the physical controller is required to handle grows beyond its limits, the physical controller could become a bottleneck in the system. Nevertheless, in embodiments where the physical controllers of some embodiments is primarily responsible for moving universal flow entries to chassis controller of physical switching elements that need the universal flows, the computational overhead per logical datapath set should remain low.

In some embodiments, the chassis controllers of the managed switching elements are at the lowest level of the hierarchical network control system. Each chassis controller receives universal flow entries from a physical controller, and customizes these flow entries into a custom set of flow entries for its associated managed switching element. In some embodiments, the chassis controller runs within its managed switching element or adjacent to its managed switching element.

The chassis controller is used in some embodiments to minimize the computational load on the physical controller. In these embodiments, the physical controllers primarily act as a relay between the logical controllers and the chassis controller to direct the universal flow entries to the correct chassis controller for the correct managed switching elements. In several embodiments described below by reference to figures, the chassis controllers are shown to be outside of the managed switching elements. Also, in several of these embodiments, the chassis controllers operate on the same host machine (e.g., same computer) on which the managed software switching element executes. In some embodiments, the switching elements receive OpenFlow entries (and updates over the configuration protocol) from the chassis controller.

When placing the chassis controllers within or adjacent to the switching elements is not possible, the physical controllers in some embodiments continue to perform the computation to translate universal flow information to customized flow information and send the physical flow information (using OpenFlow and configuration protocols) to the switching elements in which the chassis controllers are not available. For instance, some hardware switching elements may not have the capability to run a controller. When the physical controller does not perform such customization and no controller chassis is available for a particular managed switching element, another technique used by some embodiments is to employ daemons to generate custom physical control plane data from the universal physical control plane data. These alternative techniques are further described below.

As described above, the computation results (i.e., the creation of flows) flow from the top of the hierarchy towards the switching elements. In addition, information may flow in the opposite direction, from the managed switching elements to the logical controllers. The primary reason for the logical controller to obtain information from the switching elements is the need to know the location of various virtual interfaces or virtual network interfaces (VIFs) among the managed switching elements. That is, in order to compute the universal flow entries for a logical datapath set, the logical controller is required to know the physical location in the network of the managed switching elements and the VIFs of the managed switching elements.

In some embodiments, each managed switching elements reports its VIFs to the physical controller responsible for the switch. The physical controller then publishes this information to all of the logical controllers. As such, the information flow from the switching elements to the logical controllers is done in a hierarchical manner, but one that is upside down compared to the hierarchy used for computing the flow entries. Because this information may potentially reach more and more controllers as it traverses up the hierarchy, the information should be limited in volume and not overly dynamic. This allows the publication of the information to avoid becoming a scalability bottleneck for the system, while enabling the information to be obtained by the upper layers of the hierarchy as soon as (or very shortly after) the information is generated at the switching elements.

There are other uses for publishing information upwards, beyond the need to know the location of the VIFs in the network. In some embodiments, various error-reporting subsystems at the controllers benefit from obtaining error reports from the switching elements (in the case that such errors exist). As with the VIF information, the switching elements of some embodiments only publish minimal information about the errors in order to limit the information volume (e.g., a simple piece of data indicating that "chassis X has some error"). Any interested controller may then pull additional information from the switch.

Instead of requiring all the information needed by the controllers to be published proactively, the network control system of some embodiments has the controllers "pull" the information from the lower layers as needed. For certain types of information, it may be difficult to determine in advance whether the information is needed by any of the controllers and, if it is needed, which of the controllers needs the information. For this sort of information, the controllers of some embodiments "pull" the information instead of passively receiving information automatically published by the lower layers. This enables the network control system in such embodiments to avoid the overhead of publishing all the information even when the information is not needed. The overhead cost is paid only when the information is actually needed, when the controllers pull the information.

Examples of information better off pulled by the controllers than automatically published by the managed switching elements include the API operations that read information from the lower layers of the system. For instance, when the API requests statistics of a particular logical port, this information must be obtained from the switch to which the particular logical port maps. As not all of the statistical information would be consumed constantly, it would be a waste of CPU resources to have the switching elements publishing this information regularly. Instead, the controllers request this information when needed.

The downside to pulling information as opposed to receiving published information is responsiveness. Only by pulling a particular piece of information does a controller know whether the information was worth retrieving (e.g., whether the pulled value has changed or not since the last pull). To overcome this downside, some embodiments combine the use of the upwards-directed publishing (push-based information dissemination) with the pull-based dissemination. Specifically, the switching elements publish a minimal amount of information indicating that more information is available, and the controllers at the upper layers can then determine when they need to pull the additional information.

Various mechanisms are used by some embodiments in order to realize the network control system described above. This application will describe both computational mechanisms (e.g., for translating the forwarding state between data planes) as well as mechanisms for disseminating information (both intra-controller communication and controller-switch communication).

The computation of the forwarding state within a single controller may be performed by using an n Log engine in some embodiments. For both directions of information flow (logical controller to switch and switch to logical controller), the n Log engine running in a controller takes as input events received from other controllers or switching elements and outputs new events to send to the other controllers/switching elements. To compute the forwarding state, at each level of the hierarchy an n Log engine is responsible for receiving the network state (e.g., in the form of tuples) from the higher layers, computing the state in a new data plane (e.g., also in the form of tuples), and pushing the computed information downwards. To publish information upwards, the controllers and switching elements use the same approach in some embodiments, with only the direction and type of computations performed by the n Log engine being different. That is, the n Log engine receives the network state (tuples) from the lower layers and computes the state in a new data plane (tuples) to be published or pulled upwards.

API queries are "computed" in some embodiments. In some embodiments, the API query processing can be transformed into n Log processing: an incoming event corresponds to a query, which may result in a tuple being computed locally. Similarly, the query processing may result in recursive query processing: the query processing at the first level controllers results in a new tuple that corresponds to a query to be sent to next level controllers; and the first query does not finish before it receives the response from the controller below.

Thus, some embodiments include a hierarchy of controllers that each locally uses n Log to process received updates/requests and produce new updates/responses. In order to carry out such a hierarchy, the controllers need to be able to communicate with each other. As the computation in these embodiments is based on n Log, tuples are the primary for of state information that needs to be transferred for the forwarding state and API querying. As such, some embodiments allow the n Log instances to directly integrate with a channel that provides a tuple-level transport between controllers, so that n Log instances can easily send tuples to other controllers. Using this channel, n Log can provide the publishing of information both upwards and downwards, as well as implement the query-like processing using tuples to correspond queries and the responses to the queries.

The channel used for this communication in some embodiments is a remote procedure call (RPC) channel providing batching of tuple updates (so that an RPC call is not required for every tuple and an RPC call handles a batch of tuples). In addition, the transactional aspects utilize a concept of commit (both blocking and non-blocking) from the channel in some embodiments.

By using the RPC channels to exchange tuples directly among controllers and switching elements, the network control system of some embodiments can avoid using an objected-oriented programming presentation (e.g., the NIB presentation described in U.S. patent application Ser. No. 13/177,529) of the state exchanged between the controllers. That is, the n Log instances in some embodiments transform the inputs/outputs between the NIB and tuple formats when entering or leaving the n Log runtime system, while in other embodiments such translation becomes unnecessary and the implementation becomes simpler because the tuples can be exchanged directly among controllers and switching elements. Thus, in these embodiments, the state dissemination mechanism is actually point-to-point between controllers.

However, the information flows among the controllers of these embodiments possess two identifiable patterns built on the point-to-point channels. The first such information flow pattern is flooding. Certain information (e.g., the location of VIFs) is flooded to a number of controllers, by sending the same information across multiple RPC channels. The second such pattern is point-to-point information flow. Once minimal information has been flooded so that a controller can identify which available information is actually needed, the controllers can then transfer the majority of the information across RPC channels directly between the producing and consuming controllers, without reverting to more expensive flooding.

Prior to a more extensive discussion of the network control system of some embodiments, some examples of its use will now be provided. First, in order to compute flows, an API controller of some embodiments creates an RPC channel to a logical controller responsible for a logical datapath set and sends logical datapath set configuration information to the logical controller. In addition, the API controller sends physical chassis configuration information to a physical controller managing the chassis. The physical controller receives VIF locations from its managed switching elements, and floods the VIF locations to all of the logical controllers. This information allows the logical controller to identify the one or more physical chassis that host the VIFs belonging to the logical datapath set. Using this information, the logical controller computes the universal flows for the logical datapath set and creates an RPC channel to the physical controllers that manage the chassis hosting the logical datapath set in order to push the universal flow information down to these physical controllers. The physical controller can then relay the universal flows (or translated physical flows) down to the chassis controller at the managed switch.

A second example use of the network control system is the processing of an API query. In some embodiments, an API controller receives a request for port statistics for a particular logical port. The API controller redirects the request to the logical controller responsible for managing the logical datapath set that contains the particular logical port. The logical controller then queries the physical controller that hosts the VIF bound to the particular logical port, and the physical controller in turn queries the chassis (or chassis controller) at which the VIF is located for this information, and responds back. Each of these information exchanges (API controller to logical controller to physical controller to chassis, and back) occurs over RPC channels.

II. Virtualized Control System

A. External Layers for Pushing Flows to Control Layer

FIG. 1 illustrates a virtualized network system 100 of some embodiments of the invention. This system allows multiple users to create and control multiple different LDP sets on a shared set of network infrastructure switching elements (e.g., switches, virtual switches, software switches, etc.). In allowing a user to create and control the user's set of LDP sets (i.e., the user's switching logic), the system does not allow the user to have direct access to another user's set of LDP sets in order to view or modify the other user's switching logic. However, the system does allow different users to pass packets through their virtualized switching logic to each other if the users desire such communication.

As shown in FIG. 1, the system 100 includes one or more switching elements 105 and a network controller 110. The switching elements include N switching devices (where N is a number equal to one or greater) that form the network infrastructure switching elements of the system 100. In some embodiments, the network infrastructure switching elements includes virtual or physical network switches, software switches (e.g., Open vSwitch), routers, and/or other switching devices, as well as any other network elements (such as load balancers, etc.) that establish connections between these switches, routers, and/or other switching devices. All such network infrastructure switching elements are referred to below as switching elements or forwarding elements.

The virtual or physical switching devices 105 typically include control switching logic 125 and forwarding switching logic 130. In some embodiments, a switch's control logic 125 specifies (1) the rules that are to be applied to incoming packets, (2) the packets that will be discarded, and (3) the packet processing methods that will be applied to incoming packets. The virtual or physical switching elements 105 use the control logic 125 to populate tables governing the forwarding logic 130. The forwarding logic 130 performs lookup operations on incoming packets and forwards the incoming packets to destination addresses.

As further shown in FIG. 1, the network controller 110 includes a control application 115 through which switching logic is specified for one or more users (e.g., by one or more administrators or users) in terms of LDP sets. The network controller 110 also includes a virtualization application 120 that translates the LDP sets into the control switching logic to be pushed to the switching devices 105. In this application, the control application and the virtualization application are referred to as "control engine" and "virtualization engine" for some embodiments.

In some embodiments, the virtualization system 100 includes more than one network controller 110. The network controllers include logical controllers that each is responsible for specifying control logic for a set of switching devices for a particular LDPS. The network controllers also include physical controllers that each pushes control logic to a set of switching elements that the physical controller is responsible for managing. In other words, a logical controller specifies control logic only for the set of switching elements that implement the particular LDPS while a physical controller pushes the control logic to the switching elements that the physical controller manages regardless of the LDP sets that the switching elements implement.

In some embodiments, the virtualization application of a network controller uses a relational database data structure to store a copy of the switch-element states tracked by the virtualization application in terms of data records (e.g., data tuples). The switch-element tracking will be described in detail further below. These data records represent a graph of all physical or virtual switching elements and their interconnections within a physical network topology and their forwarding tables. For instance, in some embodiments, each switching element within the network infrastructure is represented by one or more data records in the relational database data structure. However, in other embodiments, the relational database data structure for the virtualization application stores state information about only some of the switching elements. For example, as further described below, the virtualization application in some embodiments only keeps track of switching elements at the edge of a network infrastructure. In yet other embodiments, the virtualization application stores state information about edge switching elements in a network as well as some non-edge switching elements in the network that facilitate communication between the edge switching elements.

In some embodiments, the relational database data structure is the heart of the control model in the virtualized network system 100. Under one approach, applications control the network by reading from and writing to the relational database data structure. Specifically, in some embodiments, the application control logic can (1) read the current state associated with network entity records in the relational database data structure and (2) alter the network state by operating on these records. Under this model, when a virtualization application 120 needs to modify a record in a table (e.g., a control plane flow table) of a switching element 105, the virtualization application 120 first writes one or more records that represent the table in the relational database data structure. The virtualization application then propagates this change to the switching element's table.

In some embodiments, the control application also uses the relational database data structure to store the logical configuration and the logical state for each user specified LDPS. In these embodiments, the information in the relational database data structure that represents the state of the actual switching elements accounts for only a subset of the total information stored in the relational database data structure.

In some embodiments, the control and virtualization applications use a secondary data structure to store the logical configuration and the logical state for a user specified LDPS. This secondary data structure in these embodiments serves as a communication medium between different network controllers. For instance, when a user specifies a particular LDPS using a logical controller that is not responsible for the particular LDPS, the logical controller passes the logical configuration for the particular LDPS to another logical controller that is responsible for the particular LDPS via the secondary data structures of these logical controllers. In some embodiments, the logical controller that receives from the user the logical configuration for the particular LDPS passes the configuration data to all other controllers in the virtualized network system. In this manner, the secondary storage structure in every logical controller includes the logical configuration data for all LDP sets for all users in some embodiments.

The operating system of some embodiments provides a set of different communication constructs (not shown) for the control and virtualization applications and the switching elements 105 of different embodiments. For instance, in some embodiments, the operating system provides a managed switching element communication interface (not shown)

between (1) the switching elements 105 that perform the physical switching for any one user, and (2) the virtualization application 120 that is used to push the switching logic for the users to the switching elements. In some of these embodiments, the virtualization application manages the control switching logic 125 of a switching element through a commonly known switch-access interface that specifies a set of APIs for allowing an external application (such as a virtualization application) to control the control plane functionality of a switching element. Specifically, the managed switching element communication interface implements the set of APIs so that the virtualization application can send the records stored in the relational database data structure to the switching elements using the managed switching element communication interface. Two examples of such known switch-access interfaces are the OpenFlow interface and the Open Virtual Managed switching element communication interface, which are respectively described in the following two papers: McKeown, N. (2008). *OpenFlow: Enabling Innovation in Campus Networks* (which can be retrieved from http://www.openflowswitch.org//documents/openflow-wp-latest.pdf), and Pettit, J. (2010). *Virtual Switching in an Era of Advanced Edges* (which can be retrieved from http://openvswitch.org/papers/dccaves2010.pdf). These two papers are incorporated herein by reference.

It is to be noted that for those embodiments described above and below where the relational database data structure is used to store data records, a data structure that can store data in the form of object-oriented data objects can be used alternatively or conjunctively. An example of such data structure is the NIB data structure.

FIG. 1 conceptually illustrates the use of switch-access APIs through the depiction of halos 135 around the control switching logic 125. Through these APIs, the virtualization application can read and write entries in the control plane flow tables. The virtualization application's connectivity to the switching elements' control plane resources (e.g., the control plane tables) is implemented in-band (i.e., with the network traffic controlled by the operating system) in some embodiments, while it is implemented out-of-band (i.e., over a separate physical network) in other embodiments. There are only minimal requirements for the chosen mechanism beyond convergence on failure and basic connectivity to the operating system, and thus, when using a separate network, standard IGP protocols such as IS-IS or OSPF are sufficient.

In order to define the control switching logic 125 for switching elements when the switching elements are physical switching elements (as opposed to software switches), the virtualization application of some embodiments uses the Open Virtual Switch protocol to create one or more control tables within the control plane of a switch. The control plane is typically created and executed by a general purpose CPU of the switching element. Once the system has created the control table(s), the virtualization application then writes flow entries to the control table(s) using the OpenFlow protocol. The general purpose CPU of the physical switching element uses its internal logic to convert entries written to the control table(s) to populate one or more forwarding tables in the forwarding plane of the switching element. The forwarding tables are created and executed typically by a specialized switching chip of the switching element. Through its execution of the flow entries within the forwarding tables, the switching chip of the switching element can process and route packets of data that it receives.

In some embodiments, the virtualized network system 100 includes a chassis controller in addition to logical and physical controllers. In these embodiments, the chassis controller implements the switch-access APIs to manage a particular switching element. That is, it is the chassis controller that pushes the control logic to the particular switching element. The physical controller in these embodiments functions as an aggregation point to relay the control logic from the logical controllers to the chassis controllers interfacing the set of switching elements for which the physical controller is responsible. The physical controller distributes the control logic to the chassis controllers managing the set of switching elements. In these embodiments, the managed switching element communication interface that the operating system of a network controller establishes a communication channel (e.g., a Remote Procedure Call (RPC) channel) between a physical controller and a chassis controller so that the physical controller can send the control logic stored as data records in the relational database data structure to the chassis controller. The chassis controller in turn will push the control logic to the switching element using the switch-access APIs or other protocols.

The communication constructs that the operating system of some embodiments provides also include an exporter (not shown) that a network controller can use to send data records to another network controller (e.g., from a logical controller to another logical controller, from a physical controller to another physical controller, from a logical controller to a physical controller, from a physical controller to a logical controller, etc.). Specifically, the control application and the virtualization application of a network controller can export the data records stored in the relational database data structure to one or more other network controllers using the exporter. In some embodiments, the exporter establishes a communication channel (e.g., an RPC channel) between two network controllers so that one network controller can send data records to another network controller over the channel.

The operating system of some embodiments also provides an importer that a network controller can use to receive data records from an network controller. The importer of some embodiments functions as a counterpart to the exporter of another network controller. That is, the importer is on the receiving end of the communication channel established between two network controllers. In some embodiments, the network controllers follow a publish-subscribe model in which a receiving controller subscribes to channels to receive data only from the network controllers that supply the data in which the receiving controller is interested.

B. Pushing Flows

Figure 2:
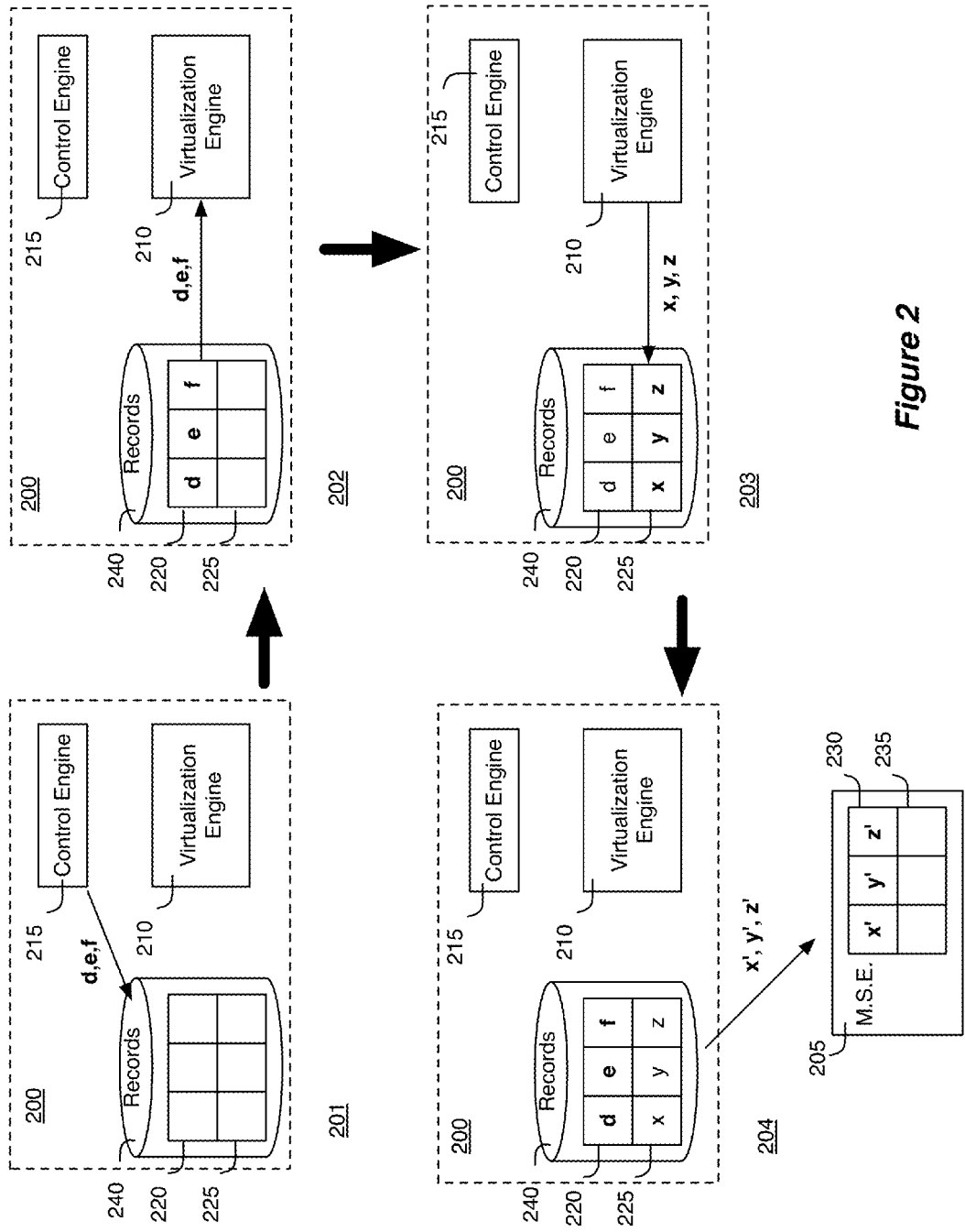
FIG. 2 presents one example that illustrates the functionality of a network controller.

FIG. 2 presents one example that illustrates the functionality of a network controller. In particular, this figure illustrates in four stages 201-204 the modification of a record (e.g., a flow table record) in a managed switching element 205 by a network controller 200. In this example, the managed switching element 205 has a switch logic record 230. As shown in stage 201 of FIG. 2, records 240 stores two records 220 and 225 that correspond to the switch logic record 230 of the switch. In some embodiments, the records 220 and 225 are stored in a relational database data structure 240 to and from which the control engine and the virtualization engine of a network controller write data and get data. The record 220 holds logical data that is an output of the control engine 215 that generates logical data based on a user's specification of a LDPS. The record 225 holds physical data that is an output of the virtualization engine 210 that generates physical data based on the logical data that the control application generates.

In the first stage 201, the control application writes three new values d, e, f to the record 220 in this example. The values d, e, f represent logical data (e.g., a logical flow entry) generated by the control engine 215. The second stage 202 shows that the virtualization engine detects and reads the values d, e, f to use as an input to generate physical data (e.g., a physical flow entry). The third stage 203 illustrates that the virtualization engine 210 generates values x, y, z based on the values d, e, f and writes the values x, y, z into the relational database data structure 240, specifically, into the record 225.

Next, the network controller 200 writes the values x, y, z into the managed switching element 205. In some embodiments, the network controller 200 performs a translation operation that modifies the format of the record 225 before writing the record into the switch. These operations are pictorially illustrated in FIG. 2 by showing the values x, y, z translated into x',y',z', and the writing of these new values into the managed switching element 205. In these embodiments, the managed switching element communication interface (not shown) of the network controller 200 would perform the translation and send the translated record to the managed switching element 205 using switch-access APIs (e.g., OpenFlow).

The network controller 200 illustrated in FIG. 2 has a single relational database data structure in some embodiments. However, in other embodiments, the network controller 200 has more than one relational database data structure to store records written and read by the control and virtualization engines. For instance, the control engine 215 and the virtualization engine 210 may each have a separate relational database data structure from which to read data and to which to write data.

C. Pushing Flows to Edge Switching Elements

Figure 3:
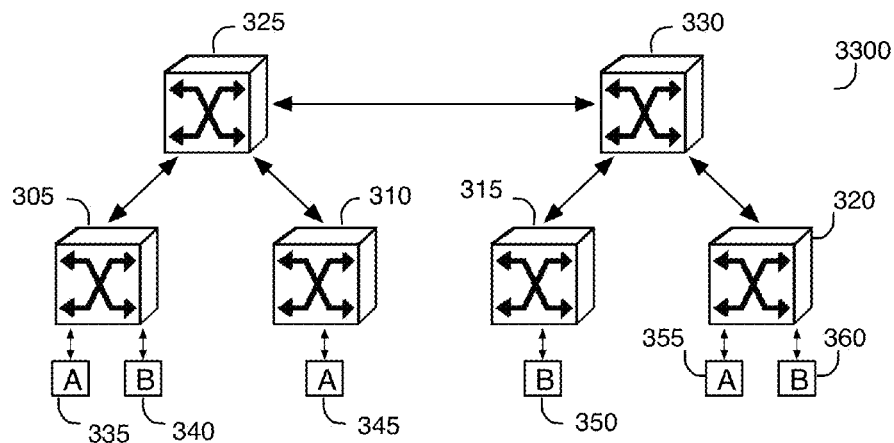
FIG. 3 illustrates the switch infrastructure of a multi-user server hosting system.
Figure 4:
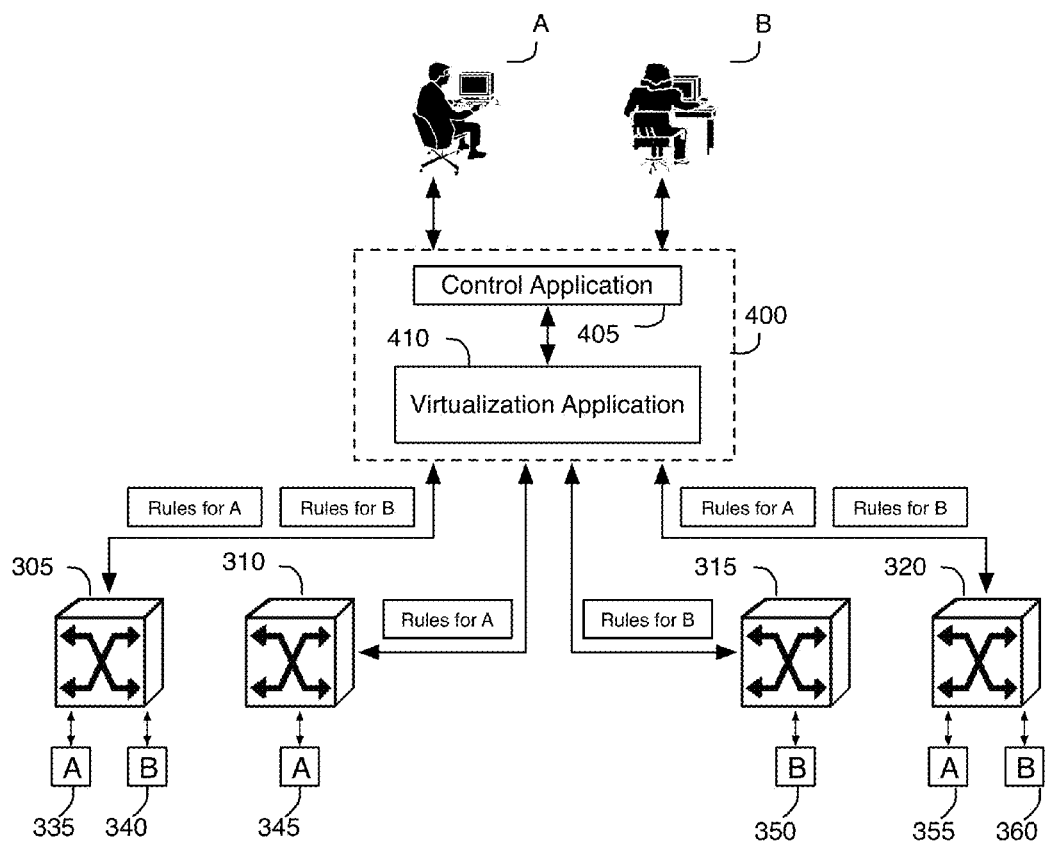
FIG. 4 illustrates a network controller that manages edge switching elements.

As mentioned above, the relational database data structure in some embodiments stores data regarding each switching element within the network infrastructure of a system, while in other embodiments, the relational database data structure only stores state information about switching elements at the edge of a network infrastructure. FIGS. 3 and 4 illustrate an example that differentiates the two differing approaches. Specifically, FIG. 3 illustrates the switch infrastructure of a multi-user server hosting system. In this system, six switching elements are employed to interconnect six machines of two users A and B. Four of these switching elements 305-320 are edge switching elements that have direct connections with the machines 335-360 of the users A and B, while two of the switching elements 325 and 330 are interior switching elements (i.e., non-edge switching elements) that interconnect the edge switching elements and connect to each other. All the switching elements illustrated in the Figures described above and below may be software switching elements in some embodiments, while in other embodiments the switching elements are mixture of software and physical switching elements. For instance, the edge switching elements 305-320 as well as the non-edge switching elements 325-330 are software switching elements in some embodiments. Also, "machines" described in this application include virtual machines and physical machines such as computing devices.

FIG. 4 illustrates a network controller 400 that manages the edge switching elements 305-320. The network controller 400 is similar to the network controller 110 described above by reference to FIG. 1. As shown in FIG. 4, the controller 400 includes a control application 405 and a virtualization application 410. The operating system for the controller 400 creates and maintains a relational database data structure (not shown), which contains data records regarding only the four edge switching elements 305-320. In addition, the applications 405 and 410 running on the operating system allow the users A and B to modify their switching element configurations for the edge switching elements that they use. The network controller 400 then propagates these modifications, if needed, to the edge switching elements. Specifically, in this example, two edge switching elements 305 and 320 are used by machines of both users A and B, while edge switching element 310 is only used by the machine 345 of the user A and edge switching element 315 is only used by the machine 350 of the user B. Accordingly, FIG. 4 illustrates the network controller 400 modifying users A and B records in switching elements 305 and 320, but only updating user A records in switching element 310 and only user B records in switching element 315.

The controller 400 of some embodiments only controls edge switching elements (i.e., only maintains data in the relational database data structure regarding edge switching elements) for several reasons. Controlling edge switching elements provides the controller with a sufficient mechanism for maintaining isolation between machines (e.g., computing devices), which is needed, as opposed to maintaining isolation between all switching elements, which is not needed. The interior switching elements forward data packets between switching elements. The edge switching elements forward data packets between machines and other network elements (e.g., other switching elements). Thus, the controller can maintain user isolation simply by controlling the edge switching element because the edge switching element is the last switching element in line to forward packets to a machine.

Controlling only edge switching element also allows the controller to be deployed independent of concerns about the hardware vendor of the non-edge switching elements, because deploying at the edge allows the edge switching elements to treat the internal nodes of the network as simply a collection of elements that moves packets without considering the hardware makeup of these internal nodes. Also, controlling only edge switching elements makes distributing switching logic computationally easier. Controlling only edge switching elements also enables non-disruptive deployment of the controller because edge-switching solutions can be added as top of rack switching elements without disrupting the configuration of the non-edge switching elements.

In addition to controlling edge switching elements, the network controller of some embodiments also utilizes and controls non-edge switching elements that are inserted in the switch network hierarchy to simplify and/or facilitate the operation of the controlled edge switching elements. For instance, in some embodiments, the controller requires the switching elements that it controls to be interconnected in a hierarchical switching architecture that has several edge switching elements as the leaf nodes and one or more non-edge switching elements as the non-leaf nodes. In some such embodiments, each edge switching element connects to one or more of the non-leaf switching elements, and uses such non-leaf switching elements to facilitate its communication with other edge switching elements. Examples of functions that a non-leaf switching element of some embodiments may provide to facilitate such communications between edge switching elements in some embodiments include (1) forwarding of a packet with an unknown destination address (e.g., unknown MAC address) to the non-leaf switching element so that this switching element can route this packet to the appropriate edge switch, (2) forwarding a multicast or broadcast packet to the non-leaf switching element so that this switching element can convert this packet to a series of unicast packets to the desired destinations, (3) bridging remote managed networks that are separated by one or more networks, and (4) bridging a managed network with an unmanaged network.

Some embodiments employ one level of non-leaf (non-edge) switching elements that connect to edge switching elements and to other non-leaf switching elements. Other embodiments, on the other hand, employ multiple levels of non-leaf switching elements, with each level of non-leaf switching element after the first level serving as a mechanism to facilitate communication between lower level non-leaf switching elements and leaf switching elements. In some embodiments, the non-leaf switching elements are software switching elements that are implemented by storing the switching tables in the memory of a standalone computer instead of an off the shelf switch. In some embodiments, the standalone computer may also be executing in some cases a hypervisor and one or more virtual machines on top of that hypervisor. Irrespective of the manner by which the leaf and non-leaf switching elements are implemented, the relational database data structure of the controller of some embodiments stores switching state information regarding the leaf and non-leaf switching elements.

The above discussion relates to the control of edge switching elements and non-edge switching elements by a network controller of some embodiments. In some embodiments, edge switching elements and non-edge switching elements (leaf and non-leaf nodes) may be referred to as managed switching elements. This is because these switching elements are managed by the network controller (as opposed to unmanaged switching elements, which are not managed by the network controller, in the network) in order to implement LDP sets through the managed switching elements.

Network controllers of some embodiments implement a logical switching element across the managed switching elements based on the physical data and the logical data described above. A logical switching element can be defined to function any number of different ways that a switching element might function. The network controllers implement the defined logical switching element through control of the managed switching elements. In some embodiments, the network controllers implement multiple logical switching elements across the managed switching elements. This allows multiple different logical switching elements to be implemented across the managed switching elements without regard to the network topology of the network.

The managed switching elements of some embodiments can be configured to route network data based on different routing criteria. In this manner, the flow of network data through switching elements in a network can be controlled in order to implement multiple logical switching elements across the managed switching elements.

D. Logical switching Elements and Physical Switching Elements

Figure 5:
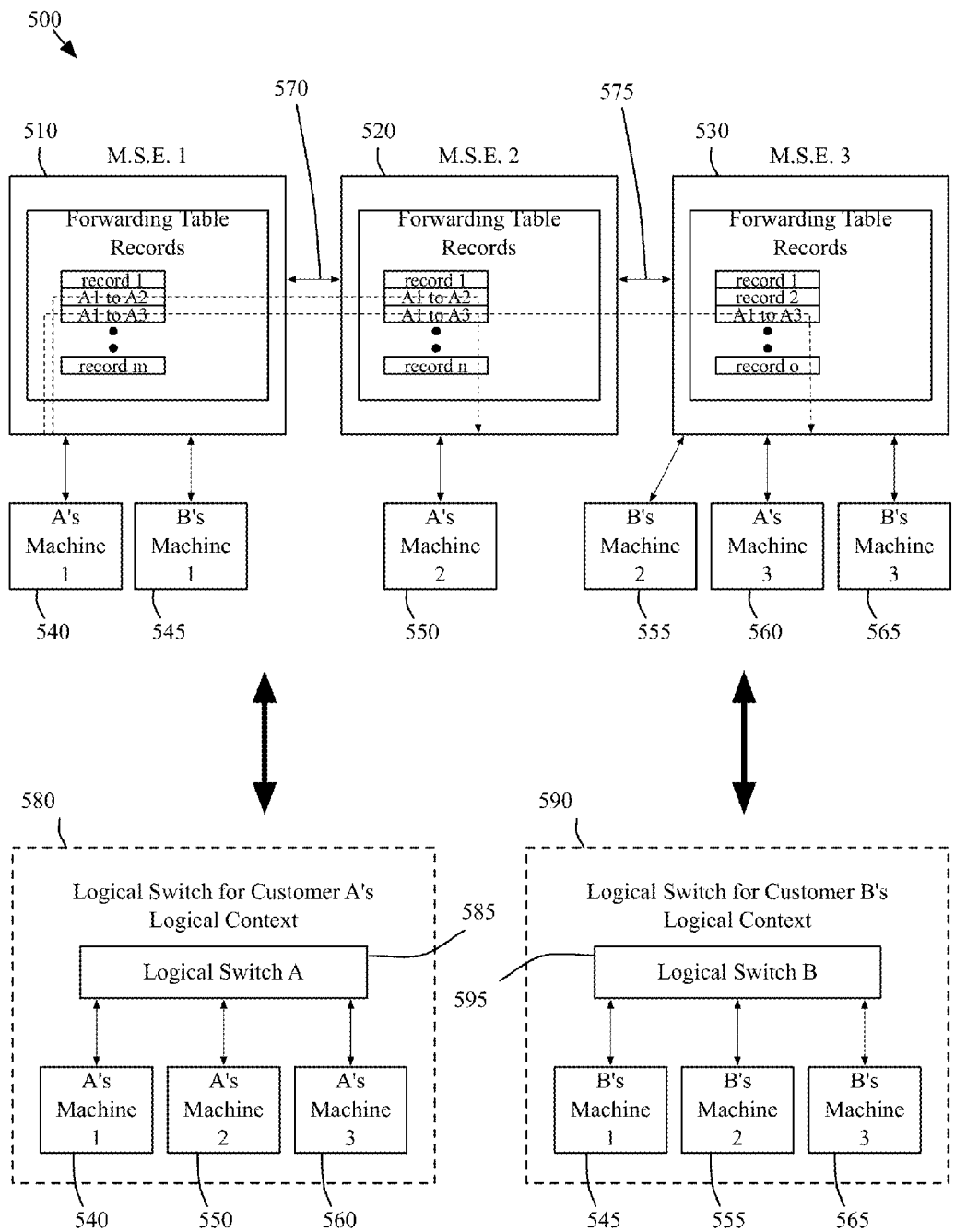
FIG. 5 illustrates an example of multiple logical switching elements implemented across a set of switching elements.

FIG. 5 illustrates an example of multiple logical switching elements implemented across a set of switching elements. In particular, FIG. 5 conceptually illustrates logical switching elements 580 and 590 implemented across managed switching elements 510-530. As shown in FIG. 5, a network 500 includes managed switching elements 510-530 and machines 540-565. As indicated in this figure, the machines 540, 550, and 560 belong to user A and the machines 545, 555, and 565 belong to user B.

The managed switching elements 510-530 of some embodiments route network data (e.g., packets, frames, etc.) between network elements in the network that are coupled to the managed switching elements 510-530. As shown, the managed switching element 510 routes network data between the machines 540 and 545 and the switching element 520. Similarly, the switching element 520 routes network data between the machine 550 and the managed switching elements 510 and 530, and the switching element 530 routes network data between the machines 555-565 and the switching element 520.

Moreover, each of the managed switching elements 510-530 routes network data based on the switch's forwarding logic, which in some embodiments are in the form of tables. In some embodiments, a forwarding table determines where to route network data (e.g., a port on the switch) according to routing criteria. For instance, a forwarding table of a layer 2 switching element may determine where to route network data based on MAC addresses (e.g., source MAC address and/or destination MAC address). As another example, a forwarding table of a layer 3 switching element may determine where to route network data based on IP addresses (e.g., source IP address and/or destination IP address). Many other types of routing criteria are possible.

As shown in FIG. 5, the forwarding table in each of the managed switching elements 510-530 includes several records. In some embodiments, each of the records specifies operations for routing network data based on routing criteria. The records may be referred to as flow entries in some embodiments as the records control the "flow" of data through the managed switching elements 510-530.

FIG. 5 also illustrates conceptual representations of each user's logical network. As shown, the logical network 580 of user A includes a logical switching element 585 to which user A's machines 540, 550, and 560 are coupled. User B's logical network 590 includes a logical switching element 595 to which user B's machines 545, 555, and 565 are coupled. As such, from the perspective of user A, user A has a switching element to which only user A's machines are coupled, and, from the perspective of user B, user B has a switching element to which only user B's machines are coupled. In other words, to each user, the user has its own network that includes only the user's machines.

The following will describe the conceptual flow entries for implementing the flow of network data originating from the machine 540 and destined for the machine 550 and originating from the machine 540 and destined for the machine 560. First, the flow entries for routing network data originating from the machine 540 and destined for the machine 550 will be described followed by the flow entries for routing network data originating from the machine 540 and destined for the machine 560.

The flow entry "A1 to A2" in the managed switching element 510's forwarding table instructs the managed switching element 510 to route network data that originates from machine 510 and is destined for the machine 550 to the switching element 520. The flow entry "A1 to A2" in the forwarding table of the switching element 520 instructs the switching element 520 to route network data that originates from machine 510 and is destined for the machine 550 to the machine 550. Therefore, when the machine 540 sends network data that is destined for the machine 550, the managed switching elements 510 and 520 route the network data along datapath 570 based on the corresponding records in the switching elements' forwarding tables.

Furthermore, the flow entry "A1 to A3" in the managed switching element 510's forwarding table instructs the managed switching element 510 to route network data that originates from machine 540 and is destined for the machine 560 to the switching element 520. The flow entry "A1 to A3" in the forwarding table of the switching element 520 instructs the switching element 520 to route network data that originates from machine 540 and is destined for the machine 560 to the switching element 530. The flow entry "A1 to A3" in the forwarding table of the switching element 530 instructs the switching element 530 to route network data that originates from machine 540 and is destined for the machine 560 to the machine 560. Thus, when the machine 540 sends network data that is destined for the machine 560, the managed switching elements 510-530 route the network data along datapaths 570 and 575 based on the corresponding records in the switching elements' forwarding tables.

While conceptual flow entries for routing network data originating from the machine 540 and destined for the machine 550 and originating from the machine 540 and destined for the machine 560 are described above, similar flow entries would be included in the forwarding tables of the managed switching elements 510-530 for routing network data between other machines in user A's logical network 580. Moreover, similar flow entries would be included in the forwarding tables of the managed switching elements 510-530 for routing network data between the machines in user B's logical network 590.

The conceptual flow entries shown in FIG. 5 includes both the source and destination information for the managed switching elements to figure out the next-hop switching elements to which to send the packets. However, the source information does not have to be in the flow entries as the managed switching elements of some embodiments can figures out the next-hope switching elements using the destination information (e.g., a context identifier, a destination address, etc.) only.

In some embodiments, tunnels provided by tunneling protocols (e.g., control and provisioning of wireless access points (CAPWAP), generic route encapsulation (GRE), GRE Internet Protocol Security (IPsec), etc.) may be used to facilitate the implementation of the logical switching elements 585 and 595 across the managed switching elements 510-530. By tunneling, a packet is transmitted through the switches and routers as a payload of another packet. That is, a tunneled packet does not have to expose its addresses (e.g., source and destination MAC addresses) as the packet is forwarded based on the addresses included in the header of the outer packet that is encapsulating the tunneled packet. Tunneling, therefore, allows separation of logical address space from the physical address space as a tunneled packet can have addresses meaningful in the logical address space while the outer packet is forwarded/routed based on the addresses in the physical address space. In this manner, the tunnels may be viewed as the "logical wires" that connect managed switching elements in the network in order to implement the logical switches 585 and 595.

In some embodiments, unidirectional tunnels are used. For instance, a unidirectional tunnel between the managed switching element 510 and the switching element 520 may be established, through which network data originating from the machine 540 and destined for the machine 550 is transmitted. Similarly, a unidirectional tunnel between the managed switching element 510 and the switching element 530 may be established, through which network data originating from the machine 540 and destined for the machine 560 is transmitted. In some embodiments, a unidirectional tunnel is established for each direction of network data flow between two machines in the network.

Alternatively, or in conjunction with unidirectional tunnels, bidirectional tunnels can be used in some embodiments. For instance, in some of these embodiments, only one bidirectional tunnel is established between two switching elements. Referring to FIG. 5 as an example, a tunnel would be established between the managed switching elements 510 and 520, a tunnel would be established between the managed switching elements 520 and 530, and a tunnel would be established between the managed switching elements 510 and 530.

Configuring the switching elements in the various ways described above to implement multiple logical switching elements across a set of switching elements allows multiple users, from the perspective of each user, to each have a separate network and/or switching element while the users are in fact sharing some or all of the same set of switching elements and/or connections between the set of switching elements (e.g., tunnels, physical wires).

Figure 6:
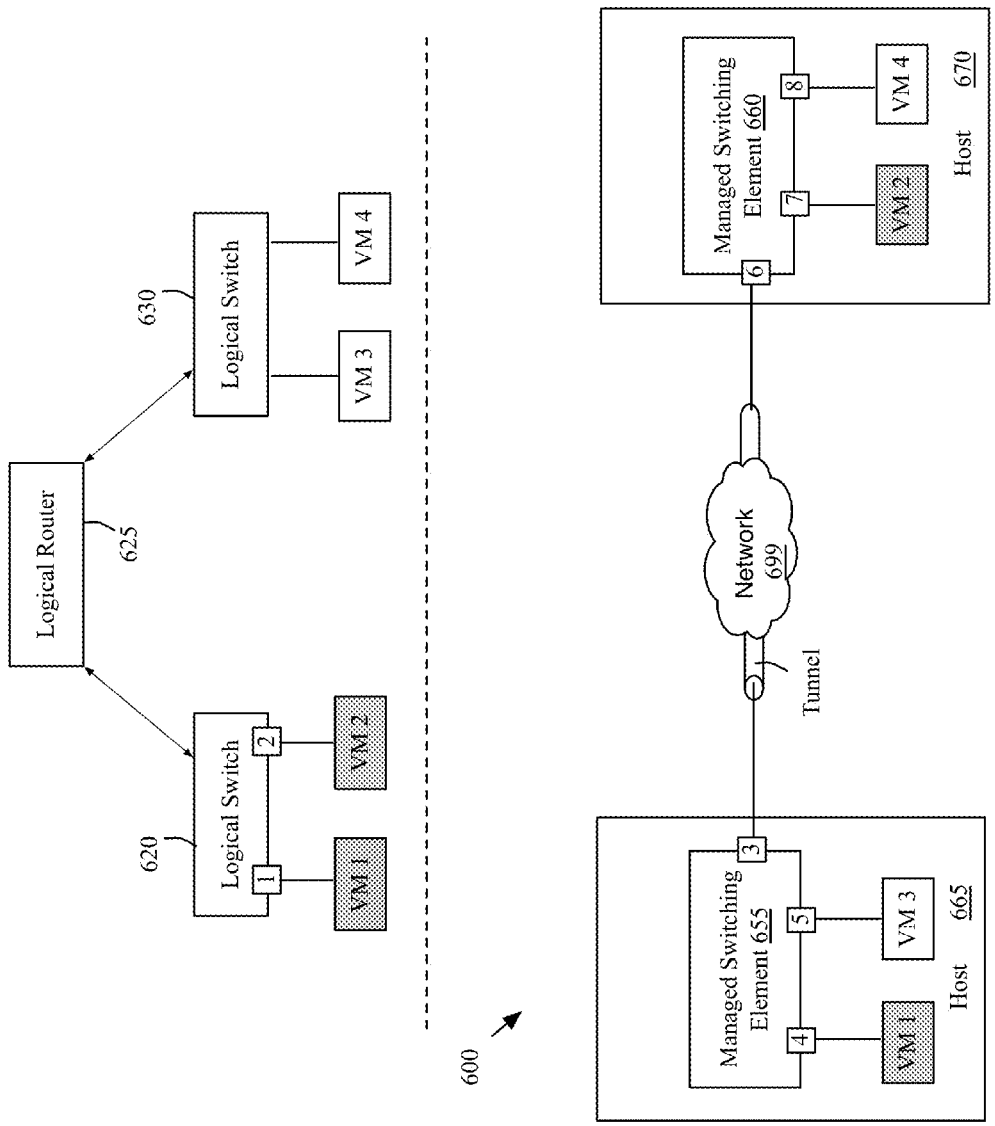
FIG. 6 illustrates a network architecture of some embodiments which implements a logical router and logical switching.

Although FIG. 5 illustrates implementation of logical switching elements in a set of managed switching elements, it is possible to implement a more complex logical network (e.g., that includes several logical L3 routers) by configuring the forwarding tables of the managed switching elements. FIG. 6 conceptually illustrates an example of a more complex logical network. FIG. 6 illustrates an network architecture 600 of some embodiments which implements a logical router 625 and logical switching elements 620 and 630. Specifically, the network architecture 600 represents a physical network that effectuate logical networks whose data packets are switched and/or routed by the logical router 625 and the logical switching elements 620 and 630. The figure illustrates in the top half of the figure the logical router 625 and the logical switching elements 620 and 630. This figure illustrates, in the bottom half of the figure, the managed switching elements 655 and 660. The figure illustrates machines 1-4 in both the top and the bottom of the figure.

In this example, the logical switching element 620 forwards data packets between the logical router 625, machine 1, and machine 2. The logical switching element 630 forwards data packets between the logical router 625, machine 3, and machine 4. As mentioned above, the logical router 625 routes data packets between the logical switching elements 620 and 630 and other logical routers and switches (not shown). The logical switching elements 620 and 630 and the logical router 625 are logically coupled through logical ports (not shown) and exchange data packets through the logical ports. These logical ports are mapped or attached to physical ports of the managed switching elements 655 and 660.

In some embodiments, a logical router is implemented in each managed switching element in the managed network. When the managed switching element receives a packet from a machine that is coupled to the managed switching element, the managed switching element performs the logical routing. In other words, a managed switching element that is a first-hop switching element with respect to a packet, performs the logical routing in these embodiments.

In this example, the managed switching elements 655 and 660 are software switching elements running in hosts 665 and 670, respectively. The managed switching elements 655 and 660 have flow entries which implement the logical switching elements 620 and 630 to forward and route the packets the managed switching element 655 and 660 receive from machines 1-4. The flow entries also implement the logical router 625. Using these flow entries, the managed switching elements 655 and 660 can forward and route packets between network elements in the network that are coupled to the managed switching elements 655 and 660.

As shown, the managed switching elements 655 and 660 each have three ports (e.g., VIFs) through which to exchange data packets with the network elements that are coupled to the managed switching elements 655 and 660. In some cases, the data packets in these embodiments will travel through a tunnel that is established between the managed switching elements 655 and 660 (e.g., the tunnel that terminates at port 3 of the managed switching element 655 and port 6 of the managed switching element 660). This tunnel makes it possible to separate addresses in logical space and the addresses in physical space. That is, information about the logical ports (e.g., association between the machines MAC addresses and logical ports of logical switching elements, association between network addresses and logical ports of the logical router, etc.) can be encapsulated by the header of the outer packet that establishes the tunnel. Also, because the information is encapsulated by the outer header, the information will not be exposed to the network elements such as other switches and routers (not shown) in the network 699.

In this example, each of the hosts 665 and 670 includes a managed switching element and several machines as shown. The machines 1-4 are virtual machines that are each assigned a set of network addresses (e.g., a MAC address for L2, an IP address for network L3, etc.) and can send and receive network data to and from other network elements. The machines are managed by hypervisors (not shown) running on the hosts 665 and 670. The machines 1 and 2 are associated with logical ports 1 and 2, respectively, of the same logical switch 620. However, the machine 1 is associated with the port 4 of the managed switching element 655 and the machine 2 is associated with the port 7 of the managed switching element 660. The logical ports 1 and 2 are therefore mapped to the ports 4 and 7, respectively, but this mapping does not have to be exposed to any of the network elements (not shown) in the network. This is because the packets that include this mapping information will be exchanged between the machines 1 and 2 over the tunnel based on the outer header of the outer packets that carry the packets with mapping information as payloads.

E. Layers of Controller Instance

Figure 7:
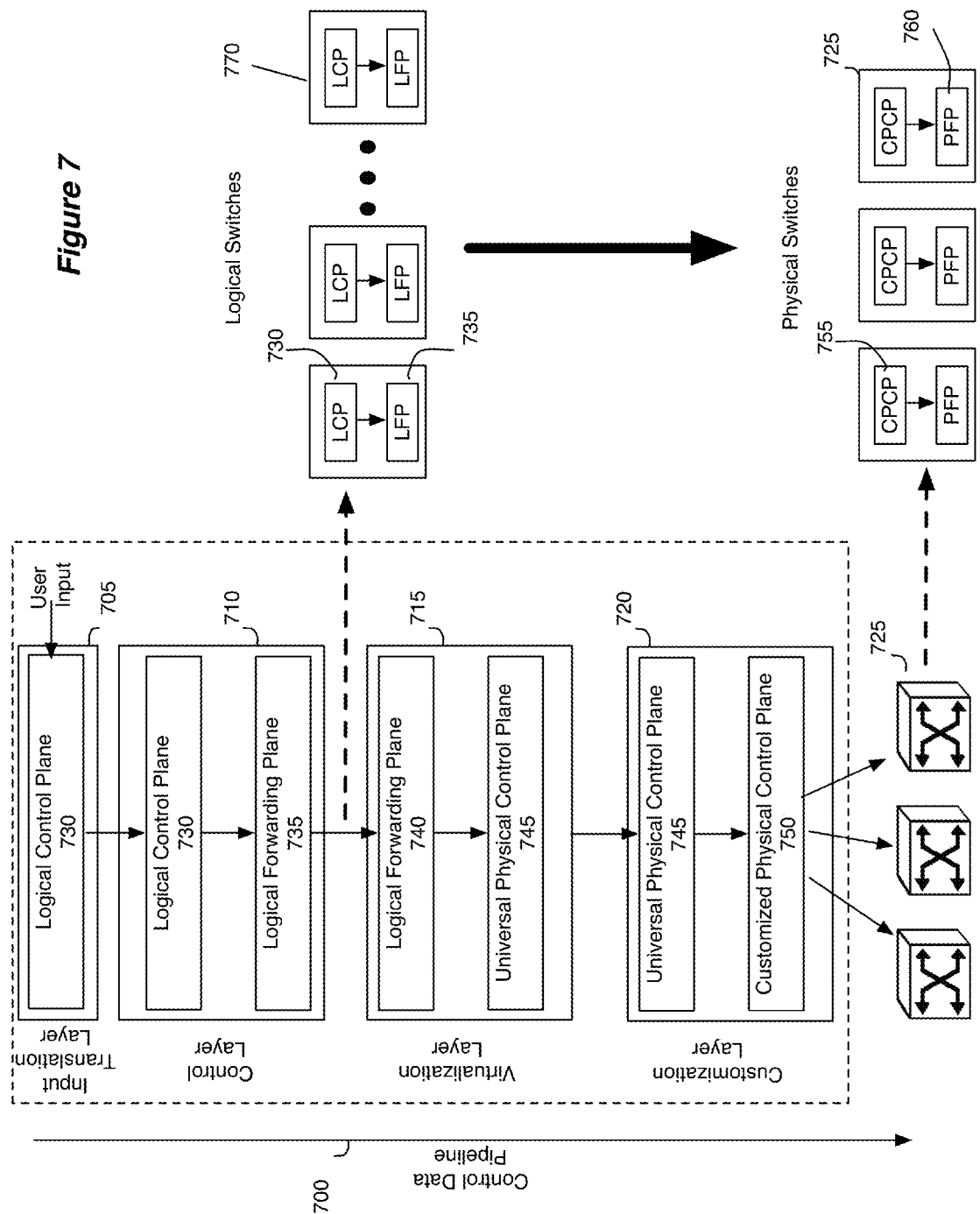
FIG. 7 further elaborates on the propagation of the instructions to control a managed switching element through the various processing layers of the controller instances of some embodiments of the invention.

FIG. 7 further elaborates on the propagation of the instructions to control a managed switching element through the various processing layers of the controller instances of some embodiments of the invention. This figure illustrates a control data pipeline 700 that translates and propagates control plane data through four processing layers of the same or different controller instances to a managed switching element 725. These four layers are the input translation layer 705, the control layer 710, the virtualization layer 715, and the customization layer 720.

In some embodiments, these four layers are in the same controller instance. However, other arrangements of these layers exist in other embodiments. For instance, in other embodiments, only the control and virtualization layers 710 and 715 are in the same controller instance, but the functionality to propagate the customized physical control plane data reside in a customization layer of another controller instance (e.g., a chassis controller, not shown). In these other embodiments, the universal control plane data is transferred from the relational database data structure (not shown) of one controller instance to the relational database data structure of another controller instance, before this other controller instance generates and pushes the customized physical control plane data to the managed switching element. The former controller instance may be a logical controller that generates universal control plane data and the latter controller instance may be a physical controller or a chassis controller that customizes the universal control plane data in to customized physical control plane data.

As shown in FIG. 7, the input translation layer 705 in some embodiments has a logical control plane 730 that can be used to express the output of this layer. In some embodiments, an application (e.g., web-based application, not shown) is provided to the users for them to supply inputs specifying the LDP sets. This application sends the inputs in the form of API calls to the input translation layer 705, which translates them into logical control plane data in a format that can be processed by the control layer 710. For instance, the inputs are translated into a set of input events that can be fed into n Log table mapping engine of the control layer. The n Log table mapping engine and its operation will be described further below.

The control layer 710 in some embodiments has the logical control plane 730 and the logical forwarding plane 735 that can be used to express the input and output to this layer. The logical control plane includes a collection of higher-level constructs that allow the control layer and its users to specify one or more LDP sets within the logical control plane for one or more users. The logical forwarding plane 735 represents the LDP sets of the users in a format that can be processed by the virtualization layer 715. In this manner, the two logical planes 730 and 735 are virtualization space analogs of the control and forwarding planes 755 and 760 that typically can be found in a typical managed switching element 725, as shown in FIG. 7.

In some embodiments, the control layer 710 defines and exposes the logical control plane constructs with which the layer itself or users of the layer define different LDP sets within the logical control plane. For instance, in some embodiments, the logical control plane data 730 includes logical ACL data, etc. Some of this data (e.g., logical ACL data) can be specified by the user, while other such data (e.g., the logical L2 or L3 records) are generated by the control layer and may not be specified by the user. In some embodiments, the control layer 710 generates and/or specifies such data in response to certain changes to the relational database data structure (which indicate changes to the managed switching elements and the managed datapaths) that the control layer 710 detects.

In some embodiments, the logical control plane data (i.e., the LDP sets data that is expressed in terms of the control plane constructs) can be initially specified without consideration of current operational data from the managed switching elements and without consideration of the manner by which this control plane data will be translated to physical control plane data. For instance, the logical control plane data might specify control data for one logical switch that connects five computers, even though this control plane data might later be translated to physical control data for three managed switching elements that implement the desired switching between the five computers.

The control layer includes a set of modules for converting any LDPS within the logical control plane to a LDPS in the logical forwarding plane 735. In some embodiments, the control layer 710 uses the n Log table mapping engine to perform this conversion. The control layer's use of the n Log table mapping engine to perform this conversion is further described below. The control layer also includes a set of modules for pushing the LDP sets from the logical forwarding plane 735 of the control layer 710 to a logical forwarding plane 740 of the virtualization layer 715.

The logical forwarding plane 740 includes one or more LDP sets of one or more users. The logical forwarding plane 740 in some embodiments includes logical forwarding data for one or more LDP sets of one or more users. Some of this data is pushed to the logical forwarding plane 740 by the control layer, while other such data are pushed to the logical forwarding plane by the virtualization layer detecting events in the relational database data structure as further described below for some embodiments.

In addition to the logical forwarding plane 740, the virtualization layer 715 includes a universal physical control plane 745. The universal physical control plane 745 includes a universal physical control plane data for the LDP sets. The virtualization layer includes a set of modules (not shown) for converting the LDP sets within the logical forwarding plane 740 to universal physical control plane data in the universal physical control plane 745. In some embodiments, the virtualization layer 715 uses the n Log table mapping engine to perform this conversion. The virtualization layer also includes a set of modules (not shown) for pushing the universal physical control plane data from the universal physical control plane 745 of the virtualization layer 715 into the relational database data structure of the customization layer 720.

In some embodiments, the universal physical control plane data that is sent to the customization layer 715 allows managed switching element 725 to process data packets according to the LDP sets specified by the control layer 710. However, in contrast to the customized physical control plane data, the universal physical control plane data is not a complete implementation of the logical data specified by the control layer because the universal physical control plane data in some embodiments does not express the differences in the managed switching elements and/or location-specific information of the managed switching elements.

The universal physical control plane data has to be translated into the customized physical control plane data for each managed switching element in order to completely implement the LDP sets at the managed switching elements. For instance, when the LDP sets specifies a tunnel that spans several managed switching elements, the universal physical control plane data expresses one end of the tunnel using a particular network address (e.g., IP address) of the managed switching element representing that end. However, each of the other managed switching elements over which the tunnel spans uses a port number that is local to the managed switching element to refer to the end managed switching element having the particular network address. That is, the particular network address has to be translated to the local port number for each of the managed switching elements in order to completely implement the LDP sets specifying the tunnel at the managed switching elements.

The universal physical control plane data as intermediate data to be translated into customized physical control plane data enables the control system of some embodiments to scale, assuming that the customization layer 720 is running in another controller instance. This is because the virtualization layer 715 does not have to convert the logical forwarding plane data specifying the LDP sets to customized physical control plane data for each of the managed switching elements that implements the LDP sets. Instead, the virtualization layer 715 converts the logical forwarding plane data to universal physical control data once for all the managed switching elements that implement the LDP sets. In this manner, the virtualization application saves computational resources that it would otherwise have to spend to perform conversion of the LDP sets to customized physical control plane data for as many times as the number of the managed switching elements that implement the LDP sets.

The customization layer 720 includes the universal physical control plane 745 and a customized physical control plane 750 that can be used to express the input and output to this layer. The customization layer includes a set of modules (not shown) for converting the universal physical control plane data in the universal physical control plane 745 into customized physical control plane data in the customized physical control plane 750. In some embodiments, the customization layer 715 uses the n Log table mapping engine to perform this conversion. The customization layer also includes a set of modules (not shown) for pushing the customized physical control plane data from the customized physical control plane 750 of the customization layer 715 into the managed switching elements 725.

As mentioned above, customized physical control plane data that is pushed to each managed switching element is specific to the managed switching element. The customized physical control plane data allows the managed switching element to perform physical switching operations in both the physical and logical data processing domains. In some embodiments, the customization layer 720 runs in a separate controller instance for each of the managed switching elements 725.

In some embodiments, the customization layer 720 does not run in a controller instance. The customization layer 715 in these embodiments reside in the managed switching elements 725. Therefore, in these embodiments, the virtualization layer 715 sends the universal physical control plane data to the managed switching elements. Each managed switching element will customize the universal physical control plane data into customized physical control plane data specific to the managed switching element. In some of these embodiments, a controller daemon will be running in each managed switching element and will perform the conversion of the universal data into the customized data for the managed switching element. A controller daemon will be described further below.

Figure 8:
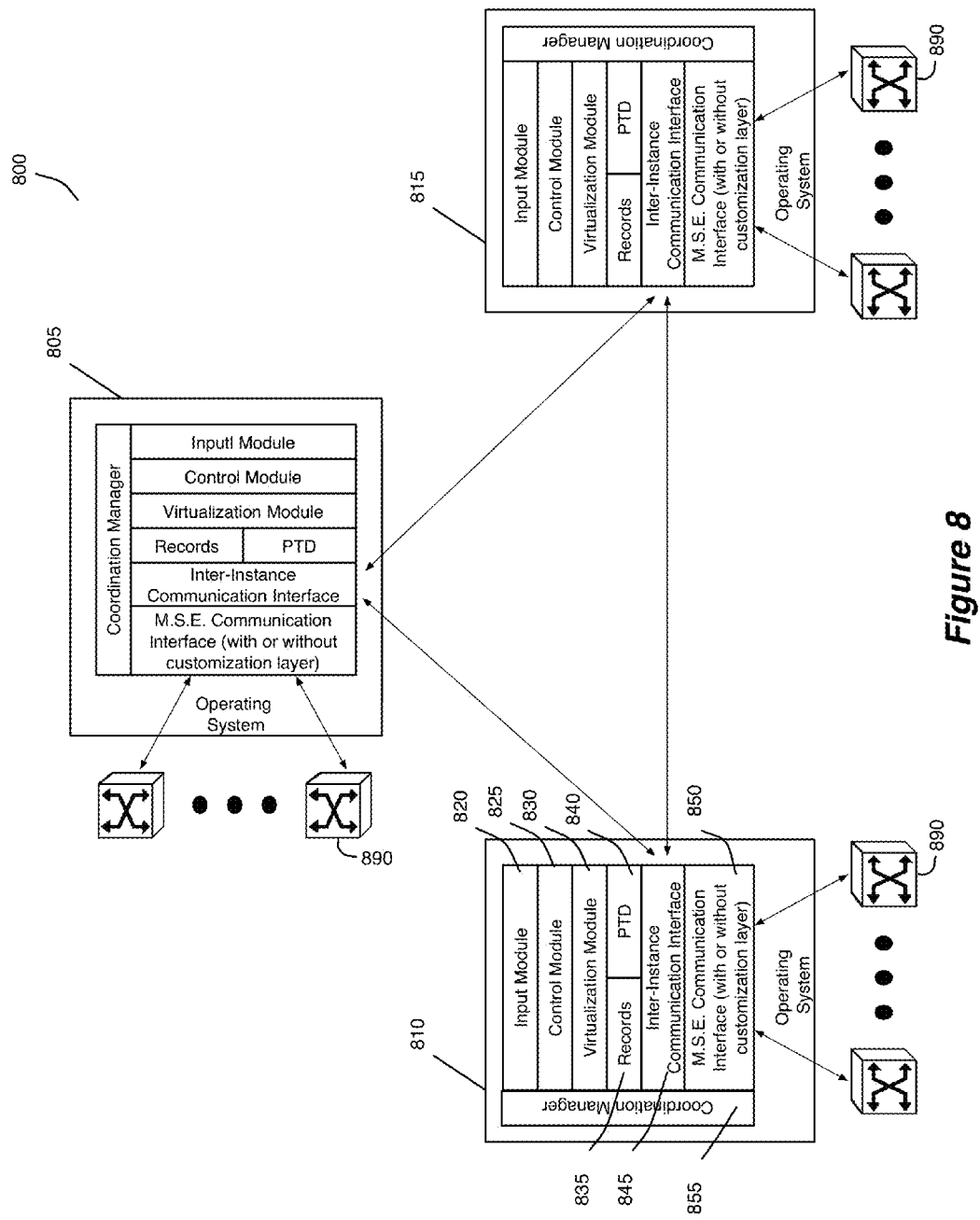
FIG. 8 illustrates a multi-instance, distributed network control system of some embodiments.

FIG. 8 illustrates a multi-instance, distributed network control system 800 of some embodiments. This distributed system controls multiple switching elements 890 with three controller instances 805, 810, and 815. In some embodiments, the distributed system 800 allows different controller instances to control the operations of the same switching element or of different switching elements. As shown in FIG. 8, each instance includes an input module 820, a control module 825, records (a relational database data structure) 835, a secondary storage structure (e.g., a PTD) 840, an inter-instance communication interface 845, a managed switching element communication interface 850.

The input module 820 of a controller instance is similar to the input translation layer 705 described above by reference to FIG. 7 in that the input module takes inputs from users and translates the inputs into logical control plane data that the control module 825 would understand and process. As mentioned above, the inputs are in the form of API calls in some embodiments. The input module 820 sends the logical control plane data to the control module 825.

The control module 825 of a controller instance is similar to the control layer 710 in that the control module 825 converts the logical control plane data into logical forwarding plane data and pushes the logical forwarding plane data into the virtualization module 830. In addition, the control module 825 determines whether the received logical control plane data is of the LDPS that the controller instance is managing. If the controller instance is the master of the LDPS for the logical control plane data, the virtualization module of the controller instance will further process the data. Otherwise, the control module stores the logical control plane data in the secondary storage 840.

The virtualization module 830 of a controller instance is similar to the virtualization layer 715 in that the virtualization module 830 converts the logical forwarding plane data into the universal physical control plane data. The virtualization module 830 of some embodiments then sends the universal physical control plane data to another controller instance through inter-instance communication interface 845 or to the managed switching elements through the managed switching element communication interface 850.

The virtualization module 830 sends the universal physical control plane data to another instance when the other controller instance is a physical controller that is responsible for managing the managed switching elements that implement the LDPS. This is the case when the controller instance, on which the virtualization module 830 has generated the universal control plane data, is just a logical controller responsible for a particular LDPS but is not a physical controller or a chassis controller responsible for the managed switching elements that implement the LDPS.

The virtualization module 830 sends the universal physical control plane data to the managed switching elements when the managed switching elements are configured to convert the universal physical control plane data into the customized physical control plane data specific to the managed switching elements. In this case, the controller instance would not have a customization layer or module that would perform the conversion from the universal physical control plane data into the customized physical control plane data.

The records 835, in some embodiments, is a set of records stored in the relational database data structure of a controller instance. In some embodiments, some or all of the input module, the control module, and the virtualization modules use, update, and manage the records stored in the relational database data structure. That is, the inputs and/or outputs of these modules are stored in the relational database data structure.

In some embodiments, the system 800 maintains the same switching element data records in the relational database data structure of each instance, while in other embodiments, the system 800 allows the relational database data structures of different instances to store different sets of switching element data records based on the LDPS(s) that each controller instance is managing.

The PTD 840 is a secondary storage structure for storing user-specified network configuration data (e.g., logical control plane data converted from the inputs in the form of API calls). In some embodiments, the PTD of each controller instance stores the configuration data for all users using the system 800. The controller instance that receives the user input propagates the configuration data to the PTDs of other controller instances such that every PTD of every controller instance has all the configuration data for all users in these embodiments. In other embodiments, however, the PTD of a controller instance only stores the configuration data for a particular LDPS that the controller instance is managing.

By allowing different controller instances to store the same or overlapping configuration data, and/or secondary storage structure records, the system improves its overall resiliency by guarding against the loss of data due to the failure of any network controller (or failure of the relational database data structure instance and/or the secondary storage structure instance). For instance, replicating the PTD across controller instances enables a failed controller instance to quickly reload its PTD from another instance.

The inter-instance communication interface 845 is similar to an exporter of a controller instance described above in that this interface establishes a communication channel (e.g., an RPC channel) with another controller instance. As shown, the inter-instance communication interfaces facilitate the data exchange between different controller instances 805-815.

The managed switching element communication interface, as mentioned above, facilitates the communication between a controller instance and a managed switching element. In some embodiments, the managed switching element communication interface converts the universal physical control plane data generated by the virtualization module 830 into the customized physical control plane data specific to each managed switching element that is not capable of converting the universal data into the customized data.

For some or all of the communications between the distributed controller instances, the system 800 uses the coordination managers (CMs) 855. The CM 855 in each instance allows the instance to coordinate certain activities with the other instances. Different embodiments use the CM to coordinate the different sets of activities between the instances. Examples of such activities include writing to the relational database data structure, writing to the PTD, controlling the switching elements, facilitating inter-controller communication related to fault tolerance of controller instances, etc. Also, CMs are used to find the masters of LDPS and the masters of managed switching elements.

As mentioned above, different controller instances of the system 800 can control the operations of the same switching elements or of different switching elements. By distributing the control of these operations over several instances, the system can more easily scale up to handle additional switching elements. Specifically, the system can distribute the management of different switching elements to different controller instances in order to enjoy the benefit of efficiencies that can be realized by using multiple controller instances. In such a distributed system, each controller instance can have a reduced number of switching elements under management, thereby reducing the number of computations each controller needs to perform to distribute flow entries across the switching elements. In other embodiments, the use of multiple controller instances enables the creation of a scale-out network management system. The computation of how best to distribute network flow tables in large networks is a CPU intensive task. By splitting the processing over controller instances, the system 800 can use a set of more numerous but less powerful computer systems to create a scale-out network management system capable of handling large networks.

To distribute the workload and to avoid conflicting operations from different controller instances, the system 800 of some embodiments designates one controller instance (e.g., 805) within the system 800 as the master of a LDPS and/or any given managed switching element (i.e., as a logical controller or a physical controller). In some embodiments, each master controller instance stores in its relational database data structure only the data related to the managed switching elements which the master is handling.

In some embodiments, as noted above, the CMs facilitate inter-controller communication related to fault tolerance of controller instances. For instance, the CMs implement the inter-controller communication through the secondary storage described above. A controller instance in the control system may fail due to any number of reasons. (e.g., hardware failure, software failure, network failure, etc.). Different embodiments may use different techniques for determining whether a controller instance has failed. In some embodiments, a consensus protocol is used to determine whether a controller instance in the control system has failed. While some of these embodiments may use Apache Zookeeper to implement the consensus protocols, other embodiments may implement the consensus protocol in other ways.

Some embodiments of the CM 855 may utilize defined timeouts to determine whether a controller instance has failed. For instance, if a CM of a controller instance does not respond to a communication (e.g., sent from another CM of another controller instance in the control system) within an amount of time (i.e., a defined timeout amount), the non-responsive controller instance is determined to have failed. Other techniques may be utilized to determine whether a controller instance has failed in other embodiments.

When a master controller instance fails, a new master for the LDP sets and the switching elements needs to be determined. Some embodiments of the CM 855 make such determination by performing a master election process that elects a master controller instance (e.g., for partitioning management of LDP sets and/or partitioning management of switching elements). The CM 855 of some embodiments may perform a master election process for electing a new master controller instance for both the LDP sets and the switching elements of which the failed controller instance was a master. However, the CM 855 of other embodiments may perform (1) a master election process for electing a new master controller instance for the LDP sets of which the failed controller instance was a master and (2) another master election process for electing a new master controller instance for the switching elements of which the failed controller instance was a master. In these cases, the CM 855 may determine two different controller instances as new controller instances: one for the LDP sets of which the failed controller instance was a master and another for the switching elements of which the failed controller instance was a master.

Alternatively or conjunctively, the controllers in the cluster of some embodiments run a consensus algorithm to determine a leader controller as mentioned above. The leader controller partitions the tasks for which each controller instance in the cluster is responsible by assigning a master controller for a particular work item, and in some cases a hot-standby controller to take over in case the master controller fails.

In some embodiments, the master election process is further for partitioning management of LDP sets and/or management of switching elements when a controller instance is added to the control system. In particular, some embodiments of the CM 855 perform the master election process when the control system 800 detects a change in membership of the controller instances in the control system 800. For instance, the CM 855 may perform the master election process to redistribute a portion of the management of the LDP sets and/or the management of the switching elements from the existing controller instances to the new controller instance when the control system 800 detects that a new network controller has been added to the control system 800. However, in other embodiments, redistribution of a portion of the management of the LDP sets and/or the management of the switching elements from the existing controller instances to the new controller instance does not occur when the control system 800 detects that a new network controller has been added to the control system 800. Instead, the control system 800 in these embodiments assigns unassigned LDP sets and/or switching elements (e.g., new LDP sets and/or switching elements or LDP sets and/or switching elements from a failed network controller) to the new controller instance when the control system 800 detects the unassigned LDP sets and/or switching elements.

F. Partitioning Management of LDP Sets and Managed Switching Elements

Figure 9:
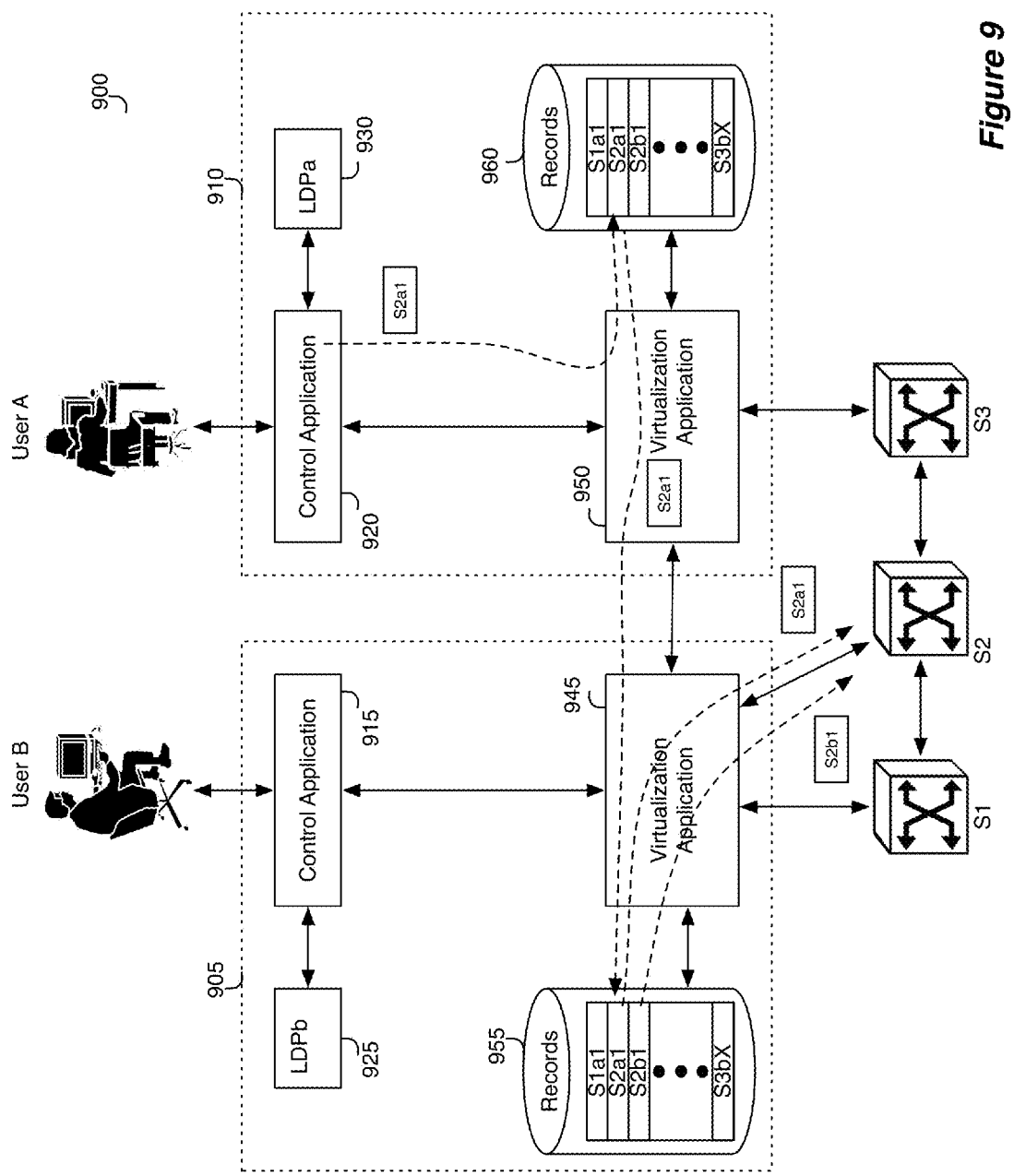
FIG. 9 illustrates an example of specifying a master controller instance for a switching element (i.e., a physical controller) in a distributed that is similar to the system of FIG. 8.

FIG. 9 illustrates an example of specifying a master controller instance for a switching element (i.e., a physical controller) in a distributed system 900 that is similar to the system 800 of FIG. 8. In this example, two controllers 905 and 910 control three switching elements S1, S2 and S3, for two different users A and B. Through two control applications 915 and 920, the two users specify two different LDP sets 925 and 930, which are translated into numerous records that are identically stored in two relational database data structures 955 and 960 of the two controller instances 905 and 910 by virtualization applications 945 and 950 of the controllers.

In the example illustrated in FIG. 9, both control applications 915 and 920 of both controllers 905 and 910 can modify records of the switching element S2 for both users A and B, but only controller 905 is the master of this switching element. This example illustrates two different scenarios. The first scenario involves the controller 905 updating the record 52*b*1 in switching element S2 for the user B. The second scenario involves the controller 905 updating the records 52*a*1 in switching element S2 after the control application 920 updates a record 52*a*1 for switching element S2 and user A in the relational database data structure 960. In the example illustrated in FIG. 9, this update is routed from relational database data structure 960 of the controller 910 to the relational database data structure 955 of the controller 905, and subsequently routed to switching element S2.

Different embodiments use different techniques to propagate changes to the relational database data structure 960 of controller instance 910 to the relational database data structure 955 of the controller instance 905. For instance, to propagate this update, the virtualization application 950 of the controller 910 in some embodiments sends a set of records directly to the relational database data structure 955 (by using inter-controller communication modules or exporter/importer). In response, the virtualization application 945 would send the changes to the relational database data structure 955 to the switching element S2.

Instead of propagating the relational database data structure changes to the relational database data structure of another controller instance, the system 900 of some embodiments uses other techniques to change the record S2*a*1 in the switching element S2 in response to the request from control application 920. For instance, the distributed control system of some embodiments uses the secondary storage structures (e.g., a PTD) as communication channels between the different controller instances. In some embodiments, the PTDs are replicated across all instances, and some or all of the relational database data structure changes are pushed from one controller instance to another through the PTD storage layer. Accordingly, in the example illustrated in FIG. 9, the change to the relational database data structure 960 could be replicated to the PTD of the controller 910, and from there it could be replicated in the PTD of the controller 905 and the relational database data structure 955.

Other variations to the sequence of operations shown in FIG. 9 could exist because some embodiments designate one controller instance as a master of a LDPS, in addition to designating a controller instance as a master of a switching element. In some embodiments, different controller instances can be masters of a switching element and a corresponding record for that switching element in the relational database data structure, while other embodiments require the controller instance to be master of the switching element and all records for that switching element in the relational database data structure.

In the embodiments where the system 900 allows for the designation of masters for switching elements and relational database data structure records, the example illustrated in FIG. 9 illustrates a case where the controller instance 910 is the master of the relational database data structure record S2*a*1, while the controller instance 905 is the master for the switching element S2. If a controller instance other than the controller instance 905 and 910 was the master of the relational database data structure record S2a1, then the request for the relational database data structure record modification from the control application 920 would have had to be propagated to this other controller instance. This other controller instance would then modify the relational database data structure record and this modification would then cause the relational database data structure 955 and the switching element S2 to update their records through any number of mechanisms that would propagate this modification to the controller instances 905.

In other embodiments, the controller instance 905 might be the master of the relational database data structure record S2a1, or the controller instance 905 might be the master of switching element S2 and all the records of its relational database data structure. In these embodiments, the request for the relational database data structure record modification from the control application 920 would have to be propagated to the controller instance 905, which would then modify the records in the relational database data structure 955 and the switching element S2.

As mentioned above, different embodiments employ different techniques to facilitate communication between different controller instances. In addition, different embodiments implement the controller instances differently. For instance, in some embodiments, the stack of the control application(s) (e.g., 825 or 915 in FIGS. 8 and 9) and the virtualization application (e.g., 830 or 945) is installed and runs on a single computer. Also, in some embodiments, multiple controller instances can be installed and run in parallel on a single computer. In some embodiments, a controller instance can also have its stack of components divided amongst several computers. For example, within one instance, the control application (e.g., 825 or 915) can be on a first physical or virtual computer and the virtualization application (e.g., 830 or 945) can be on a second physical or virtual computer.

Figure 10:
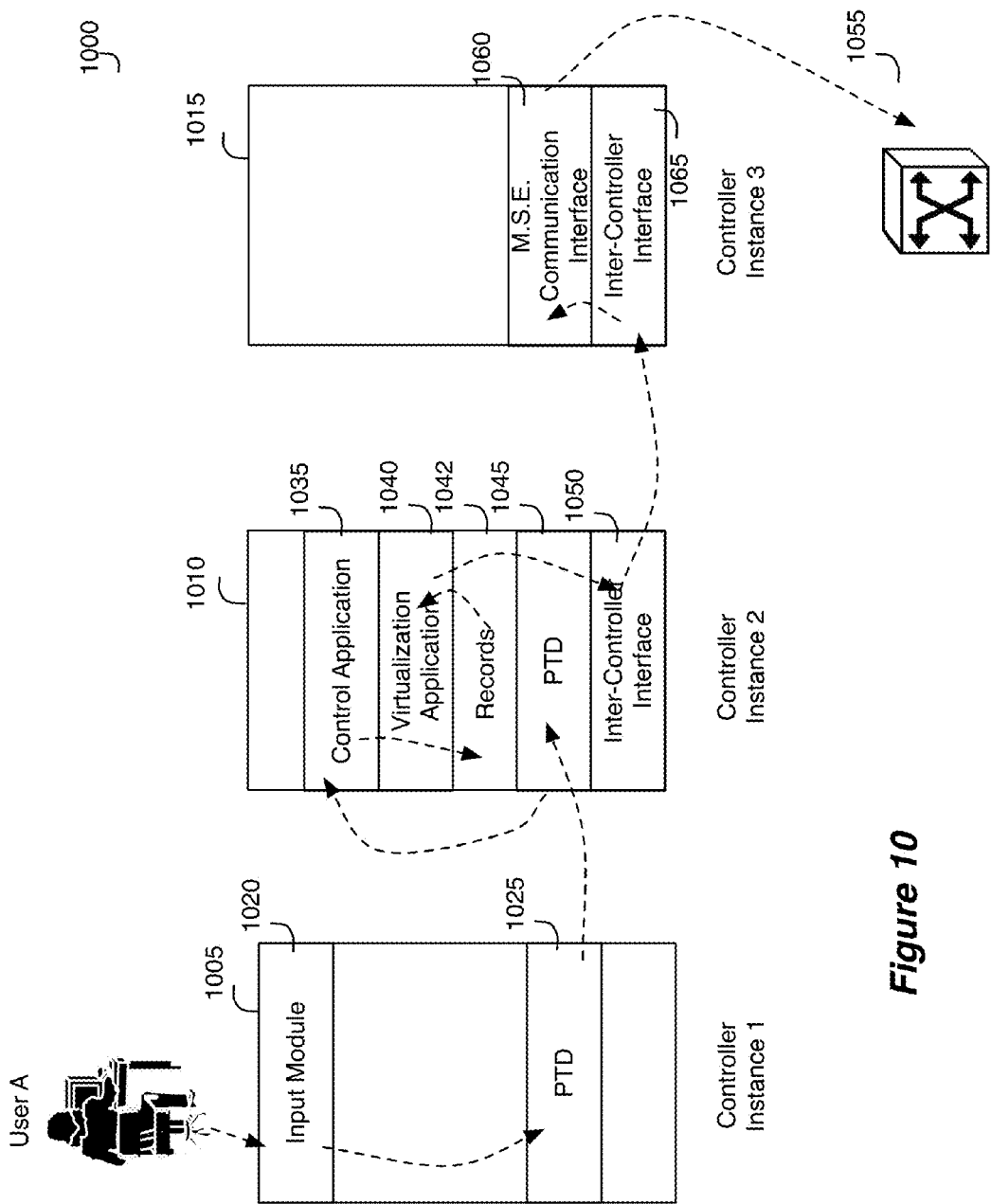
FIG. 10 illustrates an example operation of several controller instances that function as a controller for distributing inputs, a master controller of a LDPS, and a master controller of a managed switching element.

FIG. 10 illustrates an example operation of several controller instances that function as a controller for distributing inputs, a master controller of a LDPS, and a master controller of a managed switching element. In some embodiments, not every controller instance includes a full stack of different modules and interfaces as described above by reference to FIG. 8. Or, not every controller instance performs every function of the full stack. For instance, none of the controller instances 1005, 1010, and 1015 illustrated in FIG. 10 has a full stack of the modules and interfaces.

The controller instance 1005 in this example is a controller instance for distributing inputs. That is, the controller instance 1005 of some embodiments takes the inputs from the users in the form of API calls. Through the API calls, the users can specify requests for configuring a particular LDPS (i.e., configuring a logical switching element or a logical router to be implemented in a set of managed switching elements). The input module 1020 of the controller instance 1005 receives these API calls and translates them into the form (e.g., data tuples or records) that can be stored in a PTD 1025 and sent to another controller instance in some embodiments.

The controller instance 1005 in this example then sends these records to another controller instance that is responsible for managing the records of the particular LDPS. In this example, the controller instance 1010 is responsible for the records of the LDPS. The controller instance 1010 receives the records from the PTD 1025 of the controller instance 1005 and stores the records in the PTD 1045, which is a secondary storage structure of the controller instance 1010. In some embodiments, PTDs of different controller instances can directly exchange information each other and do not have to rely on inter-controller interfaces.

The control application 1010 then detects the addition of these records to the PTD and processes the records to generate or modify other records in the relational database data structure 1042. In particular, the control application generates logical forwarding plane data. The virtualization application in turn detects the modification and/or addition of these records in the relational database data structure and modifies and/or generates other records in the relational database data structure. These records represent the universal physical control plane data in this example. These records then get sent to another controller instance that is managing at least one switching element that implements the particular LDPS, through the inter-controller interface 1050 of the controller instance 1010.

The controller instance 1015 in this example is a controller instance that is managing the switching element 1055. The switching element implements at least part of the particular LDPS. The controller instance 1015 receives the records representing the universal physical control plane data from the controller instance 1010 through the inter-controller interface 1065. In some embodiments, the controller instance 1015 would have a control application and a virtualization application to perform a conversion of the universal physical control plane data to the customized physical control plane data. However, in this example, the controller instance 1015 just identifies a set of managed switching elements to which to send the universal physical control plane data. In this manner, the controller instance 1015 functions as an aggregation point to gather data to send to the managed switching elements that this controller is responsible for managing. In this example, the managed switching element 1055 is one of the switching elements managed by the controller instance 1015.

Figure 11:
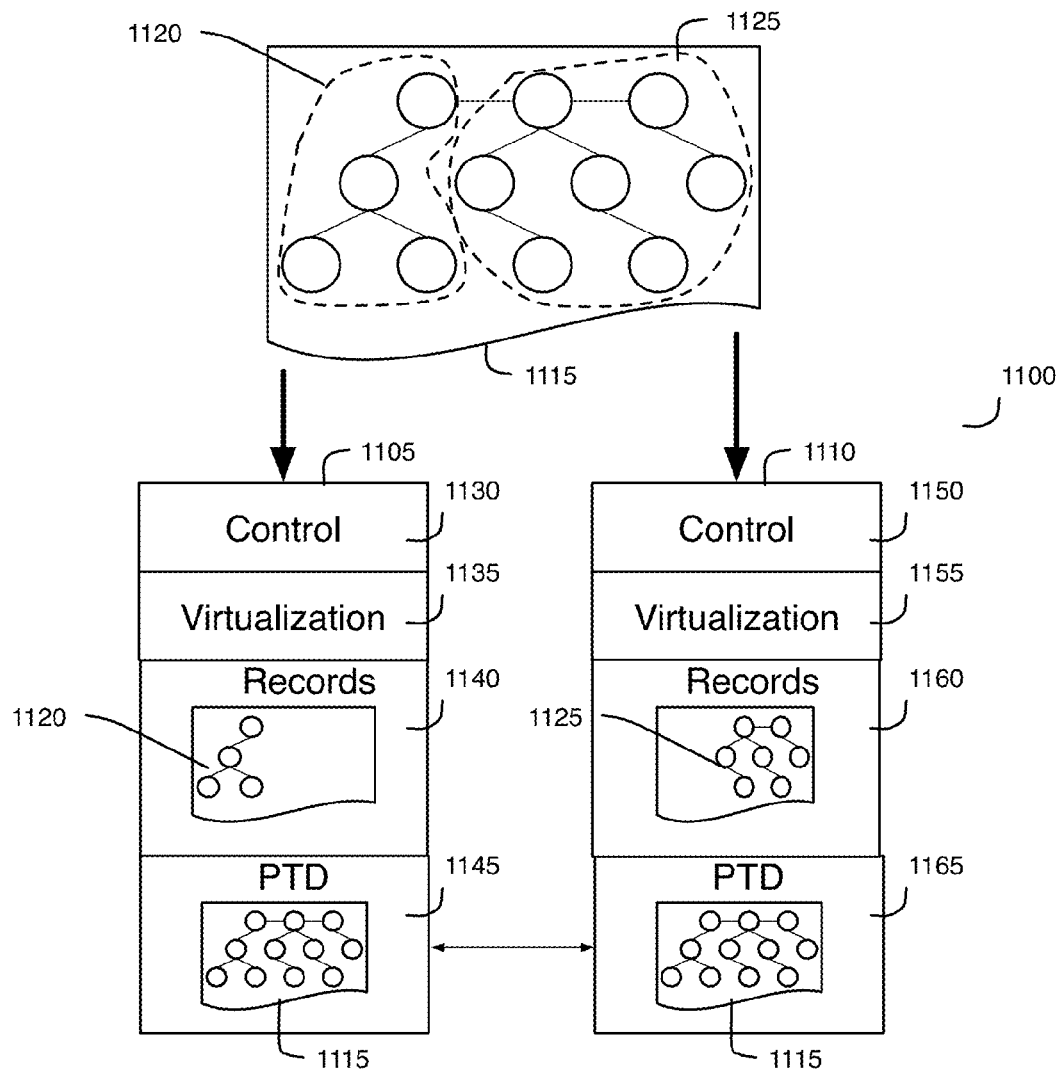
FIG. 11 illustrates an example of maintaining the records in different storage structures.

In some embodiments, the controller instances in a multi-instance, distributed network control system (such as the system 800 described above by reference to FIG. 8) partitions the LDP sets. That is, the responsibility for managing LDP sets is distributed over the controller instances. For instance, a single controller instance of some embodiments is responsible for managing one or more LDP sets but not all of the LDP sets managed by the system. In these embodiments, a controller instance that is responsible for managing a LDPS (i.e., the master of the LDPS) maintains different portions of the records for all LDP sets in the system in different storage structures of the controller instance. FIG. 11 illustrates an example of maintaining the records in different storage structures. This figure illustrates two controller instances of a multi-instance, distributed network control system 1100. One of the ordinary skill in the art would recognize that there could be many more controller instances in the system 1100 for managing many other LDP sets. This figure also illustrates a global view 1115 of the state of the network for two LDP sets that the system 1100 is managing in this example.

The controller instance 1105 is a master of one of the two LDP sets. The view 1120 represents the state of the network for this LDPS only. The controller instance 1105 maintains the data for this view 1120 in the relational datapath data structure 1140. On the other hand, the controller instance 1110 is a master of the other LDPS that the system 1100 is managing. The controller instance 1110 maintains the data for the view 1125, which represents the state of the network for this other LDPS only. Because a controller instance that is a master of a LDPS may not need the global view of the state of the network for all LDP sets, the master of the LDPS does not maintain the data for the global view.

In some embodiments, however, each controller instance in the system 1100 maintains the data for the global view of the state of the network for all LDPS that the system is managing in the secondary storage structure (e.g., a PTD) of the controller instance. As mentioned above, keeping the data for the global data in each controller instance improves overall resiliency by guarding against the loss of data due to the failure of any network controller (or failure of the relational database data structure instance and/or the secondary storage structure instance). Also, the secondary storage structures in these embodiments serve as a communication medium among the controller instances. In particular, when a controller instance that is not a master of a particular LDPS receives updates for this particular LDPS (e.g., from a user), the controller instance first stores the updates in the PTD and propagates the updates to the controller instance that is the master of this particular LDPS. As described above, these updates will be detected by the control application of the master of the LDPS and processed.

G. Input Translation Layer

Figure 12:
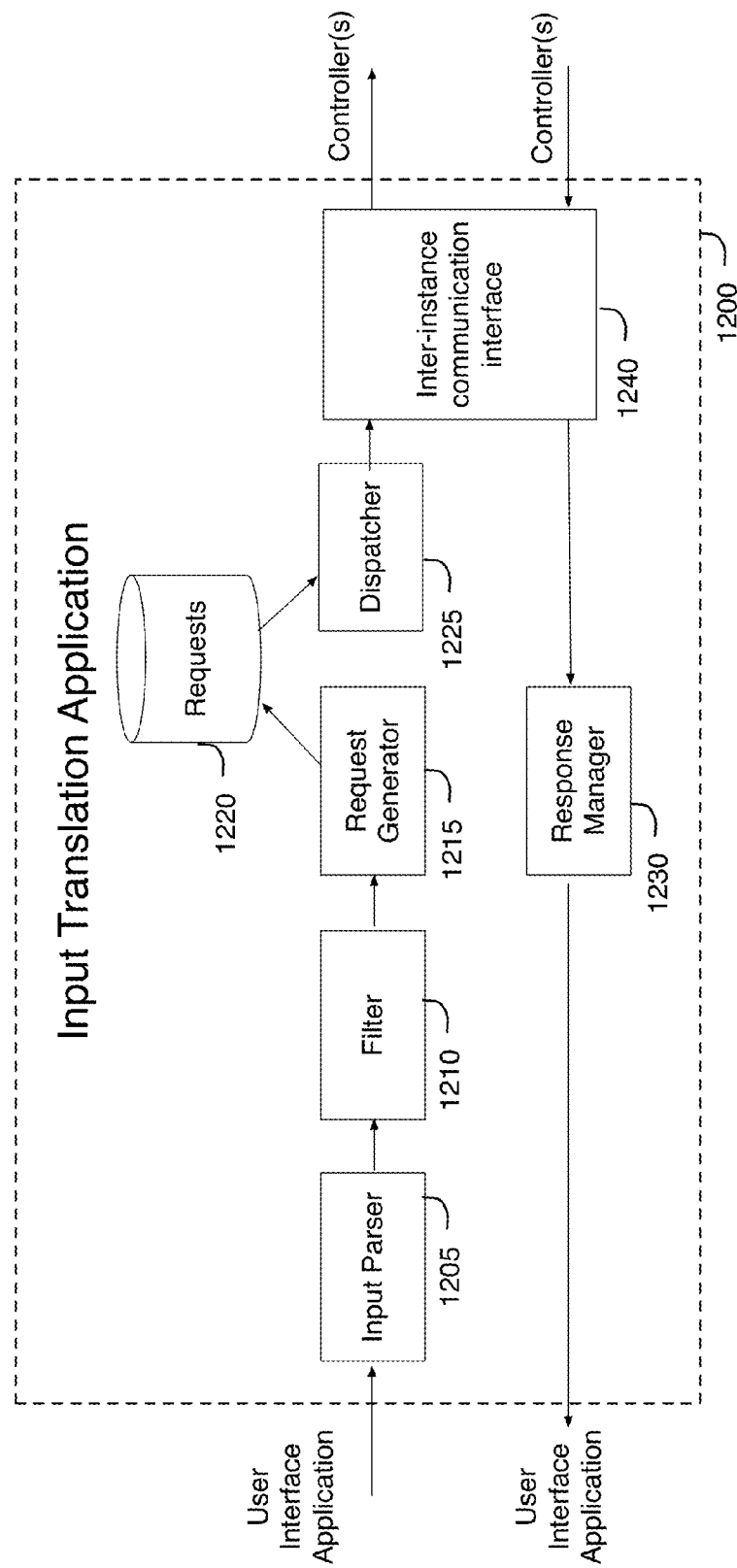
FIG. 12 conceptually illustrates software architecture for an input translation application.

FIG. 12 conceptually illustrates software architecture for an input translation application 1200. The input translation application of some embodiments functions as the input translation layer 705 described above by reference to FIG. 7. In particular, the input translation application receives inputs from a user interface application that allows the user to enter input values, translates inputs into requests, and dispatches the requests to one or more controller instances to process the requests and send back responses. In some embodiments, the input translation application runs in the same controller instance in which a control application runs, while in other embodiments the input translation application runs as a separate controller instance. As shown in this figure, the input translation application includes an input parser 1205, a filter 1210, a request generator 1215, a requests repository 1220, a dispatcher 1225, a response manager 1230, and an inter-instance communication interface 1240.

In some embodiments, the input translation application 1200 supports a set of API calls for specifying LDP sets and information inquires. In these embodiments, the user interface application that allows the user to enter input values is written to send the inputs in the form of API calls to the input translation application 1200. These API calls therefore specify the LDPS (e.g., logical switch configuration specified by the user) and the user's information inquiry (e.g., network traffic statistics for the logical ports of the logical switch of the user). Also, the input translation application 1200 may get inputs from logical controllers, physical controllers and/or physical controllers as well as from another input translation controller in some embodiments.

The input parser 1205 of some embodiments receives inputs in the form of API calls from the user interface application. In some embodiments, the input parser extracts the user input values from the API calls and passes the input values to the filter 1210. The filter 1210 filters out the input values that do not conform to certain requirements. For instance, the filter 1210 filters out the input values that specify an invalid network address for a logical port. For those API calls that contain non-conforming input values, the response manager 1230 sends a response to the user indicating the inputs are not conforming.

The request generator 1215 generates requests to be sent to one or more controller instances, which will process requests to produce responses to the requests. An example request may ask for statistical information of a logical port of a logical switch that the user is managing. The response to this request would include the requested statistical information prepared by a controller instance that is responsible for managing the LDPS associated with the logical switch.

The request generator 1215 of different embodiments generates requests of different formats, depending on the implementation of the controller instances that receive and process the requests. For instance, the requests that the request generator 1215 of some embodiments generates are in the form of records (e.g., data tuples) suitable for storing in the relational database data structures of controller instances that receives the requests. In some of these embodiments, the receiving controller instances use an n Log table mapping engine to process the records representing the requests. In other embodiments, the requests are in the form of object-oriented data objects that can interact with the NIB data structures of controller instances that receive the request. In these embodiments, the receiving controller instances processes the data object directly on the NIB data structure without going through the n Log table mapping engine. The NIB data structure will be described further below.

The request generator 1215 of some embodiments deposits the generated requests in the requests repository 1220 so that the dispatcher 1225 can send the requests to the appropriate controller instances. The dispatcher 1225 identifies the controller instance to which each request should be sent. In some cases, the dispatcher looks at the LDPS associated with the request and identifies a controller instance that is the master of that LDPS. In some cases, the dispatcher identifies a master of a particular switching element (i.e., a physical controller) as a controller instance to send the request when the request is specifically related to a switching element (e.g., when the request is about statistical information of a logical port that is mapped to a port of the switching element). The dispatcher sends the request to the identified controller instance.

The inter-instance communication interface 1240 is similar to the inter-instance communication interface 845 described above by reference to FIG. 8 in that the inter-instance communication interface 1240 establishes a communication channel (e.g., an RPC channel) with another controller instance over which requests can be sent. The communication channel of some embodiments is bidirectional while in other embodiments the communication channel is unidirectional. When the channel is unidirectional, the inter-instance communication interface establishes multiple channels with another controller instance so that the input translation application can send requests and receive responses over different channels.

The response manager 1230 receives the responses from the controller instances that processed requests through the channel(s) established by the inter-instance communication interface 1240. In some cases, more than one response may return for a request that was sent out. For instance, a request for statistical information from all logical ports of the logical switch that the user is managing would return a response from each controller. The responses from multiple physical controller instances for multiple different switching elements whose ports are mapped to the logical ports may return to the input translation application 1200, either directly to the input translation application 1200 or through the master of the LDPS associated with the logical switch. In such cases, the response manager 1230 merges those responses and sends a single merged response to the user interface application.

As mentioned above, the control application running in a controller instance converts data records representing logical control plane data to data records representing logical forwarding plane data by performing conversion operations. Specifically, in some embodiments, the control application populates the LDPS tables (e.g., the logical forwarding tables) that are created by the virtualization application with LDP sets.

H. Control Layer

Figure 13:
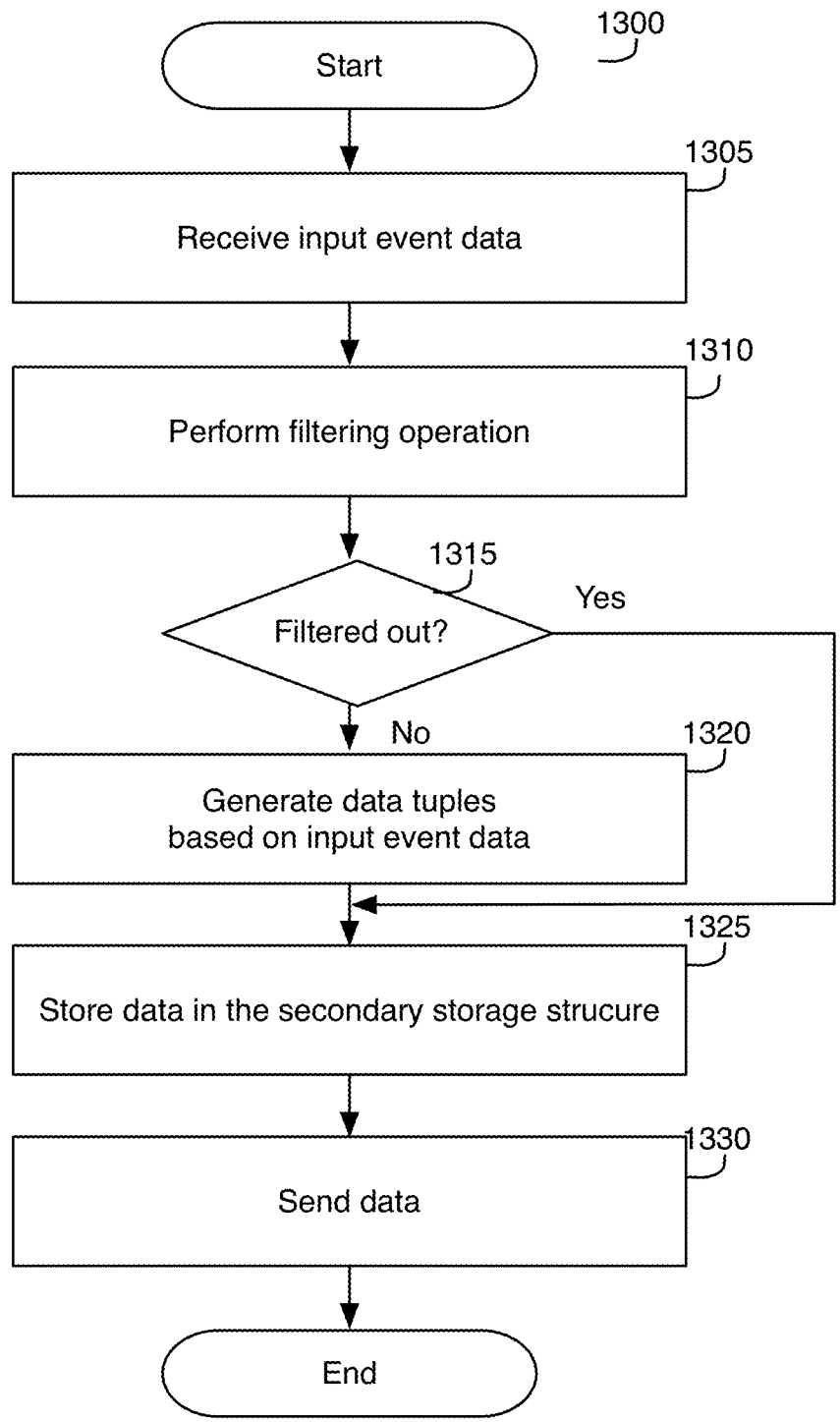
FIG. 13 conceptually illustrates an example conversion operations that an instance of a control application of some embodiments performs.

FIG. 13 conceptually illustrates an example conversion operations that an instance of a control application of some embodiments performs. This figure conceptually illustrates a process 1300 that the control application performs to generate logical forwarding plane data based on input event data that specifies the logical control plane data. As described above, the generated logical forwarding plane data is transmitted to the virtualization application, which subsequently generates universal physical control plane data from the logical forwarding plane data in some embodiments. The universal physical control plane data is propagated to the managed switching elements (or to chassis controllers managing the switching elements), which in turn will produce forwarding plane data for defining forwarding behaviors of the switching elements.

As shown in FIG. 13, the process 1300 initially receives (at 1305) data regarding an input event. The input event data may be logical data supplied by an input translation application that distributes the input records (i.e., requests) to different controller instances. An example of user-supplied data could be logical control plane data including access control list data for a logical switch that the user manages. The input event data may also be logical forwarding plane data that the control application generates, in some embodiments, from the logical control plane data. The input event data in some embodiments may also be universal physical control plane data received from the virtualization application.

At 1310, the process 1300 then performs a filtering operation to determine whether this instance of the control application is responsible for the input event data. As described above, several instances of the control application may operate in parallel in several different controller instances to control multiple LDP sets in some embodiments. In these embodiments, each control application uses the filtering operation to filter out input data that does not relate to the LDPS that the control application is not responsible for managing. To perform this filtering operation, the control application of some embodiments includes a filter module. This module of some embodiments is a standalone module, while in other embodiments it is implemented by a table mapping engine (e.g., implemented by the join operations performed by the table mapping engine) that maps records between input tables and output tables of the control application, as further described below.

Next, at 1315, the process determines whether the filtering operation has filtered out the input event data. The filtering operation filters out the input event data in some embodiments when the input event data does not fall within one of the LDP sets that the control application is responsible for managing. When the process determines (at 1315) that the filtering operation has filtered out the input event data, the process transitions to 1325, which will be described further below. Otherwise, the process 1300 transitions to 1320.

At 1320, a converter of the control application generates one or more sets of data tuples based on the received input event data. In some embodiments, the converter is an table mapping engine that performs a series of table mapping operations on the input event data to map the input event data to other data tuples to modify existing data or generate new data. As mentioned above, this table mapping engine also performs the filtering operation in some embodiments. One example of such a table mapping engine is an n Log table-mapping engine which will be described below.

As mentioned above, the data that the process 1300 filters out (at 1310) include data (e.g., configuration data) that the control application is not responsible for managing. The process pushes down these data to a secondary storage structure (e.g., PTD) which is a storage structure other than the relational database data structure that contains the input and output tables in some embodiments. Accordingly, at 1325, the process 1300 of some embodiments translates the data in a format that can be stored in the secondary storage structure so that the data can be shared by the controller instance that is responsible for managing the data. As mentioned above, the secondary storage structure such as PTD of one controller instance is capable of sharing data directly with the secondary storage structure of another controller instance. The process 1300 of some embodiments also pushes down configuration data in the output tables from the relational database data structure to the secondary storage structure for data resiliency.

At 1330, the process sends the generated data tuples to a virtualization application. The process also sends the configuration data that is stored in the secondary storage structure to one or more other controller instances that are responsible for the configuration data. The process then ends.

The control application in some embodiments performs its mapping operations by using the n Log table mapping engine, which uses a variation of the datalog table mapping technique. Datalog is used in the field of database management to map one set of tables to another set of tables. Datalog is not a suitable tool for performing table mapping operations in a virtualization application of a network control system as its current implementations are often slow. Accordingly, the n Log engine of some embodiments is custom designed to operate quickly so that it can perform the real time mapping of the LDPS data tuples to the data tuples of the managed switching elements. This custom design is based on several custom design choices. For instance, some embodiments compile the n Log table mapping engine from a set of high level declaratory rules that are expressed by an application developer (e.g., by a developer of a control application). In some of these embodiments, one custom design choice that is made for the n Log engine is to allow the application developer to use only the AND operator to express the declaratory rules. By preventing the developer from using other operators (such as ORs, XORs, etc.), these embodiments ensure that the resulting rules of the n Log engine are expressed in terms of AND operations that are faster to execute at run time.

Another custom design choice relates to the join operations performed by the n Log engine. Join operations are common database operations for creating association between records of different tables. In some embodiments, the n Log engine limits its join operations to inner join operations (also called as internal join operations) because performing outer join operations (also called as external join operations) can be time consuming and therefore impractical for real time operation of the engine.

Yet another custom design choice is to implement the n Log engine as a distributed table mapping engine that is executed by several different virtualization applications. Some embodiments implement the n Log engine in a distributed manner by partitioning management of LDP sets. Partitioning management of the LDP sets involves specifying for each particular LDPS only one controller instance as the instance responsible for specifying the records associated with that particular LDPS. For instance, when the control system uses three switching elements to specify five LDP sets for five different users with two different controller instances, one controller instance can be the master for records relating to two of the LDP sets while the other controller instance can be the master for the records for the other three LDP sets.

Partitioning management of the LDP sets also assigns in some embodiments the table mapping operations for each LDPS to the n Log engine of the controller instance responsible for the LDPS. The distribution of the n Log table mapping operations across several n Log instances reduces the load on each n Log instance and thereby increases the speed by which each n Log instance can complete its mapping operations. Also, this distribution reduces the memory size requirement on each machine that executes a controller instance. As further described below, some embodiments partition the n Log table mapping operations across the different instances by designating the first join operation that is performed by each n Log instance to be based on the LDPS parameter. This designation ensures that each n Log instance's join operations fail and terminate immediately when the instance has started a set of join operations that relate to a LDPS that is not managed by the n Log instance.

Figure 14:
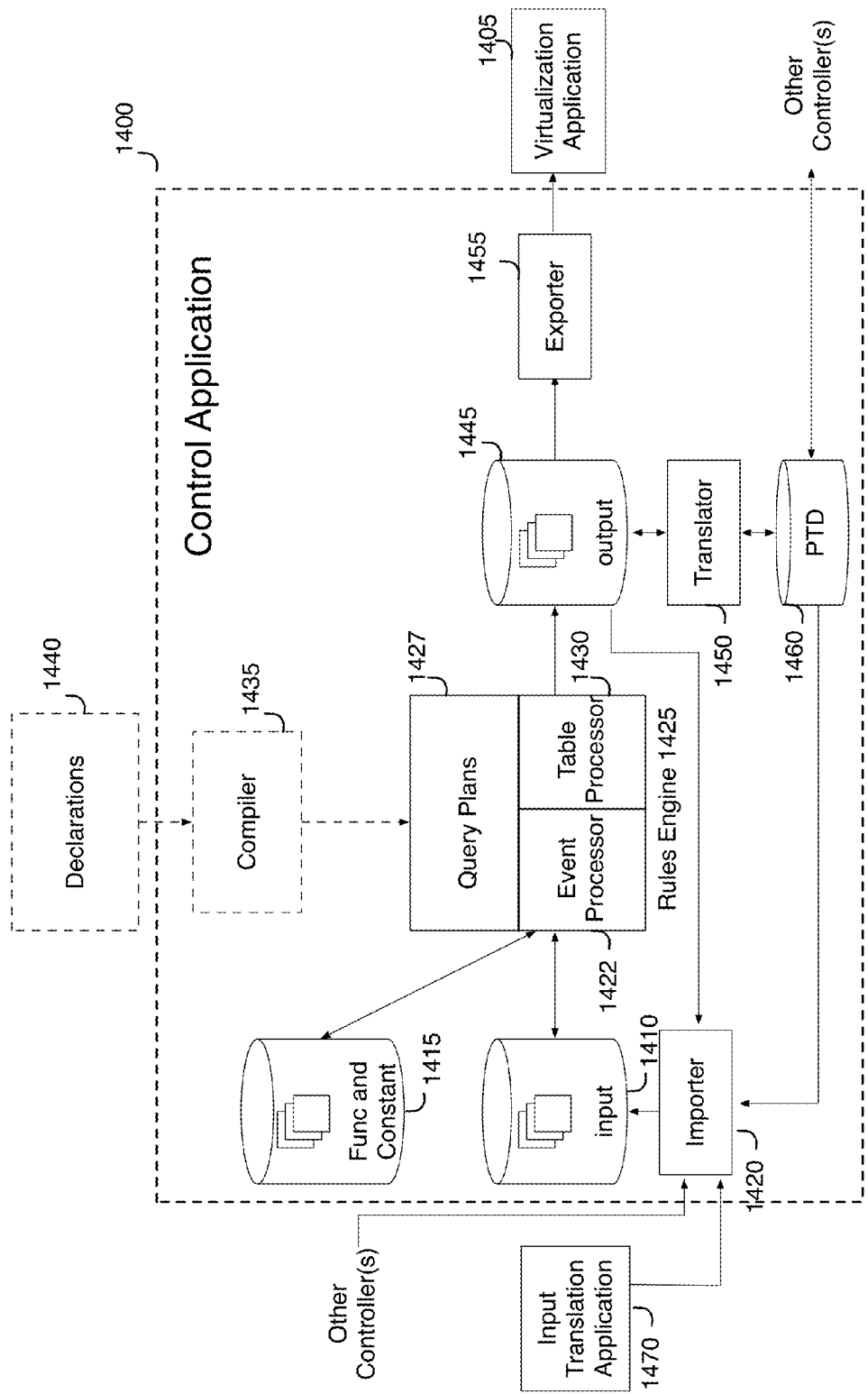
FIG. 14 illustrates a control application of some embodiments of the invention.

FIG. 14 illustrates a control application 1400 of some embodiments of the invention. This application 1400 is used in some embodiments as the control module 825 of FIG. 8. This application 1400 uses an n Log table mapping engine to map input tables that contain input data tuples to data tuples that represent the logical forwarding plane data. This application resides on top of a virtualization application 1405 that receives data tuples specifying LDP sets from the control application 1400. The virtualization application 1405 maps the data tuples to universal physical control plane data.

More specifically, the control application 1400 allows different users to define different LDP sets, which specify the desired configuration of the logical switches that the users manage. The control application 1400 through its mapping operations converts data for each LDPS of each user into a set of data tuples that specify the logical forwarding plane data for the logical switch associated with the LDPS. In some embodiments, the control application is executed on the same host on which the virtualization application 1405 is executed. The control application and the virtualization application do not have to run on the same machine in other embodiments.

As shown in FIG. 14, the control application 1400 includes a set of rule-engine input tables 1410, a set of function and constant tables 1415, an importer 1420, a rules engine 1425, a set of rule-engine output tables 1445, a translator 1450, an exporter 1455, a PTD 1460, and a compiler 1435. The compiler 1435 is one component of the application that operates at a different instance in time than the application's other components. The compiler operates when a developer needs to specify the rules engine for a particular control application and/or virtualized environment, whereas the rest of the application's modules operate at runtime when the application interfaces with the virtualization application to deploy LDP sets specified by one or more users.

In some embodiments, the compiler 1435 takes a relatively small set (e.g., few hundred lines) of declarative instructions 1440 that are specified in a declarative language and converts these into a large set (e.g., thousands of lines) of code (i.e., object code) that specifies the operation of the rules engine 1425, which performs the application's table mapping. As such, the compiler greatly simplifies the control application developer's process of defining and updating the control application. This is because the compiler allows the developer to use a high level programming language that allows a compact definition of the control application's complex mapping operation and to subsequently update this mapping operation in response to any number of changes (e.g., changes in the logical networking functions supported by the control application, changes to desired behavior of the control application, etc.). Moreover, the compiler relieves the developer from considering the order at which the events would arrive at the control application, when the developer is defining the mapping operation.

In some embodiments, the rule-engine (RE) input tables 1410 include tables with logical data and/or switching configurations (e.g., access control list configurations, private virtual network configurations, port security configurations, etc.) specified by the user and/or the control application. They also include tables that contain physical data (i.e., non-logical data) from the switching elements managed by the virtualized control system in some embodiments. In some embodiments, such physical data includes data regarding the managed switching elements (e.g., universal physical control plane data) and other data regarding network configuration employed by the virtualized control system to deploy the different LDP sets of the different users.

The RE input tables 1410 are partially populated with logical control plane data provided by the users as will be further described below. The RE input tables 1410 also contain the logical forwarding plane data and universal physical control plane data. In addition to the RE input tables 1410, the control application 1400 includes other miscellaneous tables 1415 that the rules engine 1425 uses to gather inputs for its table mapping operations. These tables 1415 include constant tables that store defined values for constants that the rules engine 1425 needs to perform its table mapping operations. For instance, the constant tables 1415 may include a constant "zero" that is defined as the value 0, a constant "dispatch_port_no" as the value 4000, and a constant "broadcast_MAC_addr" as the value 0xFF:FF:FF:FF:FF:FF.

When the rules engine 1425 references constants, the corresponding value defined for the constants are actually retrieved and used. In addition, the values defined for constants in the constant tables 1415 may be modified and/or updated. In this manner, the constant tables 1415 provide the ability to modify the value defined for constants that the rules engine 1425 references without the need to rewrite or recompile code that specifies the operation of the rules engine 1425. The tables 1415 further include function tables that store functions that the rules engine 1425 needs to use to calculate values needed to populate the output tables 1445.

The rules engine 1425 performs table mapping operations that specifies one manner for converting logical control plane data to logical forwarding plane data. Whenever one of the rule-engine (RE) input tables is modified, the rules engine performs a set of table mapping operations that may result in the modification of one or more data tuples in one or more RE output tables.

As shown in FIG. 14, the rules engine 1425 includes an event processor 1422, several query plans 1427, and a table processor 1430. Each query plan is a set of rules that specifies a set of join operations that are to be performed upon the occurrence of a modification to one of the RE input tables. Such a modification is referred to below as an input table event. Each query plan is generated by the compiler 1435 from one declaratory rule in the set of declarations 1440. In some embodiments, more than one query plan is generated from one declaratory rule. For instance, a query plan is created for each of the tables joined by one declaratory rule. That is, when a declaratory rule specifies to join four tables, four different query plans will be created from that one declaration. In some embodiments, the query plans are defined by using the n Log declaratory language.

In some embodiments, the compiler 1435 does not just statically generate query plans but rather dynamically generates query plans based on performance data it gathers. The compiler 1435 in these embodiments generates an initial set of query plans and lets the rules engine operate with the initial set of query plans. The control application gathers the performance data or receives performance feedback (e.g., from the rules engine). Based on this data, the compiler is modified so that the control application or a user of this application can have the modified compiler modify the query plans while the rules engine is not operating or during the operation of the rules engine.

For instance, the order of the join operations in a query plan may result in different execution times depending on the number of tables the rules engine has to select to perform each join operation. The compiler in these embodiments can be re-specified in order to re-order the join operations in a particular query plan when a certain order of the join operations in the particular query plan has resulted in a long execution time to perform the join operations.

The event processor 1422 of the rules engine 1425 detects the occurrence of each input table event. The event processor of different embodiments detects the occurrence of an input table event differently. In some embodiments, the event processor registers for callbacks with the RE input tables for notification of changes to the records of the RE input tables. In such embodiments, the event processor 1422 detects an input table event when it receives notification from an RE input table that one of its records has changed.

In response to a detected input table event, the event processor 1422 (1) selects the appropriate query plan for the detected table event, and (2) directs the table processor 1430 to execute the query plan. To execute the query plan, the table processor 1430, in some embodiments, performs the join operations specified by the query plan to produce one or more records that represent one or more sets of data values from one or more input and miscellaneous tables 1410 and 1415. The table processor 1430 of some embodiments then (1) performs a select operation to select a subset of the data values from the record(s) produced by the join operations, and (2) writes the selected subset of data values in one or more RE output tables 1445.

In some embodiments, the RE output tables 1445 store both logical and physical network element data attributes. The tables 1445 are called RE output tables as they store the output of the table mapping operations of the rules engine 1425. In some embodiments, the RE output tables can be grouped in several different categories. For instance, in some embodiments, these tables can be RE input tables and/or control-application (CA) output tables. A table is an RE input table when a change in the table causes the rules engine to detect an input event that requires the execution of a query plan. A RE output table 1445 can also be an RE input table 1410 that generates an event that causes the rules engine to perform another query plan. Such an event is referred to as an internal input event, and it is to be contrasted with an external input event, which is an event that is caused by an RE input table modification made by the control application 1400 or the importer 1420.

A table is a control-application output table when a change in the table causes the exporter 1455 to export a change to the virtualization application 1405, as further described below. A table in the RE output tables 1445 can be an RE input table, a CA output table, or both an RE input table and a CA output table.

The exporter 1455 detects changes to the CA output tables of the RE output tables 1445. The exporter of different embodiments detects the occurrence of a CA output table event differently. In some embodiments, the exporter registers for callbacks with the CA output tables for notification of changes to the records of the CA output tables. In such embodiments, the exporter 1455 detects an output table event when it receives notification from a CA output table that one of its records has changed.

In response to a detected output table event, the exporter 1455 takes some or all of modified data tuples in the modified CA output tables and propagates this modified data tuple(s) to the input tables (not shown) of the virtualization application 1405. In some embodiments, instead of the exporter 1455 pushing the data tuples to the virtualization application, the virtualization application 1405 pulls the data tuples from the CA output tables 1445 into the input tables of the virtualization application. In some embodiments, the CA output tables 1445 of the control application 1400 and the input tables of the virtualization 1405 may be identical. In yet other embodiments, the control and virtualization applications use one set of tables, so that the CA output tables are essentially CA input tables.

In some embodiments, the control application does not keep in the output tables 1445 the data for LDP sets that the control application is not responsible for managing. However, such data will be translated by the translator 1450 into a format that can be stored in the PTD and gets stored in the PTD. The PTD of the control application 1400 propagates this data to one or more other control application instances of other controller instances so that some of other control application instances that are responsible for managing the LDP sets associated with the data can process the data.

In some embodiments, the control application also brings the data stored in the output tables 1445 (i.e., the data that the control application keeps in the output tables) to the PTD for resiliency of the data. Such data is also translated by the translator 1450, stored in the PTD, and propagated to other control application instances of other controller instances. Therefore, in these embodiments, a PTD of a controller instance has all the configuration data for all LDP sets managed by the virtualized control system. That is, each PTD contains the global view of the configuration of the logical network in some embodiments.

The importer 1420 interfaces with a number of different sources of input data and uses the input data to modify or create the input tables 1410. The importer 1420 of some embodiments receives, from the input translation application 1470 through the inter-instance communication interface (not shown), the input data. The importer 1420 also interfaces with the PTD 1460 so that data received through the PTD from other controller instances can be used as input data to modify or create the input tables 1410. Moreover, the importer 1420 also detects changes with the RE input tables and the RE input tables & CA output tables of the RE output tables 1445.

As mentioned above, the virtualization application of some embodiments specifies the manner by which different LDP sets of different users of a network control system can be implemented by the switching elements managed by the network control system. In some embodiments, the virtualization application specifies the implementation of the LDP sets within the managed switching element infrastructure by performing conversion operations. These conversion operations convert the LDP sets data records (also called data tuples below) to the control data records (e.g., universal physical control plane data) that are initially stored within the managed switching elements and then used by the switching elements to produce forwarding plane data (e.g., flow entries) for defining forwarding behaviors of the switching elements. The conversion operations also produce other data (e.g., in tables) that specify network constructs (e.g., tunnels, queues, queue collections, etc.) that should be defined within and between the managed switching elements. The network constructs also include managed software switching elements that are dynamically deployed or pre-configured managed software switching elements that are dynamically added to the set of managed switching elements.

I. Virtualization Layer

Figure 15:
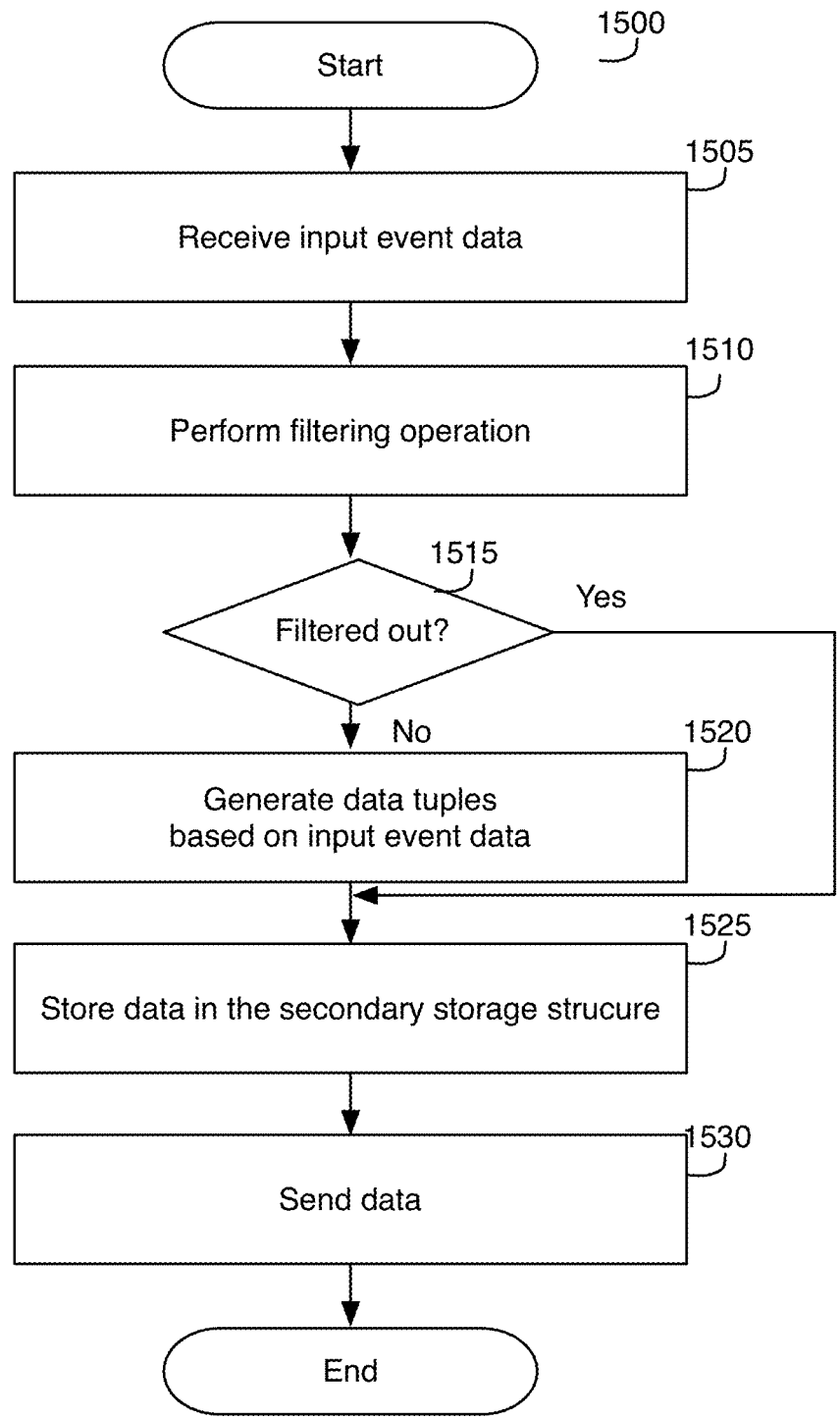
FIG. 15 conceptually illustrates an example of such conversion operations that the virtualization application of some embodiments performs.

FIG. 15 conceptually illustrates an example of such conversion operations that the virtualization application of some embodiments performs. This figure conceptually illustrates a process 1500 that the virtualization application performs to generate data tuples based on input event data. As shown in FIG. 15, the process 1500 initially receives (at 1505) data regarding an input event. The input event data may be logical forwarding plane data that the control application generates in some embodiments from the logical control plane data. The input event data in some embodiments may also be universal physical control plane data, customized physical control plane data, or physical forwarding plane data.

At 1510, the process 1500 then performs a filtering operation to determine whether this instance of the virtualization application is responsible for the input event data. As described above, several instances of the virtualization application may operate in parallel to control multiple sets of LDP sets in some embodiments. In these embodiments, each virtualization application uses the filtering operation to filter out input data that does not relate to the virtualization application's LDP sets. Also, the virtualization application of some embodiments filters out input data that does not relate to the managed switching elements that this instance of the virtualization application is responsible for managing.

To perform this filtering operation, the virtualization application of some embodiments includes a filter module. This module in some embodiments is a standalone module, while in other embodiments it is implemented by a table mapping engine (e.g., implemented by the join operations performed by the table mapping engine) that maps records between input tables and output tables of the virtualization application, as further described below.

Next, at 1515, the process determines whether the filtering operation has filtered out the received input event data. As mentioned above, the instance of the virtualization application filters out the input data when the input data is related to a LDPS that is not one of the LDP sets of which the virtualization application is the master or when the data is for a managed switching element that is not one of the managed switching elements of which the virtualization application is the master. When the process determines (at 1515) that the filtering operation has filtered out the input event, the process transitions to 1525, which will be described further below. Otherwise, the process 1500 transitions to 1520.

At 1520, a converter of the virtualization application generates one or more sets of data tuples based on the received input event data. In some embodiments, the converter is a table mapping engine that performs a series of table mapping operations on the input event data to map the input event data to other data tuples. As mentioned above, this table mapping engine also performs the filtering operation in some embodiments. One example of such a table mapping engine is an n Log table-mapping engine which will be further described further below.

As mentioned above, the data that the process 1500 filters out (at 1510) include data (e.g., configuration data) that the virtualization application is not responsible for managing. The process pushes down these data to a secondary storage structure (e.g., PTD) which is a storage structure other than the relational database data structure that contains the input and output tables in some embodiments. Accordingly, at 1525, the process 1500 of some embodiments translates (1525) the data in a format that can be stored in the secondary storage structure so that the data can be shared by the controller instance that is responsible for managing the data. The process 1500 of some embodiments also pushes down configuration data in the output tables from the relational database data structure to the secondary storage structure for data resiliency.

At 1530, the process sends out the generated data tuples. In some cases, the process sends the data tuples to a number of chassis controllers so that the chassis controllers can convert the universal physical control plane data into customized physical control plane data before passing the customized physical control data to the switching elements. In some cases, the process sends the data tuples to the switching elements of which the instance of the virtualization application is the master. In some cases, the process also sends the configuration data that is stored in the secondary storage structure to one or more other controller instances that are responsible for the configuration data. The process then ends.

Figure 16:
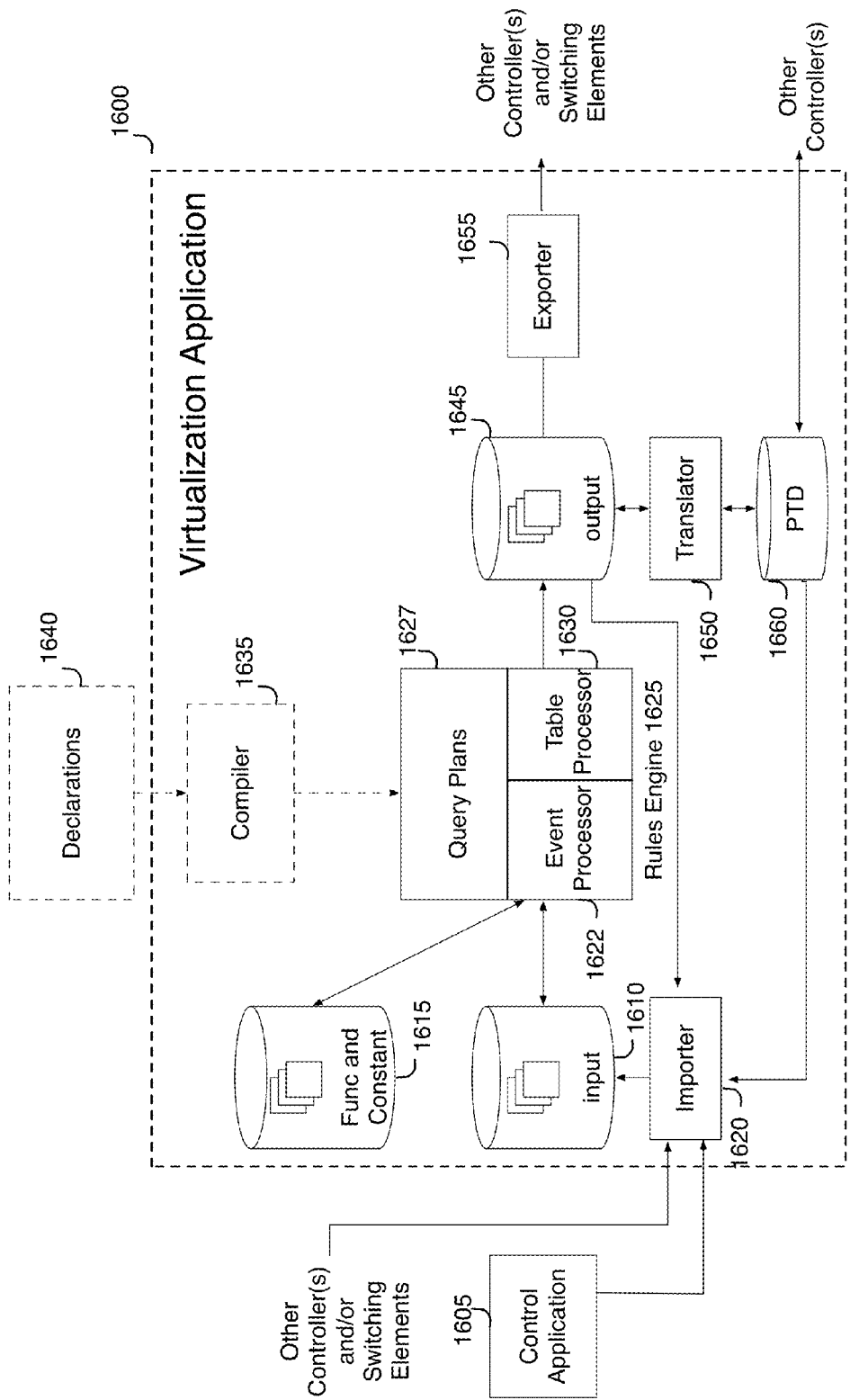
FIG. 16 illustrates a virtualization application of some embodiments of the invention.

FIG. 16 illustrates a virtualization application 1600 of some embodiments of the invention. This application 1600 is used in some embodiments as the virtualization module 830 of FIG. 8. The virtualization application 1600 uses an n Log table mapping engine to map input tables that contain LDPS data tuples that represent universal physical control plane data. This application resides below a control application 1605 that generates LDPS data tuples.

More specifically, the control application 1605 allows different users to define different LDP sets, which specify the desired configuration of the logical switches that the users manage. The control application 1605 through its mapping operations converts data for each LDPS of each user into a set of data tuples that specify the logical forwarding plane data for the logical switch associated with the LDPS. In some embodiments, the control application is executed on the same host on which the virtualization application 1600 is executed. The control application and the virtualization application do not have to run on the same machine in other embodiments.

As shown in FIG. 16, the virtualization application 1600 includes a set of rule-engine input tables 1610, a set of function and constant tables 1615, an importer 1620, a rules engine 1625, a set of rule-engine output tables 1645, a translator 1650, an exporter 1655, a PTD 1660, and a compiler 1635.

The compiler 1635 is similar to the compiler 1435 described above by reference to FIG. 14. In some embodiments, the rule-engine (RE) input tables 1610 include tables with logical data and/or switching configurations (e.g., access control list configurations, private virtual network configurations, port security configurations, etc.) specified by the user and/or the virtualization application. In some embodiments, they also include tables that contain physical data (i.e., non-logical data) from the switching elements managed by the virtualized control system. In some embodiments, such physical data includes data regarding the managed switching elements (e.g., universal physical control plane data) and other data regarding network configuration employed by the virtualized control system to deploy the different LDP sets of the different users.

The RE input tables 1610 are partially populated by the LDPS data (e.g., by logical forwarding plane data) provided by the control application 1605. The control application generates part of the LDPS data based on user input regarding the LDP sets.

In addition to the RE input tables 1610, the virtualization application 1600 includes other miscellaneous tables 1615 that the rules engine 1625 uses to gather inputs for its table mapping operations. These tables 1615 include constant tables that store defined values for constants that the rules engine 1625 needs to perform its table mapping operations.

When the rules engine 1625 references constants, the corresponding value defined for the constants are actually retrieved and used. In addition, the values defined for constants in the constant table 1615 may be modified and/or updated. In this manner, the constant tables 1615 provide the ability to modify the value defined for constants that the rules engine 1625 references without the need to rewrite or recompile code that specifies the operation of the rules engine 1625. The tables 1615 further include function tables that store functions that the rules engine 1625 needs to use to calculate values needed to populate the output tables 1645.

The rules engine 1625 performs table mapping operations that specify one manner for implementing the LDP sets within the managed switching element infrastructure. Whenever one of the RE input tables is modified, the rules engine performs a set of table mapping operations that may result in the modification of one or more data tuples in one or more RE output tables.

As shown in FIG. 16, the rules engine 1625 includes an event processor 1622, several query plans 1627, and a table processor 1630. In some embodiments, each query plan is a set of join operations that are to be performed upon the occurrence of a modification to one of the RE input tables. Such a modification is referred to below as an input table event. Each query plan is generated by the compiler 1635 from one declaratory rule in the set of declarations 1640. In some embodiments, more than one query plan is generated from one declaratory rule as described above. In some embodiments, the query plans are defined by using the n Log declaratory language.

The event processor 1622 of the rules engine 1625 detects the occurrence of each input table event. The event processor of different embodiments detects the occurrence of an input table event differently. In some embodiments, the event processor registers for callbacks with the RE input tables for notification of changes to the records of the RE input tables. In such embodiments, the event processor 1622 detects an input table event when it receives notification from an RE input table that one of its records has changed.

In response to a detected input table event, the event processor 1622 (1) selects the appropriate query plan for the detected table event, and (2) directs the table processor 1630 to execute the query plan. To execute the query plan, the table processor 1630 in some embodiments performs the join operations specified by the query plan to produce one or more records that represent one or more sets of data values from one or more input and miscellaneous tables 1610 and 1615. The table processor 1630 of some embodiments then (1) performs a select operation to select a subset of the data values from the record(s) produced by the join operations, and (2) writes the selected subset of data values in one or more RE output tables 1645.

In some embodiments, the RE output tables 1645 store both logical and physical network element data attributes. The tables 1645 are called RE output tables as they store the output of the table mapping operations of the rules engine 1625. In some embodiments, the RE output tables can be grouped in several different categories. For instance, in some embodiments, these tables can be RE input tables and/or virtualization-application (VA) output tables. A table is an RE input table when a change in the table causes the rules engine to detect an input event that requires the execution of a query plan. A RE output table 1645 can also be an RE input table 1610 that generates an event that causes the rules engine to perform another query plan after it is modified by the rules engine. Such an event is referred to as an internal input event, and it is to be contrasted with an external input event, which is an event that is caused by an RE input table modification made by the control application 1605 via the importer 1620.

Figure 17:
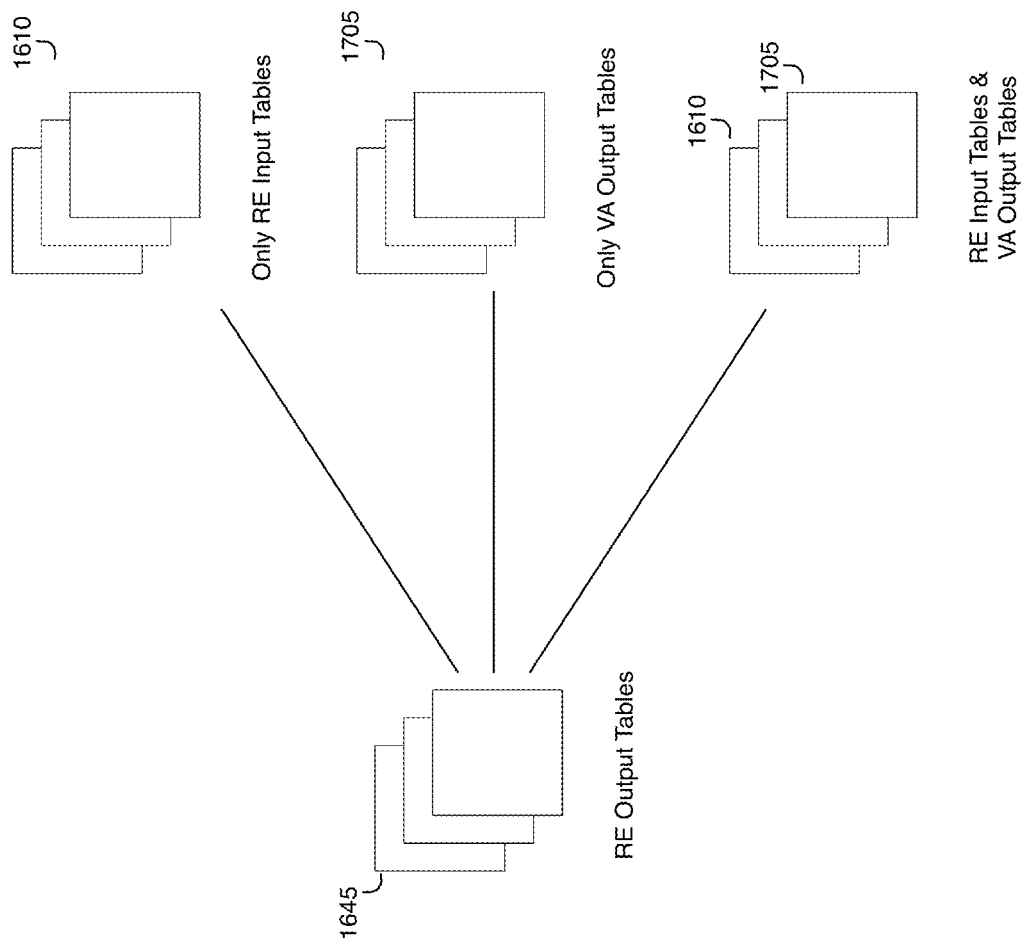
FIG. 17 conceptually illustrates a table in the RE output tables can be an RE input table, a VA output table, or both an RE input table and a VA output table.

A table is a virtualization-application output table when a change in the table causes the exporter 1655 to export a change to the managed switching elements or other controller instances. As shown in FIG. 17, a table in the RE output tables 1645 can be an RE input table 1610, a VA output table 1705, or both an RE input table 1610 and a VA output table 1705.

The exporter 1655 detects changes to the VA output tables 1705 of the RE output tables 1645. The exporter of different embodiments detects the occurrence of a VA output table event differently. In some embodiments, the exporter registers for callbacks with the VA output tables for notification of changes to the records of the VA output tables. In such embodiments, the exporter 1655 detects an output table event when it receives notification from a VA output table that one of its records has changed.

In response to a detected output table event, the exporter 1655 takes each modified data tuple in the modified VA output tables and propagates this modified data tuple to one or more of other controller instances (e.g., chassis controller) or to one or more the managed switching elements. In doing this, the exporter completes the deployment of the LDPS (e.g., one or more logical switching configurations) to one or more managed switching elements as specified by the records.

As the VA output tables store both logical and physical network element data attributes in some embodiments, the PTD 1660 in some embodiments stores both logical and physical network element attributes that are identical or derived from the logical and physical network element data attributes in the output tables 1645. In other embodiments, however, the PTD 1660 only stores physical network element attributes that are identical or derived from the physical network element data attributes in the output tables 1645.

In some embodiments, the virtualization application does not keep in the output tables 1645 the data for LDP sets that the virtualization application is not responsible for managing. However, such data will be translated by the translator 1650 into a format that can be stored in the PTD and then gets stored in the PTD. The PTD of the virtualization application 1600 propagates this data to one or more other virtualization application instances of other controller instances so that some of other virtualization application instances that are responsible for managing the LDP sets associated with the data can process the data.

In some embodiments, the virtualization application also brings the data stored in the output tables 1645 (i.e., the data that the virtualization application keeps in the output tables) to the PTD for resiliency of the data. Such data is also translated by the translator 1650, stored in the PTD, and propagated to other virtualization application instances of other controller instances. Therefore, in these embodiments, a PTD of a controller instance has all the configuration data for all LDP sets managed by the virtualized control system. That is, each PTD contains the global view of the configuration of the logical network in some embodiments.

The importer 1620 interfaces with a number of different sources of input data and uses the input data to modify or create the input tables 1610. The importer 1620 of some embodiments receives, from the input translation application 1670 through the inter-instance communication interface, the input data. The importer 1620 also interfaces with the PTD 1660 so that data received through the PTD from other controller instances can be used as input data to modify or create the input tables 1610. Moreover, the importer 1620 also detects changes with the RE input tables and the RE input tables & VA output tables of the RE output tables 1645.

J. Rules Engine

1. Designing the n Log Table Mapping Engine

In some embodiments, the control application 1400 and the virtualization application 1600 each uses a variation of the datalog database language, called n Log, to create the table mapping engine that maps input tables containing LDPS data and switching element attributes to the output tables. Like datalog, n Log provides a few declaratory rules and operators that allow a developer to specify different operations that are to be performed upon the occurrence of different events. In some embodiments, n Log provides a smaller subset of the operators that are provided by datalog in order to increase the operational speed of n Log. For instance, in some embodiments, n Log only allows the AND operator to be used in any of the declaratory rules.

The declaratory rules and operations that are specified through n Log are then compiled into a much larger set of rules by an n Log compiler. In some embodiments, this compiler translates each rule that is meant to respond to an event into several sets of database join operations. Collectively the larger set of rules forms the table mapping, rules engine that is referred to below as the n Log engine. For simplicity of discussion, FIGS. 18-22 are described below by referring to the rules engine 1625 and the virtualization application 1600 although the description for these figures are also applicable to the rules engine 1425 and the control application 1400.

Figure 18:
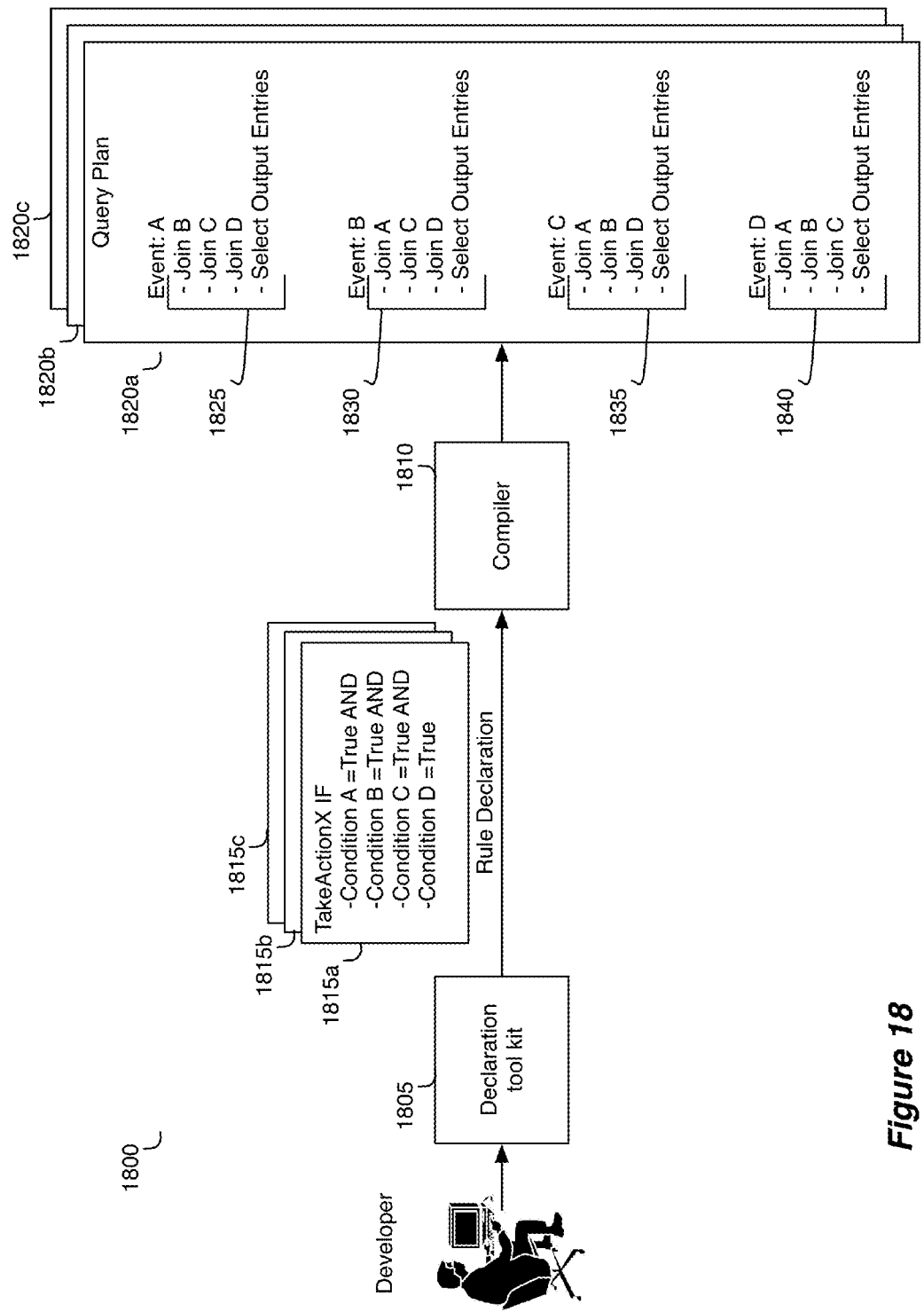
FIG. 18 illustrates a development process that some embodiments employ to develop the rules engine of the virtualization application.

FIG. 18 illustrates a development process 1800 that some embodiments employ to develop the rules engine 1625 of the virtualization application 1600. As shown in this figure, this process uses a declaration toolkit 1805 and a compiler 1810. The toolkit 1805 allows a developer (e.g., a developer of a control application 1605 that operates on top of the virtualization application 1600) to specify different sets of rules to perform different operations upon occurrence of different sets of conditions.

One example 1815 of such a rule is illustrated in FIG. 18. This example is a multi-conditional rule that specifies that an Action X has to be taken if four conditions A, B, C, and D are true. The expression of each condition as true in this example is not meant to convey that all embodiments express each condition for each rule as True or False. For some embodiments, this expression is meant to convey the concept of the existence of a condition, which may or may not be true. For example, in some such embodiments, the condition "A=True" might be expressed as "Is variable Z=A?" In other words, A in this example is the value of a parameter Z, and the condition is true when Z has a value A.

Irrespective of how the conditions are expressed, a multi-conditional rule in some embodiments specifies the taking of an action when certain conditions in the network are met. Examples of such actions include creation or deletion of new packet flow entries, creation or deletion of new network constructs, modification to existing network constructs, etc. In the virtualization application 1600 these actions are often implemented by the rules engine 1625 by creating, deleting, or modifying records in the output tables. In some embodiments, an action entails a removal or a creation of a data tuple.

As shown in FIG. 18, the multi-conditional rule 1815 uses only the AND operator to express the rule. In other words, each of the conditions A, B, C and D has to be true before the Action X is to be taken. In some embodiments, the declaration toolkit 1805 only allows the developers to utilize the AND operator because excluding the other operators (such as ORs, XORs, etc.) that are allowed by datalog allows n Log to operate faster than datalog.

The compiler 1810 converts each rule specified by the declaration toolkit 1805 into a query plan 1820 of the rules engine. FIG. 18 illustrates the creation of three query plans 1820a-1820c for three rules 1815a-1815c. Each query plan includes one or more sets of join operations. Each set of join operations specifies one or more join operations that are to be performed upon the occurrence of a particular event in a particular RE input table, where the particular event might correspond to the addition, deletion or modification of an entry in the particular RE input table.

In some embodiments, the compiler 1810 converts each multi-conditional rule into several sets of join operations, with each set of join operations being specified for execution upon the detection of the occurrence of one of the conditions. Under this approach, the event for which the set of join operations is specified is one of the conditions of the multi-conditional rule. Given that the multi-conditional rule has multiple conditions, the compiler in these embodiments specifies multiple sets of join operations to address the occurrence of each of the conditions.

FIG. 18 illustrates this conversion of a multi-conditional rule into several sets of join operations. Specifically, it illustrates the conversion of the four-condition rule 1815 into the query plan 1820a, which has four sets of join operations. In this example, one join-operation set 1825 is to be performed when condition A occurs, one join-operation set 1830 is to be performed when condition B occurs, one join-operation set 1835 is to be performed when condition C occurs, and one join-operation set 1840 is to be performed when condition D occurs.

These four sets of operations collectively represent the query plan 1820a that the rules engine 1625 performs upon the occurrence of an RE input table event relating to any of the parameters A, B, C, or D. When the input table event relates to one of these parameters (e.g., parameter B) but one of the other parameters (e.g., parameters A, C, and D) is not true, then the set of join operations fails and no output table is modified. But, when the input table event relates to one of these parameters (e.g., parameter B) and all of the other parameters (e.g., parameters A, C, and D) are true, then the set of join operations does not fail and an output table is modified to perform the action X. In some embodiments, these join operations are internal join operations. In the example illustrated in FIG. 18, each set of join operations terminates with a select command that selects entries in the record(s) resulting from the set of join operations to output to one or more output tables.

To implement the n Log engine in a distributed manner, some embodiments partition management of LDP sets by assigning the management of each LDPS to one controller instance. This partition management of the LDPS is also referred to as serialization of management of the LDPS. The rules engine 1625 of some embodiments implements this partitioned management of the LDPS by having a join to the LDPS entry be the first join in each set of join operations that is not triggered by an event in a LDPS input table.

Figure 19:
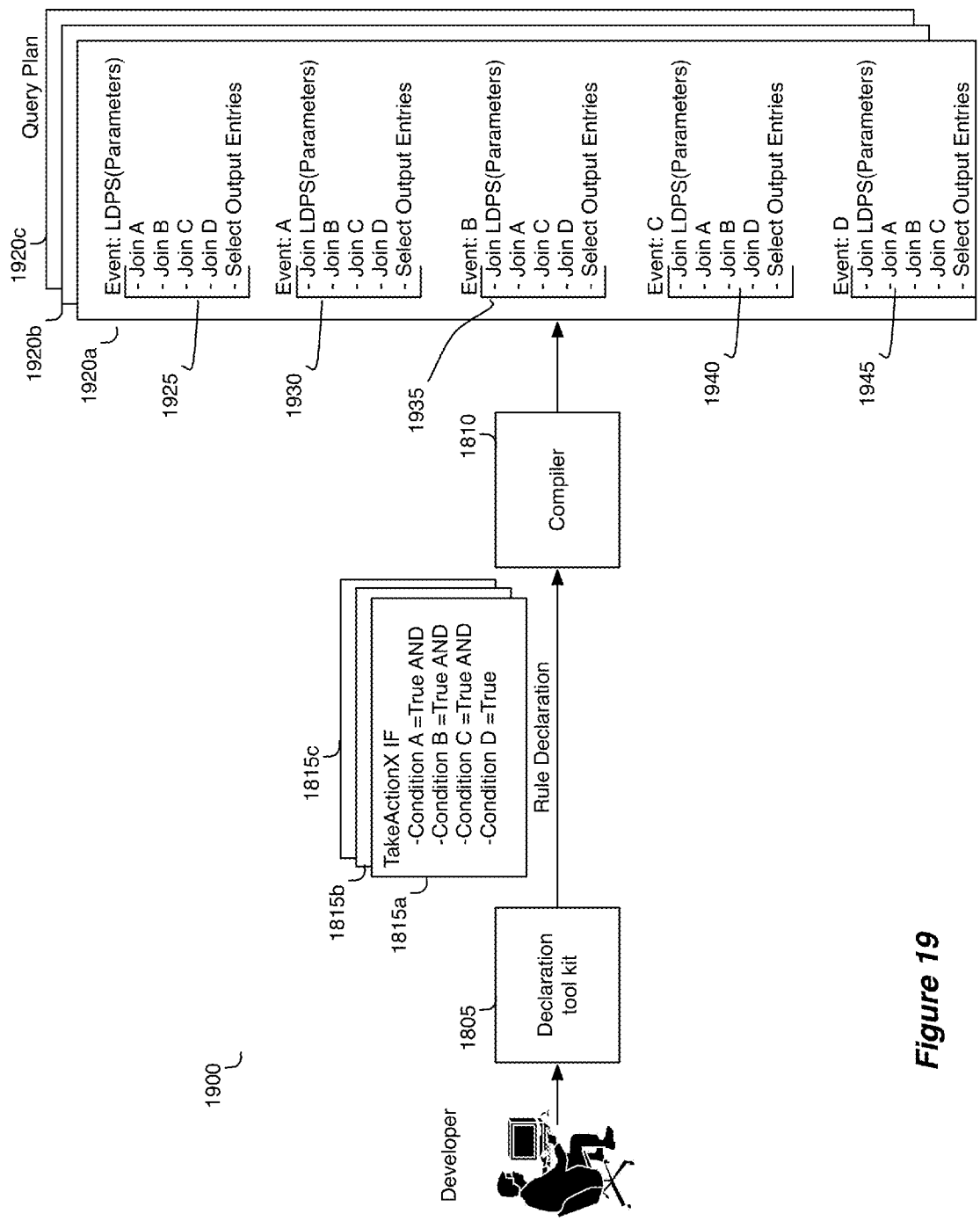
FIG. 19 illustrates a rules engine that some embodiments implements a partitioned management of a LDPS by having a join to the LDPS entry be the first join in each set of join operations that is not triggered by an event in a LDPS input table.

FIG. 19 illustrates one such approach. Specifically, for the same four-condition rule 1815a illustrated in FIG. 18, it generates a different query plan 1920a. This query plan is part of three query plans 1920a-1920c that this figure shows the compiler 1910 generating for the three rules 1815a-1815c specified through the declaration toolkit 1805. Like the query plan 1820a that has four sets of join operations 1825, 1830, 1835 and 1840 for the four-condition rule 1815a, the query plan 1920a also has four sets of join operations 1930, 1935, 1940 and 1945 for this rule 1815a.

The four sets of join operations 1930, 1935, 1940 and 1945 are operational sets that are each to be performed upon the occurrence of one of the conditions A, B, C, and D. The first join operations in each of these four sets 1930, 1935, 1940 and 1945 is a join with the LDPS table managed by the virtualization application instance. Accordingly, even when the input table event relates to one of these four parameters (e.g., parameter B) and all of the other parameters (e.g., parameters A, C, and D) are true, the set of join operations may fail if the event has occurred for a LDPS that is not managed by this virtualization application instance. The set of join operations does not fail and an output table is modified to perform the desire action only when (1) the input table event relates to one of these four parameters (e.g., parameter B), all of the other parameters (e.g., parameters A, C, and D) are true, and (3) the event relates to a LDPS that is managed by this virtualization application instance. How the insertion of the join operation to the LDPS table allows the virtualization application to partition management of the LDP sets is described in detail further below.

2. Table Mapping Operations Upon Occurrence of Event

Figure 20:
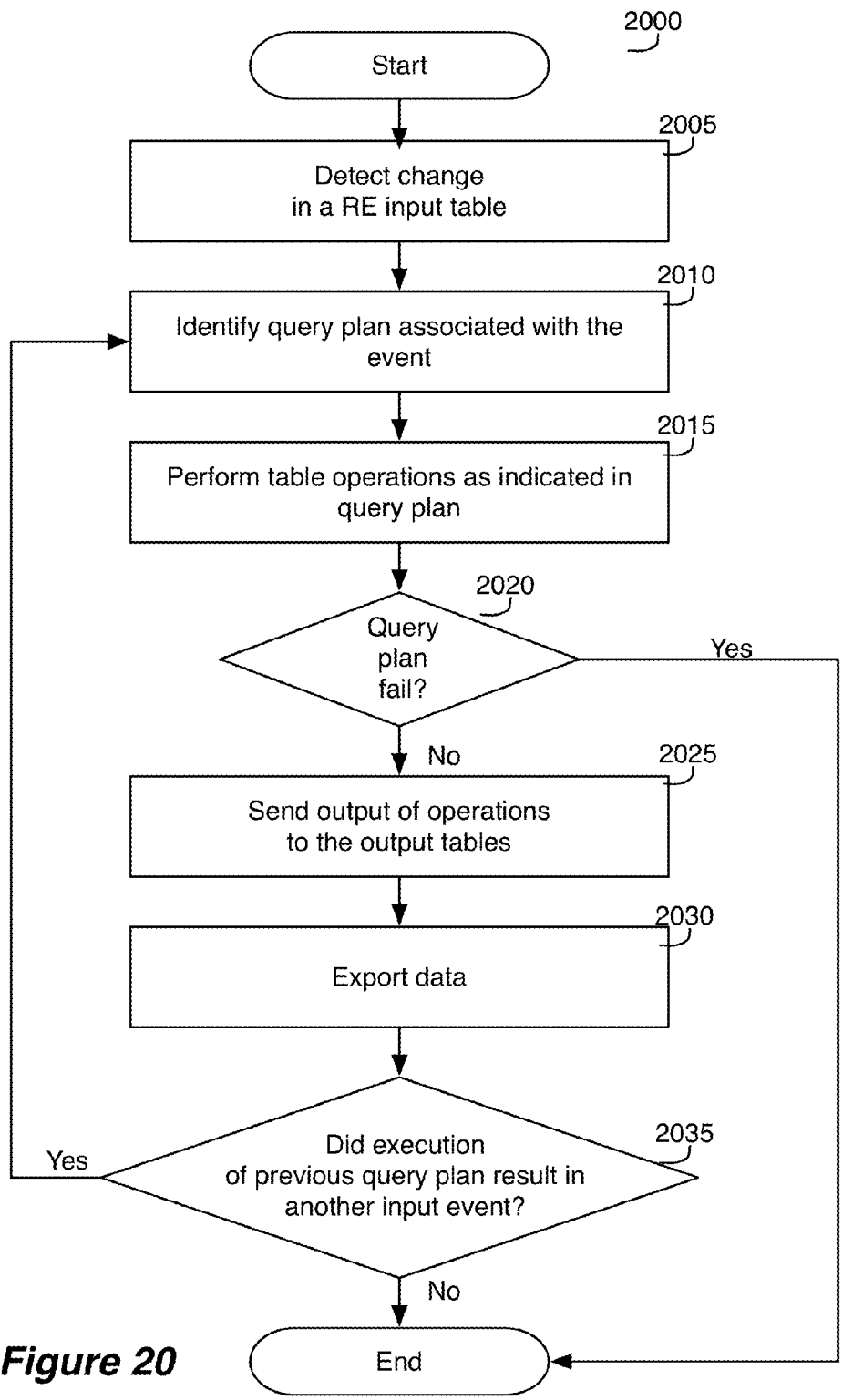
FIG. 20 conceptually illustrates a process that the virtualization application performs in some embodiments each time a record in an RE input table changes.

FIG. 20 conceptually illustrates a process 2000 that the virtualization application 1600 performs in some embodiments each time a record in an RE input table changes. This change may be a change made through the control application 1605. Alternatively, it may be a change that is made by the importer 1620 after the importer 1620 detects or receives a change in the PTD 1660. The change to the RE input table record can entail the addition, deletion or modification of the record.

As shown in FIG. 20, the process 2000 initially detects (at 2005) a change in an RE input table 1610. In some embodiments, the event processor 1622 is the module that detects this change. Next, at 2010, the process 2000 identifies the query plan associated with the detected RE input table event. As mentioned above, each query plan in some embodiments specifies a set of join operations that are to be performed upon the occurrence of an input table event. In some embodiments, the event processor 1622 is also the module that performs this operation (i.e., is the module that identifies the query plan).

At 2015, the process 2000 executes the query plan for the detected input table event. In some embodiments, the event processor 1622 directs the table processor 1630 to execute the query plan. To execute a query plan that is specified in terms of a set of join operations, the table processor 1630 in some embodiments performs the set of join operations specified by the query plan to produce one or more records that represent one or more sets of data values from one or more input and miscellaneous tables 1610 and 1615.

Figure 21:
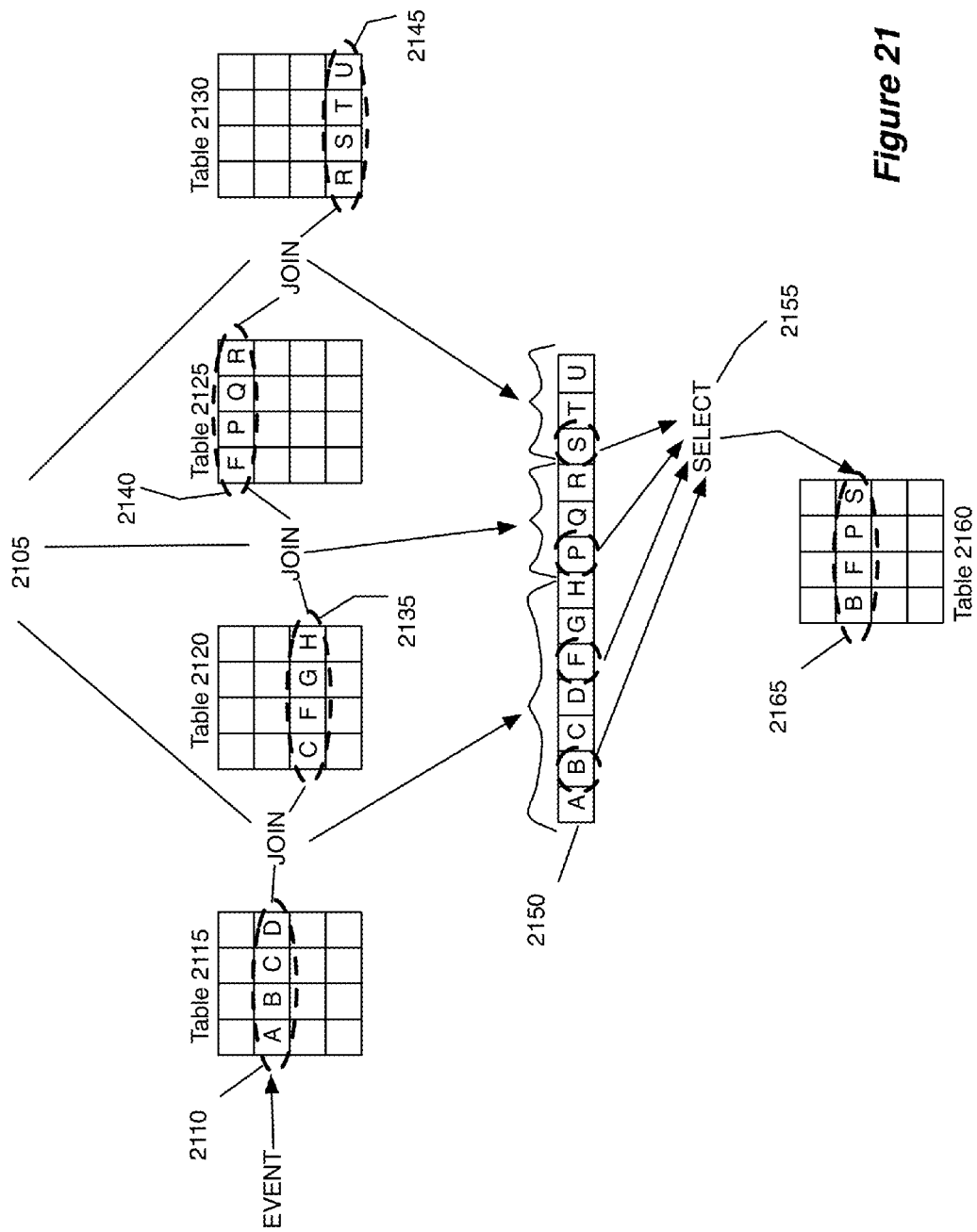
FIG. 21 illustrates an example of a set of join operations.

FIG. 21 illustrates an example of a set of join operations 2105. This set of join operations is performed when an event is detected with respect to record 2110 of an input table 2115. The join operations in this set specify that the modified record 2110 in table 2115 should be joined with the matching record(s) in table 2120. This joined record should then be joined with the matching record(s) in table 2125, and this resulting joined record should finally be joined with the matching record(s) in table 2130.

Two records in two tables "match" when values of a common key (e.g., a primary key and a foreign key) that the two tables share are the same, in some embodiments. In the example in FIG. 21, the records 2110 and 2135 in tables 2115 and 2120 match because the values C in these records match. Similarly, the records 2135 and 2140 in tables 2120 and 2125 match because the values F in these records match. Finally, the records 2140 and 2145 in tables 2125 and 2130 match because the values R in these records match. The joining of the records 2110, 2135, 2140, and 2145 results in the combined record 2150. In the example shown in FIG. 21, the result of a join operation between two tables (e.g., tables 2115 and 2120) is a single record (e.g., ABCDFGH). However, in some cases, the result of a join operation between two tables may be multiple records.

Even though in the example illustrated in FIG. 21 a record is produced as the result of the set of join operations, the set of join operations in some cases might result in a null record. For instance, as described further below, a null record results when the set of join operations terminates on the first join because the detected event relates to a LDPS not managed by a particular instance of the virtualization application. Accordingly, at 2020, the process determines whether the query plan has failed (e.g., whether the set of join operations resulted in a null record). If so, the process ends. In some embodiments, the operation 2020 is implicitly performed by the table processor when it terminates its operations upon the failure of one of the join operations.

When the process 2000 determines (at 2020) that the query plan has not failed, it stores (at 2025) the output resulting from the execution of the query plan in one or more of the output tables. In some embodiments, the table processor 1630 performs this operation by (1) performing a select operation to select a subset of the data values from the record(s) produced by the join operations, and (2) writing the selected subset of data values in one or more RE output tables 1645. FIG. 21 illustrates an example of this selection operation. Specifically, it illustrates the selection of values B, F, P and S from the combined record 2150 and the writing of these values into a record 2165 of an output table 2160.

As mentioned above, the RE output tables can be categorized in some embodiments as (1) an RE input table only, (2) a VA output table only, or (3) both an RE input table and a VA output table. When the execution of the query plan results in the modification a VA output table, the process 2000 exports (at 2030) the changes to this output table to one or more other controller instances or one or more managed switching elements. In some embodiments, the exporter 1655 detects changes to the VA output tables 1705 of the RE output tables 1645, and in response, it propagates the modified data tuple in the modified VA output table to other controller instances or managed switching elements. In doing this, the exporter completes the deployment of the LDP sets (e.g., one or more logical switching configurations) to one or more managed switching elements as specified by the output tables.

At 2035, the process determines whether the execution of the query plan resulted in the modification of the RE input table. This operation is implicitly performed in some embodiments when the event processor 1622 determines that the output table that was modified previously at 2025 modified an RE input table. As mentioned above, an RE output table 1645 can also be an RE input table 1610 that generates an event that causes the rules engine to perform another query plan after it is modified by the rules engine. Such an event is referred to as an internal input event, and it is to be contrasted with an external input event, which is an event that is caused by an RE input table modification made by the control application 1605 or the importer 1620. When the process determines (at 2030) that an internal input event was created, it returns to 2010 to perform operations 2010-2035 for this new internal input event. The process terminates when it determines (at 2035) that the execution of the query plan at 2035 did not result in an internal input event.

One of ordinary skill in the art will recognize that process 2000 is a conceptual representation of the operations used to map a change in one or more input tables to one or more output tables. The specific operations of process 2000 may not be performed in the exact order shown and described. The specific operations may not be performed in one continuous series of operations, and different specific operations may be performed in different embodiments. For instance, the process 2000 in some embodiments batches up a set of changes in RE input tables 1610 and identifies (at 2010) a query plan associated with the set of detected RE input table events. The process in these embodiments executes (at 2020) the query plan for the whole set of the RE input table events rather than for a single RE input table event. Batching up the RE input table events in some embodiments results in better performance of the table mapping operations. For example, batching the RE input table events improves performance because it reduces the number of instances that the process 2000 will produce additional RE input table events that would cause it to start another iteration of itself.

3. Parallel, Distributed Management of LDP Sets

As mentioned above, some embodiments implement the n Log engine as a distributed table mapping engine that is executed by different virtualization applications of different controller instances. To implement the n Log engine in a distributed manner, some embodiments partition the management of the LDP sets by specifying, for each particular LDPS, only one controller instance as the instance responsible for specifying the records associated with that particular LDPS. Partitioning the management of the LDP sets also assigns in some embodiments the table mapping operations for each LDPS to the n Log engine of the controller instance responsible for the LDPS.

As described above, some embodiments partition the n Log table mapping operations across the different instances by designating the first join operation that is performed by each n Log instance to be based on the LDPS parameter. This designation ensures that each n Log instance's join operations fail and terminate immediately when the instance has started a set of join operations that relate to a LDPS that is not managed by the n Log instance.

Figure 22:
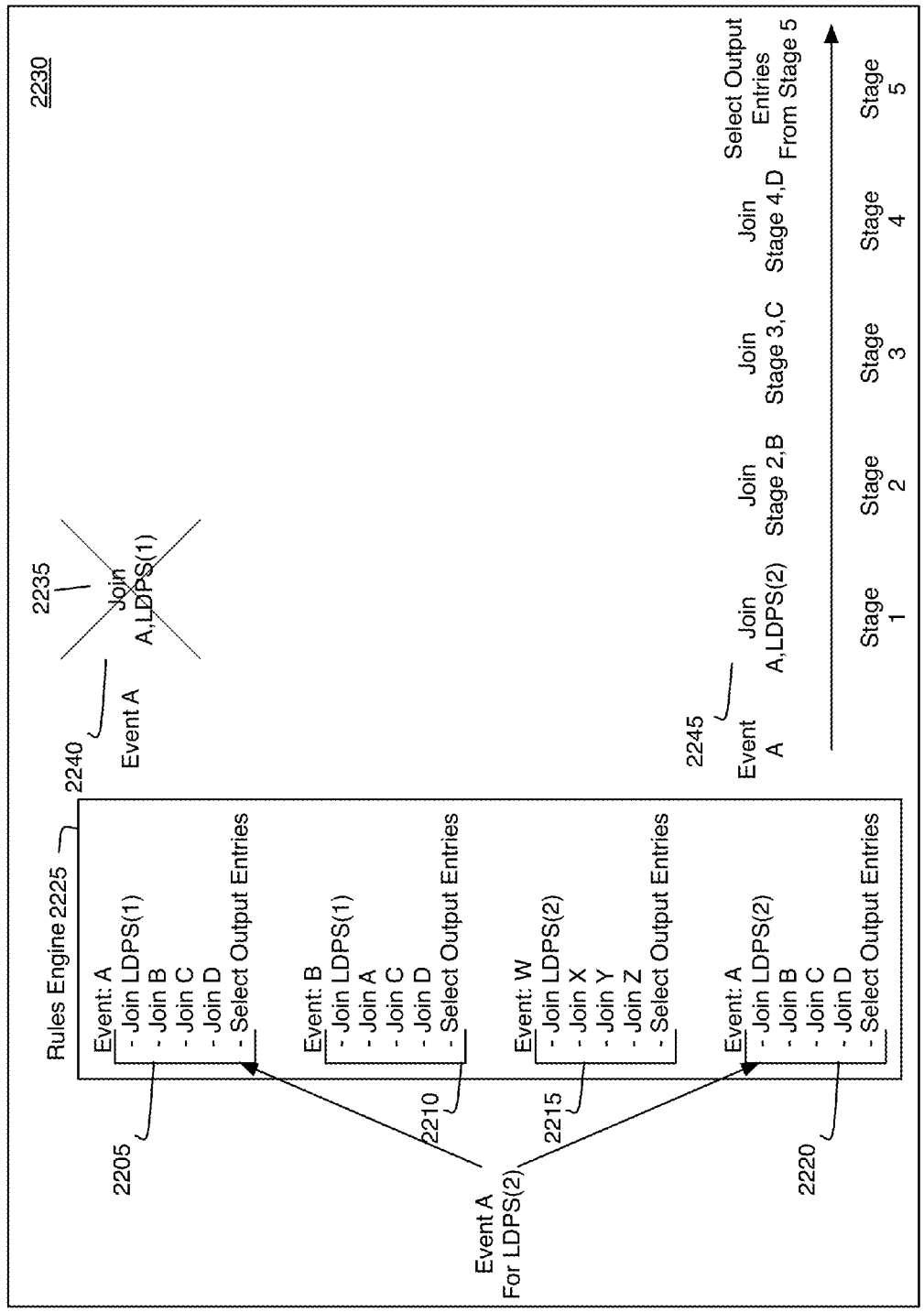
FIG. 22 illustrates an example of a set of join operations failing when they relate to a LDPS that does not relate to an input table event that has occurred.

FIG. 22 illustrates an example of a set of join operations failing when they relate to a LDPS that does not relate to an input table event that has occurred. Specifically, this figure illustrates four query plans 2205, 2210, 2215 and 2220 of a rules engine 2225 of a particular virtualization application instance 2230. Two of these query plans 2210 and 2215 specify two sets of join operations that should be performed upon occurrence of input table events B and W respectively, while two of the query plans 2205 and 2220 specify two sets of join operations that should be performed upon occurrence of input table event A.

In the example illustrated in FIG. 22, the two query plans 2210 and 2215 are not executed because an input table event A has occurred for a LDPS 2 and these two plans are not associated with such an event. Instead, the two query plans 2205 and 2220 are executed because they are associated with the input table event A that has occurred. As shown in this figure, the occurrence of this event results in two sets of join operations being performed to execute the two query plans 2205 and 2220.

The first set of join operations 2240 for the query plan 2205 fails on the first join operation 2235 because it is a join with the LDPS table, which for the virtualization application instance 2230 does not contain a record for the LDPS 1, which is a LDPS not managed by the virtualization application instance 2230. In some embodiments, even though the first join operation 2235 has failed, the remaining join operations (not shown) of the query plan 2240 will still be performed and fail. In other embodiments, the remaining join operations of the query plan 2240 will not be performed as shown.

The second set of join operations 2245 does not fail, however, because it is for the LDPS 2, which is a LDPS managed by the virtualization application instance 2230 and therefore has a record in the LDPS table of this application instance. This set of join operations has four stages that each performs one join operation. Also, as shown in FIG. 22, the set of join operations terminates with a selection operation that selects a portion of the combined record produced through the join operations. The distribution of the n Log table mapping operations across several n Log instances reduces the load on each n Log instance and thereby increases the speed by which each n Log instance can complete its mapping operations.

K. Network Controller

Figure 23:
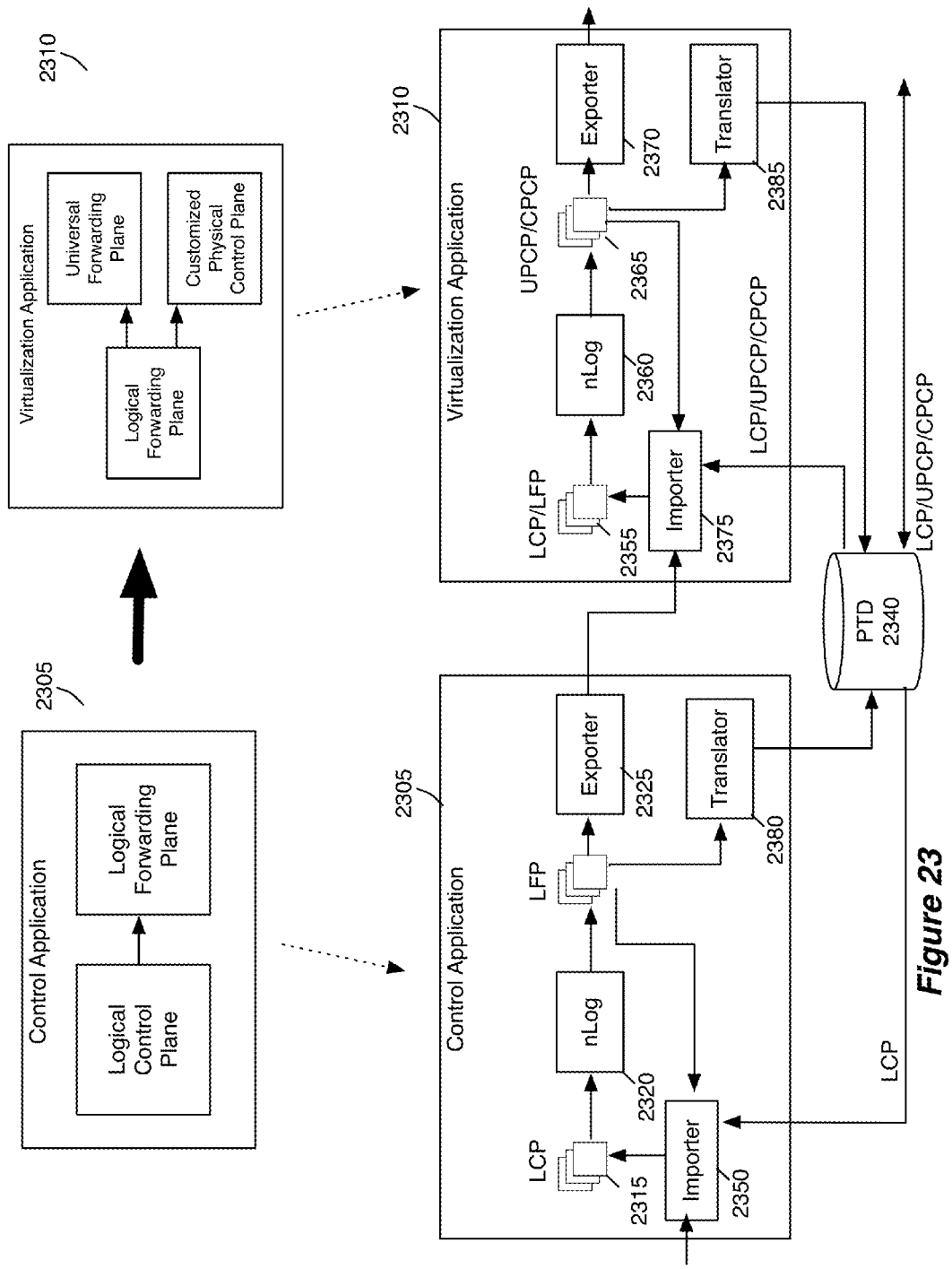
FIG. 23 illustrates a simplified view of the table mapping operations of the control and virtualization applications of some embodiments of the invention.

FIG. 23 illustrates a simplified view of the table mapping operations of the control and virtualization applications of some embodiments of the invention. As indicated in the top half of this figure, the control application 2305 maps logical control plane data to logical forwarding plane data, which the virtualization application 2310 of some embodiments then maps to universal physical control plane data or customized physical control plane data.

The bottom half of this figure illustrates the table mapping operations of the control application and the virtualization application. As shown in this half, the control application's input tables 2315 store logical control plane (LCP) data as the LCP data along with data in the constant and function tables (not shown) is used by the control application's n Log engine 2320 in some embodiments to generate logical forwarding plane (LFP) data. The exporter 2325 sends the generated data to the virtualization application 2310 for further processing.

This figure shows that the importer 2350 receives the LCP data from the user (e.g., thru an input translation application) and update input tables 2315 of the control application with the LCP data. This figure further shows that the importer 2350 detects or receives changes in the PTD 2340 (e.g., LCP data changes originated from the other controller instances) in some embodiments and in response to such changes the importer 2350 may update input tables 2315.

The bottom half of this figure also illustrates the table mapping operations of the virtualization application 2310. As shown, the virtualization application's input tables 2355 store logical forwarding plane (LFP) data as the LFP data along with data in the constant and function tables (not shown) is used by the virtualization application's n Log engine 2320 in some embodiments to generate universal physical control plane (UPCP) data and/or customized physical control plane (CPCP) data. In some embodiments, the exporter 2370 sends the generated UPCP data to one or more other controller instances (e.g., a chassis controller) to generate CPCP data before pushing this data to the managed switching elements or to one or more managed switching elements that convert the UPCP data to CPCP data specific to the managed switching elements. In other embodiments, the exporter 2370 sends the generate CPCP data to one or more managed switching elements to define the forwarding behaviors of these managed switching elements.

This figure shows that the importer 2375 receives the LFP data from the control application 2305 and update input tables 2355 of the virtualization application with the LFP data. This figure further shows that the importer 2375 detects or receives changes in the PTD 2340 (e.g., LCP data changes originated from the other controller instances) in some embodiments and in response to such changes the importer 2375 may update input tables 2355.

As mentioned above, some of the logical or physical data that an importer pushes to the input tables of the control or virtualization application relates to data that is generated by other controller instances and passed to the PTD. For instance, in some embodiments, the logical data regarding logical constructs (e.g., logical ports, logical queues, etc.) that relates to multiple LDP sets might change, and the translator (e.g., translator 2380 of the controller instance) may write this change to the input tables. Another example of such logical data that is produced by another controller instance in a multi controller instance environment occurs when a user provides logical control plane data for a LDPS on a first controller instance that is not responsible for the LDPS. This change is added to the PTD of the first controller instance by the translator of the first controller instance. This change is then propagated across the PTDs of other controller instances by replication processes performed by the PTDs. The importer of a second controller instance, which is the master of the LDPS, eventually takes this change and then writes the change to the one of the application's input tables (e.g., the control application's input table). Accordingly, in such cases, the logical data that the importer writes to the input tables in some cases may originate from the PTD of another controller instance.

As mentioned above, the control application 2305 and the virtualization application 2310 are two separate applications that operate on the same machine or different machines in some embodiments. Other embodiments, however, implement these two applications as two modules of one integrated application, with the control application module 2305 generating logical data in the logical forwarding plane and the virtualization application generating physical data in the universal physical control plane or in the customized physical control plane.

Figure 24:
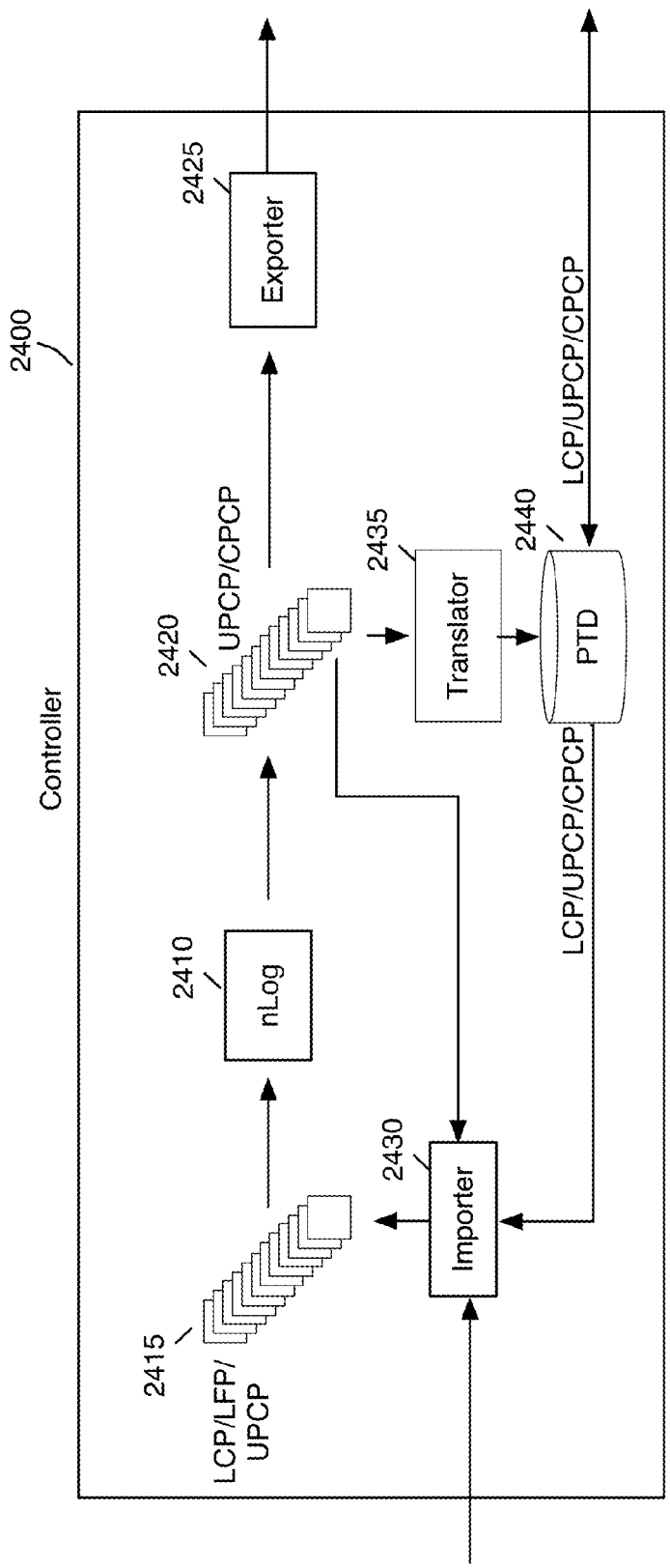
FIG. 24 illustrates an example of an integrated application.

Still other embodiments integrate the control and virtualization operations of these two applications within one integrated application, without separating these operations into two separate modules. FIG. 24 illustrates an example of such an integrated application 2400. This application 2400 uses an n Log table mapping engine 2410 to map data from an input set of tables 2415 to an output set of tables 2420, which like the above described embodiments, may include one or more tables in the input set of tables. The input set of tables in this integrated application may include LCP data that need to be mapped to LFP data, or it may include LFP data that need to be mapped to CPCP or UPCP data. The input set of tables may also include UPCP data that need to be mapped to CPCP data.

In this integrated control and virtualization application 2400, the importer 2430 gets the input data from the users or other controller instances. The importer 2430 also detects or receives the changes in the PTD 2440 that is replicated to the PTD. The exporter 2425 exports output table records to other controller instances or managed switching elements.

When sending the output table records to managed switching elements, the exporter uses a managed switching element communication interface (not shown) so that the data contained in the records are sent to a managed switching element over two channels. One channel is established using a switch control protocol (e.g., OpenFlow) for controlling the forwarding plane of the managed switching element, and the other channel is established using a configuration protocol to send configuration data.

When sending the output table records to a chassis controller, the exporter in some embodiments uses a single channel of communication to send the data contained in the records. In these embodiments, the chassis controller accepts the data through this single channel but communicates with the managed switching element over two channels. A chassis controller is described in more details further below by reference to FIG. 29.

Figure 25:
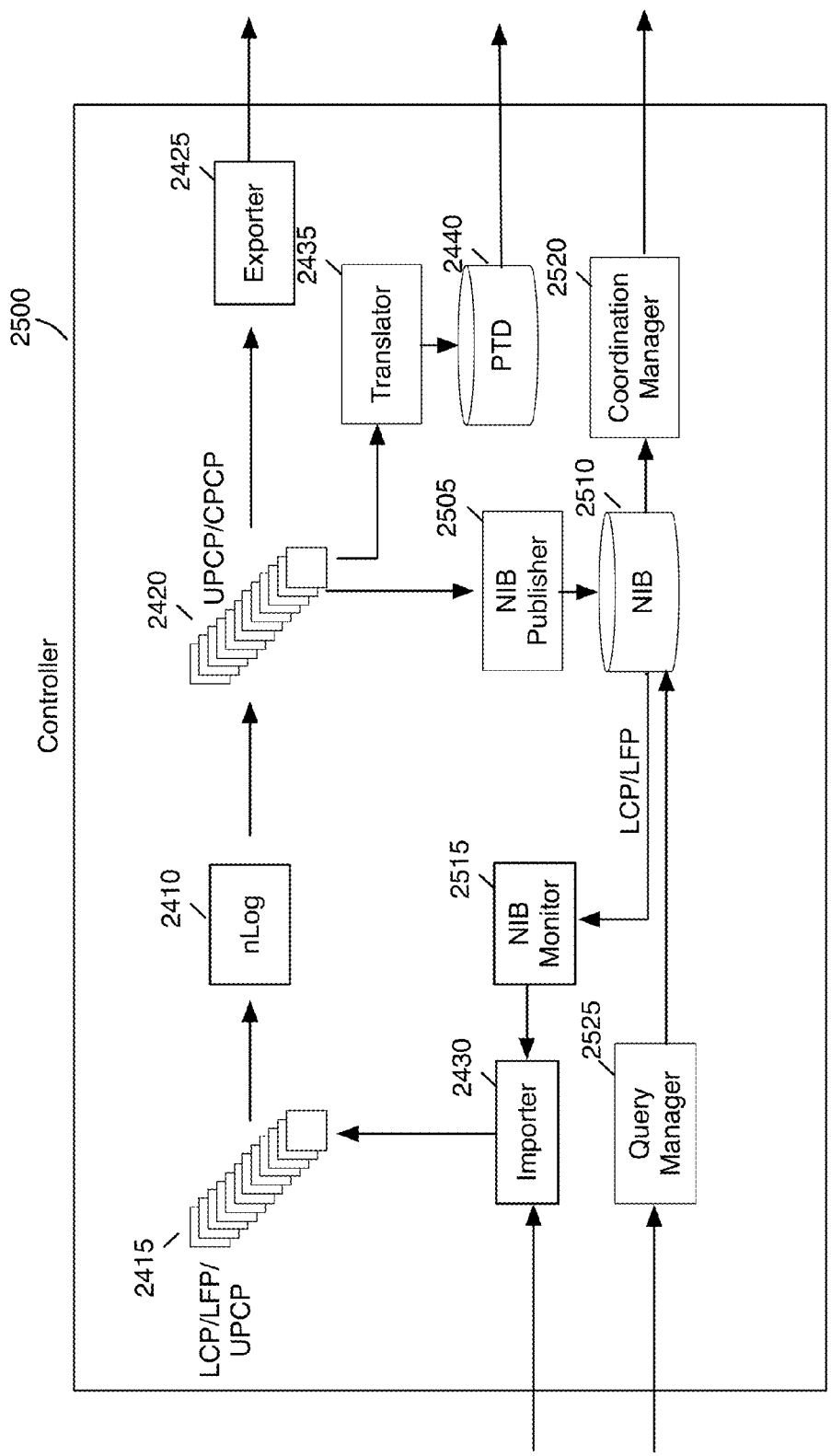
FIG. 25 illustrates another example of such an integrated application.

FIG. 25 illustrates another example of such an integrated application 2500. The integrated application 2500 uses a network information base (NIB) data structure 2510 to store some of the input and output data of the n Log table mapping engine 2410. The NIB data structure is described in detail in U.S. patent application Ser. No. 13/177,533, which is incorporated herein by reference. As described in the application Ser. No. 13/177,533, the NIB data structure stores data in the form of an object-oriented data objects. In the integrated application 2500, the output tables 2420 are the primary storage structure. The PTD 2440 and the NIB 2510 are the secondary storage structures.

The integrated application 2500 uses the n Log table mapping engine 2410 to map data from the input set of tables 2415 to the output set of tables 2420. In some embodiments, some of the data in the output set of tables 2420 is exported by the exporter 2425 to one or more other controller instances or one or managed switching elements. Such exported data include UPCP or CPCP data that would define flow behaviors of the managed switching elements. These data may be backed up in the PTD by the translator 2435 in the PTD 2440 for data resiliency.

Some of the data in the output set of tables 2420 is published to the NIB 2510 by the NIB publisher 2505. These data include configuration information of the logical switches that the users manage using the integrated application 2500. The data stored in the NIB 2510 is replicated to other NIBs of other controller instances by the coordination manager 2520.

The NIB monitor 2515 receives notifications of changes from the NIB 2510, and for some notifications (e.g., those relating to the LDP sets for which the integrated application is the master), pushes changes to the input tables 2415 via the importer 2430.

The query manager 2525 interfaces with an input translation application to receive queries regarding configuration data. As shown in this figure, the manager 2525 of some embodiments also interfaces with the NIB 2510 in order to query the NIB to provide the state information (e.g., logical port statistics) regarding the logical network elements that the user is managing. In other embodiments, however, the query manager 2525 queries the output tables 2420 to obtain the state information.

In some embodiments, the application 2500 uses secondary storage structures other than the PTD and the NIB. These structures include a persistent non-transactional database (PNTD) and a hash table. In some embodiments, these two types of secondary storage structures store different types of data, store data in different manners, and/or provide different query interfaces that handle different types of queries.

The PNTD is a persistent database that is stored on disk or other non-volatile memory. Some embodiments use this database to store data (e.g., statistics, computations, etc.) regarding one or more switching element attributes or operations. For instance, this database is used in some embodiment to store the number of packets routed through a particular port of a particular switching element. Other examples of types of data stored in the PNTD include error messages, log files, warning messages, and billing data.

The PNTD in some embodiments has a database query manager (not shown) that can process database queries, but as it is not a transactional database, this query manager cannot handle complex conditional transactional queries. In some embodiments, accesses to the PNTD are faster than accesses to the PTD but slower than accesses to the hash table.

Unlike the PNTD, the hash table is not a database that is stored on disk or other non-volatile memory. Instead, it is a storage structure that is stored in volatile system memory (e.g., RAM). It uses hashing techniques that use hashed indices to quickly identify records that are stored in the table. This structure combined with the hash table's placement in the system memory allows this table to be accessed very quickly. To facilitate this quick access, a simplified query interface is used in some embodiments. For instance, in some embodiments, the hash table has just two queries: a Put query for writing values to the table and a Get query for retrieving values from the table. Some embodiments use the hash table to store data that change quickly. Examples of such quick-changing data include network entity status, statistics, state, uptime, link arrangement, and packet handling information. Furthermore, in some embodiments, the integrated application uses the hash tables as a cache to store information that is repeatedly queried for, such as flow entries that will be written to multiple nodes. Some embodiments employ a hash structure in the NIB in order to quickly access records in the NIB. Accordingly, in some of these embodiments, the hash table is part of the NIB data structure.

The PTD and the PNTD improve the resiliency of the controller by preserving network data on hard disks. If a controller system fails, network configuration data will be preserved on disk in the PTD and log file information will be preserved on disk in the PNTD.

Figure 26:
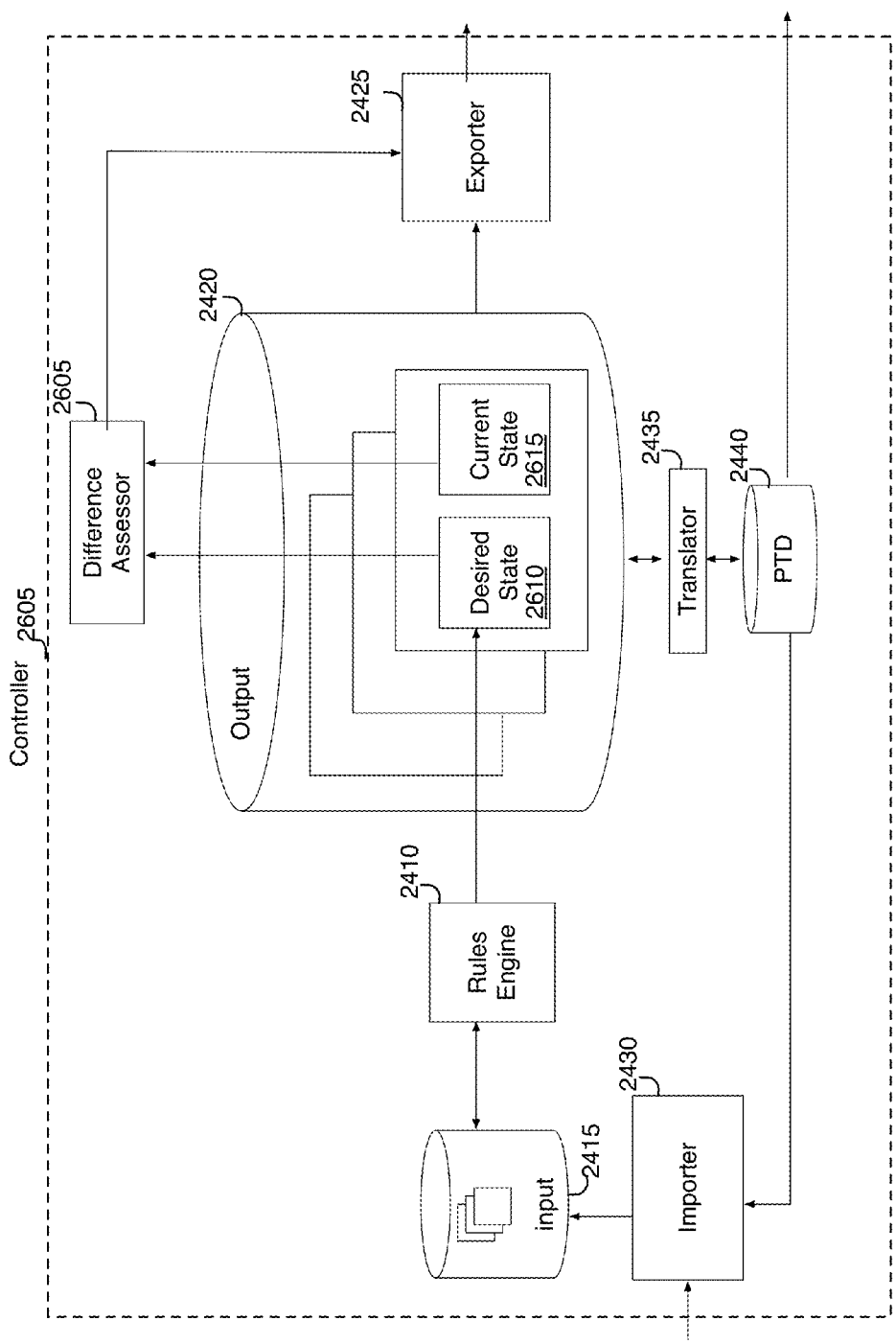
FIG. 26 illustrates additional details regarding the operation of the integrated application of some embodiments of the invention.

FIG. 26 illustrates additional details regarding the operation of the integrated application 2400 of some embodiments of the invention. As described above, the importer 2430 interfaces with the input translation application to receive input data and also interfaces with the PTD 2440 to detect or receive changes to the PTD 2440 that originated from other controller instance(s). In the examples described above, the importer 2430 may modify one or more a set of input tables 2415 when it receives input data. The rules engine 2410 then performs a series of mapping operations to map the modified input tables to the output tables 2420, which may include input tables, output tables and tables that serve as both input tables and output tables.

In some cases, the modified input tables become the output tables without being further modified by the rules engine 2410, as if the importer 2430 had directly modified the output tables 2420 in response to receiving certain input data. Such input data in some embodiments relate to some of the changes to the state and configuration of the managed switching elements. That is, these changes originate from the managed switching elements. By directly writing such data to the output tables, the importer keeps the output tables updated with the current state and configuration of the managed switching elements.

FIG. 26 conceptually illustrates that some of the output tables 2420 conceptually include two representations 2610 and 2615 of the state and configuration of the managed switching elements. The first representation 2610 in some embodiments includes data that specify the desired state and configuration of the managed switching elements, while the second representation 2615 includes data specifying the current state and configuration of the managed switching elements. The data of the first representation 2610 is the result of table mapping operations performed by the rules engine 2410. Thus, in some embodiments, the data of the first representation 2610 is universal physical control plane data or customized physical control plane data produced by the rules engine 2410 based on changes in logical forwarding data stored in the input tables 2415. On the other hand, the data of the second representation 2615 is directly modified by the importer 2430. This data is also universal physical control plane data or customized physical control data in some embodiments. The data of the first representation and the data of the second representation do not always match because, for example, a failure of a managed switching element that is reflected in the second representation may not have been reflected in the first representation yet.

As shown, the application 2400 conceptually includes a difference assessor 2605. The difference assessor 2605 detects a change in the first representation 2610 or in the second representation 2615. A change in the first representation may occur when the rules engine 2410 puts the result of its mapping operations in the output tables 2420. A change in the second representation may occur when the importer directly updates the output tables 2420 when the changes come from the managed switching element(s). Upon detecting a change in the output tables, the difference assessor 2605 in some embodiments examines both the first representation 2610 and the second representation 2615 to find the difference, if any, between these two representations.

When there is no difference between these two representations, the difference assessor 2605 takes no further action because the current state and configuration of the managed switching elements are already what they should be. However, when there is a difference, the different assessor 2605 may have the exporter 2425 export the difference (e.g., data tuples) to the managed switching elements so that the state and configuration of the managed switching elements will be the state and configuration specified by the first representation 2610. Also, the translator 2435 will translate and store the difference in the PDT 2440 so that the difference will be propagated to other controller instances.

Also, when the difference assessor detects a difference between the two representations, the difference assessor in some embodiments may call the input tables of the integrated application to initiate additional table mapping operations to reconcile the difference between the desired and current values. Alternatively, in other embodiments, the importer will end up updating the input tables based on the changes in the PTD at the same time it updates the output tables and these will trigger the n Log operations that might update the output table.

In some embodiments, the integrated application 2400 does not store the desired and current representations 2610 and 2615 of the universal or customized physical control plane data, and does not use a difference assessor 2605 to assess whether two corresponding representations are identical. Instead, the integrated application 2400 stores each set of universal or customized physical control plane data in a format that identifies differences between the desired data value and the current data value. When the difference between the desired and current values is significant, the integrated application 2400 of some embodiments may have the exporter to push a data tuple change to the managed switching elements, or may call the input tables of the integrated application to initiate additional table mapping operations to reconcile the difference between the desired and current values.

The operation of the integrated application 2400 will now be described with an example network event (i.e., a change in the network switching elements). In this example, the switching elements managed by the integrated application 2400 include a second-level managed switching element. A second-level managed switching element is a managed non-edge switching element, which, in contrast to an managed edge switching element, does not send and receive packets directly to and from the machines. A second-level managed switching element facilitates packet exchanges between non-edge managed switching elements and edge managed switching elements. A pool node and an extender, which are described in U.S. patent application Ser. No. 13/177,535, are also second-level managed switching elements. The pool node shuts down for some reason (e.g., by hardware or software failure) and the two bridges of the pool node get shut down together with the pool node.

The importer 2430 in this example then receives this update and subsequently writes information to both the input tables 2415 and the output tables 2420 (specifically, the second representation 2615). The rules engine 2410 performs mapping operations upon detecting the change in the input tables 2415 but the mapping result (i.e., the first representation 2610) in this example will not change the desired data value regarding the pool node and its bridges. That is, the desired data value would still indicate that the pool node and the two bridges should exist in the configuration of the system. The second representation 2615 would also indicate the presence of the pool node and its bridges in the configuration.

The pool node then restarts but the root bridge and the patch bridge do not come back up in this example. The pool node will let the importer know that the pool node is back up and the importer updates the input tables 2415 and the second representation 2615 of the output tables accordingly. The rules engine 2410 performs mapping operations on the modified input tables 2415 but the resulting desired data value would still not change because there was no change as to the existence of the pool node in the configuration of the system. However, the current data value in the second representation 2615 would indicate at this point that the pool node has come back up but not the bridges.

The difference assessor 2605 detects the changes in the first and second representations and compares the desired and current data values regarding the pool node and its bridges. The difference assessor 2605 determines the difference, which is the existence of the two bridges in the pool node. The difference assessor 2605 notifies the exporter 2425 of this difference. The exporter 2425 exports this difference to the pool node so that the pool node creates the root and patch bridges in it. The translator 2435 will also put this difference in the PTD 2440 and the coordination manager subsequently propagates this difference to one or more other controller instances.

III. Universal Forwarding State

Traditionally, in routing-protocol based, distributed networking computing, the computation of forwarding state (e.g., computation of physical control plane data) by a control plane of a switching element needs to be quick enough to meet the convergence requirements of the forwarding plane that is locally attached to the switching element. That is, the control plane needs to compute the control logic of the switching element quickly so that the forwarding plane can update flow entries quickly to correctly forward data packets entering the switching element according to the flow entries.

When centralizing the control plane (i.e., when the control plane data is managed by a centralized network controller), the efficiency of the computation of the forwarding state becomes more critical. In particular, moving the computation from many switching elements to one or more central controller instances may cause the central controller cluster to become a bottleneck to scalability because the central controller's computational resources (e.g., memory, CPU cycles, etc.) may not be sufficient to rapidly handle the computations, despite the central controller instances typically having more computational resources than traditional forwarding elements (such as routers, physical switches, virtual switches, etc.). Also, while these central computational resources can be scaled, economical deployment factors may limit the amount of computational resources for the central controller instances (e.g., the central controller instances have a limited number of servers and CPUs for economic reason). This makes an efficient implementation of the state computation a critical factor in building a centralized control plane that can scale to large-scale networks while remaining practically deployable.

In network virtualization, the opportunities for optimization are especially large. The computation of the forwarding state for a single LDPS involves computing the state for all involved physical switching elements over which the LDPS spans (for all switching elements that implement the LDPS), including individual switching elements that host the smallest portions of the LDPS (such as a single logical port). In case of a large LDPS (e.g., one with hundreds or even thousands of ports), the degree of the span can be significant. However, at the high-level, the state across the elements still realizes only a single forwarding behavior, as it is still fundamentally only about a single LDPS.

Nevertheless, often the forwarding state must be computed for each switching element because the forwarding state entries (i.e., flow entries) include components local or specific to the switching element (e.g., specific ports of the switching element). This per-element computation requirement may result in computational overhead that makes the computational requirements grow quickly enough to render the centralized computation of the forwarding state significantly more difficult. In particular, irrespective of the logical ports present in a switching element, one can assume that the forwarding state for a single switching element is of complexity $O(N)$, where N is the number of logical ports the particular LDPS has in total. As the size of the LDPS grows, N increases (i.e., the load introduced by a single switching element increases), as does the number of switching elements, and the size of the state that has to be recomputed grows. Together, this implies the resulting state complexity will be approximately $O(N^2)$, which is clearly undesirable from an efficiency point of view as it may require a large amount of computational resources. As N grows large enough, this may result in a computational load that becomes very difficult to meet by the centralized controller instances.

In some embodiments, two factors exist that require per-element computation of forwarding state for a LDPS. First, the forwarding state itself may be uniquely specific to a switching element. For instance, a particular switching element may have completely different forwarding hardware from any other switching element in the network. Second, the forwarding state may be artificially bound to the switching element. For instance, the forwarding state may have to include identifiers that are local to the switching element (e.g., consider a forwarding entry that has to refer to a port number which is assigned by the switching element itself). Similarly, the forwarding state may be uniquely specific to a switching element if the state includes dependencies to network state that are location-specific. For instance, a forwarding entry could refer to a multiprotocol label switching (MPLS) label that is meaningful only at the link that is local to the switching element.

Some embodiments of the invention provide a network control system that removes these two sources of dependencies in order to make the computation of the forwarding state as efficient as possible at the central controller instances. The network control system of such embodiments allows the forwarding state for a LDPS to be computed only once and then merely disseminated to the switching element layer. This decouples the physical instantiation of the forwarding state from its specification. Once the forwarding state becomes completely decoupled from the physical instantiation, the forwarding state becomes universal, as it can be applied at any switching element, regardless of the switching element's type and location in the network.

Thus, the network control system of some embodiments provides universal physical control plane data that enables the control system of some embodiments to scale even when there is a large number of managed switching elements that implement a LDPS. Universal physical control plane data in some embodiments abstracts common characteristics of different managed switching elements that implement a LDPS. More specifically, the universal physical control plane data is an abstraction that is used to express physical control plane data without considering differences in the managed switching elements and/or location-specific information of the managed switching elements.

As mentioned above, the control system's virtualization application of some embodiments converts the logical forwarding plane data for the LDPS to the universal physical control plane data and pushes down the universal physical control plane data to the chassis controller of the managed switching elements (from a logical controller through one or more physical controllers, in some embodiments). Each chassis controller of a managed switching element converts the universal physical control plane data into the physical control plane data that is specific to the managed switching element. Thus, the computation to generate the physical control plane data specific to each managed switching element is offloaded to the managed switching element's chassis controller. By offloading the computation to the managed switching element layer, the control system of some embodiments is able to scale in order to handle a large number of managed switching elements that implement a LDPS.

In some embodiments, the universal physical control plane data that is pushed into the chassis controller may be different for different groups of managed switching elements. For instance, the universal physical control plane data that is pushed for a first group of software switching elements (e.g., OVSs) that run a first version of software may be different than the universal physical control plane data that is pushed for a second group of software switching elements that run a second version of the software. This is because, for example, the formats of the universal physical control plane data that the different versions of software can handle may be different.

In the following description of the network controllers, the managed forwarding state is assumed to include only flow entries. While there may be additional states (other than the forwarding states) managed by other out-of-band means, these additional states play less critical roles in the actual establishing of the packet forwarding function and tend to be more auxiliary. In addition, the realization of a LDPS itself requires use of virtual forwarding primitives: effectively, the physical datapath has to be sliced over the switching elements.

Even when the flow entries are made universal by following these principles, a small portion of flow entries may remain that still require per-switching element computation in some embodiments. The goal of these principles is to make this portion sufficiently small so that the computation of forwarding states can easily scale with larger deployments.

Similarly, the following description does not imply that the forwarding elements will always (or even should always) follow the principles mentioned below, but instead merely suggests that the pushed forwarding entries (i.e., the entries pushed from a central controller to the switching element layer) follow these principles. Once the universal entries are pushed to the physical switching element layer, the chassis controller of the switching elements perform the necessary translations to the specifics of the switching elements. Again, when some switching elements are not able to handle universal flow entries at all, the central controller can still prepare the flow entries completely for the switching elements (i.e., can customize the flow entries for the switching elements) but with the cost of reduced scalability. Hence, the universalization does not need to be complete throughout the flow entries, nor throughout all the switching elements. The goal of universalization is to make the flow entries pervasive enough to allow for scaling.

Having stated these considerations, several features (principles) of the universal-forwarding network control system of some embodiments will now be described. These features include (1) making the matching entries independent of the local state of the switching elements, (2) making actions independent of the local state of the switching elements, (3) reducing the burden of disseminating flow entries from the central controller(s) to the switching elements, and (4) simplifying the translation of universal state to switching element specific forwarding state by categorizing the universal flow entries, accounting for switching element limitations when computing flow entries, and including metadata in the universal flow entries.

A. Header Matching

All existing packet header matching expressions are usable in the universalization of some embodiments because, by definition, header matching expressions do not contain any location-specific information and only refer to a packet, which does not change for any specific switching element that receives the packet. However, when packets contain identifiers and labels that are specific to a receiving network, the universalization of the flow entries may not be applicable. In such case, use of the local identifiers and labels has to be resolved at a higher level, if such use becomes a scalability issue.

Any scratchpad register matching expression is usable in the universalization as long as the register is guaranteed to exist at any switching element or the switching element can simulate the register. The hardware limitations for the universalization will be discussed further below.

When matching to an ingress port, the central controller of some embodiments uses a location independent identifier instead of a local port number of any sort to universalize the forwarding state. For instance, for virtual interface (VIF) and physical network interface card (e.g., NIC) attachments (e.g., VLAN attachments), a globally unique identifier (e.g., universally unique identifier (UUID)) with possible VLAN attachment information should serve as the identifier to use in the universal forwarding state instead of a port number, which is switch-specific. Also, for encapsulated traffic (i.e., tunneled traffic, which are data packets routed according to the information in their outer headers), the central controller should be able to perform matching over the outer headers' source IP address as well as over the tunnel type. Matching over the tunnel type helps minimize the number of flow entries because a flow entry is not required per traffic source. For instance, if a central controller writes a single flow entry to receive from each source of type X, it would result in (X*Y) extra flow entries, assuming there are Y switching elements for which to write such a flow entry.

B. Actions

Any packet-modifying flow actions are universal in some embodiments. However, operations that involve ports require special consideration. Also, actions for routing packets to a physical port and a tunnel should not refer to any state that may be specific to the switching element. This has two implications.

First, any identifier that refers to an existing state has to be globally unique. A port number that is local to a switching element is an example of an identifier that refers to an existing state but is not globally unique. There are several different ways for an identifier to be deemed globally unique. For instance, an identifier is globally unique when the identifier guarantees a statistical uniqueness. Alternatively, an identifier is globally unique when it includes a network locator (e.g., an IP address). However, an identifier that includes a network locator may not be globally unique when there are two different kinds of tunnels (e.g., Internet Protocol Security (IPsec) and Generic Routing Encapsulation (GRE)) towards the same destination. That is, using an IP address alone as a tunnel identifier is not enough to make the identifier globally unique because an identical IP address may be used for both kinds of tunnels.

Second, the flow entry should contain a complete specification of the tunnel to be created when the state does not exist (e.g., when a tunnel should be explicitly created before any flow entry sends a packet through the tunnel). At a minimum, the flow entry should include the tunnel type and a destination network locator. The flow entry may also additionally include information about any security transformations (e.g., authentication and encryption, etc.) done for the packet as well as information about the layering relationships (e.g., the OSI layers) of various tunnels. If the flow entry is not self-contained (i.e., if the flow entry does not contain the complete specification of the tunnel to be created), some embodiments create the tunnel (i.e., a state) for each switching element by other means, such as configuration protocols of Open vSwitch (OVS).

It is to be noted that physical ports are an exception to the universalization principles. While a forwarding entry that forwards a packet to a local physical port may use a physical interface identifier (e.g., "eth0") and a VLAN identifier in the action, forwarding a packet to a local physical port still involves a state that is specific to a switching element. A physical interface identifier may be specific to a switching element because it is not guaranteed that most of the switching elements share an identical interface name for the interface to use for a given LDPS. A physical interface identifier may not be specific to a switching element when the network interfaces are named in such a way that the names remain the same across switching elements. For instance, in some embodiments, the control system exposes only a single bonded network interface to the flow entries so that the flow entries would never get exposed to any of the underlying differences in bonding details.

Finally, there are actions that actually result in modifying local state at a switching element for each packet. Traditional MAC learning is an example of modifying local state at a switching element for each packet. The discussion above regarding having the matching entries and actions be independent of a local state does not apply to a local state established by the packets as long as the entries and actions operating on that packet's established state can be identical across switching elements. For instance, in some embodiments, the following universal learning action provides the necessary functionality for the controller to implement the learning in a location-independent manner. This action's input parameters include in some embodiments (1) learning broadcast domain identifier (e.g., 32-bit VLAN), (2) traffic source identifier (to be learned), (3) a result to return for indicating flooding (e.g., a 32-bit number), and (4) a scratchpad register for writing the result (e.g., either a source identifier or a flooding indicator). The action's output parameters in some embodiments include a scratchpad register that contains the learning decision. In some embodiments, the learning state would be updated for any subsequent packets to be forwarded.

C. Minimizing the Dissemination Cost

Universalization of the flow entries minimizes the computational overhead at the central controller instances by removing the redundancy in computation of flow entries. However, there is still a non-linear amount of non-universal flow entries to be disseminated from the central location to the switching element layer. The universal-forwarding network control system of some embodiments provides two solutions to alleviate the burden of disseminating such flow entries to the switching element layer.

First, the control system reduces the transmission cost of the flow entries. In particular, the system of some embodiments optimizes on-wire encoding and representation of the flow entries to exploit any remaining redundancy that the universalization did not remove. For instance, the flow state is likely to contain encapsulation entries that are seemingly similar: if sending to logical port X1, send to IP1 using tunnel configuration C1, and then a number of similar entries for (X2, IP2, C2), (X3, IP3, C3) and so on. Similarly, when flow entries are about packet replication, the flow entries contain a significant level of repetition in the actions. That is, these actions could be a long sequence of a small number of actions repeated with minor changes. Removing such redundancy calls for special flow entries that can capture the repetitive nature of the flow state. For instance, a base "flow template" can be defined once and then updated with the parameter values that are changing. Alternatively, a standard data compression technique can be used to compress the flow entries.

Second, to alleviate the burden of disseminating flow entries to the switching element layer, the control system of some embodiments offloads the transmission of the flow entries from controllers as much as possible. To implement this solution, the switching elements should provide a failure tolerant mechanism for disseminating the universal flow state updates among the switching elements. In practice, such implementation requires building a reliable publish/subscribe infrastructure (e.g., multicast infrastructure) with the switching elements. In this manner, the central controllers can take advantage of the switching elements' ability to disseminate any updates timely and reliably among themselves and with little help from the central controllers.

D. Translating Universal to Element-Specific Forwarding State

In some embodiments, the universal-forwarding control system categorizes the universal flow entries into different types based on type information. That is, the type information is used to precisely categorize every flow entry according to the entry's high-level semantic purpose. Without the type information, the chassis controller of the switching element may have difficulties in performing translation of the universal flow entries into flow entries specific to the local forwarding plane.

However, even with type information, the universal flow entries may not be translated for every switching element because of certain hardware limitations. In particular, the forwarding hardware (e.g., ASICs) tend to come with significant limitations which the local control plane CPU running next to the ASIC(s) may not be able to overcome. Therefore, the central controller that computes the universal flow entries in some embodiments accounts for these hardware limitations when computing the flow entries. Considering the hardware limitations, the central controller of some embodiments disables some high-level features provided by the LDP sets or constrains the implementation of those high-level features by some other means, such as placing an upper limit on them. However, computation by factoring in the hardware limitations of switching elements does not mean the computation would become specific to a switching element. Rather, the central controller can still remove redundancy in computation across the switching elements because the hardware limitations may be common to multiple switching elements.

In some embodiments, the network control system has the universal flow entries include additional metadata that is not used by the most switching elements, so that the translation of such universal flow entries remains feasible at as many switching elements as possible. The trade-off between ballooning the state and savings computational resources in removing redundancy in computation is something to consider carefully for each flow entry type.

Figure 27:
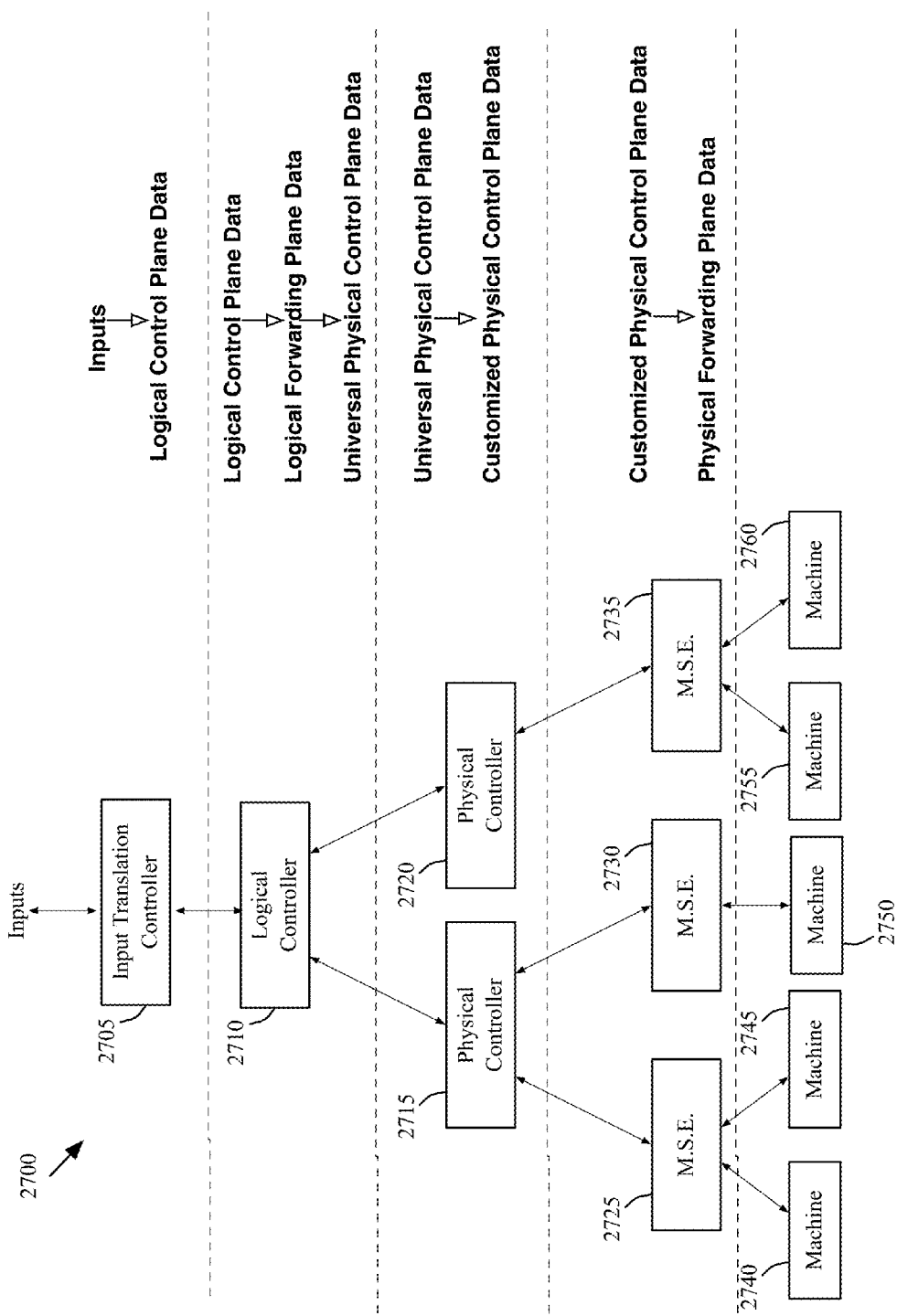
FIG. 27 conceptually illustrates an example architecture of a network control system.

FIG. 27 conceptually illustrates an example architecture of a network control system 2700. In particular, this figure illustrates generation of customized physical control plane data from inputs by different elements of the network control system. As shown, the network control system 2700 of some embodiments includes an input translation controller 2705, a logical controller 2710, physical controllers 2715 and 2720, and three managed switching elements 2725-2735. This figure also illustrates five machines 2740-2760 that are connected to the managed switching elements 2725-2735 to exchange data between them. One of the ordinary skill in the art will recognize that many other different combinations of the controllers, switching elements, and machines are possible for the network control system 2700.

In some embodiments, each of the controllers in a network control system has a full stack of different modules and interfaces described above by reference to FIG. 8. However, each controller does not have to use all the modules and interfaces in order to perform the functionalities given for the controller. Alternatively, in some embodiments, a controller in the system has only those modules and interfaces that are necessary to perform the functionalities given for the controller. For instance, the logical controller 2710 which is a master of a LDPS does not include an input module (i.e., an input translation application) but does include the control module and the virtualization module (i.e., a control application or a virtualization application, or an integrated application) to generate universal physical control plane data from the input logical control plane data.

Moreover, different combinations of different controllers may be running in a same machine. For instance, the input translation controller 2705 and the logical controller 2710 may run in the same computing device. Also, one controller may function differently for different LDP sets. For instance, a single controller may be a master of a first LDPS and a master of a managed switching element that implements a second LDPS.

The input translation controller 2705 includes an input translation application (such as the input translation application described above by reference to FIG. 12) that generates logical control plane data from the inputs received from the user that specify a particular LDPS. The input translation controller 2705 identifies, from the configuration data for the system 2705, the master of the LDPS. In this example, the master of the LDPS is the logical controller 2710. In some embodiments, more than one controller can be masters of the same LDPS. Also, one logical controller can be the master of more than one LDP sets.

The logical controller 2710 is responsible for the particular LDPS. The logical controller 2710 thus generates the universal physical control plane data from the logical control plane data received from the input translation controller. Specifically, the control module (not shown) of the logical controller 2710 generates the logical forwarding plane data from the received logical control plane data and the virtualization module (not shown) of the logical controller 2710 generates the universal physical control plane data from the logical forwarding data.

The logical controller 2710 identifies physical controllers that are masters of the managed switching elements that implement the LDPS. In this example, the logical controller 2710 identifies the physical controllers 2715 and 2720 because the managed switching elements 2725-2735 are configured to implement the LDPS in this example. The logical controller 2710 sends the generated universal physical control plane data to the physical controllers 2715 and 2720.

Each physical controllers 2715 and 2720 can be a master of one or more managed switching elements. In this example, the physical controller 2715 is the master of two managed switching elements 2725 and 2730 and the physical controller 2720 is the master of the managed switching element 2735. As the master of a set of managed switching elements, the physical controllers of some embodiments generate, from the received universal physical control plane data, customized physical control plane data specific for each of the managed switching elements. Therefore, in this example, the physical controller 2715 generates the physical control plane data customized for each of the managed switching elements 2725 and 2730. The physical controller 2320 generates physical control plane data customized for the managed switching element 2735. The physical controllers send the customized physical control data to the managed switching elements of which the controllers are masters. In some embodiments, multiple physical controllers can be the masters of the same managed switching elements.

In addition to sending customized control plane data, the physical controllers of some embodiments receive data from the managed switching elements. For instance, a physical controller receives configuration information (e.g., identifiers of VIFs of a managed switching element) of the managed switching elements. The physical controller maintains the configuration information and also sends the information up to the logical controllers so that the logical controllers have the configuration information of the managed switching elements that implement the LDP sets of which the logical controllers are masters.

Each of the managed switching elements 2725-2735 generates physical forwarding plane data from the customized physical control plane data that the managed switching element received. As mentioned above, the physical forwarding plane data defines the forwarding behavior of the managed switching element. In other words, the managed switching element populates its forwarding table using the customized physical control plane data. The managed switching elements 2725-2735 forward data among the machines 2740-2760 according to the forwarding tables.

Figure 28:
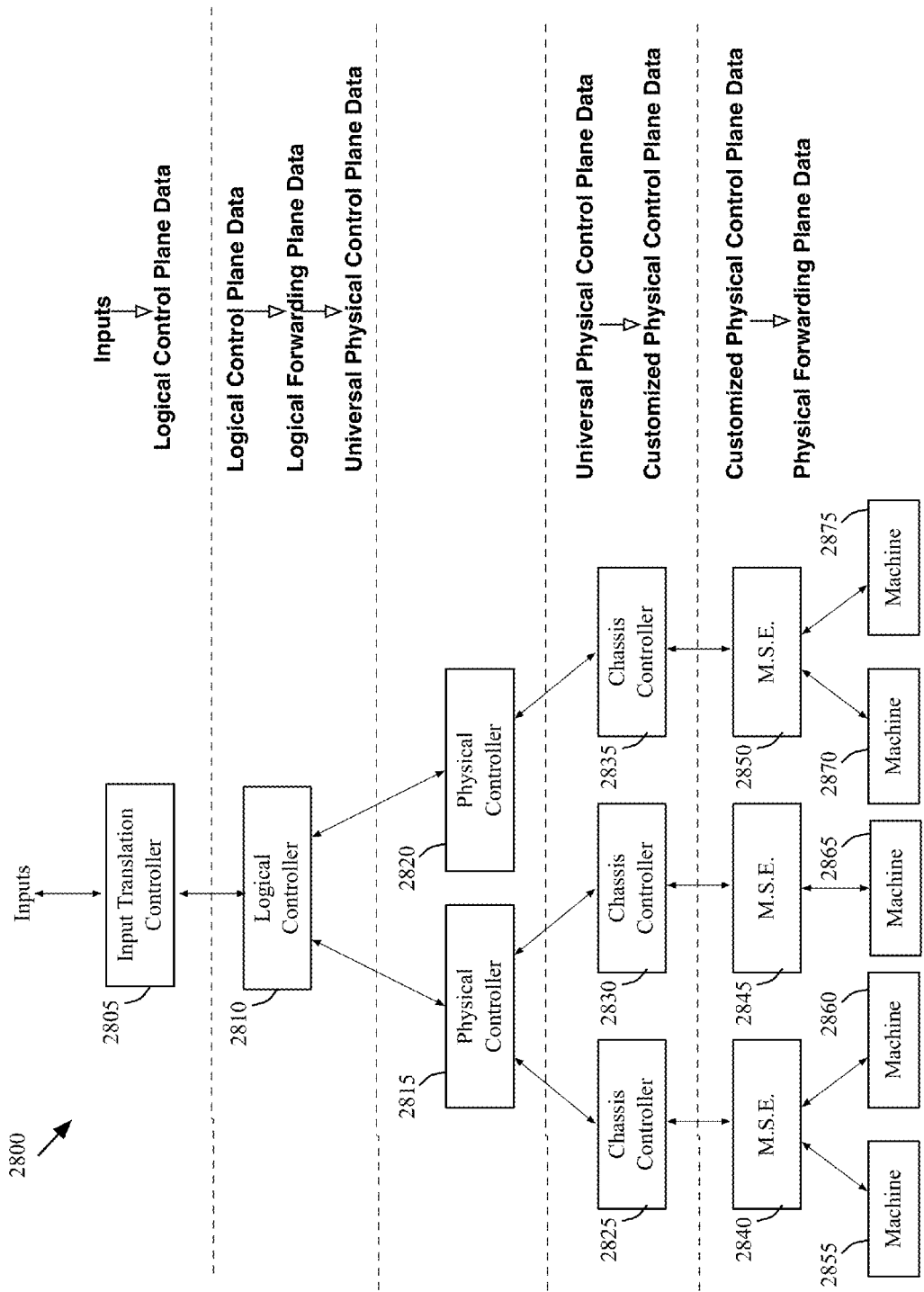
FIG. 28 conceptually illustrates an example architecture of a network control system.

FIG. 28 conceptually illustrates an example architecture of a network control system 2800. Like FIG. 27, this figure illustrates generation of customized physical control plane data from inputs by different elements of the network control system. In contrast to the network control system 2700 in FIG. 27, the network control system 2800 includes chassis controllers 2825-2835. As shown, the network control system 2800 of some embodiments includes an input translation controller 2805, a logical controller 2710, physical controllers 2815 and 2820, the chassis controllers 2825-2835, and three managed switching elements 2840-2850. This figure also illustrates five machines 2855-2875 that are connected to the managed switching elements 2840-2850 to exchange data between them. One of the ordinary skill in the art will recognize that many other different combinations of the controllers, switching elements, and machines are possible for the network control system 2800.

The input translation controller 2805 is similar to the input translation controller 2705 in that the input translation controller 2805 includes an input translation application that generates logical control plane data from the inputs received from the user that specify a particular LDPS. The input translation controller 2805 identifies from the configuration data for the system 2805 the master of the LDPS. In this example, the master of the LDPS is the logical controller 2810.

The logical controller 2810 is similar to the logical controller 2810 in that the logical controller 2810 generates the universal physical control plane data from the logical control plane data received from the input translation controller 2805. The logical controller 2810 identifies physical controllers that are masters of the managed switching elements that implement the LDPS. In this example, the logical controller 2810 identifies the physical controllers 2815 and 2820 because the managed switching elements 2840-2850 are configured to implement the LDPS in this example. The logical controller 2810 sends the generated universal physical control plane data to the physical controllers 2815 and 2820.

Like the physical controllers 2715 and 2720, each physical controllers 2815 and 2820 can be a master of one or more managed switching elements. In this example, the physical controller 2815 is the master of two managed switching elements 2840 and 2845 and the physical controller 2830 is the master of the managed switching element 2850. However, the physical controllers 2815 and 2820 do not generate customized physical control plane data for the managed switching elements 2840-2850. As a master of managed switching elements, the physical controller sends the universal physical control plane data to the chassis controller that is responsible for each managed switching element of which the physical controller is the master. That is, the physical controller of some embodiments identifies the chassis controllers that interface the managed switching elements of which the physical controller is master. In some embodiments, the physical controller identifies those chassis controllers by determining whether the chassis controllers are subscribing to a channel of the physical controller.

A chassis controller of some embodiments has a one-to-one relationship with a managed switching element. The chassis controller receives universal control plane data from the physical controller that is the master of the managed switching element and generates customized control plane data specific for the managed switching element. An example architecture of a chassis controller will be described further below by reference to FIG. 29. The chassis controller in some embodiments runs in the same machine in which the managed switching element that the chassis controller manages runs while in other embodiments the chassis controller and the managed switching element run in different machines. In this example, the chassis controller 2825 and the managed switching element 2840 run in the same computing device.

Like the managed switching elements 2725-2735, each of the managed switching elements 2840-2850 generates physical forwarding plane data from the customized physical control plane data that the managed switching element received. The managed switching elements 2840-2850 populate their respective forwarding tables using the customized physical control plane data. The managed switching elements 2840-2850 forward data among the machines 2855-2875 according to the flow tables.

As mentioned above, a managed switching element may implement more than one LDPS in some cases. In such cases, the physical controller that is the master of such a managed switching element receives universal control plane data for each of the LDP sets. Thus, a physical controller in the network control system 2800 may be functioning as an aggregation point for relaying universal control plane data for the different LDP sets for a particular managed switching element that implements the LDP sets to the chassis controllers.

Even though the chassis controllers illustrated in FIG. 28 are a level above the managed switching elements, the chassis controllers typically operate at the same level as the managed switching elements do because the chassis controllers of some embodiments within the managed switching elements or adjacent to the managed switching elements.

In some embodiments, a network control system can have a hybrid of the network control systems 2700 and 2800. That is, in this hybrid network control system, some of the physical controllers generate customized physical control plane data for some of the managed switching elements and some of the physical controllers do not generate customized physical control plane data for some of the managed switching elements. For the latter managed switching elements, the hybrid system has chassis controllers to generate the customized physical control plane data.

Figure 29:
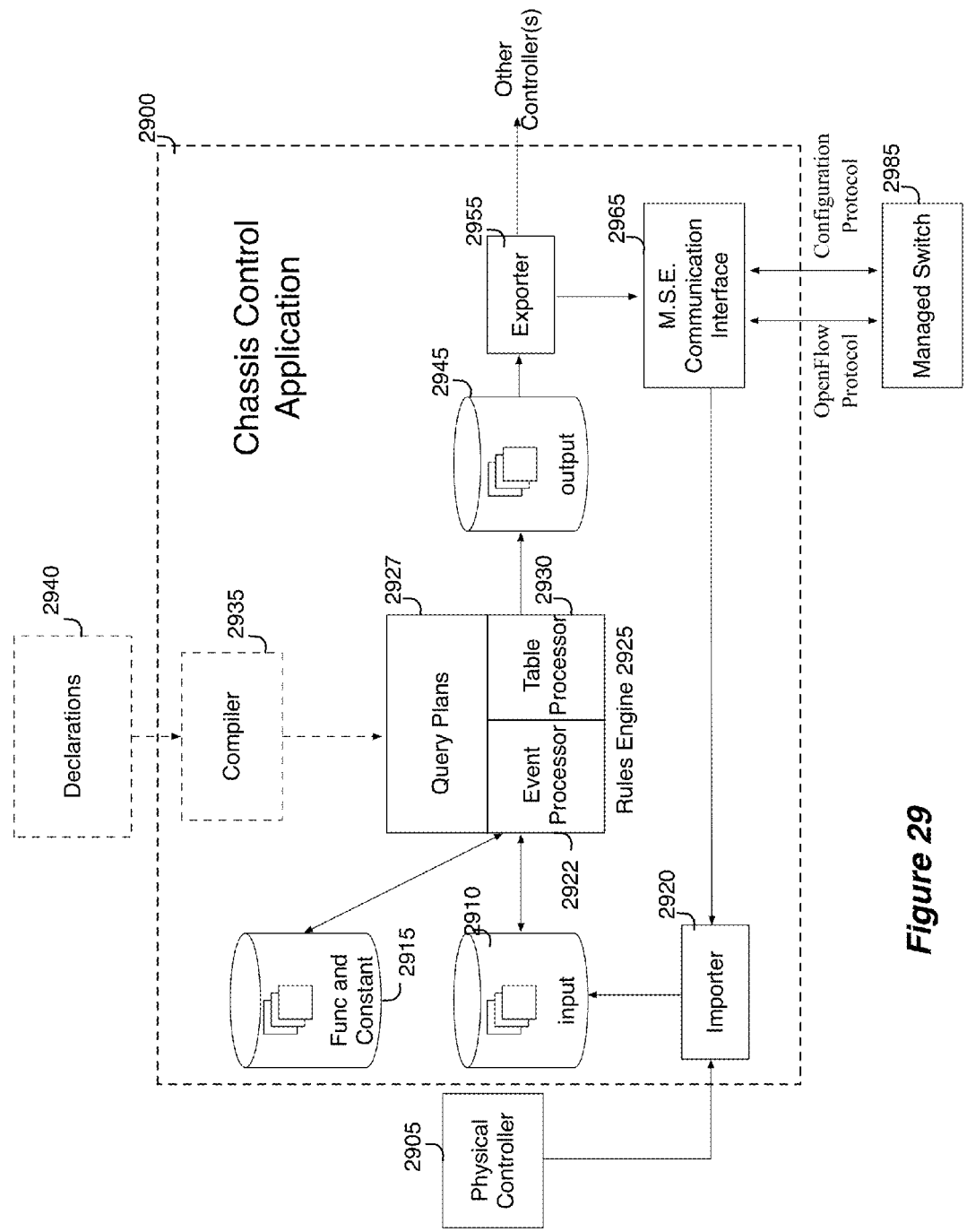
FIG. 29 illustrates an example architecture for a chassis control application.

As mentioned above, a chassis controller of some embodiments is a controller for managing a single managed switching element. A chassis controller of some embodiments does not have a full stack of different modules and interfaces described above by reference to FIG. 8. One of the module that a chassis controller does have is a chassis control application that generates customized physical control plane data from universal control plane data it receives from one or more physical controllers. FIG. 29 illustrates an example architecture for a chassis control application 2900. This application 2900 uses an n Log table mapping engine to map input tables that contain input data tuples that represent universal control plane data to data tuples that represent the logical forwarding plane data. This application 2900 manages the managed switching element 2985 in this example by exchanging data with the managed switching element 2985. In some embodiments, the application 2900 (i.e., the chassis controller) runs in the same machine in which the managed switching element 2985 is running.

As shown in FIG. 29, the chassis control application 2900 includes a set of rule-engine input tables 2910, a set of function and constant tables 2915, an importer 2920, a rules engine 2925, a set of rule-engine output tables 2945, an exporter 2955, a managed switching element communication interface 2965, and a compiler 2935. This figure also illustrates a physical controller 2905 and a managed switching element 2985.

The compiler 2935 is similar to the compilers 1435 in FIG. 14. In some embodiments, the rule-engine (RE) input tables 2910 include tables with universal physical data and/or switching configurations (e.g., access control list configurations, private virtual network configurations, port security configurations, etc.) that the physical controller 2905 that is master of the managed switching element 2985, sent to the chassis control application 2900. The input tables 2910 also include tables that contain physical data (i.e., non-logical data) from the managed switching element 2985. In some embodiments, such physical data includes data regarding the managed switching element 2985 (e.g., customized physical control plane data, physical forwarding data) and other data regarding configuration of the managed switching element 2985.

The input tables 2910 are partially populated by the universal physical control plane data provided by the physical controller 2905. The physical controller 2905 of some embodiments receives the universal physical control plane data from one or more logical controllers (not shown).

In addition to the input tables 2910, the virtualization application 2900 includes other miscellaneous tables 2915 that the rules engine 2925 uses to gather inputs for its table mapping operations. These tables 2915 include constant tables that store defined values for constants that the rules engine 2925 needs to perform its table mapping operations.

When the rules engine 2925 references constants, the corresponding value defined for the constants are actually retrieved and used. In addition, the values defined for constants in the constant table 2915 may be modified and/or updated. In this manner, the constant tables 2915 provide the ability to modify the value defined for constants that the rules engine 2925 references without the need to rewrite or recompile code that specifies the operation of the rules engine 2925. The tables 2915 further include function tables that store functions that the rules engine 2925 needs to use to calculate values needed to populate the output tables 2945.

The rules engine 2925 performs table mapping operations that specify one manner for implementing the LDP sets within the managed switching element 2985. Whenever one of the RE input tables is modified, the rules engine performs a set of table mapping operations that may result in the modification of one or more data tuples in one or more RE output tables.

As shown in FIG. 29, the rules engine 2925 includes an event processor 2922, several query plans 2927, and a table processor 2930. In some embodiments, each query plan is a set of join operations that are to be performed upon the occurrence of a modification to one of the RE input table. Such a modification is referred to below as an input table event. Each query plan is generated by the compiler 2935 from one declaratory rule in the set of declarations 2940. In some embodiments, more than one query plan is generated from one declaratory rule as described above. In some embodiments, the query plans are defined by using the n Log declaratory language.

The event processor 2922 of the rules engine 2925 detects the occurrence of each input table event. The event processor of different embodiments detects the occurrence of an input table event differently. In some embodiments, the event processor registers for callbacks with the input tables for notification of changes to the records of the input tables. In such embodiments, the event processor 2922 detects an input table event when it receives notification from an input table that one of its records has changed.

In response to a detected input table event, the event processor 2922 (1) selects the appropriate query plan for the detected table event, and (2) directs the table processor 2930 to execute the query plan. To execute the query plan, the table processor 2930 in some embodiments performs the join operations specified by the query plan to produce one or more records that represent one or more sets of data values from one or more input and miscellaneous tables 2910 and 2915. The table processor 2930 of some embodiments then (1) performs a select operation to select a subset of the data values from the record(s) produced by the join operations, and (2) writes the selected subset of data values in one or more output tables 2945.

In some embodiments, the RE output tables 2945 store both logical and physical network element data attributes. The tables 2945 are called RE output tables as they store the output of the table mapping operations of the rules engine 2925. In some embodiments, the RE output tables can be grouped in several different categories. For instance, in some embodiments, these tables can be RE input tables and/or chassis-controller-application (CCA) output tables. A table is an RE input table when a change in the table causes the rules engine to detect an input event that requires the execution of a query plan. A RE output table 2945 can also be an RE input table 2910 that generates an event that causes the rules engine to perform another query plan after it is modified by the rules engine. Such an event is referred to as an internal input event, and it is to be contrasted with an external input event, which is an event that is caused by an RE input table modification made by the control application 2905 via the importer 2920. A table is a CCA output table when a change in the table causes the exporter 2955 to export a change to the managed switching elements or other controller instances.

The exporter 2955 detects changes to the CCA output tables of the RE output tables 2945. The exporter of different embodiments detects the occurrence of a CCA output table event differently. In some embodiments, the exporter registers for callbacks with the CCA output tables for notification of changes to the records of the CCA output tables. In such embodiments, the exporter 2955 detects an output table event when it receives notification from a CCA output table that one of its records has changed.

In response to a detected output table event, the exporter 2955 takes each modified data tuple in the modified output tables and propagates this modified data tuple to one or more of other controller instances (e.g., physical controller) or to the managed switching element 2985. The exporter 2955 uses an inter-instance communication interface (not shown) to send the modified data tuples to the other controller instances. This inter-instance communication interface is similar to inter-instance communication interface described above in that the inter-instance communication interface 1670 establishes communication channels (e.g., an RPC channel) with other controller instances.

The exporter 2955 of some embodiments uses the managed switching element communication interface 2965 to send the modified data tuples to the managed switching element 2985. The managed switching element communication interface of some embodiments establishes two channels of communication. The managed switching element communication interface establishes a first of the two channels using a switching control protocol. One example of a switching control protocol is the OpenFlow protocol. The Openflow protocol, in some embodiments, is a communication protocol for controlling the forwarding plane (e.g., forwarding tables) of a switching element. For instance, the Openflow protocol provides commands for adding flow entries to, removing flow entries from, and modifying flow entries in the managed switching element 2985.

The managed switching element communication interface establishes a second of the two channels using a configuration protocol to send configuration information. In some embodiments, configuration information includes information for configuring the managed switching element 2985, such as information for configuring ingress ports, egress ports, QoS configurations for ports, etc.

The managed switching element communication interface 2965 receives updates in the managed switching element 2985 from the managed switching element 2985 over the two channels. The managed switching element 2985 of some embodiments sends updates to the chassis control application when there are changes with the flow entries or the configuration of the managed switching element 2985 not initiated by the chassis control application 2900. Examples of such changes include dropping of a machine that was connected to a port of the managed switching element 2985, a VM migration to the managed switching element 2985, etc. The managed switching element communication interface 2965 sends the updates to the importer 2920, which will modify one or more input tables 2910. When there is output produced by the rules engine 2925 from these updates, the exporter 2955 will send this output to the physical controller 2905.

Figure 30:
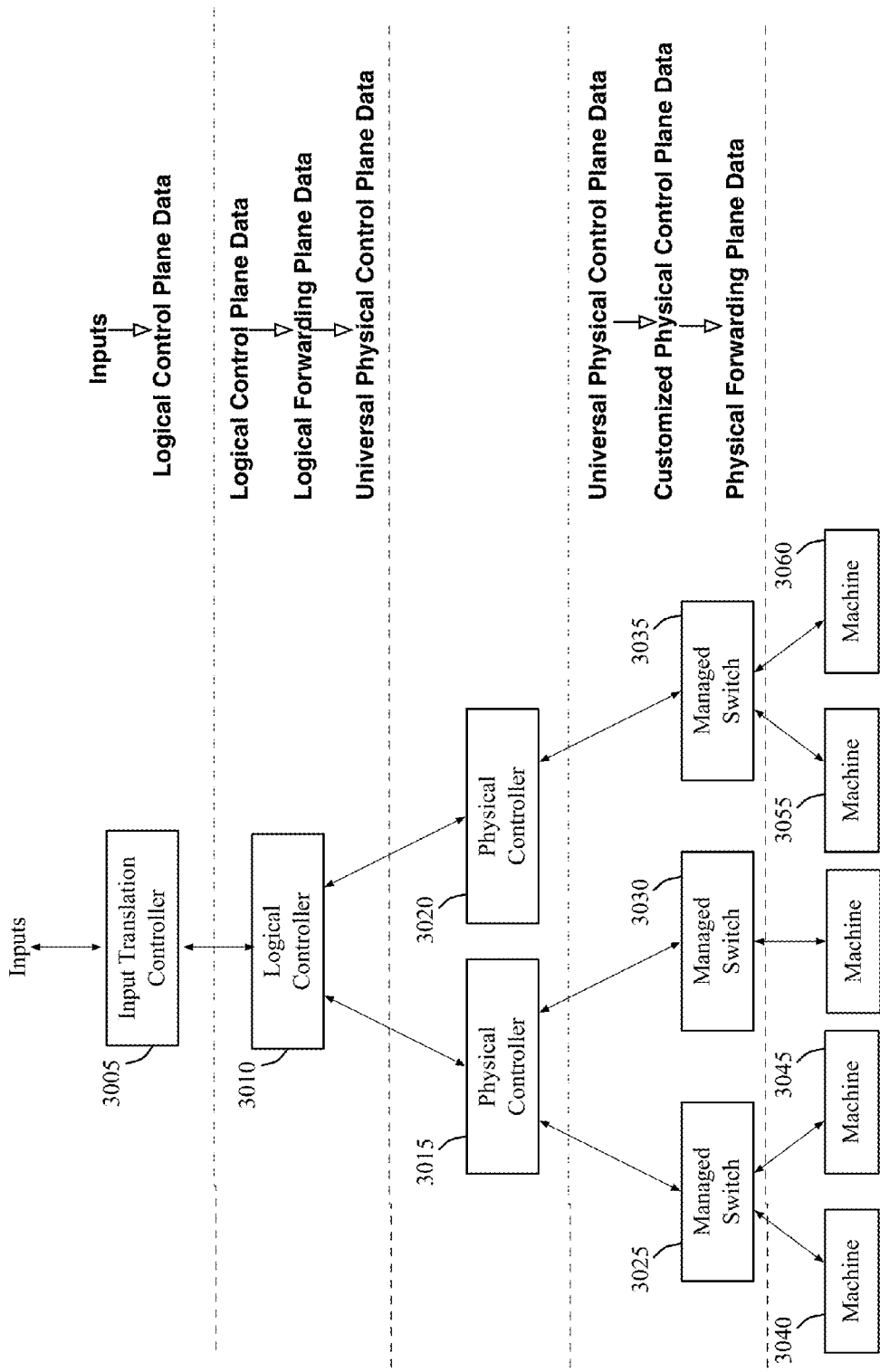
FIG. 30 conceptually illustrates an example architecture of a network control system.

FIG. 30 conceptually illustrates an example architecture of a network control system 3000. Like FIGS. 27 and 28, this figure illustrates generation of customized physical control plane data from inputs by different elements of the network control system. In contrast to the network control system 2700 in FIG. 27, the physical controller 3015 and 3020 do not generate physical control plane data customized for the managed switching elements that these physical controllers manage. Rather, these physical controller 3015 and 3020 gather universal physical control plane data from the logical controllers and distribute these universal data to the managed switching elements. Thus, the network control system 3000 is also different from the network control system 2800 in FIG. 28 in that the network control system 3000 do not have chassis controllers to generate customized physical control plane data from universal physical control plane data. In the network control system 3000, the managed switching elements 2840-2875 customize the universal physical control plane data into physical control plane data that are specific to the managed switching elements.

Figure 31:
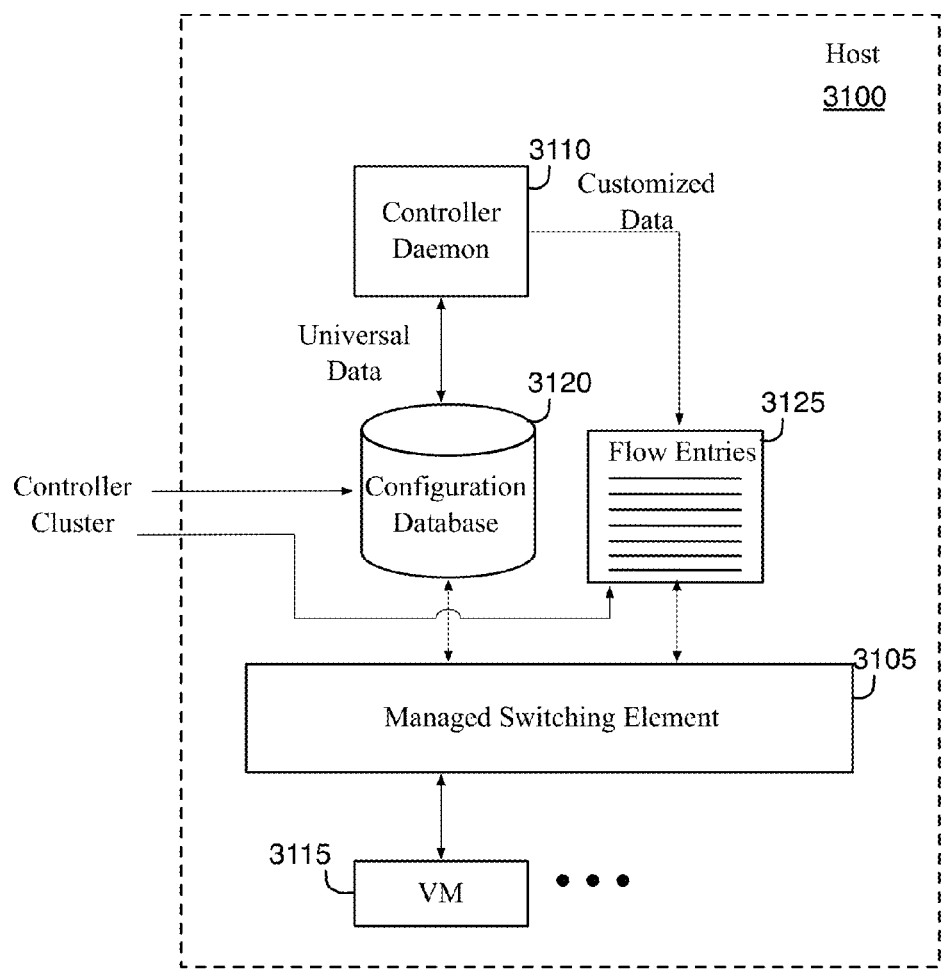
FIG. 31 illustrates an example architecture of a host on which a managed switching element runs.

FIG. 31 illustrates an example architecture of a host 3100 on which a managed switching element 3105 runs. The managed switching element 3105 receives universal control plane data from a physical controller that is master of this managed switching element. The host 3100 also includes a controller daemon 3110 that generates customized physical control plane data specific to the managed switching element 3105 from the universal control plane data. The host 3100 also includes several VMs 3115 that use the managed switching element 3105 to send and receive data packets.

As mentioned above, a physical controller in a network control system of some embodiments, such as the network control system 3000, does not customize the universal control plane data for the managed switching elements of which the physical controller is a master. When the network control system does not have chassis controllers to customized the universal control plane data for the managed switching elements, the network control system of some embodiments puts a controller daemon in the hosts on which the managed switching elements run so that the controller daemon can perform the conversion of the universal control plane data into customized control plane data specific to the switching elements.

The managed switching element 3105 in this example is a software switch. The managed switching element includes a configuration database 3120 and the flow table 3125 that includes flow entries. For simplicity of discussion, other components (e.g., ports, forwarding tables, etc.) are not depicted in this figure. The managed switching element 3105 of some embodiments receives the universal physical control plane data over two channels, a first channel using a switch control protocol (e.g., OpenFlow) and a second channel using a configuration protocol. As mentioned above, the data coming over the first switching element includes flow entries and the data coming over the second switching element includes configuration information. The managed switching element 3105 therefore puts the universal data coming over the first channel in the flow table 3125 and the universal data coming over the second channel in the configuration database 3120. However, the universal data is not written in terms of specifics of the managed switching element. The universal data thus has to be customized by rewriting the data in terms of the specifics of the managed switching element.

In some embodiments, the managed switching element 3105 keeps the configuration information in terms of the specifics of the managed switching element in the configuration database 3120. The controller daemon 3110 uses this configuration information in order to translate the universal data stored in the configuration database 3120. For instance, the universal data may specify a port of the managed switching element using a universal identifier. The controller daemon 3110 has logic to map this universal identifier to a local port identifier (e.g., port number) that is also stored in the configuration database 3120. The controller daemon 3110 then uses this customized configuration information to modify the flow entries that are written in terms of universal data.

E. Example Use Cases

1. Tunnel Creation

Figure 32A:
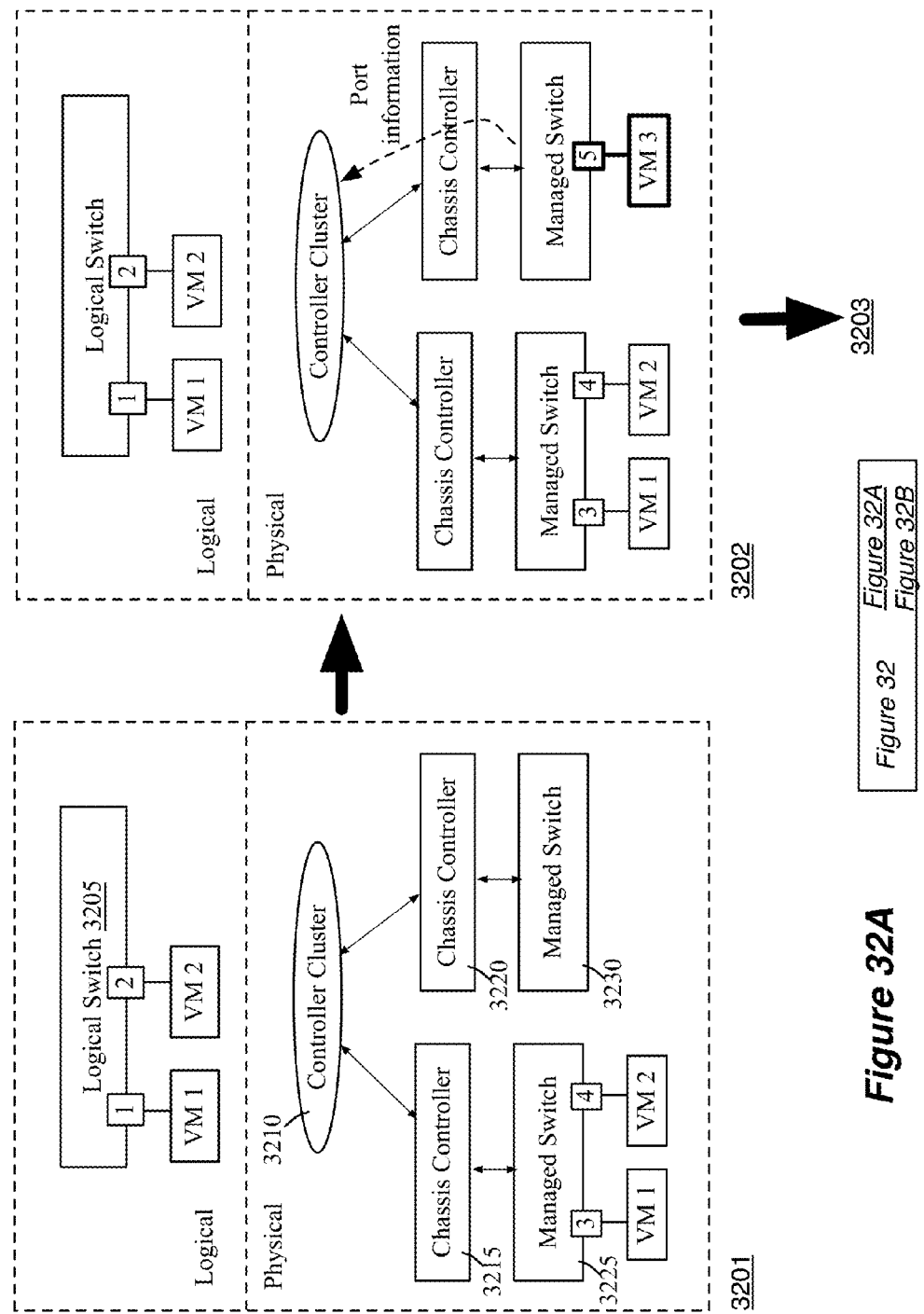
FIGS. 32A and 32B illustrate an example creation of a tunnel between two managed switching elements based on universal control plane data.
Figure 32B:
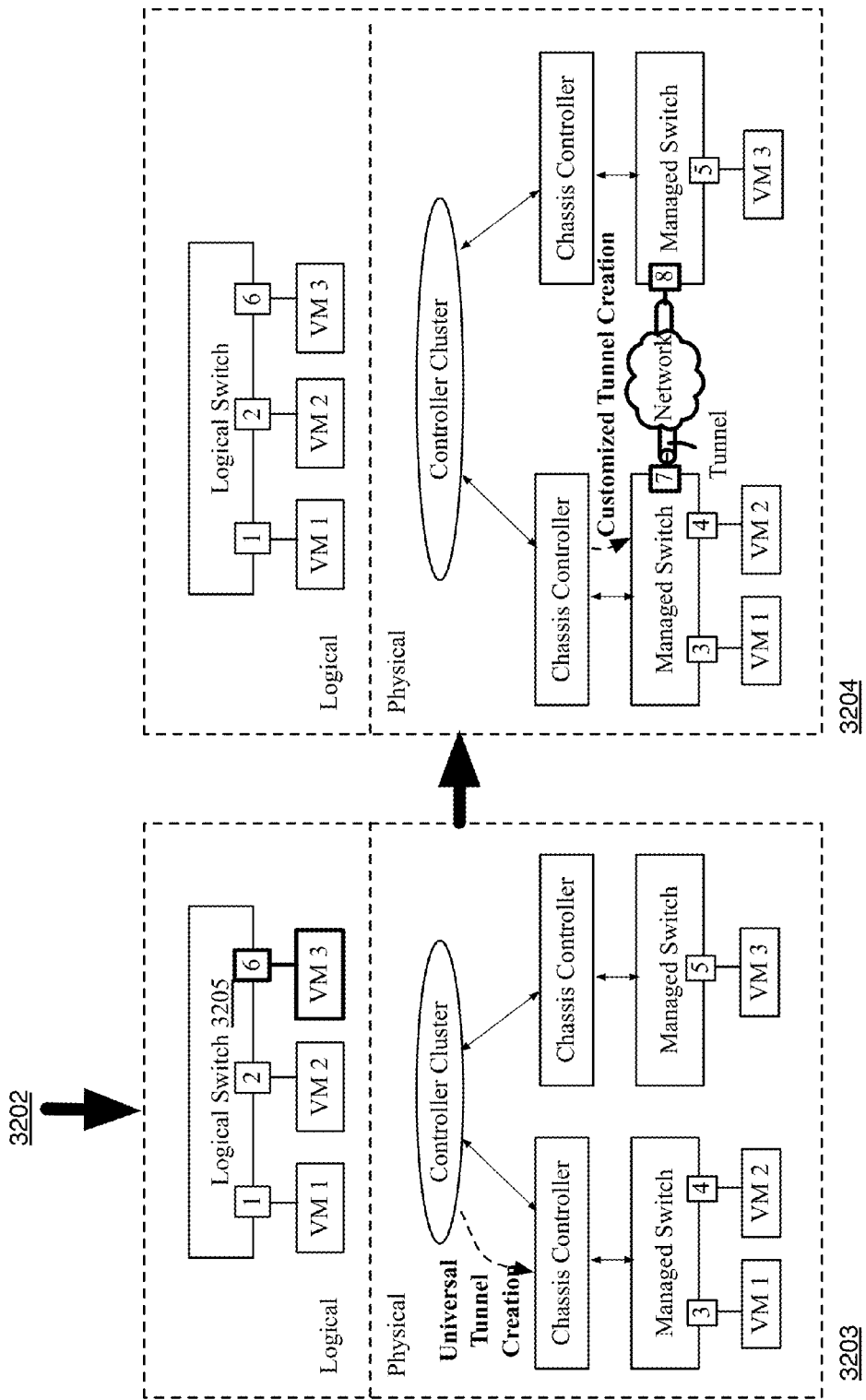

FIGS. 32A and 32B illustrate an example creation of a tunnel between two managed switching elements based on universal control plane data. Specifically, these figures illustrate in four different stages 3201-3204 a series of operations performed by different components of a network management system 3200 in order to establish a tunnel between two managed switching elements 3225 and 3230. These figures also illustrate a logical switch 3205 and VMs 1 and 2. Each of the four stages 3201-3204 shows the network control system 3200 and the managed switching elements 3225 and 3230 in the bottom portion and a logical switch 3205 and VMs connected to the logical switch 3205 in the top portion. The VMs are shown in both the top and bottom portions of each stage.

As shown in the first stage 3201, the logical switch 3205 forwards data between the VMs 1 and 2. Specifically, data comes to or from VM 1 through a logical port 1 of the logical switch 3205 and data comes to or from VM 2 through a logical port 2 of the logical switch 3205. The logical switch 3205 is implemented by the managed switching element 3225 in this example. That is, the logical port 1 is mapped to port 3 of the managed switching element 3225 and the logical port 2 is mapped to port 4 of the managed switching element 3225.

The network control system 3200 in this example includes a controller cluster 3210 and two chassis controller 3215 and 3220. The controller cluster 3210 includes input translation controllers (not shown), logical controllers (not shown), and physical controllers (not shown) that collectively generate universal control plane data based on the inputs that the controller cluster 3210 receives. The chassis controllers receive the universal control plane data and customize the universal data into physical control plane data that is specific to the managed switching element that each chassis controller is managing. The chassis controllers 3215 and 3220 pass the customized physical control plane data to the managed switching elements 3225 and 3230, respectively, so that the managed switching elements 3225 and 3230 can generate physical forwarding plane data which the managed switching elements use to forward the data between the managed switching elements 3225 and 3230.

At the second stage 3202, an administrator of the network that includes managed switching element 3230 creates VM 3 in the host (not shown) in which the managed switching element 3230 runs. The administrator creates port 5 of the managed switching element 3230 and attaches VM 3 to the port. Upon creation of port 3, the managed switching element 3230 of some embodiments sends the information about the newly created port to the controller cluster 3210.

In some embodiments, the information may include port number, network addresses (e.g., IP and MAC addresses), transport zone to which the managed switching element belongs, machine attached to the port, etc. As mentioned above, this configuration information goes through the chassis controller managing the managed switching element and then through physical controllers and logical controllers all the way up to the user that manages the logical switch 3205. To this user, a new VM has become available to be added to the logical switch 3205 that the user is managing.

At stage 3203, the user in this example decides to use VM 3 and attaches VM 3 to the logical switch 3205. As a result, a logical port 6 of the logical switch 3205 is created. Data coming to or from VM 3 therefore will go through the logical port 6. In some embodiments, the controller cluster 3210 directs all the managed switching elements that implement the logical switch to create a tunnel between each pair of managed switching elements that has a pair of ports to which a pair of logical ports of the logical switch are mapped. In this example, a tunnel can be established between managed switching elements 3225 and 3230 to facilitate data exchange between the logical port 1 and the logical port 6 (i.e., between VMs 1 and 3) and between the logical port 2 and the logical port 6 (i.e., between VMs 2 and 3). That is, data being exchanged between port 3 of the managed switching element 3225 and port 5 of the managed switching element 3230 and data being exchanged between port 4 of the managed switching element 3225 and port 5 of the managed switching element 3230 can go through the tunnel established between the managed switching elements 3225 and 3230.

A tunnel between two managed switching elements is not needed to facilitate data exchange between the logical port 1 and the logical port 2 (i.e., between VMs 1 and 2) because the logical port 1 and the logical port 2 are mapped onto two ports on the same managed switching element 3225.

The third stage 3203 further shows that the controller cluster 3210 sends universal physical control plane data specifying instructions to create a tunnel from the managed switching element 3225 to the managed switching element 3230. In this example, the universal physical control plane data is sent to the chassis controller 3215, which will customize the universal physical control plane data to physical control plane data specific to the managed switching element 3225.

The fourth stage 3204 shows that the chassis controller 3215 sends the tunnel physical control plane data that specifies instructions to create a tunnel and to forward packets to the tunnel. The managed switching element 3225 creates a tunnel to the managed switching element 3230 based on the customized physical control plane data. More specifically, the managed switching element 3225 creates port 7 and establishes a tunnel (e.g., GRE tunnel) to port 8 of the managed switching element 3230. More detailed operations to create a tunnel between two managed switching elements will be described below.

Figure 33:
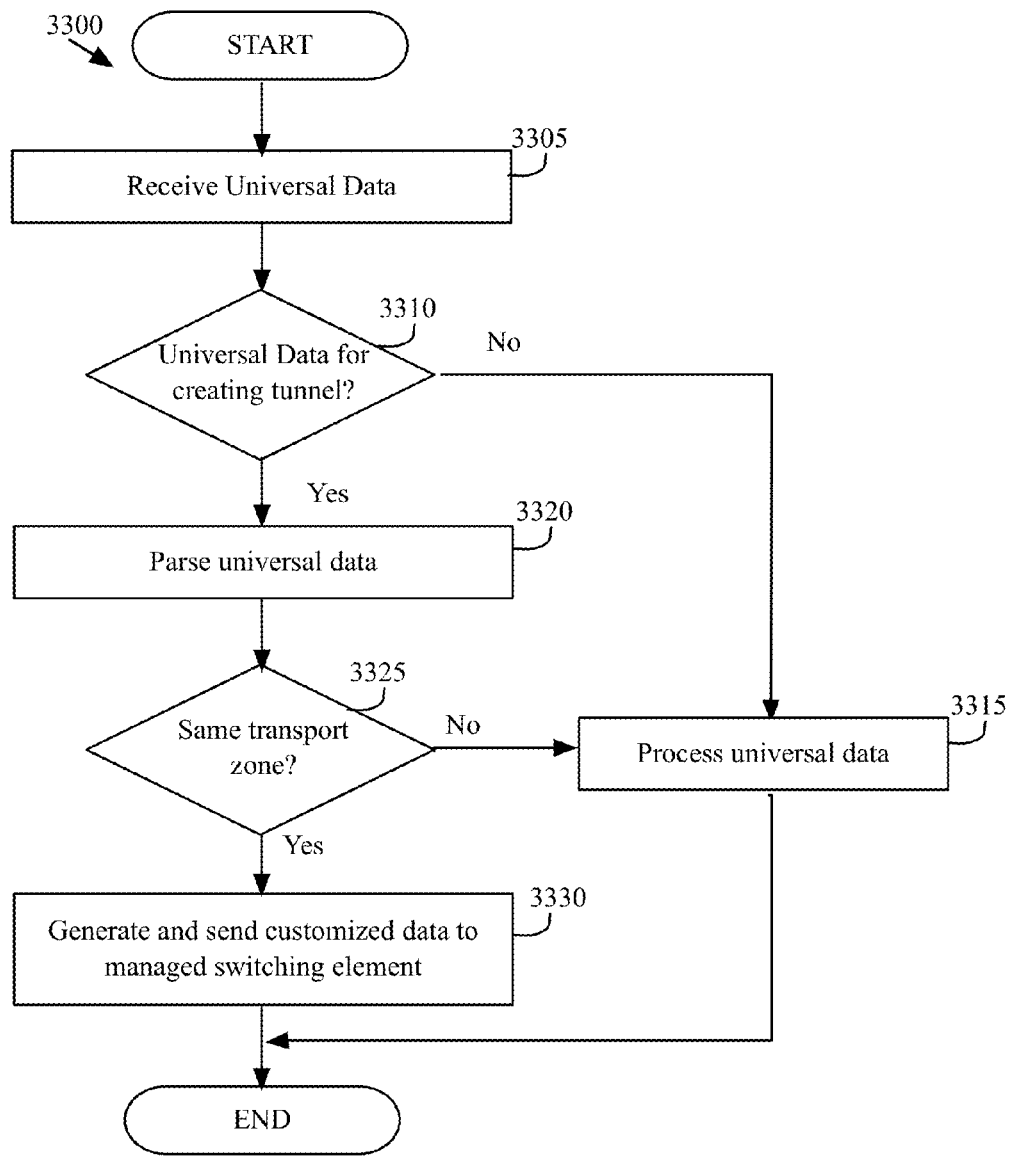
FIG. 33 conceptually illustrates a process that some embodiments perform to generate, from universal physical control plane data, customized physical control plane data that specifies the creation and use of a tunnel between two managed switching element elements.

FIG. 33 conceptually illustrates a process 3300 that some embodiments perform to generate, from universal physical control plane data, customized physical control plane data that specifies the creation and use of a tunnel between two managed switching element elements. In some embodiments, the process 3300 is performed by a chassis controller that interfaces with a managed switching element or a physical controller that directly interfaces with a managed switching element.

The process 3300 begins by receiving universal physical control plane data from a logical controller or a physical controller. In some embodiments, universal physical control plane data have different types. One of the types of universal physical control plane data is universal tunnel flow instructions, which specify creation of a tunnel in a managed switching element and the use of the tunnel. In some embodiments, the universal tunnel flow instructions include information about a port created in a managed switching element in a network. This port is a port of a managed switching element to which a user has mapped a logical port of the logical switch. This port is also a destination port which the tunneled data needs to reach. The information about the port includes (1) a transport zone to which the managed switching element that has the port belongs, (2) a tunnel type, which, in some embodiments, is based on tunnel protocols (e.g., GRE, CAPWAP, etc.) used to build a tunnel to the managed switching element that has the destination port, and (3) a network address (e.g., IP address) of the managed switching element that has the destination port (e.g., IP address of a VIF that will function as one end of the tunnel to establish).

Next, the process 3300 determines (at 3310) whether the received universal physical control plane data is a universal tunnel flow instruction. In some embodiments, the universal control plane data specifies its type so that the process 3300 can determine the type of the received universal plane data. When the process 3300 determines (at 3310) that the received universal data is not a universal tunnel flow instruction, the process proceeds to 3315 to process the universal control plane data to generate customized control plane data and send the generated data to the managed switching element that the process 3300 is managing. The process 3300 then ends.

When the process 3300 determines (at 3310) that the received universal control plane data is the universal tunnel flow instructions, the process 3300 proceeds to 3320 to parse the data to obtain the information about the destination port. The process 3300 then determines (at 3325) whether the managed switching element that has the destination port is in the same transport zone in which the managed switching element that has a source port is. The managed switching element that has the source port is the managed switching element that the chassis controller or the physical controller that performs the process 3300 manages. In some embodiments, a transport zone includes a group of machines that can communicate with each other without using a second-level managed switching element such as a pool node.

When the process 3300 determines (at 3325) that the managed switching element with the source port and the managed switching element with the destination port are not in the same transport zone, the process 3300 proceeds to 3315, which is described above. Otherwise, the process proceeds to 3330 to customize the universal tunnel flow instructions and send the customized information to the managed switching element that has the source port. Customizing the universal tunnel flow instructions will be described in detail below. The process 3300 then ends.

Figure 34:
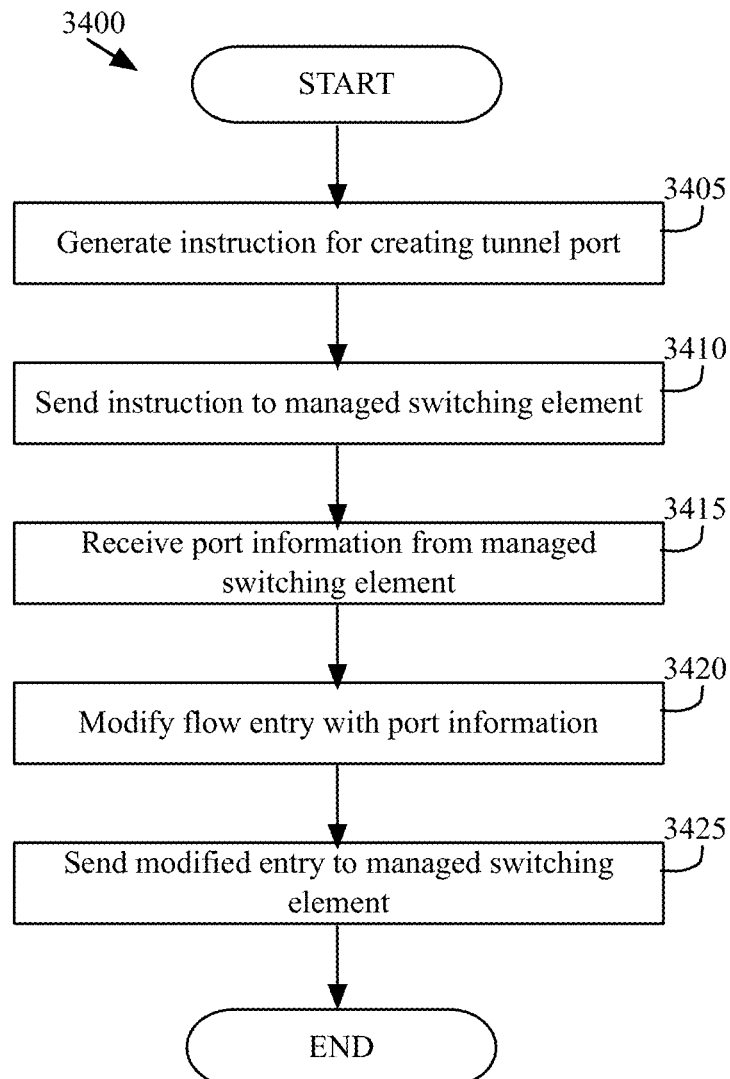
FIG. 34 conceptually illustrates a process that some embodiments perform to generate customized tunnel flow instructions and to send the customized instructions to a managed switching element so that the managed switching element can create a tunnel and send the data to a destination through the tunnel.

FIG. 34 conceptually illustrates a process 3400 that some embodiments perform to generate customized tunnel flow instructions and to send the customized instructions to a managed switching element so that the managed switching element can create a tunnel and send the data to a destination through the tunnel. In some embodiments, the process 3400 is performed by a controller instance that interfaces with a managed switching element or a physical controller that directly interfaces with a managed switching element. The process 3400 in some embodiments starts when the controller that performs the process 3400 has received universal tunnel flow instructions, parsed the port information about the destination port, and determined that the managed switching element that has the destination port is in the same transport zone as the managed switching element that the controller manages.

The process 3400 begins by generating (at 3405) instructions for creating a tunnel port. In some embodiments, the process 3400 generates instructions for creating a tunnel port in the managed switching element that the controller manages based on the port information. The instructions include, for example, the type of tunnel to establish, and the IP address of the NIC which will be the destination end of the tunnel. The tunnel port of the managed switching element managed by the controller will be the other end of the tunnel.

Next, the process 3400 sends (at 3410) the generated instructions for creating the tunnel port to the managed switching element that the controller manages. As mentioned above, a chassis controller of some embodiments or a physical controller that directly interfaces with a managed switching element uses two channels to communicate with the managed switching element. One channel is a configuration channel to exchange configuration information with the managed switching element and the other channel is a switch control channel (e.g., a channel established using OpenFlow protocol) for exchanging flow entries and event data with the managed switching element. In some embodiments, the process uses the configuration channel to send the generated instructions for creating the tunnel port to the managed switching element that the controller manages. Upon receiving the generated instructions, the managed switching element of some embodiments creates the tunnel port in the managed switching element and establishes a tunnel between the tunnel port and a port of the managed switching element that has the destination port using a tunnel protocol specified by the tunnel type. When the tunnel port and the tunnel are created and established, the managed switching element of some embodiments sends the value (e.g., four) of the identifier of the tunnel back to the controller instance.

The process 3400 of some embodiments then receives (at 3415) the value of the identifier of the tunnel port (e.g., "tunnel_port=4") through the configuration channel. The process 3400 then modifies a flow entry that is included in the universal tunnel flow instructions using this received value. This flow entry, when sent to the managed switching element, causes the managed switching element to perform an action. However, being universal data, this flow entry identifies the tunnel port by a universal identifier (e.g., tunnel_port) and not by an actual port number. For instance, this flow entry in the received universal tunnel flow instructions may be "If destination=destination machine's UUID, send to tunnel_port." The process 3400 modifies (at 3420) the flow entry with the value of the identifier of the tunnel port. Specifically, the process 3400 replaces the identifier for the tunnel port with the actual value of the identifier that identifies the created port. For instance, the modified flow entry would look like "If destination=destination machine's UUID, send to 4."

The process 3400 then sends (at 3425) this flow entry to the managed switching element. In some embodiments, the process sends this flow entry to the managed switching element over the switch control channel (e.g., OpenFlow channel). The managed switching element will update its flow entries table using this flow entry. The managed switching element from then on forwards the data headed to a destination machine through the tunnel by sending the data to the tunnel port. The process then ends.

Figure 35B:
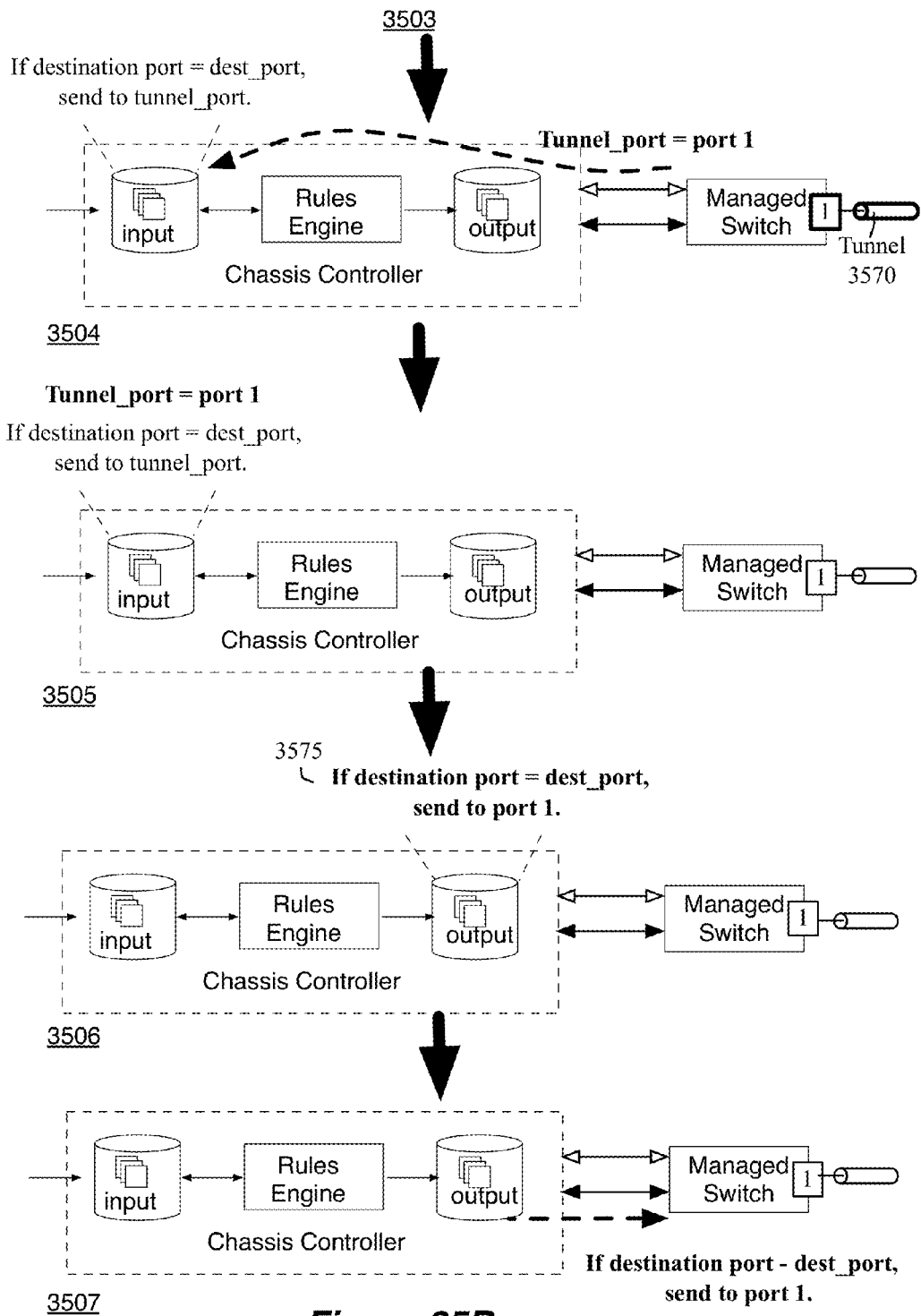

FIGS. 35A and 35B conceptually illustrate in seven different stages 3501-3507 an example operation of a chassis controller 3510 that translates universal tunnel flow instructions into customized instructions for a managed switching element 3515 to receive and use. The chassis controller 3510 is similar to the chassis controller 2900 described above by reference to FIG. 29. The chassis controller 3510 is also similar to the chassis controller 4400, which will be described further below by reference to FIG. 44. However, for simplicity of discussion, not all components of the chassis controller 3510 are shown in FIGS. 35A and 35B.

As shown, the chassis controller 3510 includes input tables 3520, a rules engine 3525, and output tables 3530, which are similar to the input tables 2920, the rules engine 2925, and the output tables 2945. The chassis controller 3510 manages the managed switching element 3515. Two channels 3535 and 3540 are established between the chassis controller and the managed switching element 3515 in some embodiment. The channel 3535 is for exchanging configuration data (e.g., data about creating ports, current status of the ports, queues associated with the managed switching element, etc.). The channel 3540 is an OpenFlow channel (OpenFlow control channel) over which to exchange flow entries in some embodiments.

The first stage 3501 shows that the chassis controller 3510 has updated the input tables 3520 using universal tunnel flow instructions received from a physical controller (not shown). As shown, the universal tunnel flow instructions include an instruction 3545 for creating a tunnel and a flow entry 3550. As shown, the instruction 3545 includes the type of the tunnel to be created and the IP addresses of the managed switching element that has the destination port. The flow entry 3550 specifies the action to take in terms of universal data that is not specific to the managed switching element 3515. The rules engine performs table mapping operations onto the instruction 3545 and the flow entry 3550.

The second stage 3502 shows the result of the table mapping operations performed by the rules engine 3525. An instruction 3560 results from the instruction 3545. In some embodiments, the instructions 3545 and 3560 may be identical while they may not be in other embodiments. For instance, the values in the instructions 3545 and 3560 that represent the tunnel type may be differ. The instruction 3560 includes the IP address and the type of the tunnel to be created, among other information that may be included in the instruction 3560. The flow entry 3550 did not trigger any table mapping operation and thus remains in the input tables 3520.

The third stage 3503 shows that the instruction 3560 has been pushed to the managed switching element 3515 over the configuration channel 3535. The managed switching element 3515 creates a tunnel port and establishes a tunnel between the managed switching element 3515 and another managed switching element that has the destination port. One end of the tunnel is the tunnel port created and the other end of the tunnel is the port that is associated with the destination IP address in some embodiments. The managed switching element 3515 of some embodiments uses the protocol specified by the tunnel type to establish the tunnel.

The fourth stage 3504 shows that the managed switching element 3515 has created a tunnel port ("port 1" in this example) and a tunnel 3570. This stage also shows that the managed switching element sends back the actual value of the tunnel port identifier. The managed switching element 3515 sends this information over the configuration channel 3535 in this example. The information goes into the input tables 3520 as input event data. The fifth stage 3505 shows that the input tables 3520 are updated with the information from the managed switching element 3515. This update triggers the rules engine 3525 to perform table mapping operations.

The sixth stage 3506 shows the result of the table mapping operations performed at the previous stage 3504. The output tables 3530 now has a flow entry 3575 that specifies the action to take in terms of information that is specific to the managed switching element 3515. Specifically, the flow entry 3575 specifies that when a packet's destination is the destination port, the managed switching element 3515 should sent out the packet through port 1. The seventh stage 3507 shows that the flow entry 3575 has been pushed to the managed switching element 3515, which will forward packets using the flow entry 3575.

It is to be noted that the instruction 3545 and the data exchanged between the chassis controller 3510 and the managed switching element 3515 as shown in FIGS. 35A and 35B are conceptual representation of the universal tunnel flow instructions and the customized instructions and may not be in actual expressions and formats.

Moreover, the example of FIGS. 35A and 35B is described in terms of the operation of the chassis controller 3510. This example is also applicable to a physical controller of some embodiments that translate universal physical control plane data into customized physical control plane data for the managed switching elements of which the physical controller is a master.

FIGS. 32A-35B illustrate a creation of a tunnel between two managed edge switching elements to facilitate data exchanges between a pair of machines (e.g., VMs) that are using two logical ports of a logical switch. This tunnel covers one of the possible uses of a tunnel. Many other uses of a tunnel are possible in a network control system in some embodiments of the invention. Example uses of a tunnel include: (1) a tunnel between a managed edge switching element and a pool node, (2) a tunnel between two managed switching elements with one being an edge switching element and the other providing an L3 gateway service (i.e., a managed switching element that is connected to a router to get routing service at the network layer (L3)), and (3) a tunnel between two managed switching elements in which a logical port and another logical port that is attached to L2 gateway service.

A sequence of events for creating a tunnel in each of the three examples will now be described. For a tunnel between a managed switching element and a pool node, the pool node is first provisioned and then the managed switching element is provisioned. A VM gets connected to a port of the managed switching element. This VM is the first VM that is connected to the managed switching element. This VM is then bound to a logical port of a logical switch by mapping the logical port to the port of the managed switching element. Once the mapping of the logical port to the port of the managed switching element is done, a logical controller sends (e.g., via physical controller(s)) universal tunnel flow instructions to the chassis controller (or, to the physical controller) that interfaces the managed switching element.

The chassis controller then instructs the managed switching element to create a tunnel to the pool node. Once the tunnel is created, another VM that is subsequently provisioned and connected to the managed switching element will share the same tunnel to exchange data with the pool node if this new VM is bound to a logical port of the same logical switch. If the new node is bound to a logical port of a different logical switch, the logical controller will send the same universal tunnel flow instructions that was passed down when the first VM was connected to the managed switching element. However, the universal tunnel flow instructions will not cause to create a new tunnel to the pool node because, for example, a tunnel has already been created and operational.

If the established tunnel is a unidirectional tunnel, another unidirectional tunnel is established from the pool node side. When the logical port to which the first VM is bounded is mapped to the port of the managed switching element, the logical controller also sends universal tunnel flow instructions to the pool node. Based on the universal tunnel flow instructions, a chassis controller that interfaces the pool node will instruct the pool node to create a tunnel to the managed switching element.

For a tunnel between a managed edge switching element and a managed switching element providing L3 gateway service, it is assumed that a logical switch with several VMs of a user have been provisioned and a logical router is implemented in a transport node that provides the L3 gateway service. A logical patch port is created in the logical switch to link the logical router to the logical switch. In some embodiments, an order in which the creation of the logical patch and provisioning of VMs do not make a difference to tunnel creation. The creation of the logical patch port causes a logical controller to send universal tunnel flow instructions to the chassis controllers (or, physical controllers) interfacing all the managed switching elements that implement the logical switch (i.e., all the managed switching elements that each has at least one port to which a logical port of the logical switch is mapped). Each chassis controller for each of these managed switching elements instructs the managed switching element to create a tunnel to the transport node. The managed switching elements each creates a tunnel to the transport node, resulting in as many tunnels as the number of the managed switching elements that implement the logical switch.

If these tunnels are unidirectional, the transport node is to create a tunnel to each of the managed switching elements that implement the logical switch. The logical switch pushes universal tunnel flow instructions to the transport node when the logical patch port is created and connected to the logical router. A chassis controller interfacing the transport node instructs the transport node to create tunnels and the transport node creates tunnels to the managed switching elements.

In some embodiments, a tunnel established between two managed switching elements can be used for data exchange between any machine attached to one of the managed switching element and any machine attached to the other managed switching element, regardless of whether these two machines are using logical ports of the same logical switch or of two different switches. That is one example case where tunneling enables different users that are managing different LDP sets to share the managed switching elements while being isolated.

A creation of a tunnel between two managed switching elements in which a logical port and another logical port that is attached to L2 gateway service starts when a logical port gets attached to L2 gateway service. The attachment causes the logical controller to send out universal tunnel flow instructions to all the managed switching elements that implement other logical ports of the logical switch. Based on the instructions, tunnels are established from these managed switching elements to a managed switching element that implements the logical port attached to L2 gateway service.

2. Quality of Service

Figure 36:
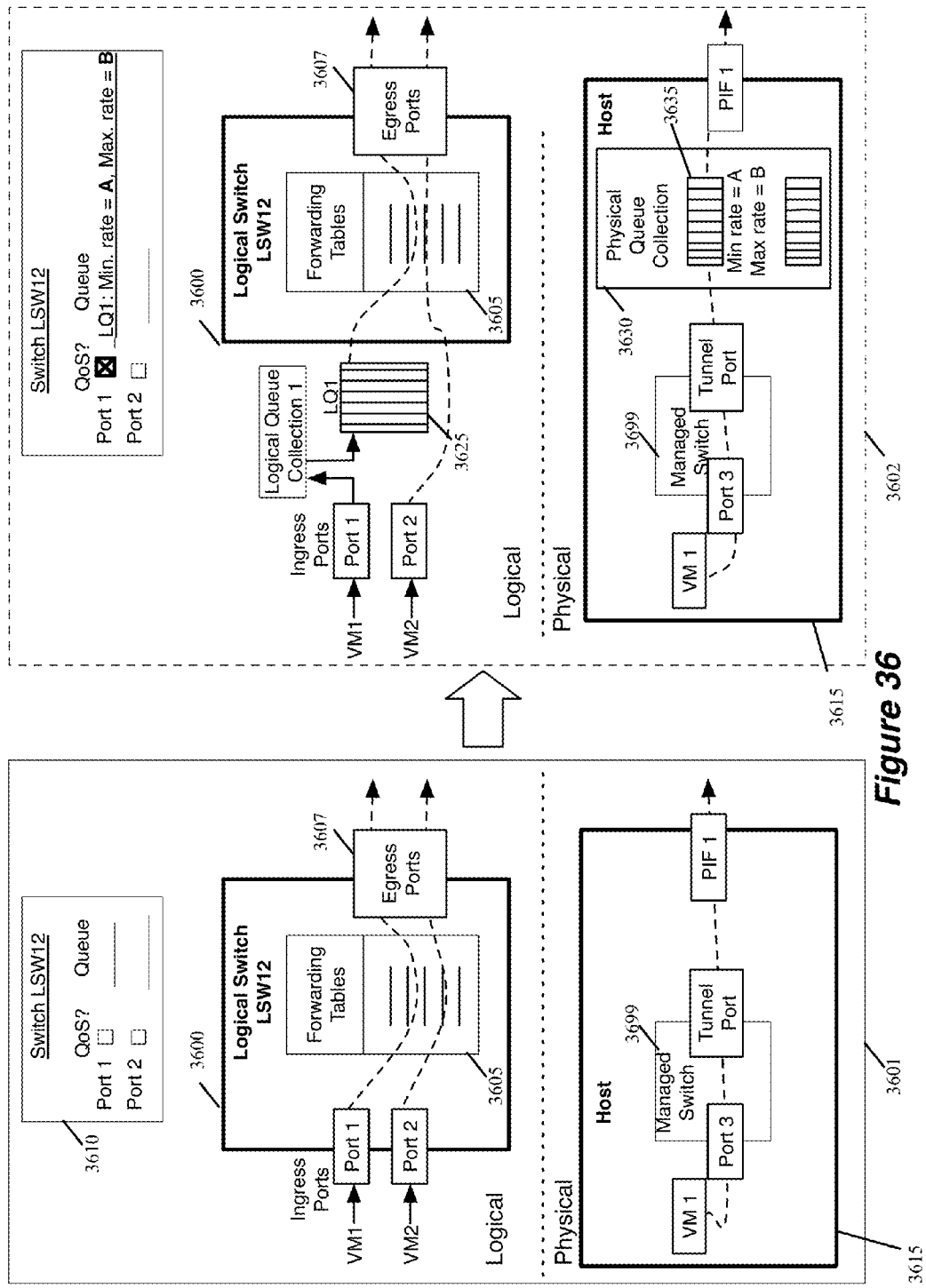
FIG. 36 illustrates an example of enabling Quality of Service (QoS) for a logical port of a logical switch.
Figure 37B:
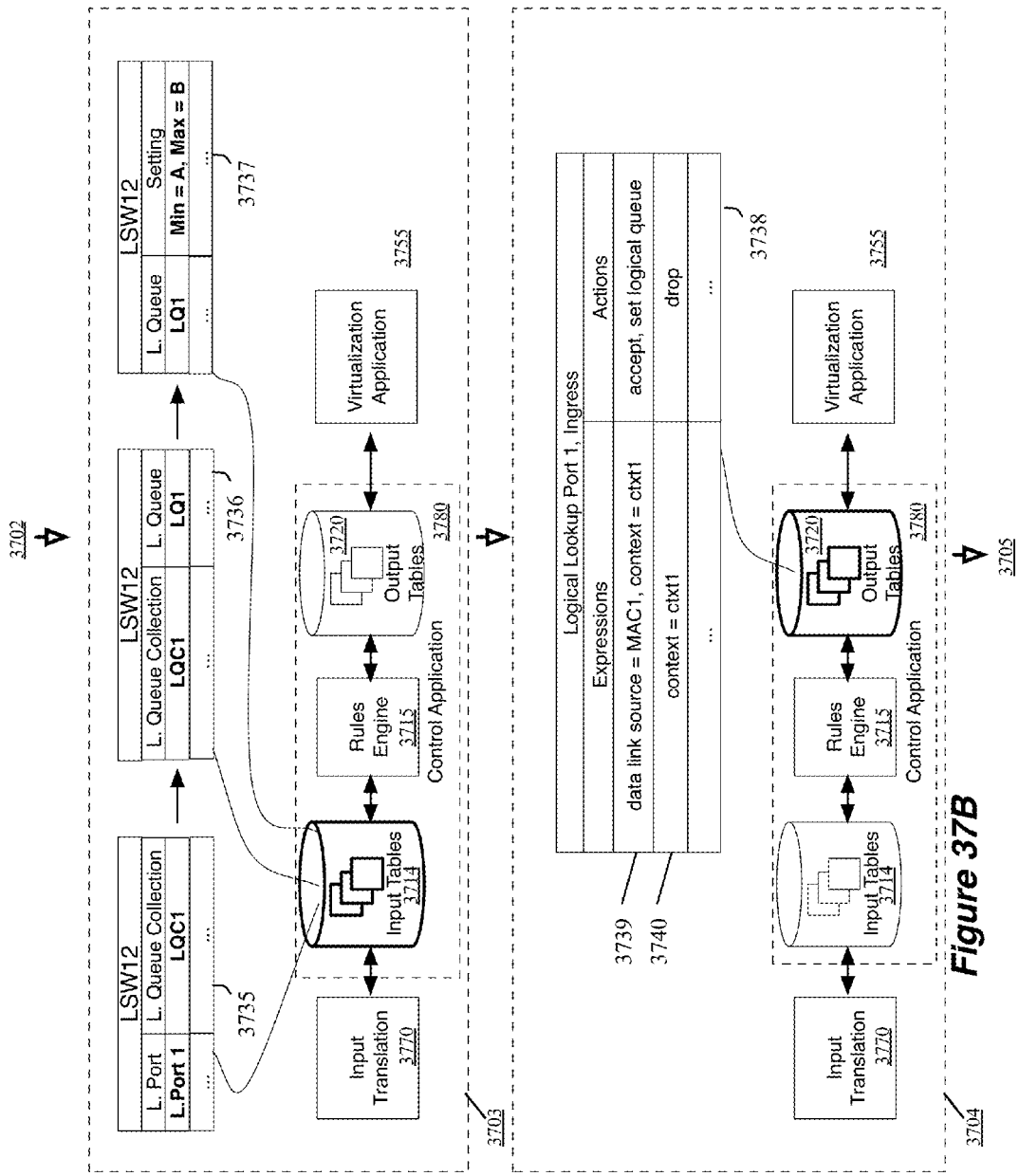
Figure 37C:
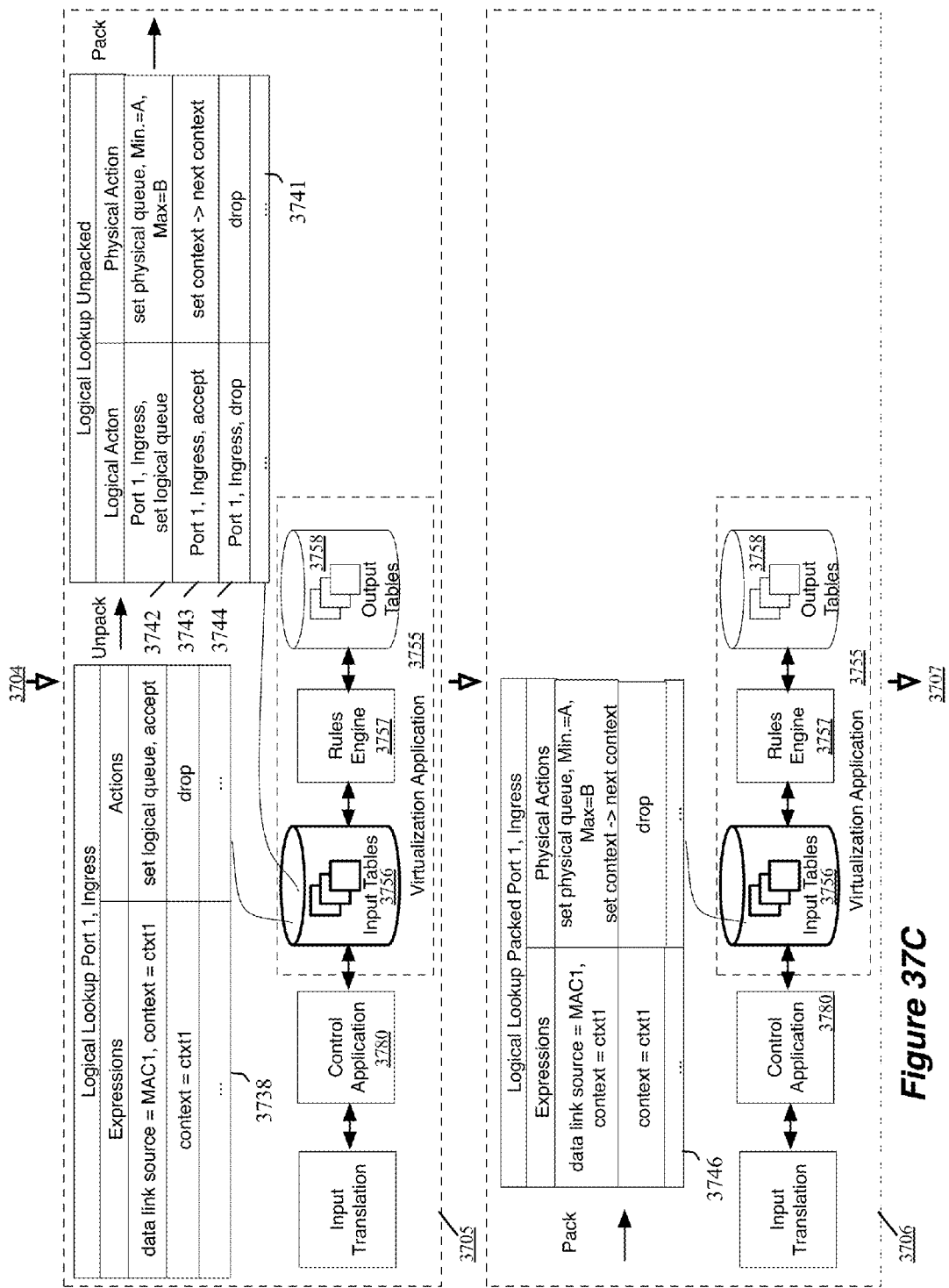
Figure 37D:
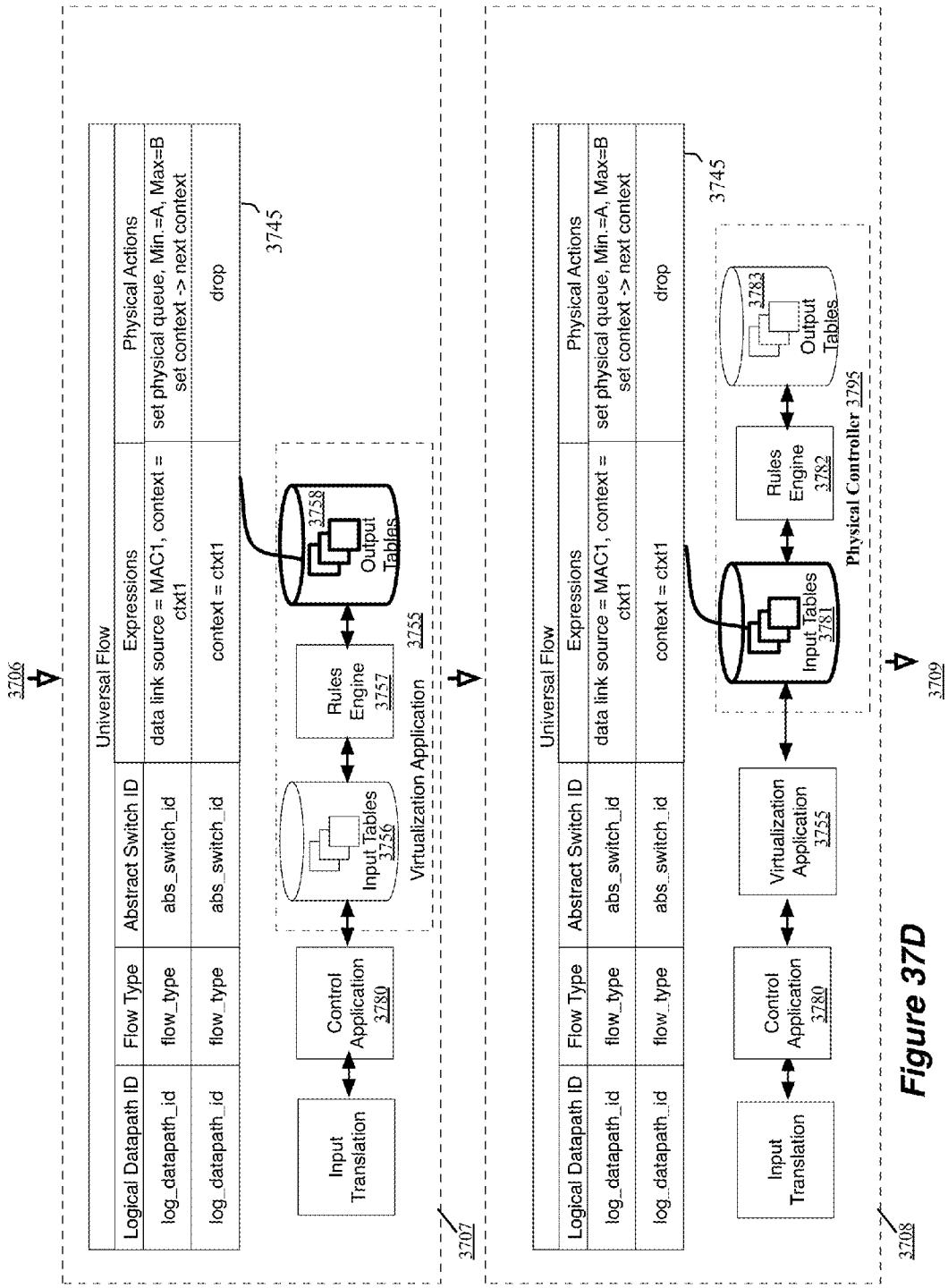
Figure 37E:
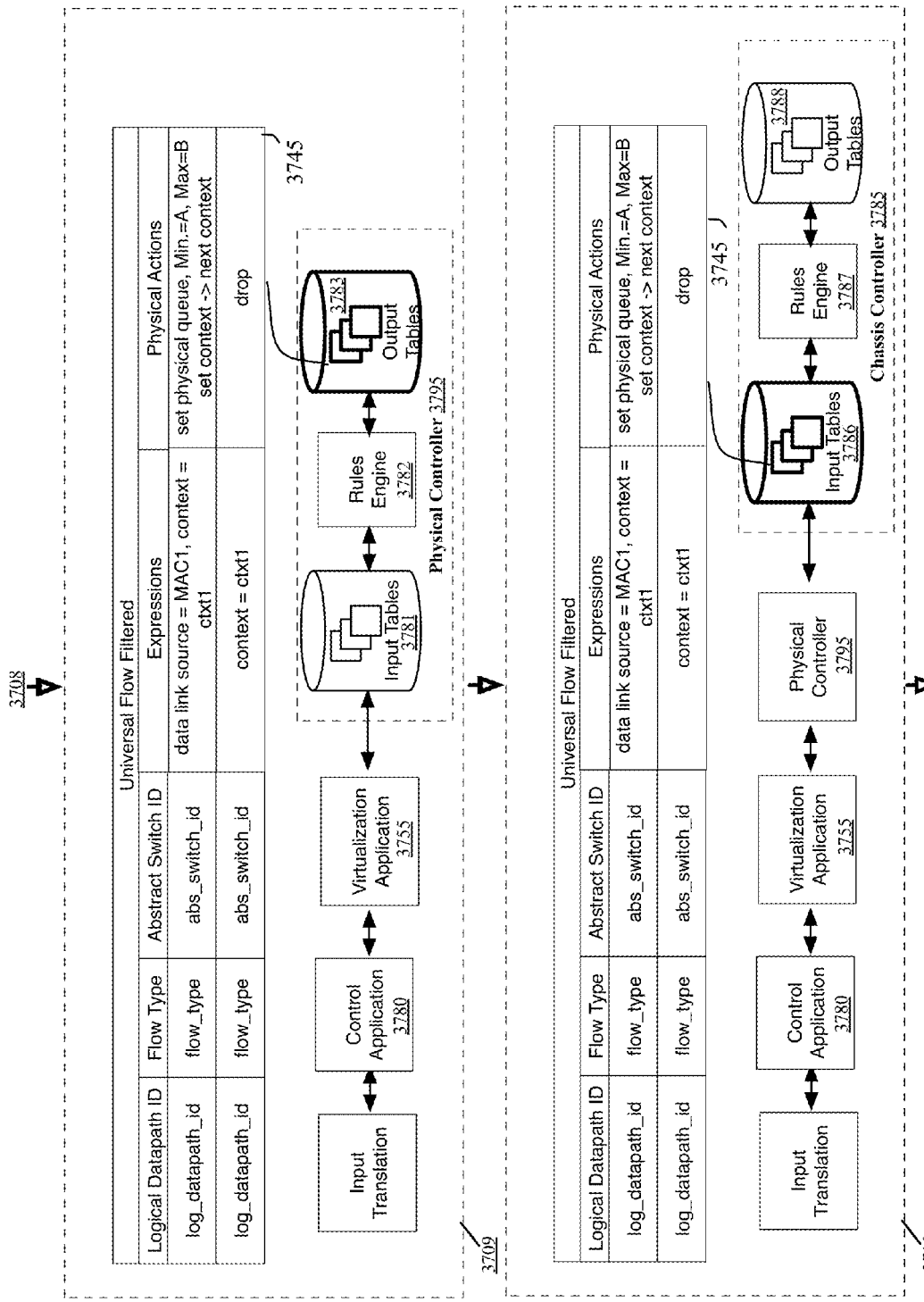
Figure 37F:
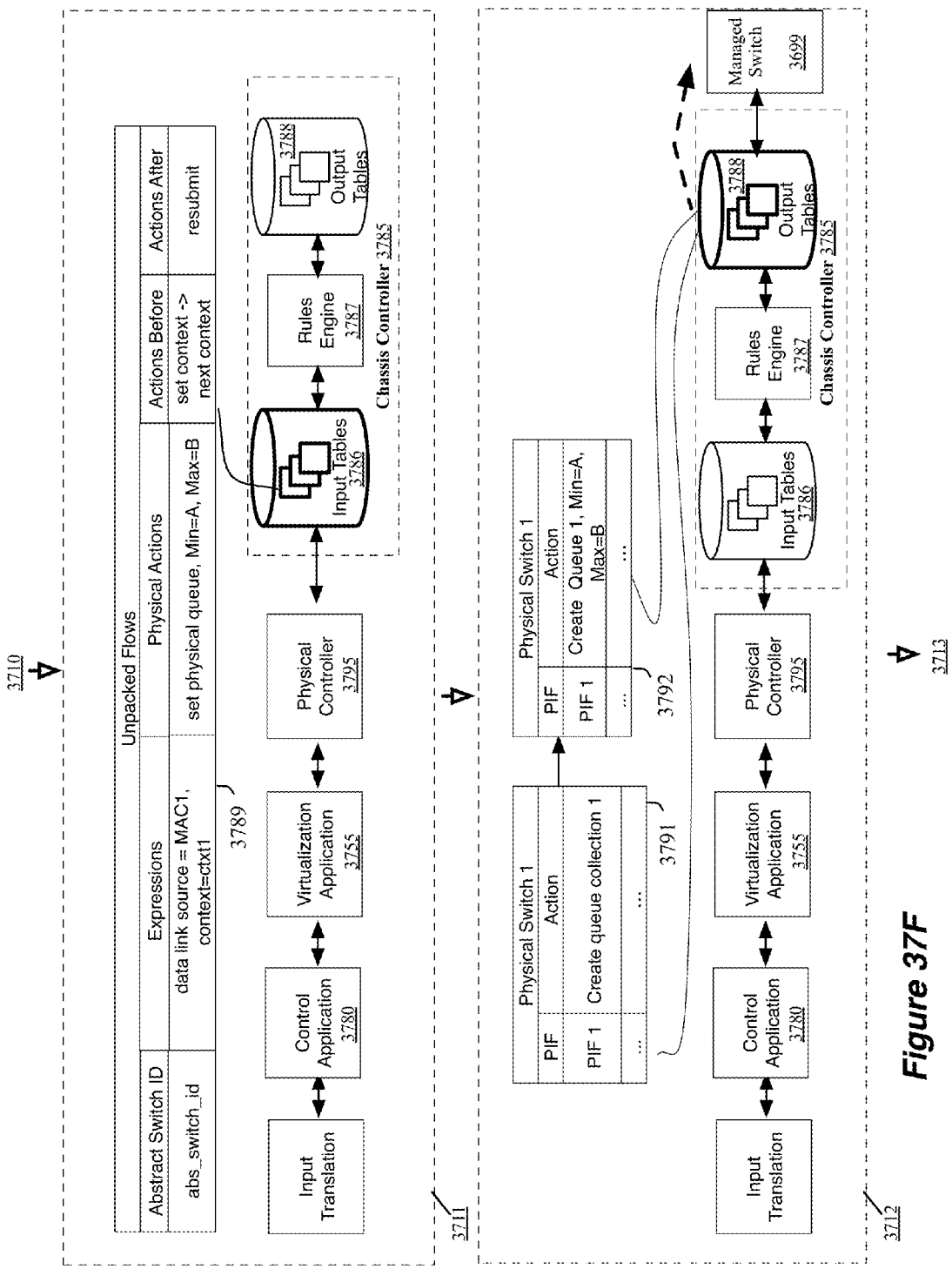
Figure 37G:
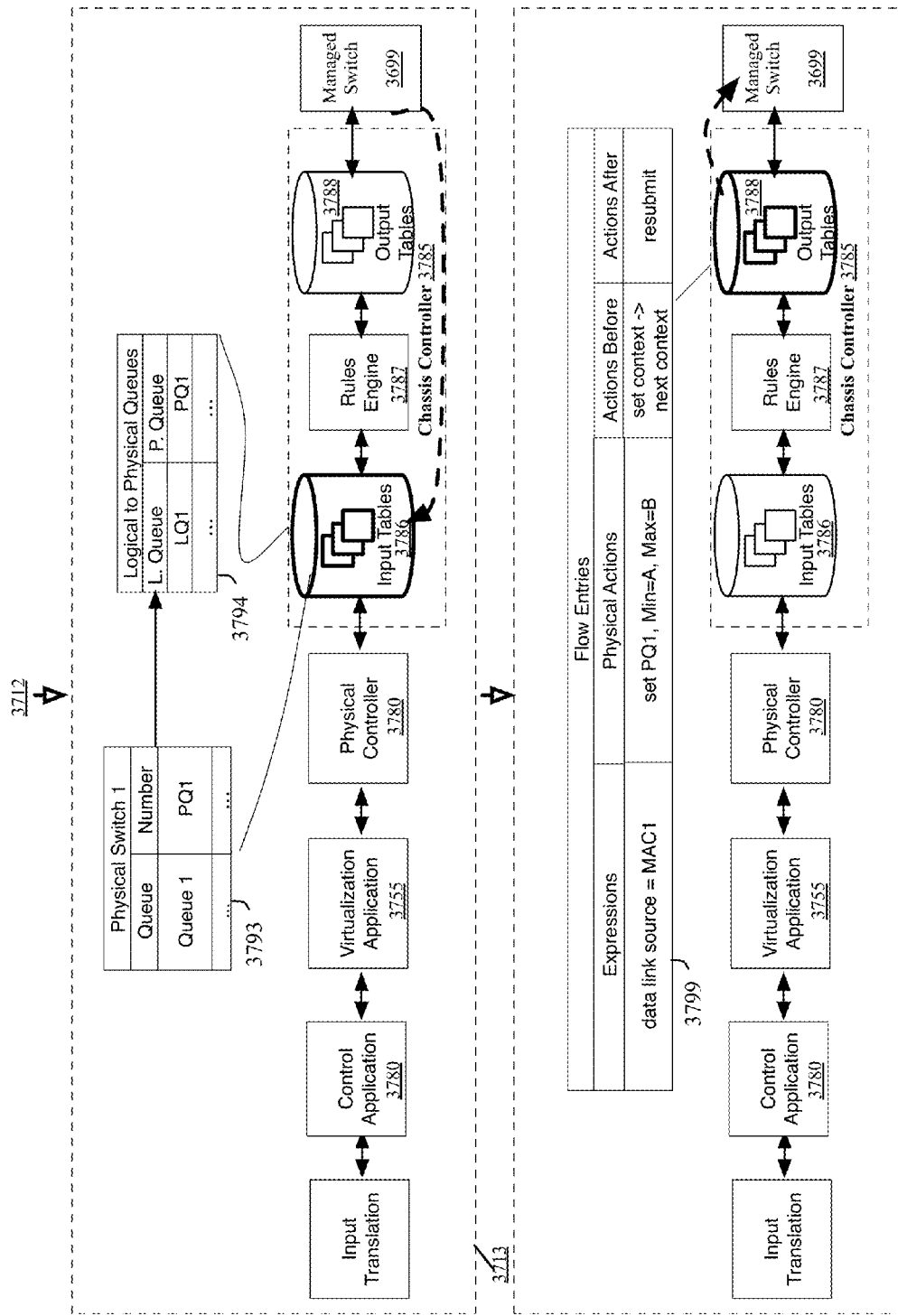

FIG. 36 illustrates an example of enabling Quality of Service (QoS) for a logical port of a logical switch. Specifically, this figure illustrates the logical switch 3600 at two different stages 3601 and 3602 to show that, after port 1 of the logical switch is enabled for QoS, the logical switch 3600 queues network data that comes into the logical switch 3600 through port 1. The logical switch 3600 queues the network data in order to provide QoS to a machine that sends the network data to switching element 3600 through port 1. QoS in some embodiments is a technique to apply to a particular port of a switching element such that the switching element can guarantee a certain level of performance to network data that a machine sends through the particular port. For instance, by enabling QoS for a particular port of a switch, the switching element guarantees a minimum bitrate and/or a maximum bitrate to network data sent by a machine to the network through the switch.

As shown, the logical switch 3600 includes logical ports 1 and 2. These logical ports of some embodiments can be both ingress ports and egress ports. The logical switch 3600 also includes forwarding tables 3605. The logical switch 3600 receives network data (e.g., packets) through the ingress ports and routes the network data based on the logical flow entries specified in the forwarding tables 3605 to the egress ports 3607, through which the logical switch 3600 sends out the network data.

This figure also illustrates a UI 3610. The UI 3610 is provided by a user interface application that allows the user to enter input values. The UI 3610 may be a web application, a command line interface (CLI), or any other form of user interface through which the user can provide inputs. This user application of some embodiments sends the inputs in the form of API calls to an input translation application. As mentioned above, an input translation application of some embodiments supports the API and sends the user input data to one or more logical controllers. The UI 3610 of some embodiments displays the current configuration of the logical switch that the user is managing.

VM 1 is a virtual machine that sends data to the logical switch 3600 through port 1. That is, port 1 of the logical switch 3600 is serving as an ingress port for VM 1. The logical switch 3600 performs logical ingress lookups using an ingress ACL table (not shown), which is one of forwarding tables 3605, in order to control the data (e.g., packets) coming through the ingress ports. For instance, the logical switch 3600 reads information stored in the header of a packet that is received through an ingress port, looks up the matching flow entry or entries in the ingress ACL table, and determines an action to perform on the received packet. As described above, a logical switch may perform further logical lookups using other forwarding tables that are storing flow entries. Also mentioned above, the operation of a logical switch is performed by a set of managed switching elements that implement the logical switch by performing a logical processing pipeline.

FIG. 36 also illustrates a host 3615 in the bottom of each stage. The host 3615 in this example is a server on which VM 1 and a managed switching element 3699 runs. The host 3615 in some embodiments includes a network interface (e.g., a network interface card (NIC) with an Ethernet port, etc.) through which one or more VMs hosted in the host 3615 send out packets.

The managed switching element 3699 has port 3 and a tunnel port. These ports of the managed switching element 3699 are VIFs in some embodiments. In this example, port 1 of the logical switch 3600 is mapped to port 3 of the managed switching element 3699. The tunnel port of the managed switching element 3699 is mapped to the network interface (i.e., PIF 1) of the host 3615.

When a logical port is enabled for QoS, the logical port needs a logical queue to en-queue the packets that are going into the logical switch through the logical port. In some embodiments, the user assigns a logical queue to a logical port. A logical queue may be created based on the inputs in some embodiments. The user may also specify the minimum and maximum bitrates for the queue. When enabling a logical port for QoS, the user may then point the logical port to the logical queue. In some embodiments, multiple logical ports can share the same logical queue. By sharing the same logical queue, the machines that send data to the logical switch through these logical ports can share the minimum and maximum bitrates associated with the logical queue.

In some embodiments, the control application of a logical controller creates a logical queue collection for the logical port. The control application then has the logical queue collection point to the logical queue. The logical port and the logical queue collection have a one-to-one relationship in some embodiments. However, in some embodiments, several logical ports (and corresponding logical queue collections) can share one logical queue. That is, the traffic coming through these several logical ports together are guaranteed for some level of performance specified for the logical queue.

Once a logical port points to a logical queue (once the relationship between logical port, the logical queue collection, and the logical queue is established), a physical queue collection and physical queue are created. The steps that lead to the creation of a physical queue collection and a physical queue will be described in detail further below by reference to FIGS. 37A, 37B, 37C, 37D, 37E, 37F, and 37G.

In some embodiments, the logical queue collection and the logical queue are mapped to a physical queue collection and a physical queue, respectively. When the packets are coming into the logical switch through a logical port that points to a logical queue, the packets are actually queued in the physical queue to which the logical queue is mapped. That is, a logical queue is a logical concept that does not actually queue packets. Instead, a logical queue indicates that the logical port that is associated with the logical queue is enabled for QoS.

In the first stage 3601, neither of the logical ports 1 and 2 of the logical switch 3600 is enabled for QoS. The logical switch 3600 routes packets that are coming from VM 1 and VM2 through ports 1 and 2 to the egress ports 3607 without guaranteeing certain performance level because logical ports 1 and 2 are not enabled for QoS. On the physical side, packets from VM 1 are sent through port 3 of the managed switching element 3699.

In the second stage 3602, a user using the UI 3610 enables port 1 of the logical switch 3600 for QoS by specifying information in the box next to "port 1" in the UI 3610 in this example. The user specifies "LQ1" as the ID of the logical queue to which to point port 1. The user also specifies "A" and "B" as the minimum and maximum bitrates, respectively, of the logical queue. "A" and "B" here represent bitrates, which are numerical values that quantify the amount of data that the port allows to go through per unit of time (e.g., 1,024 bit/second, etc.).

The control application creates a logical queue according to the specified information. The control application also creates a logical queue collection that would be set between port 1 and the logical queue LQ1. The logical queue LQ1 queues the packets coming into the logical switch 3600 through port 1 in order to guarantee that the packets are routed at a bitrate between the minimum and the maximum bitrates. For instance, the logical queue LQ1 will hold some of the packets in the queue when the packets are coming into the logical queue LQ1 through port 1 at a higher bitrate than the maximum bitrate. The logical switch 3600 will send the packets to the egress ports 3607 at a bitrate that is lower than the maximum bitrate (but at a higher bitrate than the minimum bitrate). Conversely, when the packets coming through port 1 are routed at a bitrate above but close to the minimum bitrate, the logical queue LQ1 may prioritize the packets in the queue such that the logical switch 3600 routes these packets first over other packets in some embodiments.

On the physical side, the managed switching element 3615 creates a physical queue collection 3630 and a physical queue 3635 in the host 3635 and associates the physical queue collection and the physical queue with PIF 1. A physical queue collection of some embodiments may include more than one physical queue in some embodiments. The physical queue collection 3630 in this example includes physical queue 3635. The logical queue 3625 is mapped to the physical queue 3635 actual queuing takes place. That is, the packets coming through port 1 of the logical switch 3600 in this example are queued in the physical queue 3630. The physical queue 3630 in some embodiments is implemented as a storage structure for storing packets. The packets from VM 1 are queued in the physical queue before the packets are sent out through PIF 1 so that the packets that come in through port 3 are sent out at a bitrate between the minimum and maximum bitrates.

FIGS. 37A, 37B, 37C, 37D, 37E, 37F, and 37G conceptually illustrate an example of enabling QoS for a port of a logical switch. In particular, these figures illustrate in fourteen different stages 3701-3714 that a logical controller generates universal physical control plane data for enabling QoS for port 1 of the logical switch 3600 in FIG. 36 and a chassis controller 3785 customizes the universal data to have the managed switching element 3699 implement the logical switch 3600, with QoS enabled for port 1.

The input translation application 3770, the control application 3780, and the virtualization application 3755 are similar to the input translation application 1200, the control application 1400, and the virtualization application 1600 described above in Section I, respectively. In this example, the input translation application 3770 runs in an input translation controller, and the control application 3780 and the virtualization application 3755 run in a logical controller.

The first stage 3701 shows that the control application 3780 includes, input tables 3714, rules engine 3715, and an output tables 3720, which are similar to their corresponding components of the control application 1400 in FIG. 14. Not all components of the control application 1400 are shown for the control application 3780, for simplicity of discussion. This stage also shows a UI 3721, which is similar to the UI 3610 in FIG. 36.

In the first stage 3701, the UI 3721 displays QoS information of ports 1 and 2 of the logical switch 3600. As indicated by the UI 3721, the logical ports of the logical switch 3600 are not enabled for QoS. The UI 3721 displays whether ports 1 and 2 of the logical switch 3600, which is identified by an identifier "LSW12," are enabled for QoS. The unchecked boxes in the UI 3721 indicate that ports 1 and 2 of the logical switch 3610 are not enabled for QoS. In some embodiments, the UI 3721 allows the user to specify a logical queue to which to point a logical port.

In the second stage 3702, the user provides input to indicate that user wishes to enable port 1 of the logical switch 3600 for QoS. As shown, the user has checked a box next to "port 1" in the UI 3721 and entered "LQ1" as the logical queue ID to which to point port 1. The user has also entered a command to create the logical queue with "A" and "B" as the minimum and maximum bitrates, respectively. The input translation application 3770 receives the user's inputs in the form of API calls. The input translation application 3770 translates the user's inputs into data that can be used by the control application 3780 and sends the translated inputs to the control application 3780 because the logical controller on which the control application 3780 runs is the master of the LDPS.

In the third stage 3703, the control application 3780 receives the inputs from the input translation application 3770. Based on the received inputs, the control application 3780 modifies three input tables 3735-3737. The input table 3735 shows whether a logical port of the logical switch 3600 has a logical queue collection for the logical port. In this example, the control application 3780 first creates a logical queue collection identifier "LQC1" for the logical queue that the user wants to create. The control application 3780 updates the entry in the input table 3735 for the logical port 1 to indicate that the logical queue collection identifier is created and associated with the logical port 1.

Upon creation of the logical queue collection identifier for the logical queue (i.e., for the logical port 1), the rules engine 3780 performs table mapping operations to modify the input table 3736. The input table 3736 shows whether a logical queue collection identifier is associated with a logical queue identifier. The control application 3780 creates a logical queue identifier "LQ1" as the user has specified. The control application 3780 updates the input table 3736 to indicate the logical queue collection identifier LQC1 is related to the logical queue identifier LQ1.

The control application 3780 also updates the input table 3737, which has a list of logical queue identifiers of the logical switch 3600 and each logical queue's minimum and the maximum bitrates. The control application 3780 creates an entry in the input table 3737 for the logical queue LQ1 having the minimum bitrate "A" and the maximum bitrate "B" that the user has specified. Based on the updates to the input tables 3735-3737, the rules engine 3715 performs table mapping operations.

The fourth stage 3704 shows the result of the table mapping operations performed by the rules engine 3715. As shown, the rules engine has modified and/or created an output table 3738. The table 3738 is a table that specifies logical actions to be performed on a packet coming into the logical switch 3600 through the logical port 1 by the logical switch 3600. The entry 3739 of the output table 3738 indicates that logical switch 3600 should accept the packet and set a logical queue for the logical port 1 (i.e., associate a logical queue with the logical port 1) if the packet has correct logical context and has a source mac address that matches to the logical port 1's default MAC address. The entry 3740 of the output table 3738 indicates that the logical switch 3600 should drop the packet if it does not match the conditions specified in the entry 3739.

The fifth stage 3705 shows that the control application has sent the output table 3738 to the input tables 3756 of the virtualization application 3755. Based on a function table (not shown), the rules engine 3757 performs table mapping operations to unpack the table 3738. In some embodiments, unpacking a table means specifying a physical action (i.e., an action that a managed switching element, which has a port to which the logical port is mapped, is to perform) for each logical action specified in the table. The table 3741 shows the unpacked logical actions of the table 3738. The entry 3742 specifies that the matching physical action for setting a logical queue is setting a physical queue with the minimum and maximum bitrates "A" and "B." The entry 3743 specifies that setting context to the next context (i.e., moving to the next operation of the logical processing pipeline) is the matching physical action of the logical accept action. The entry 3744 specifies that the managed switching element should drop the packet when the logical switch's action is dropping the packet.

Once unpacking is done, the rules engine 3755 performs table mapping actions to pack the unpacked table. In some embodiments, packing an unpacked table means gathering all physical actions that match the logical actions in an entry of a table that was originally unpacked. The sixth stage 3706 shows that the table 3746 that results from packing has an expressions column that is identical to the expressions column of the table 3738 that was originally unpacked. Each entry of the table 3746 includes a set of physical actions that matches the set of logical actions specified for the corresponding entry in the table 3738. Thus, the table 3746 specifies all physical actions to be performed on a packet coming into the managed switching element through the port to which the logical port 1 is mapped. The rules engine performs table mapping operations to generate universal flow tables.

The seventh stage 3707 shows a table 3745 which is the result of performing the table mapping operations at the previous stage 3706. As shown, the table 3745 has three columns for LDPS identifiers, flow types, and abstract switch identifiers in addition to the table 3746. A LDPS identifier identifies a LDPS. A flow type specifies the type of universal physical control plane data. As mentioned above, one of the types of universal physical control plane data is universal tunnel flow instructions. An abstract switch identifier identifies a channel between two controller instances. The abstract switch identifiers are used to send the data only to those controller instances that are subscribing to this channel to get the data.

The eighth stage 3708 shows a physical controller 3795, which subscribes to the channel of the virtualization application 3755. The virtualization application, along with the control application 3780, is running in a logical controller as mentioned above. The table 3745 is fed into the rules engine 3782 as an input table. The rules engine 3782 performs table mapping operations to determine whether the entries of the table 3745 are implemented by one of the managed switching elements of which the physical controller is a master. In this example, the rules engine 3782 does not filter out the table 3745 and thus puts into the output tables 3783 as shown in the ninth stage 3709.

At this stage 3709, the physical controller 3795 sends the output table 3745 to all chassis controllers which subscribe to a channel of the physical controller 3795 to get data from the physical controller.

The next stage 3710 shows a chassis controller 3785 which subscribes to a channel of the physical controller 3795. In this example, the chassis controller 3785 manages the managed switching element 3699. As shown, the table 3745 is fed into the rules engine 3787 of the chassis controller 3785. The rules engine 3787 performs table mapping operations to parse the entries in the universal flow table 3745.

The eleventh stage 3711 shows a table 3789, which includes entries for specifying a set of actions to be performed by the managed switching element that has a port to which the logical port 1 is mapped. Specifically, physical actions, "actions before," and "actions after" represent the operations in a logical processing pipeline that the managed switching element is to perform. Also, some of these actions are expressed in terms of identifiers that are not specific to the managed switching element that the chassis controller 3785 is managing. In other words, the entries in the table 3789 have not been customized by the chassis controller. The rules engine 3787 performs table mapping operations to generate several requests to pass down to the managed switching element 3699 that the chassis controller 3785 is managing. The generated requests are shown in the next stage 3712. These requests are in separate tables 3791 and 3792. The table 3791 includes a request to create a queue collection for the PIF 1 of the host 3615 (not shown). The table 3792 includes a request to create a queue with the minimum and maximum bitrates of "A" and "B." The chassis controller 3785 sends the requests to the managed switching element 3699. In some embodiments, these requests are sent over a configuration channel established between the chassis controller 3785 and the managed switching element 3699.

The next stage 3713 shows that the managed switching element 3699 sends a physical queue identifier (not shown) and a physical queue collection identifier (not shown) that are created for a physical queue (not shown) and a physical queue collection (not shown) that the managed switching element 3699 has created in response to the requests. This information is sent back to the chassis controller 3785 over the configuration channel in some embodiments. The chassis controller 3785 updates the input tables 3791 and 3792 based on the information received from the managed switching element 3790. In particular, the table 3794 specifies the association of the logical queue identifier LQ1 and the physical queue identifier PQ1. The rules engine 3787 then generates flow entries based on the unpacked flows in the table 3789 shown in stage 3711 and the input tables 3793 and 3794.

The fourteenth stage 3714 shows a table 3799 which is the result of the table mapping operations performed at the previous stage 3713. The table 3799 includes flow entries that are expressed in terms of the information that is specific to the managed switching element 3699 that the chassis controller 3785 is managing. The chassis controller 3785 sends these flow entries to the managed switching element 3699 over a switch control channel (e.g., OpenFlow channel). The managed switching element 3699 would then forward the packets coming to the managed switching element 3699 based on the flow entries received from the chassis controller 3785.

3. Port Security

Figure 38:
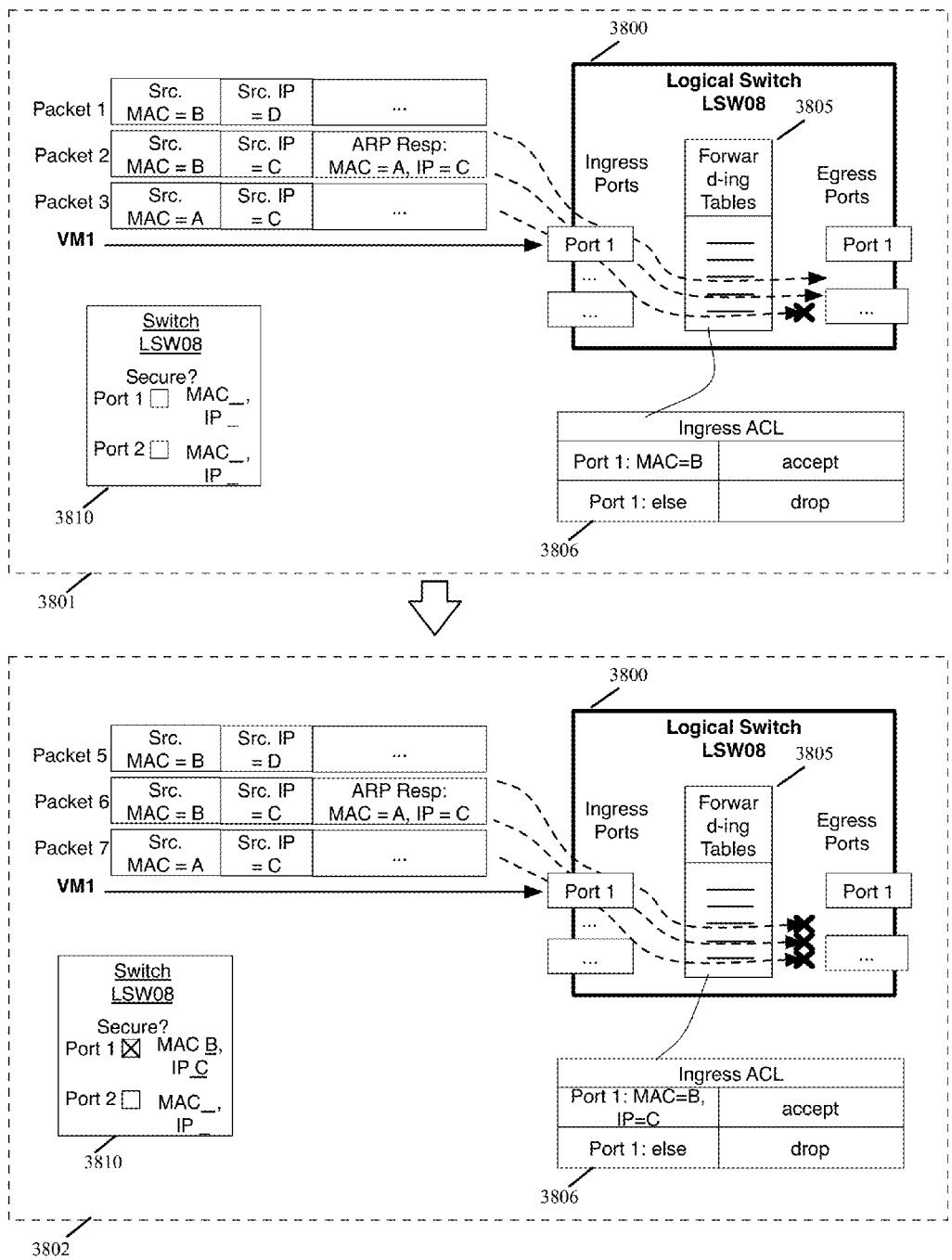
FIG. 38 conceptually illustrates an example of enabling port security for a logical port of a logical switch.
Figure 39A:
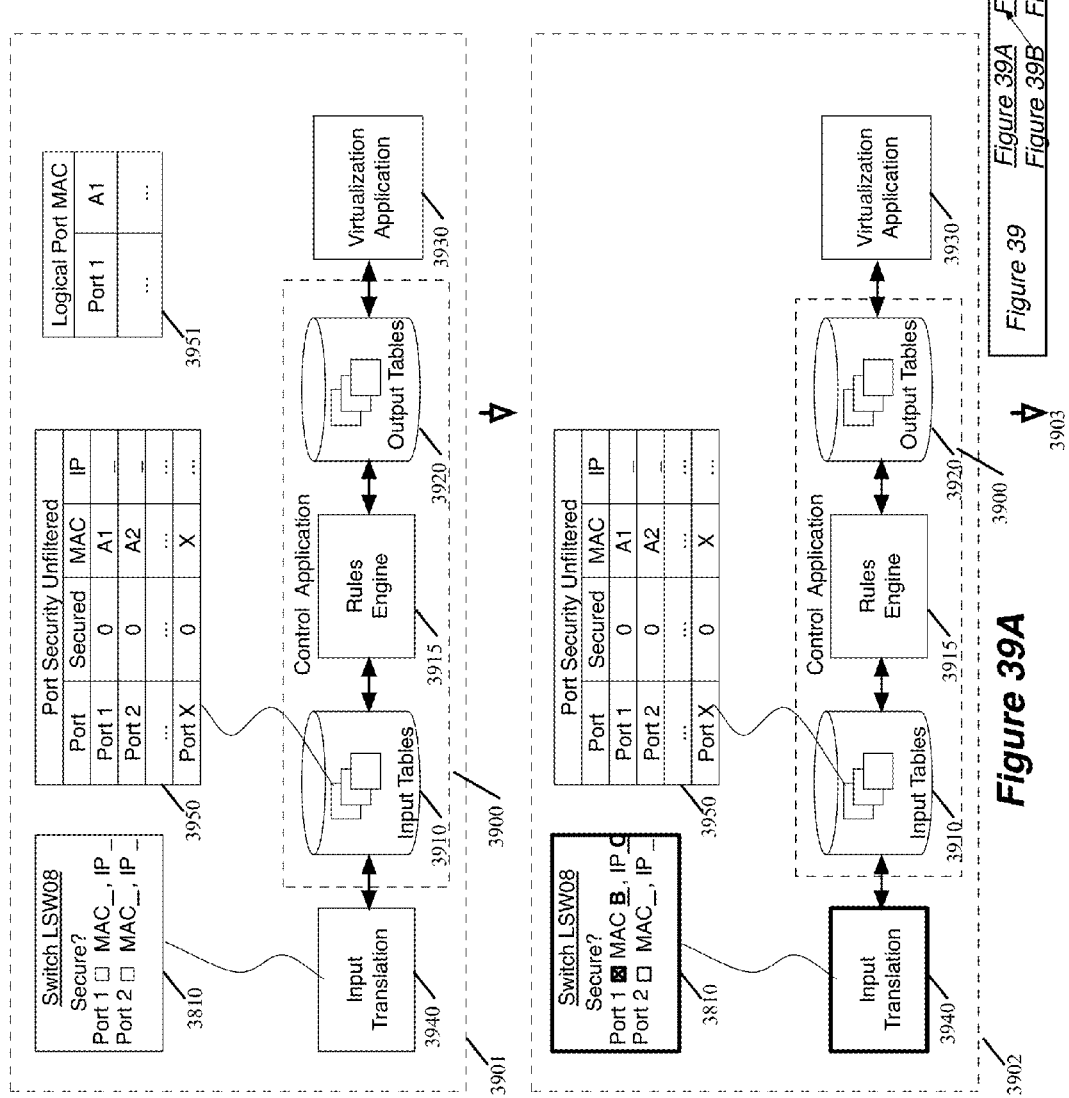
FIGS. 39A, 39B, 39C, and 39D conceptually illustrate an example of generating universal control plane data for enabling port security for a port of a logical switch.
Figure 39B:
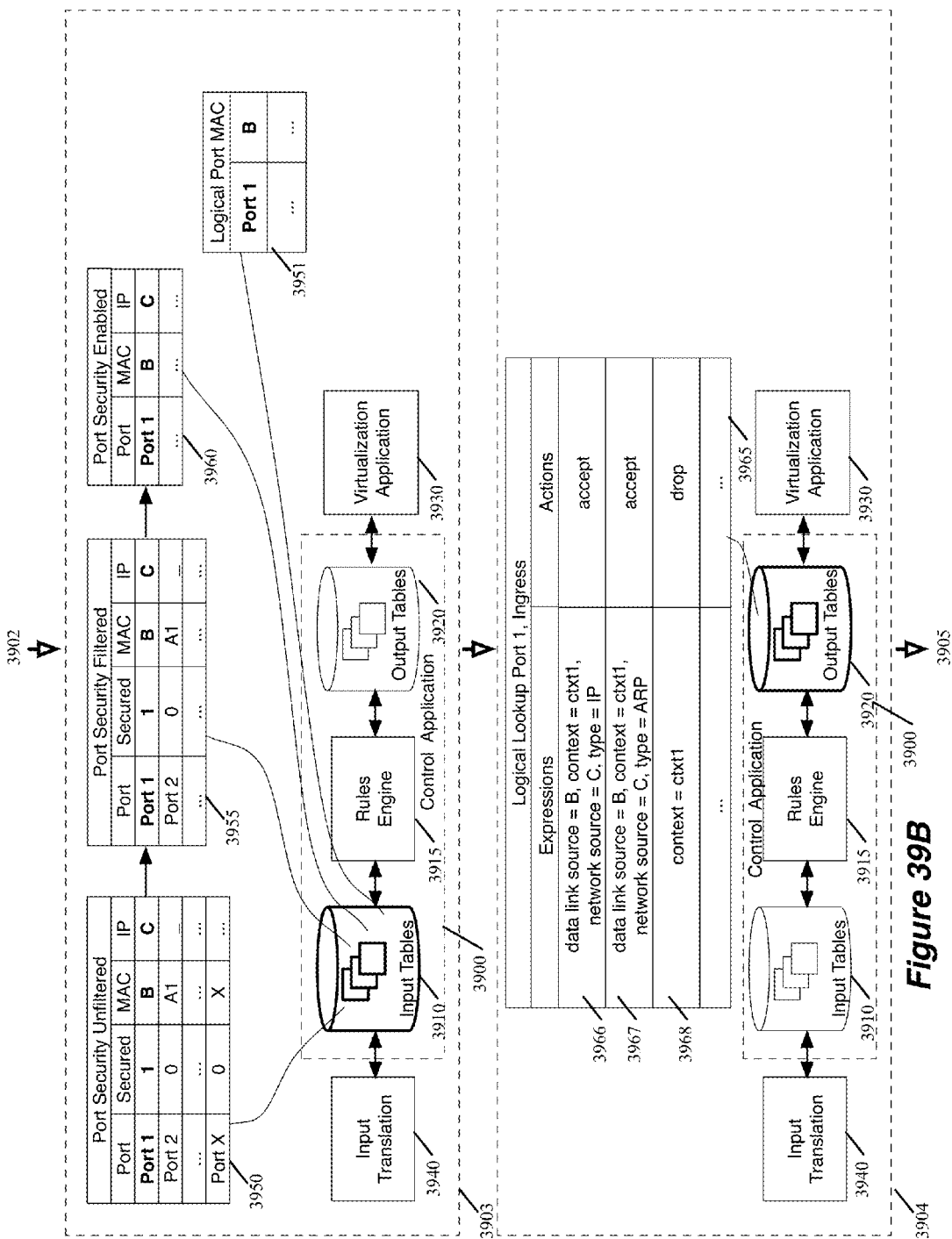
Figure 39C:
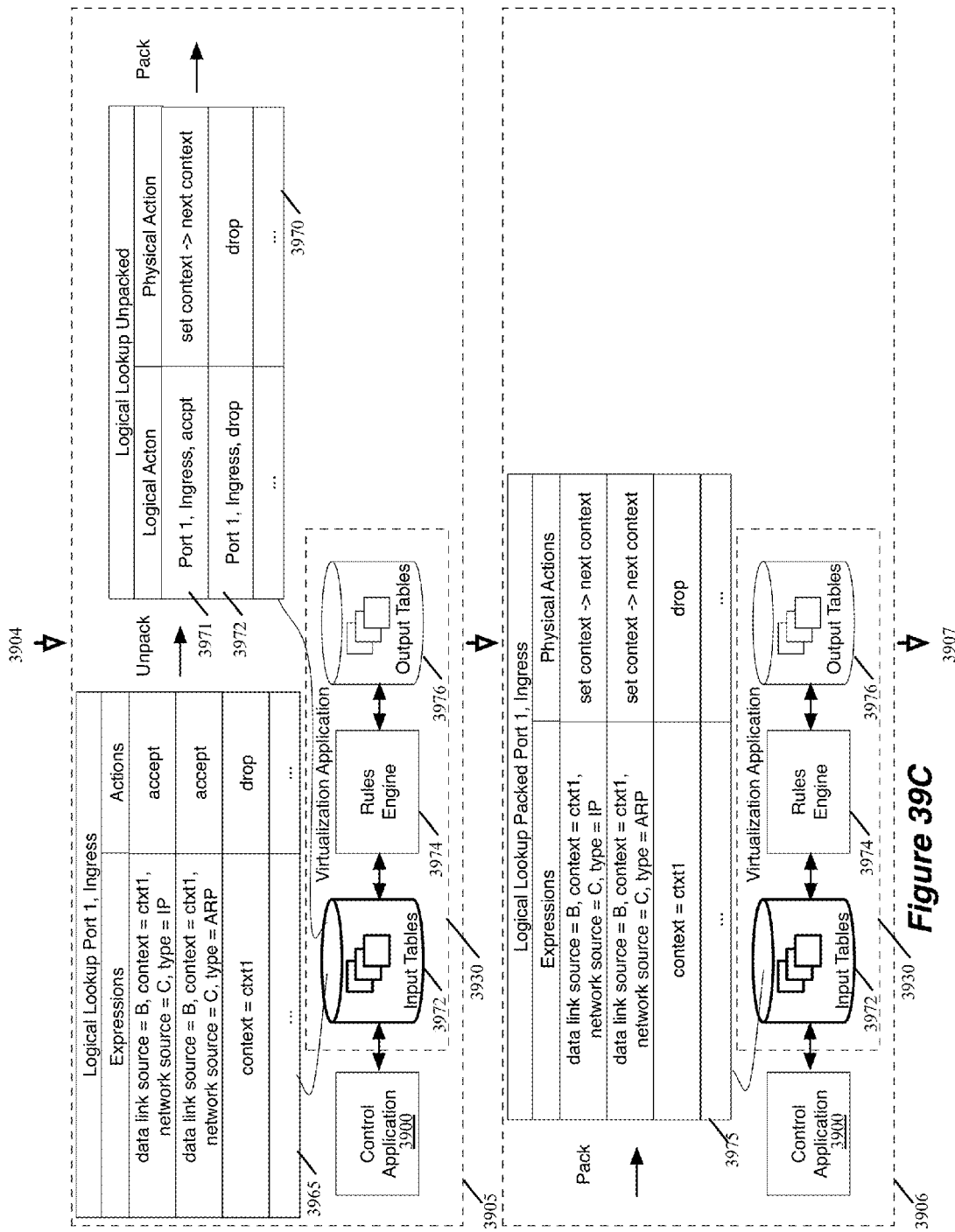
Figure 39D:
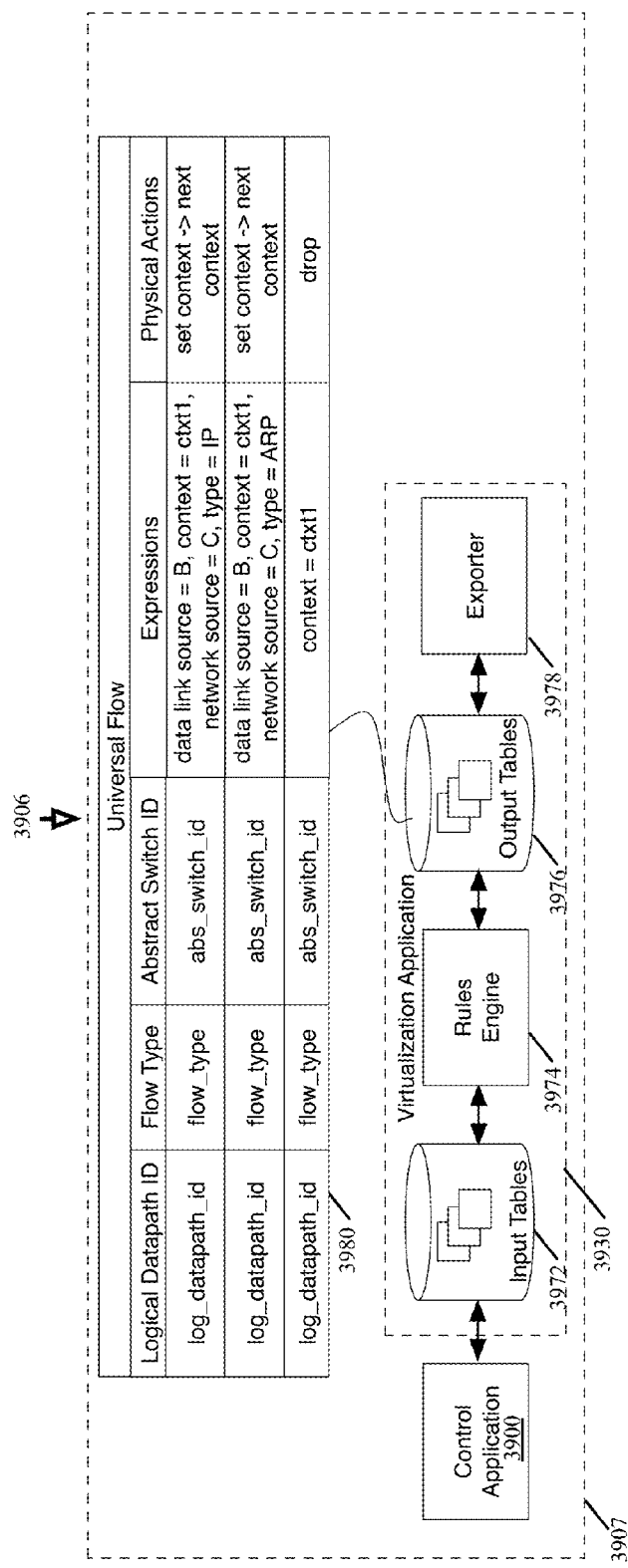

FIG. 38 conceptually illustrates an example of enabling port security for a logical port of a logical switch. Specifically, this figure illustrates the logical switch 3800 at two different stages 3801 and 3802 to show different forwarding behaviors of the logical switch 3800 before and after port 1 of the logical switch 3800 is enabled for port security. Port security in some embodiments is a technique to apply to a particular port of a logical switch such that the network data entering and existing the logical switch through the particular port have certain addresses that the switching element has restricted the port to use. For instance, a switching element may restrict a particular port to a certain MAC address and/or a certain IP address. That is, any network traffic coming in or going out through the particular port must have the allowed addresses as either the source or destination address. Port security may be enabled for ports of switching elements to prevent address spoofing.

As shown, FIG. 38 illustrates that the logical switch 3800 has a set of logical ports including logical port 1. The logical switch 3800 also includes forwarding tables 3805, which include an ingress ACL table 3806 and an egress ACL table among other forwarding tables. FIG. 38 also illustrates a UI 3810, which is similar to the UI 3610 in FIG. 36.

VM1 is a virtual machine that sends and receives network data to and from the logical switch 3800 through port 1. That is, port 1 of the logical switch 3800 is serving both as an ingress port and an egress port for VM1. VM1 has "A" as the virtual machine's MAC address. "A" represents a MAC address in the proper MAC address format (e.g., "01:23:45: 67:89:ab"). This MAC address is a default MAC address assigned to VM1 when VM1 is created. An IP address is usually not assigned to a virtual machine but a MAC address is always assigned to a virtual machine when it is initially created in some embodiments.

The logical switch 3800 performs logical ingress lookups using the ingress ACL table 3806 in order to control the network data (e.g., packets) coming through the ingress ports.

For instance, the logical switch 3800 reads information stored in the header of a packet that is received through an ingress port, looks up the matching flow entry or entries in the ingress ACL table 3806, and determines an action to perform on the received packet. As described above, a logical switch may perform further logical lookups using other forwarding tables that are storing flow entries.

In the first stage 3801, none of the logical ports of the logical switch 3800 is enabled for port security. However, the ingress ACL table 3806 in some embodiments specifies that packets coming through port 1 must have a MAC address that matches a default MAC address, which in this example is "B."

In this example, the logical switch 3800 receives packets 1-3 from VM1 through port 1. Each of packets 1-3 includes in the packet header a source MAC address and a source IP address. Each of packets 1-3 may include other information (e.g., destination MAC and IP addresses, etc.) that the logical switch may use when performing logical lookups. For packet 1, the source MAC address field of the header includes a value "B" to indicate that the MAC address of the sender of packet 1 (i.e., VM1) is "B." Packet 1 also includes in the source IP address field of the header the IP address of VM1 a value "D" to indicate that the IP address of VM1 is "D." "D" represents an IP address in the proper IP address format (e.g., an IPv4 or IPv6 format, etc.). By putting "D" in packet 1 as a source IP address, VM1 indicates that the virtual machine's IP address is "D." However, VM1 may or may not have an IP address assigned to VM1.

Packet 2 includes in packet 2's header "B" and "C" as VM1's MAC and IP addresses, respectively. In addition, packet 2 includes an Address Resolution Protocol (ARP) response with "A" and "C" as VM1's MAC and IP addresses, respectively. "A" represents a MAC address in the proper MAC address format. VM1 is sending this ARP message in response to an ARP request that asks for information about a machine that has a certain IP address. As shown, the MAC addresses in the header of packet 2 and in the ARP response do not match. That is, VM1 did not use the virtual machine's MAC address (i.e., "B") in the ARP response. As shown in the stage 3801, the logical switch 3800 routes packets 1 and 2 from port 1 to the packets' respective egress ports because port security is not enabled and the packets 1 and 2 have source MAC addresses that match the default MAC.

Packet 3 includes in packet 3's header "A" and "C" as VM1's MAC and IP addresses, respectively. The logical switch 3800 drops packet 3 because source MAC address of packet 3 does not match the default MAC address "B".

In the second stage 3802, a user using the UI 3810 enables port 1 of the logical switch 3800 for port security by checking the box in the UI 3810 in this example. The user also sets "B" and "C" as the MAC and IP addresses to which a packet that is coming in or going out through port 1 is restricted. The ingress ACL table 3806 is modified according to the user input. As shown, the ingress ACL table 3806 specifies that the packets coming into the logical switch 3800 must have "B" and "C" as the sender's (i.e., VM1's) MAC and IP addresses, respectively, in the headers of the packets and in the ARP responses if any ARP responses are included in the packets. In other words, VM1 cannot use a MAC address or an IP address that is not the addresses specified in the ACL table 3806.

In the stage 3802, the logical switch 3800 receives packets 5-7 from VM1 through port 1. Packets 5-7 are similar to packets 1-3, respectively, that the logical switch 3800 received from VM1 in the stage 3801. Packets 5-7 have the same source MAC and IP addresses as packets 1-3, respectively. The logical switch 3800 drops all three packets 5-7. The logical switch 3800 drops packet 5 because packet 6's source IP address is "D" which is different than the IP address to which a packet that is coming in through port 1 is restricted (i.e., "C"). The logical switch 3800 drops packet 6 because packet 6's ARP response has "A" as a MAC address which is different than the MAC address to which a packet that is coming in through port 1 is restricted (i.e., "B"). The logical switch 3800 drops packet 6 even though the packet has source MAC and IP addresses in the header that match the addresses to which a packet that is coming in through port 1 is restricted. The logical switch 3800 also drops packet 7 because packet 7 includes "A" as source MAC address in the header, which is different than the MAC address "B."

FIGS. 39A, 39B, 39C, and 39D conceptually illustrate an example of generating universal control plane data for enabling port security for a port of a logical switch. Specifically, these figures illustrate in seven different stages 3901-3907 that a control application 3900 and a virtualization application generate universal control plane data for enabling port security for port 1 of the logical switch 3800 described above by reference to FIG. 38. These figures also illustrate an input translation application 3940 and the user interface 3810.

The input translation application 3940, the control application 3900, and the virtualization application 3930 are similar to the input translation application 1200, the control application 1400, and the virtualization application 1600 described above in Section I, respectively. In this example, the input translation application 3940 runs in an input translation controller, and the control application 3900 and the virtualization application 3930 run in a logical controller.

In the first stage 3901, the ports of the logical switch 3800 are not enabled for port security. As shown, the UI 3810 displays whether the ports of the logical switch 3800, which is identified by an identifier "LSW08," are enabled for port security. The unchecked boxes in the UI 3810 indicate that ports 1 and 2 of the logical switch 3800 are not enabled for port security. In some embodiments, the UI 3810 allows the user to specify one or both of the MAC and IP addresses to which a particular port of the switching element is to be restricted. However, in some such embodiments, the particular port of the switching element is by default restricted to a default MAC and IP address pair.

The input table 3950 includes a list of all the logical ports of all the logical switches that the control application 3900 is managing. For each of the logical ports, the input table 3950 indicates whether the port is port security enabled. The table 3950 also lists MAC addresses of these logical ports. In some embodiments, the table 3950 lists default MAC addresses of the logical ports to which these ports are restricted by default. The table 3950 also lists IP addresses of the logical ports. The table 3950 is deemed "unfiltered," meaning this table includes all the logical ports of all the logical switches that different users manage. The input table 3951 lists default MAC addresses of all logical ports of all the logical switches that the control application 3900 is managing.

In the second stage 3902, the user provides input to indicate that user wishes to enable port 1 of the logical switch 3800 for port security. As shown, the user has checked a box next to "port 1" in the UI 3810 and entered "B" and "C" as the MAC and IP addresses, respectively, to which to restrict port 1. "B" is in the proper MAC address format and "C" is in the proper IP address format. The input translation application 3940 receives the user's inputs in the form of API calls. The input translation application 3940 translates the user's inputs into data that can be used by the control application 3900 and sends the translated inputs to the control application 3900 because the logical controller on which the control application 3900 runs is the master of the LDPS that the user is managing.

The third stage 3903 shows that the control application 3900 has updated input tables 3910 based on the inputs. Specifically, the table 3950 is updated to indicate that the logical port 1 is enabled for port security and is restricted to a MAC address "B" and an IP address "C." Based on this update to the table 3950, the rules engine 3915 performs table mapping operations to filter the entries of the table 3950 to filter out entries for the logical ports of the logical switches that the users other than the user that provided the inputs manage. The table 3955 includes the filtered result and shows only those logical ports of the logical switch that the user is managing. This in turn causes the table 3960 to be updated. The table 3960 lists only those logical ports of the logical switch that are enabled for port security. The control application 3900 also updates the table 3951 to replace the default MAC address of the logical port 1 with the MAC address that the user has specified.

The fourth stage 3904 shows a table 3965, which shows the result of table mapping operations that the rules engine 3915 performed based on the updates to the input tables 3910. The table 3965 specifies logical actions to be performed on a packet coming into the logical switch 3800 through the logical port 1 by the logical switch 3800. The entry 3966 of the output table 3965 indicates that logical switch 3800 should accept the packet if the packet has correct logical context and has a source mac address and a source IP address that match the MAC and IP addresses to which the logical port 1 is restricted. The entry 3967 indicates that logical switch 3800 should accept the packet if the packet has correct logical context and has an ARP response with a source mac address and a source IP address that match the MAC and IP addresses to which the logical port 1 is restricted. The entry 3968 indicates that the logical switch 3800 should drop the packet that does not match the conditions specified in the entries 3966 and 3967.

The fifth stage 3705 shows that the control application has sent the output table 3965 to the input tables 3972 of the virtualization application 3930. Based on a function table (not shown), the rules engine 3974 performs table mapping operations to unpack the table 3965. The table 3970 shows the unpacked logical actions of the table 3965. The entry 3971 specifies that setting context to the next context (i.e., moving to the next operation of the logical processing pipeline) is the matching physical action of the logical accept action. The entry 3972 specifies that the managed switching element should drop the packet when the logical switch's action is dropping the packet.

Once unpacking is done, the rules engine 3974 performs table mapping actions to pack the unpacked table. In some embodiments, packing an unpacked table means gathering all physical actions that match the logical actions in an entry of a table that was originally unpacked. The sixth stage 3906 shows that the table 3975 that results from packing has an expressions column that is identical to the expressions column of the table 3965. Each entry of the table 3975 includes a set of physical actions that matches the set of logical actions specified for the corresponding entry in the table 3965. Thus, the table 3975 specifies all physical actions to be performed on a packet coming into the managed switching element through the port to which the logical port 1 is mapped. The rules engine performs table mapping operations to generate universal flow tables.

The seventh stage 3907 shows a table 3980 which is the result of performing the table mapping operations at the previous stage 3906. The virtualization application 3930 will send this table 3980 to a physical controller (not shown) that manages the managed switching elements that implement the logical switch 3800. The physical controller will then pass this table 3970 to each chassis controller (not shown) that manages one of those managed switching elements in some embodiments. The chassis controller will customize these universal flows. However, in some embodiments, the flows that are customized from the universal flows for enabling port security will be identical to the universal flows.

IV. Scheduling

In computer networking, a network control plane computes the state for packet forwarding ("forwarding state"). The forwarding state is stored in the forwarding information base (FIB) of a switching element (such as a router, a physical switch, a virtual switch, etc.). The forwarding plane of the switching element uses the stored forwarding state to process the incoming packets at high-speed and transmit the packets to a next-hop of the network towards the ultimate destination of the packet. The realization of the forwarding state computation can be either distributed or centralized in nature. When a distributed routing model is used to compute the state, the switching elements compute the state collectively. In contrast, when a centralized computational model is used to compute the state, a single controller is responsible for computing the state for a set of switching elements. These two models have different costs and benefits.

When the network control plane (e.g., a control application) receives an event requiring updates to the forwarding state, the network control plane initiates the re-computation of the state. When the state is re-computed, the network control plane (which may be implemented by one controller or several controllers) pushes the updated forwarding state to the forwarding plane of the switching element(s). The time it takes to compute and update the state is referred to as "network convergence time."

Regardless of the way the computation is performed, the forwarding state in the forwarding plane has to be correct in order to guarantee that the packets reach the intended destinations. Any transient inconsistency of the forwarding state during the network convergence time may cause one or more switching elements to fail to forward the packets towards the intended destinations and may thus result in packet loss. The longer it takes to compute, disseminate, and apply any forwarding state updates to the switching elements that use the forwarding state, the longer the window for inconsistencies will become. As the window for inconsistencies becomes longer, the end-to-end packet communication service for the users of the network will degrade accordingly.

For this reason, some embodiments of the invention carefully account for updates to the forwarding state. A network event may require immediate actions by the control plane. For instance, when a link carrier goes down, the control plane has to re-compute the forwarding state to find an alternative link (or route) towards the destinations of the packets. During the time period after the network event occurs and before the network has converged to the new, updated forwarding state, the network users will experience a partial or total loss of connectivity.

To address the loss of connectivity issue, some embodiments use "proactive preparation" processes, which have the network control plane pre-compute alternative or backup forwarding states for the forwarding plane based on the conditions under which the control plane operates. With the alternative forwarding states for the forwarding plane, the switching elements using the forwarding plane may correctly forward the packets while the control plane is updating the forwarding state for a network event. For instance, in the case of a link going down, the forwarding plane could be prepared in advance with the alternative, backup path(s) for re-directing the packets. While proactive preparations may introduce significant computation load for the control plane, proactive preparations can remove the requirement of instantaneous reaction to avoid the forwarding plane failures.

Even with proactive preparations, the network control plane still needs to address several other issues in applying the forwarding state updates to the forwarding plane. These issues are addressed below. However, before addressing these issues, the network control system of some embodiments should be first described. Some embodiments of the invention provide a novel network control system that is formed by one or more controller instances for managing several managed switching elements.

A. Localizing the State Computation in Time

Traditionally, the switching elements offer no transactional updates for updating the forwarding state in the FIB. Even when a centralized computation model is used, the need to distribute the transactions might result in undue complexity because of the distributed chassis architecture of the switching elements or the physical separation of the computational and forwarding switching elements.

Without resorting to distributing transactions that are undesirable, the network control system carefully schedules pushing the forwarding state updates to the managed switching elements because the overall forwarding state for the forwarding plane in the managed switching elements may still remain inconsistent after a single update is pushed to the forwarding plane. Thus, the network control system pushes all the related updates together to minimize the window of inconsistency and the overall experienced end-user downtime in her networking services.

The network control system in some embodiments utilizes the isolation of the virtualization. That is, since the network forwarding states of individual LDP sets remain isolated from each other, as do those of individual logical networks, the network control system computes any updates on different LDP sets independently. Hence, the network control system can dedicate all the available resources to a single LDPS (or a few LDP sets) and the datapath(s)' state re-computation, and thereby finishes the state computation for all the related forwarding states faster.

Localizing the computation still offers benefits even when the computation of the forwarding state updates takes long enough to warrant aggregating updates to the forwarding plane in order to minimize the experienced downtime in packet forwarding. For instance, there will be less data to buffer and aggregate in total, as the updates are produced only for one LDPS, or a few LDP sets, at a time.

In this manner, the network control system effectively delays reacting to network events for some of the LDP sets affected by the network events. However, when the network control system reacts to a particular event, the network control system can complete the computation of all the resulting state updates as quickly as possible by focusing on a particular LDPS affected by the particular event. Described at a high-level, the network control system has to factor the network virtualization when scheduling the computation of the forwarding state updates.

B. Network Virtualization-Aware Scheduler

In a network control system of some embodiments, a single controller instance can be responsible for computing state updates for several LDP sets. As with any network control plane, the controller instance may have to re-compute and update the forwarding state for all the affected LDP sets when the controller instance receives an event from the user of the controller or from the network. As discussed above, a simple way of updating the forwarding state would be computing updates for all affected LDP sets in parallel.

To minimize the per LDPS convergence time, some embodiments localize the computation in time. To accomplish this, the controller instance of some embodiments has a scheduler that takes a unit of virtualization (e.g., a LDPS) in consideration in two ways. First, on an occurrence of a network event, the controller instance classifies the event to determine the LDPS that the event affects. Second, as the computation for the event begins, the scheduler does not preempt the computation until the computation for the event completes (i.e., until the LDPS state converges).

In this manner, the controller instance achieves faster convergence times for the given computation context. In addition, as with schedulers in general, the scheduler of the controller can implement various scheduling policies to better match certain high-level requirements. One such policy is giving a preference to a computation that affects physical-only forwarding state because a physical-only forwarding state may affect multiple LDP sets and thus may be more important than the state of any single LDPS. Another such policy is prioritizing a given LDPS over another LDPS in order to process a network event that affects a LDPS with a higher priority first. The prioritization of the LDP sets may reflect the tiered pricing structure of the provided network services in multi-user environments.

C. Scheduling Considerations Beyond a Single Controller

The considerations of the scheduling extend beyond a single controller instance when solutions that split the computation of the forwarding state over multiple controller instances for improved scaling are applied. For instance, a controller instance may prepare the state in the first stage, while in the second stage other controller instances consume the results of the first stage. That is, each of the controller instances computes for a slice of the overall final forwarding state.

Similarly, the computation of the forwarding state may span over a controller instance and several switching elements when the switching elements perform computation of the forwarding state prepared by the controller instance. For instance, spanning the computation of the forwarding state may be necessary when the forwarding state is expressed in universal physical control plane data.

In the case of a controller instance failing, the forwarding state computation may take longer than the time it would have taken without the failure. Therefore, any switching element or controller instances consuming the state updates from a previous stage should not use the state updates until the initial re-computation has converged or completed. To prevent the use of the state updates until the convergence of the initial re-computation, the scheduler of the state-computing controller instance informs, through an out-of-band communication channel, any consumers of the state updates about the convergence for a given LDPS. By delaying the consumption and computation of the subsequent state until the computation of the state from the earlier stage is completed, the controller instances involved in the computation of the states minimize the possible downtime for the network services.

When no controller instance fails, the state re-computing controller instance computes state updates for one virtualization unit (e.g., a LDPS) at a time and feeds the state updates to any switching element or controller that consumes the state updates. While the volume of the state updates for any given LDPS may be relatively modest when there is no controller instance failure, multiple controller instances at one stage of the computation and multiple consumers of a next stage of the computation share a communication channel. For instance, multiple computational processes for multiple LDP sets might operate concurrently in order to exploit all the processing power of the modern multi-core CPUs.

When computations for multiple LDP sets are being performed, the reach of the scheduling has to extend into the communication channel itself. Specifically, when computations for multiple LDP sets are not being performed, the channel sharing could introduce convergence delays as the transmission of the state updates for a single LDPS could be effectively preempted. This may result in an extended downtime of the network services. To address this problem, the scheduler factors the delays in the scheduling policy. That is, such a policy will not start the transmission of queued updates for a single LDPS until the computation for the LDPS has converged. Alternatively, a policy will start the transmission of the updates but not preempt before the convergence occurs.

The above-described techniques for temporally localizing the computation of forwarding state updates avoid an explicit, heavyweight synchronization mechanism between the computation processes of multiple LDP sets across network elements.

D. Schedulers and Channel Optimizers

The controllers of a network control system of some embodiments use schedulers and/or channel optimizers to minimize the network convergence time. A scheduler of a controller instance in some embodiments schedules updates to the input tables in such a manner that the n Log table mapping engine can process updates related to a LDPS together. A channel optimizer of some embodiments optimizes the use of the channels established between controller instances when sending updates between controller instances.

Figure 40:
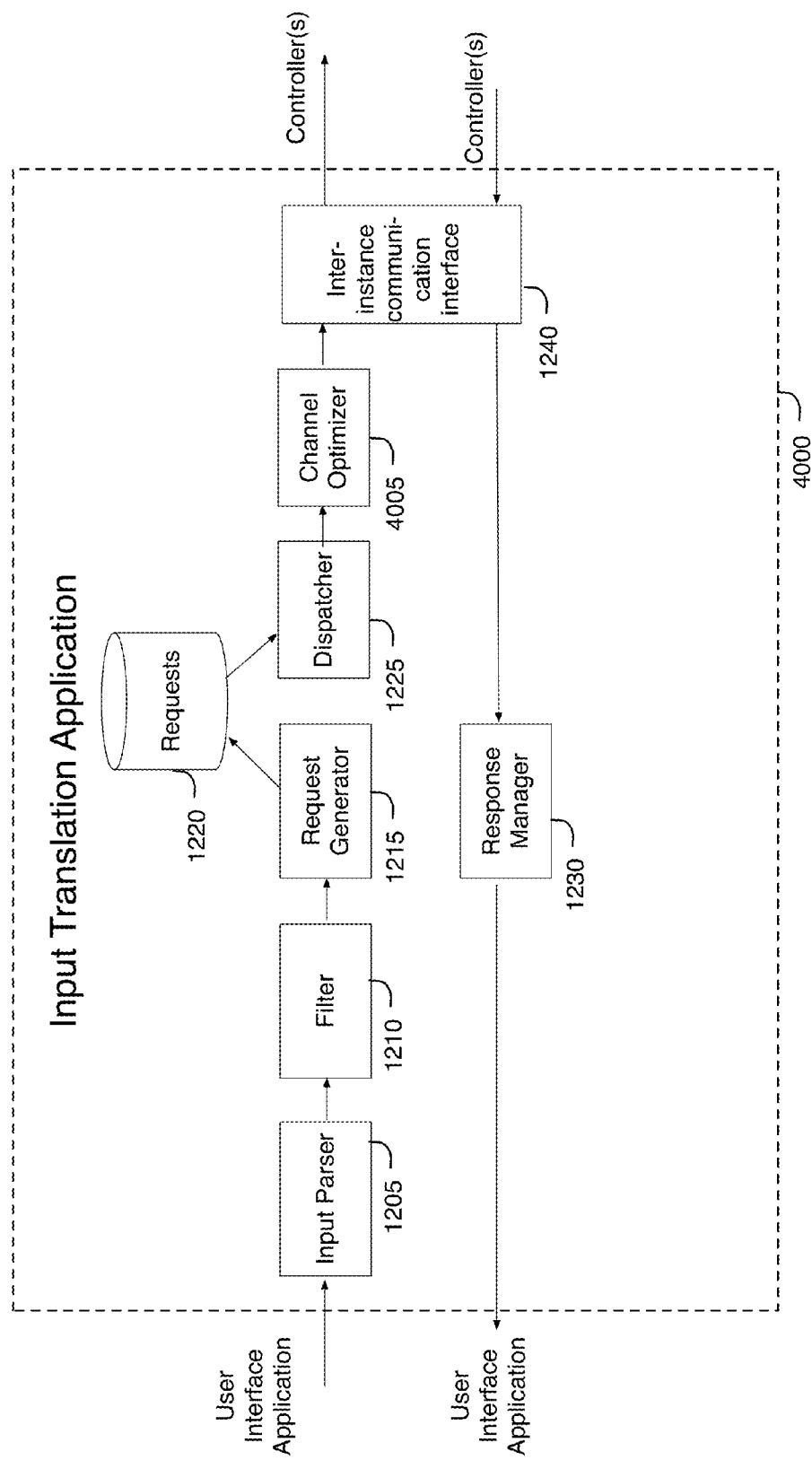
FIG. 40 conceptually illustrates software architecture for an input translation application.

FIG. 40 conceptually illustrates software architecture for an input translation application 4000. The input translation application 4000 runs in an input translation controller in some embodiments. The input translation application 4000 is identical with the input translation application 1200 in FIG. 12, except that the input translation application 4000 additionally includes a channel optimizer 4005.

As described above, the dispatcher 1225 sends the requests generated by the request generator 1215 to one or more controller instances. The dispatcher 1225 uses a communication channel established with a particular controller instance by the inter-instance communication interface 1240 to send the requests for the particular controller. In some embodiments, the dispatcher 1225 sends the requests as the requests arrive from the request generator 1215. In some of these embodiments, each request is sent as an RPC (remote procedure call) over the channel. Therefore, the dispatcher would have to make as many RPCs as the number of the requests.

In some embodiments, the channel optimizer 4005 minimizes the number of RPCs by batching up the requests to be sent over an RPC channel. Different embodiments use different criteria to batch up the requests. For instance, the channel optimizer 4005 of some embodiments makes an RPC only after a certain number (e.g., 32) of requests are batched for a communication channel. Alternatively or conjunctively, the channel optimizer 4005 of some embodiments batches up requests that arrived for a certain period of time (e.g., 10 milliseconds).

Figure 41:
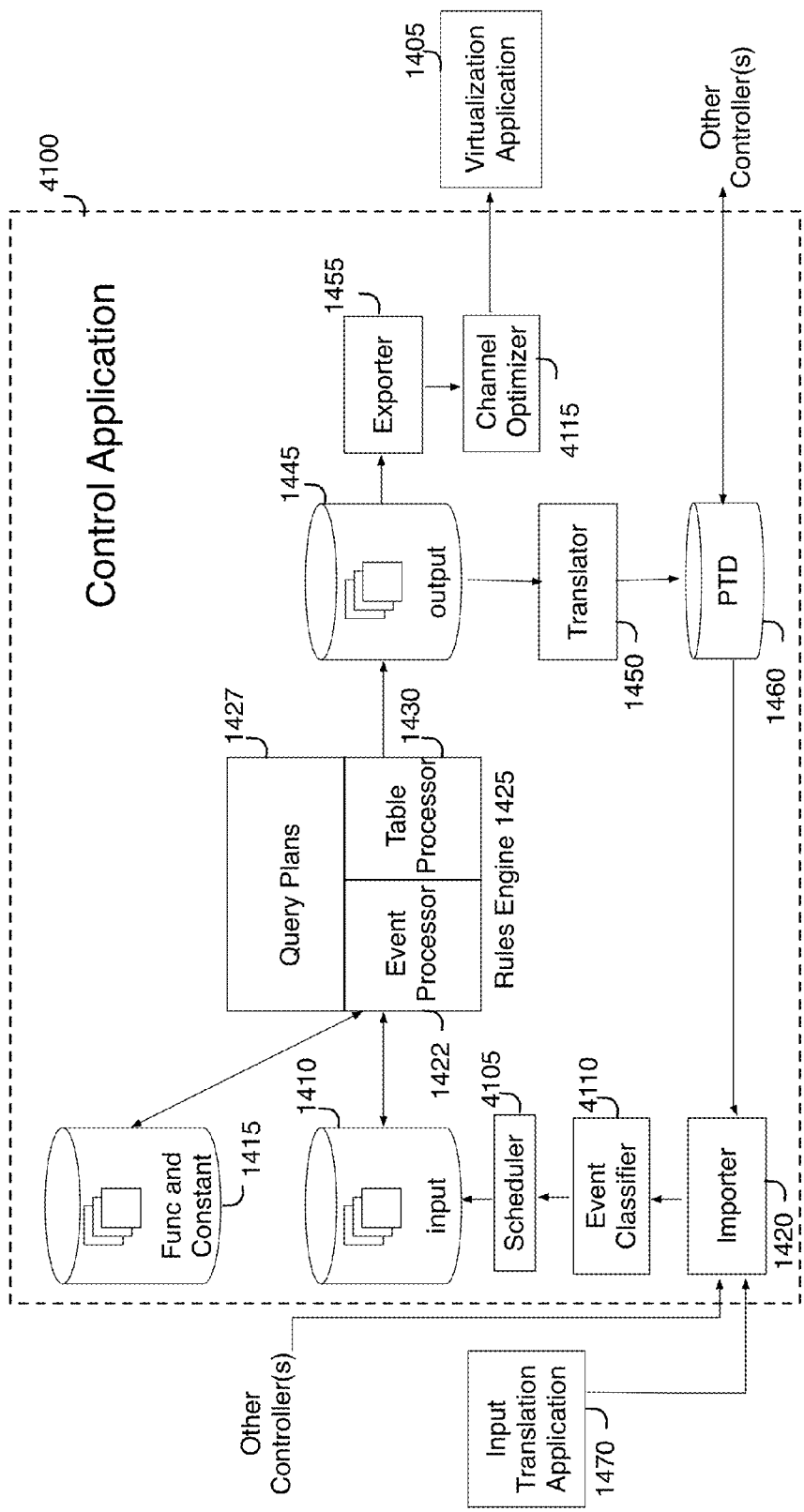
FIG. 41 conceptually illustrates software architecture for a control application.

FIG. 41 conceptually illustrates software architecture for a control application 4100. The control application 4100 runs in a controller in some embodiments. The control application 4100 is identical with the control application 1400 in FIG. 14, except that the control application 4100 additionally includes a scheduler 4105, an event classifier 4110, and a channel optimizer 4115.

As described above, the importer 1420 interfaces with a number of different sources of input event data and uses the input event data to modify or create the input tables 1410. In some embodiments, the importer 1420 does not modify or create the input tables 1410 directly. Instead, the importer 1420 sends the input data to the event classifier 4110.

The event classifier 4110 receives input event data and classifies the input event data. The event classifier 4110 of some embodiments classifies the received input event data according to the LDPS that the input event data affects. The input event data affects a LDPS when the input event data is about a change in a logical switch for the LDPS or about a change at one or more managed switching elements that implement the LDPS. For instance, when the LDPS specifies a tunnel established between two network elements, the input event data that affects the LDPS are from any of the managed switching elements that implement the tunnel. Also, when the user specifies input event data to define or modify a logical switch defined by LDPS data, this input event data affects the LDPS. In some embodiments, the event classifier 4110 adds a tag to the input event data to identify the LDPS that the input event data affects. The event classifier 4110 notifies the scheduler of the received input event data and the classification (e.g., the tag identifying the LDPS) of the input event data.

The scheduler 4105 receives the input event data and the classification from the event classifier 4110. In some embodiments, the scheduler 4105 communicates with the rules engine 1425 to find out whether the rules engine 1425 is currently processing the input tables 1415 (i.e., whether the rules engine 1425 is performing join operations on the input tables 1415 to generate the output tables 1445). When the rules engine is currently processing the input tables 1415, the scheduler 4105 identifies the LDPS of those input tables that are being processed by the rules engine 1425. The scheduler 4105 then determines whether the received input event data affects the identified LDPS. When the scheduler 4105 determines that the received input event data affects the identified LDPS, the scheduler 4105 modifies one or more input tables 1415 based on the received input event data. When the scheduler 4105 determines that the received input event data does not affect the identified LDPS, the scheduler 4105 holds the received input event data. In this manner, the scheduler 4105 allows the rules engine 1425 to process all the input event data affecting the same LDPS together while the LDPS is being modified or created.

When the rules engine 1425 is not currently processing the input tables 1415, the scheduler 4105 modifies one or more input tables 1415 based on the oldest input event data that has been held. The scheduler 4105 will be further described below by reference to FIGS. 45-48B.

As described above, the exporter 1455 sends the output event data in the output tables 1445 to one or more controller instances (e.g., when the virtualization application 1405 is running in another controller instance). The exporter 1455 uses a communication channel established with a particular controller instance by an inter-instance communication interface (not shown) to send the output event data for sending to the particular controller. In some embodiments, the exporter 1455 sends the output event data as the exporter detects the output event data in the output tables 1445. In some of these embodiments, each output event data is sent as an RPC (remote procedure call) over the channel. Therefore, the dispatcher would have to make as many RPCs as the number of the output events.

In some embodiments, the channel optimizer 4115 minimizes the number of RPCs by batching up the requests to be sent over an RPC channel. Different embodiments use different criteria to batch up the requests. For instance, the channel optimizer 4115 of some embodiments makes an RPC only after a certain number (e.g., 32) of requests are batched for a communication channel. Alternatively or conjunctively, the channel optimizer 4115 of some embodiments batches up requests that arrived for a certain period of time (e.g., 10 milliseconds).

Figure 42:
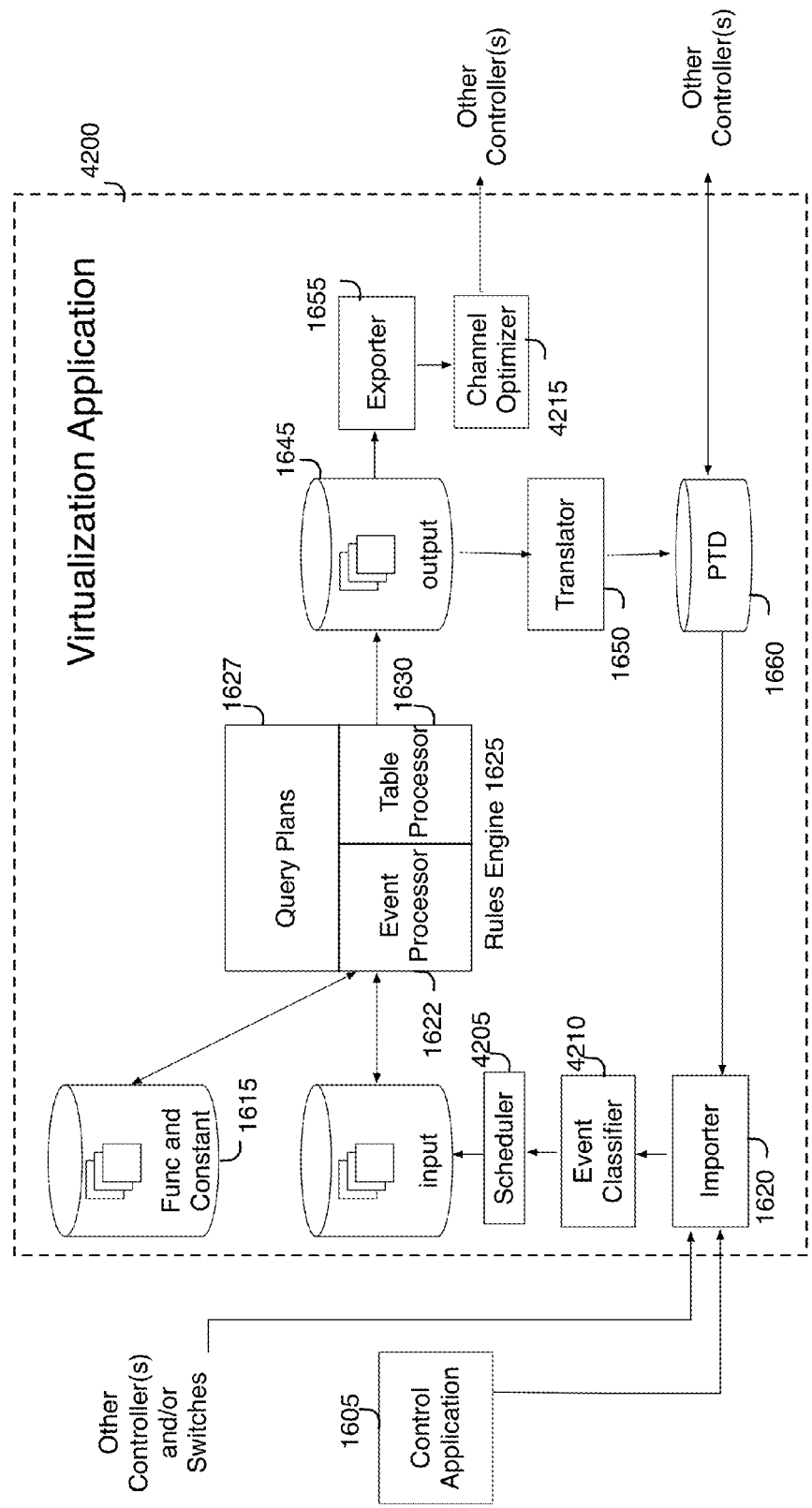
FIG. 42 conceptually illustrates software architecture for a virtualization application.

FIG. 42 conceptually illustrates software architecture for a virtualization application 4200. The virtualization application 4200 runs in a controller in some embodiments. The virtualization application 4200 is identical with the virtualization application 1600 in FIG. 16, except that the virtualization application 4200 additionally includes a scheduler 4205, an event classifier 4210, and a channel optimizer 4215.

As described above, the importer 1620 interfaces with a number of different sources of input event data and uses the input event data to modify or create the input tables 1610. In some embodiments, the importer 1620 does not modify or create the input tables 1610 directly. Instead, the importer 1620 sends the input data to the event classifier 4210.

The event classifier 4210 receives input event data and classifies the input event data. The event classifier 4210 of some embodiments classifies the received input event data according to the LDPS that the input event data affects. The input event data affects a LDPS when the input event data is about a change in a logical switch for the LDPS or about a change at one or more managed switching elements that implement the LDPS. For instance, when the LDPS specifies a tunnel established between two network elements, the input event data that affects the LDPS are from any of the managed switching elements that implement the tunnel. Also, when the user specifies input event data to define or modify a logical switch defined by LDPS data, this input event data affects the LDPS. In some embodiments, the event classifier 4210 adds a tag to the input event data to identify the LDPS that the input event data affects. The event classifier 4210 notifies the scheduler of the received input event data and the classification (e.g., the tag identifying the LDPS) of the input event data.

The scheduler 4205 receives the input event data and the classification from the event classifier 4210. In some embodiments, the scheduler 4205 communicates with the rules engine 1625 to find out whether the rules engine 1625 is currently processing the input tables 1610 (i.e., whether the rules engine 1625 is performing join operations on the input tables 1610 to generate the output tables 1645). When the rules engine is currently processing the input tables 1610, the scheduler 4205 identifies the LDPS of those input tables that are being processed by the rules engine 1625. The scheduler 4205 then determines whether the received input event data affects the identified LDPS. When the scheduler 4205 determines that the received input event data affects the identified LDPS, the scheduler 4205 modifies one or more input tables 1610 based on the received input event data. When the scheduler 4205 determines that the received input event data does not affect the identified LDPS, the scheduler 4205 holds the received input event data. In this manner, the scheduler 4205 allows the rules engine 1625 to process all the input event data affecting the same LDPS together while the LDPS is being modified or created.

When the rules engine 1625 is not currently processing the input tables 1610, the scheduler 4205 modifies one or more input tables 1610 based on the oldest input event data that has been held. The scheduler 4205 will be further described below by reference to FIGS. 45-48B.

As described above, the exporter 1655 sends the output event data in the output tables 1615 to one or more controller instances (e.g., a chassis controller). The exporter 1655 uses a communication channel established with a particular controller instance by an inter-instance communication interface (not shown) to send the output event data for sending to the particular controller. In some embodiments, the exporter 1655 sends the output event data as the exporter detects the output event data in the output tables 1645. In some of these embodiments, each output event data is sent as an RPC (remote procedure call) over the channel. Therefore, the dispatcher would have to make as many RPCs as the number of the output events.

In some embodiments, the channel optimizer 4215 minimizes the number of RPCs by batching up the requests to be sent over an RPC channel. Different embodiments use different criteria to batch up the requests. For instance, the channel optimizer 4215 of some embodiments makes an RPC only after a certain number (e.g., 32) of requests are batched for a communication channel. Alternatively or conjunctively, the channel optimizer 4215 of some embodiments batches up requests that arrived for a certain period of time (e.g., 10 milliseconds).

Figure 43:
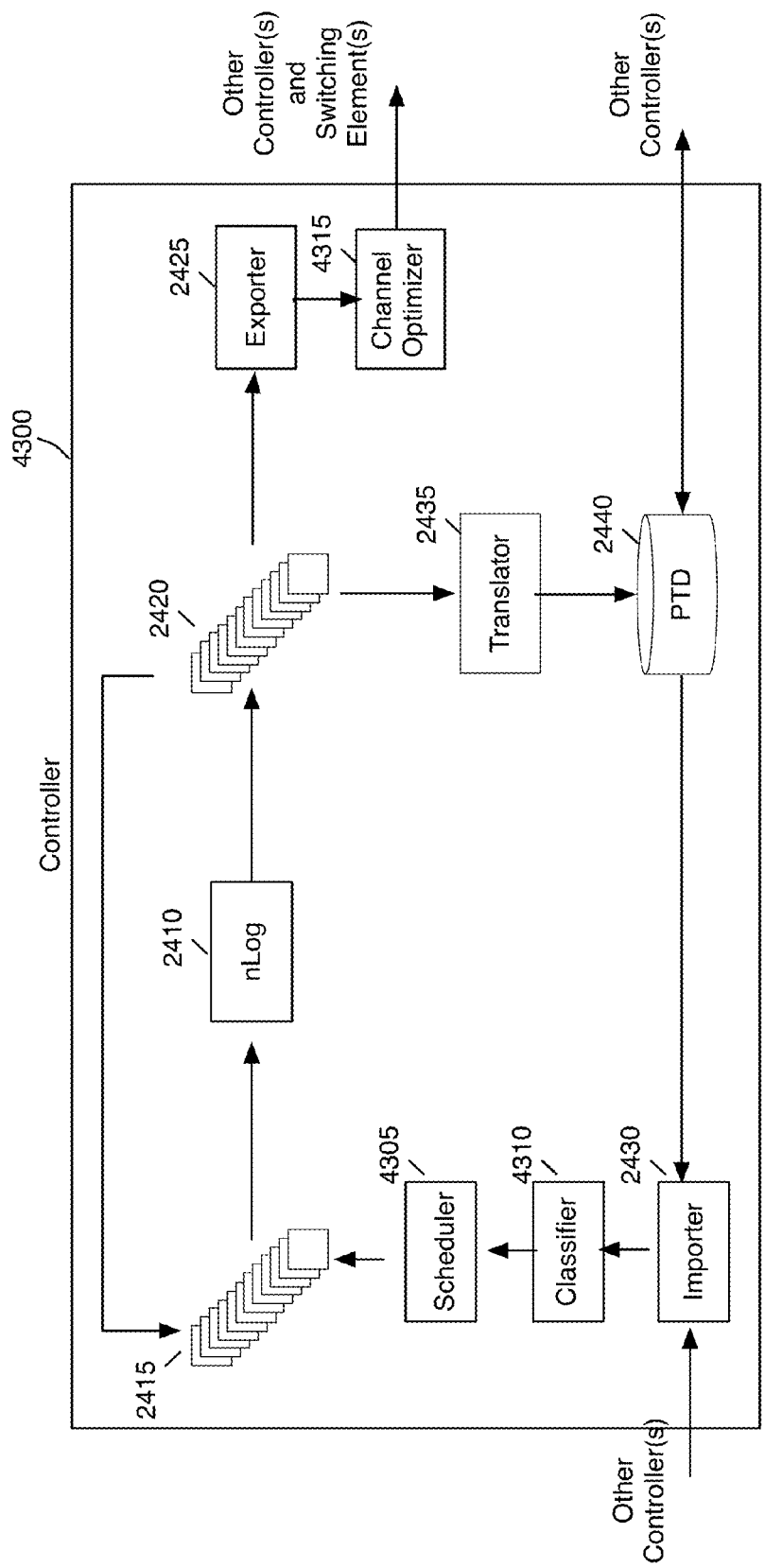
FIG. 43 conceptually illustrates software architecture for an integrated application.

FIG. 43 conceptually illustrates software architecture for an integrated application 4300. The integrated application 4300 runs in a controller in some embodiments. The integrated application 4300 is identical with the integrated application 2400 in FIG. 24, except that the integrated application 4300 additionally includes a scheduler 4305, an event classifier 4310, and a channel optimizer 4315. The scheduler 4305, the event classifier 4310, and the channel optimizer 4315 are similar to the scheduler 4205 and the event classifier 4210, and the channel optimizer 4210, respectively, described above by reference to FIG. 42.

Figure 44:
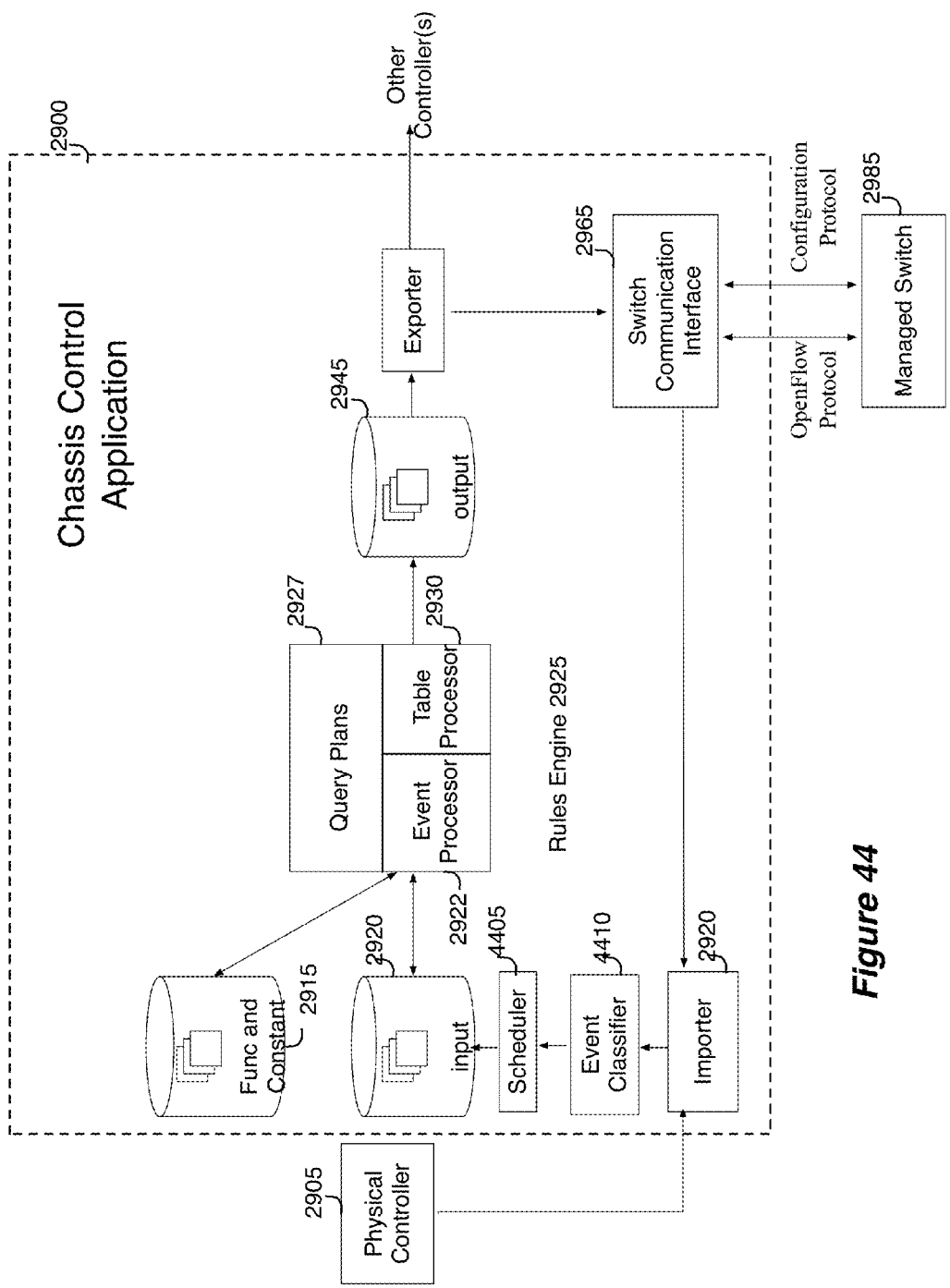
FIG. 44 conceptually illustrates a chassis control application.

FIG. 44 conceptually illustrates a chassis control application 4400. The chassis control application 4400 runs in a controller in some embodiments. The chassis control application 4400 is identical with the chassis control application 2900 in FIG. 29, except that the chassis control application 4400 additionally includes a scheduler 4405, and an event classifier 4410. The scheduler 4405, and the event classifier 4410 are similar to the scheduler 4205 and the event classifier 4210, respectively, described above by reference to FIG. 42.

E. Scheduling Schemes

Figure 45:
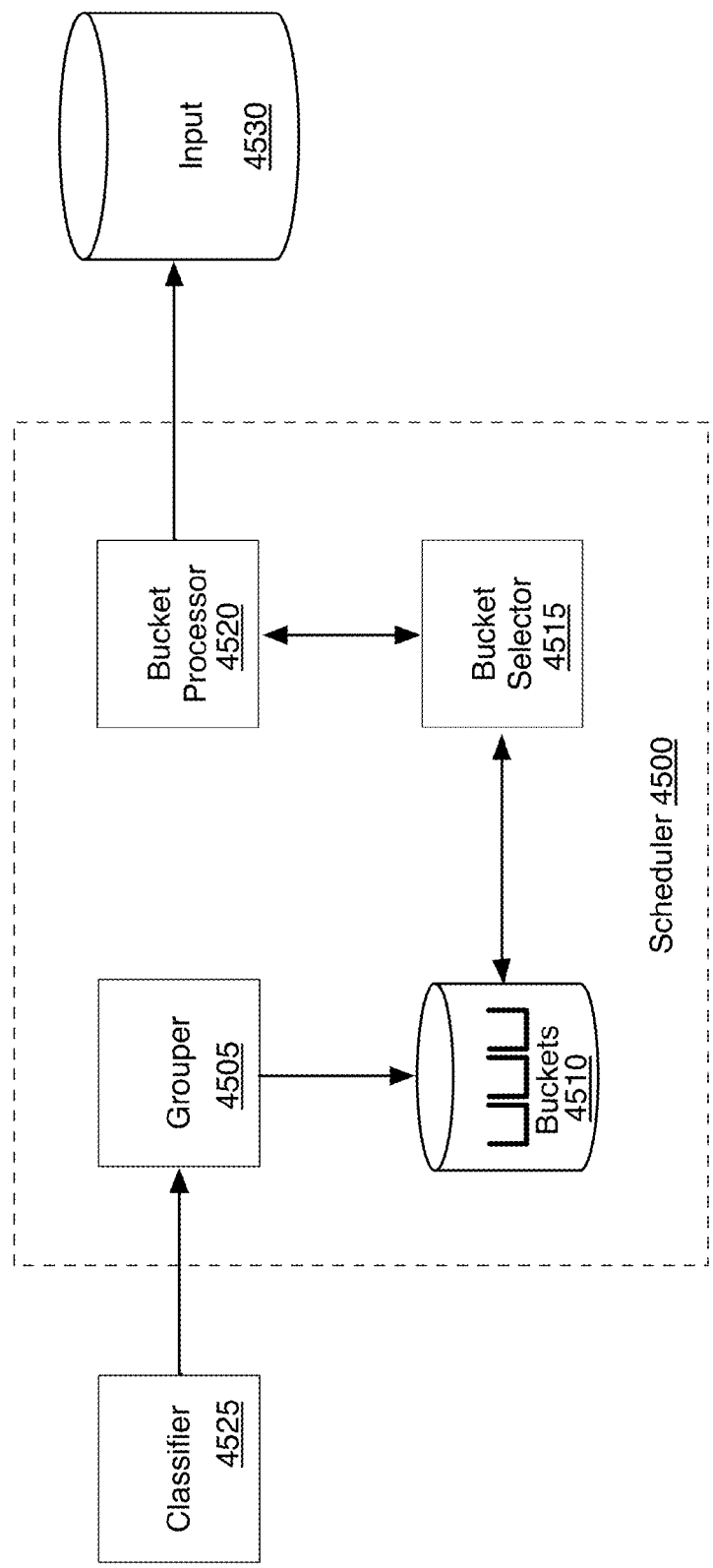
FIG. 45 conceptually illustrates a scheduler of some embodiments.

FIG. 45 conceptually illustrates a scheduler 4500 of some embodiments. Specifically, this figure illustrates that the scheduler 4500 uses buckets to determine whether to modify one or more input tables 4530 based on the input event data received from an event classifier 4525.

FIG. 45 illustrates the classifier 4525, the scheduler 4500, and the input tables 4530. As shown, the scheduler 4500 includes a grouper 4505, buckets 4510, a bucket selector 4515, and a bucket processor 4520. The classifier 4525 and the scheduler 4500 are similar to the classifiers 4110-4410 and the schedulers 4105-4405 in FIGS. 41-44, respectively.

The buckets 4510 is conceptual groupings of input event data coming from the classifier 4525. In some embodiments, a bucket is associated with a LDPS. Whenever the scheduler 4500 receives input event data, the grouper 4505 places the input event data into a bucket that is associated with a LDPS that the input event data affects. When there is no bucket to place the input event data, the grouper 4505 in some embodiments creates a bucket and associates the bucket with the LDPS that the input event data affects.

The bucket selector 4515 selects a bucket and designates the selected bucket as the bucket from which the bucket processor 4520 retrieves events. In some embodiments, the bucket selector selects a bucket that is associated with the LDPS that is currently being processed a rules engine (not shown in this figure). That is, the bucket selector 4515 selects a bucket that contains the input data that affects the LDPS that is being processed by the rules engine.

The bucket processor 4520 in some embodiments removes input event data for one input event from the bucket selected by the bucket selector 4515. The bucket processor 4520 updates one or more input tables 4530 using the input event data retrieved from the bucket so that the rules engine can perform table mapping operations on the updated input tables to modify the LDPS.

When the retrieved input event data is the only remaining event data in the selected bucket, the bucket selector 4500 in some embodiments destroys the bucket or leaves the bucket empty. When the bucket is destroyed, the grouper 4505 re-creates the bucket when an event data that is received at a later point in time affects the same LDPS that was associated with the destroyed bucket. When input event data for an input event comes in and there is no bucket or all buckets are empty, the grouper 4505 places the input event data in a bucket so that the bucket processor 4520 immediately retrieves the input event data and starts updating one or more input tables 4530.

The bucket from which input event data was removed most recently is the current bucket for the scheduler 4500. In some embodiments, the bucket selector 4515 does not select another bucket until the current bucket becomes empty. When input event data for an input event comes in while a LDPS is currently being updated, the grouper 4505 places the input event data into the current bucket if the input event data affects the LDPS being modified. If the input event data does not affect the LDPS that is currently being modified but rather affects another LDPS, the grouper 4505 places the input event data into another bucket (the grouper creates this bucket if the bucket does not exist) that is associated with the other LDPS. In this manner, the bucket processor 4520 uses input event data for as many input events affecting one LDPS as possible.

When the current bucket is destroyed or becomes empty, the bucket selector 4515 designates the oldest bucket as the current bucket. Then, the bucket processor 4520 starts using the input event data from the new current bucket to update the input tables 4530. In some embodiments, the oldest bucket is a bucket that includes the oldest input event data.

Figure 46A:
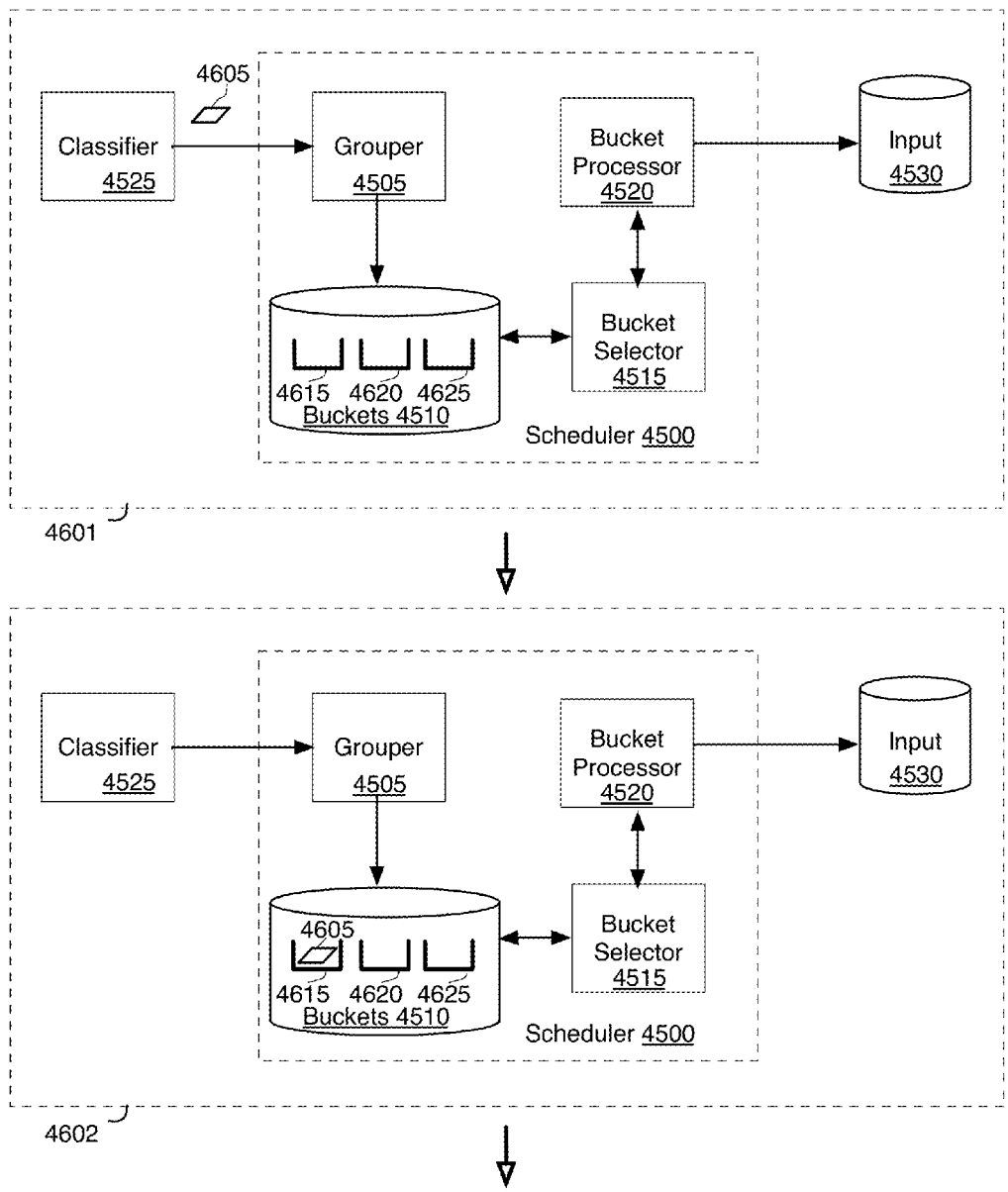
FIGS. 46A and 46B illustrate in three different stages that the scheduler processing of the input event data for an input event.
Figure 46B:
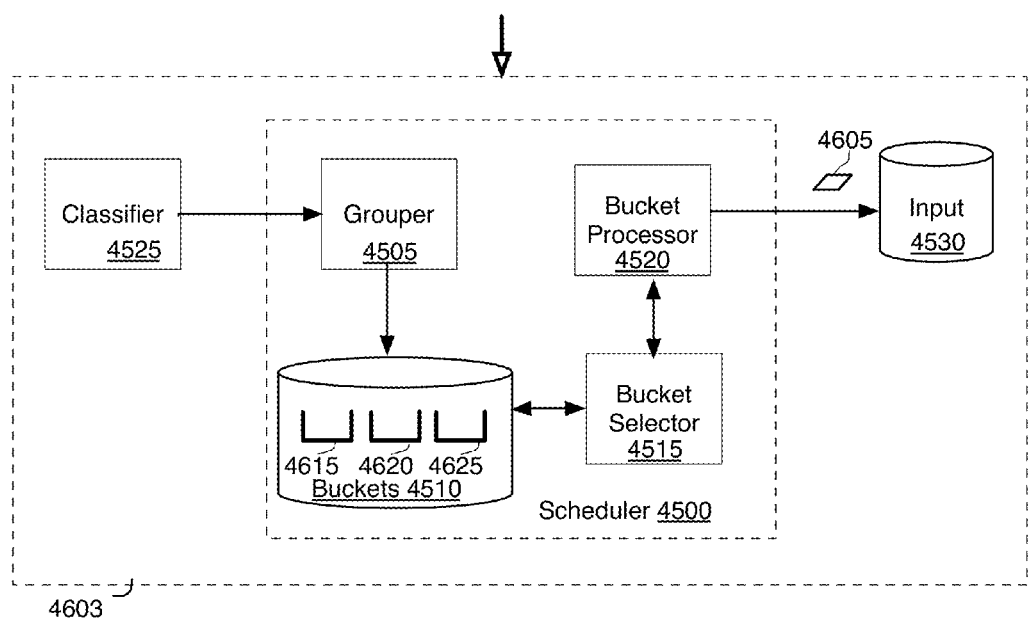

Several exemplary operations of the scheduler 4500 are now described by reference to FIGS. 46A-47B. FIGS. 46A and 46B illustrate in three different stages 4601, 4602, and 4603 that the scheduler 4500's processing of the input event data 4605 for an input event. Specifically, these figures show that the scheduler 4500 processes input event data for an event right away without waiting for more input event data when the scheduler 4500 has no other input event data to process. These figures also illustrate the classifier 4525 and the input tables 4530.

At stage 4601, the classifier sends to the scheduler 4500 the input event data 4605 that the classifier has classified. All the buckets 4510, including buckets 4615, 4620, and 4625, are empty or deemed non-existent because the bucket processor 4520 has just used the last input event data (not shown) from the last non-empty bucket to update the input tables 4530 or because the input event data 4605 is the first input event data brought into the scheduler 4500 after the scheduler 4500 starts to run.

At stage 4602, the grouper 4505 places the input event data 4605 in the bucket 4615 because the bucket 4615 is associated with a LDPS that the input event data 4605 affects. The bucket selector 4515 selects the bucket 4615 so that the bucket processor 4520 can take event input event data from the bucket 4615. At stage 4603, the bucket processor 4520 retrieves the input event data 4605 and uses the input event data 4605 to update one or more input tables 4530.

Figures 47A, 47B:
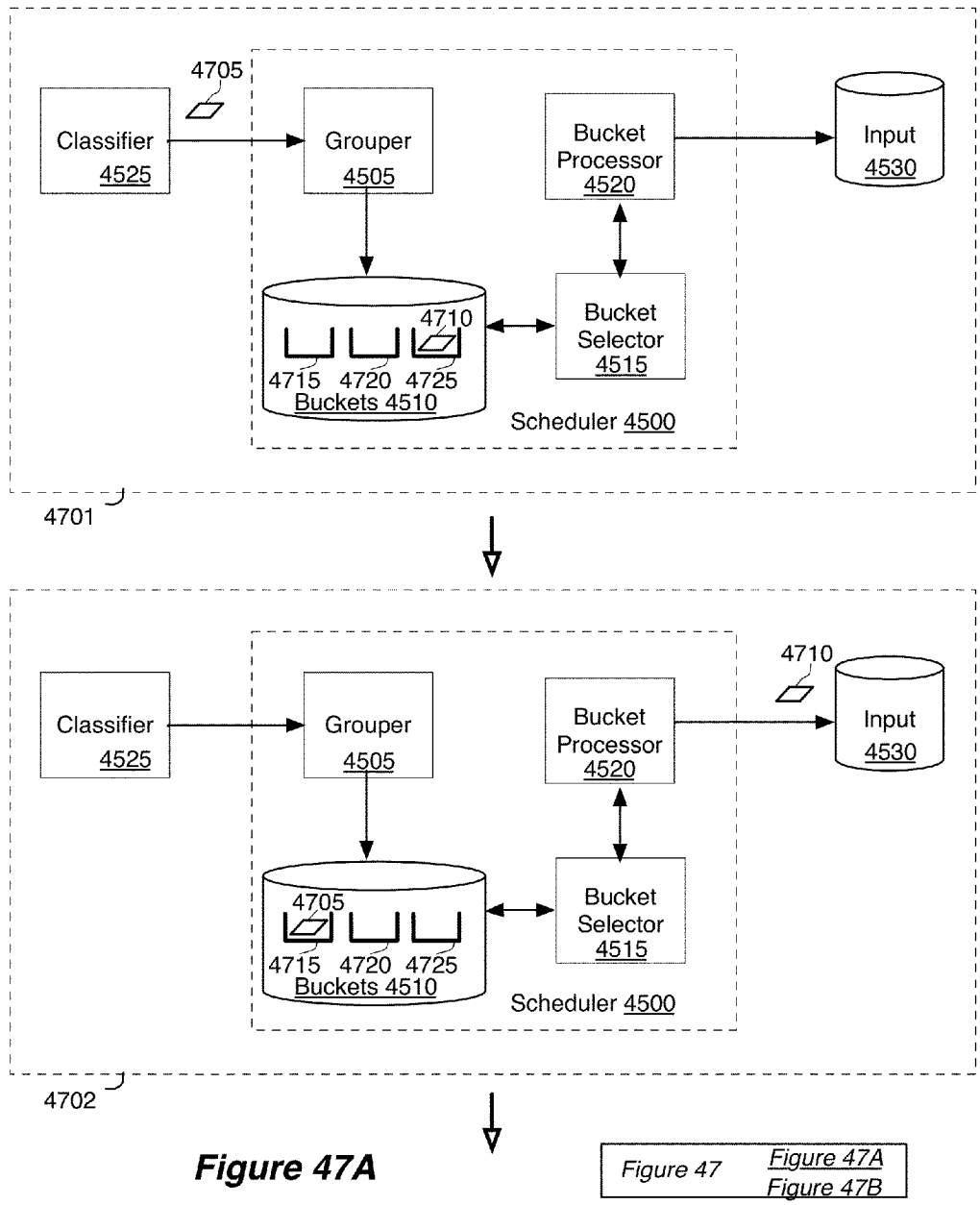
FIGS. 47A and 47B illustrate that the scheduler processes two input event data for two different input events in three different stages.
Figure 47B:
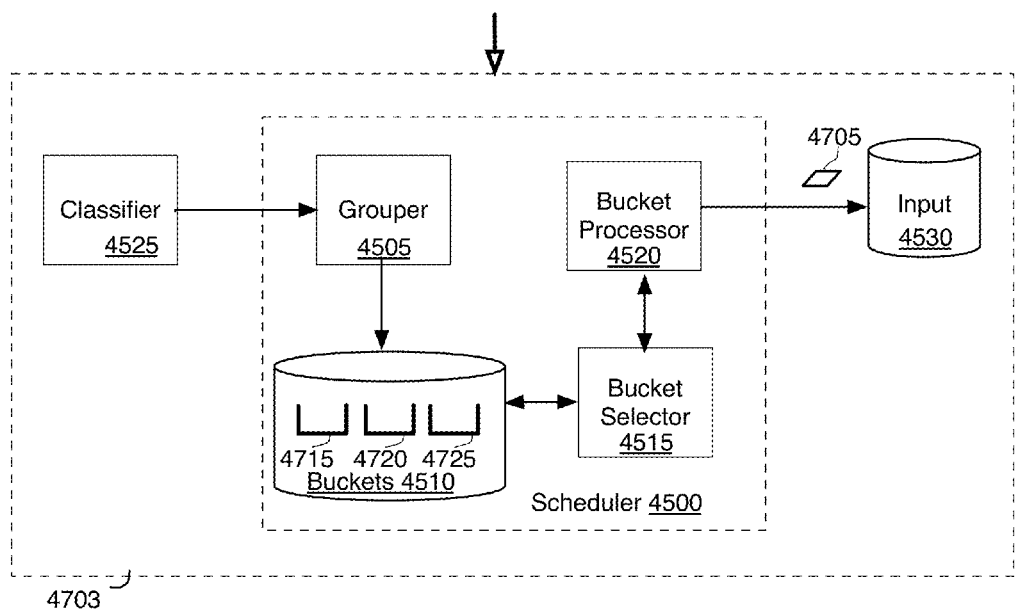

FIGS. 47A and 47B illustrate that the scheduler 4500 processes two input event data 4705 and 4710 for two different input events in three different stages 4701, 4702, and 4703. These figures also illustrate the classifier 4525 and the input tables 4530.

At stage 4701, the buckets 4510 include three buckets 4715, 4720, and 4725. In the bucket 4725, the grouper 4505 previously placed the input event data 4710. The other two buckets 4715 and 4720 are empty. The buckets 4715-4725 are associated with three different LDP sets. The classifier 4525 sends the input event data 4705 that the classifier has classified to the grouper 4505. The input event data 4705 affects the LDPS that is associated with the bucket 4715. The bucket 4725 is the bucket that the bucket selector 4515 has designated as the current bucket. That is, the bucket processor 4520 is retrieving input event data from bucket 4725.

At stage 4702, the grouper 4505 places the input event data 4705 in the bucket 4715. The bucket selector 4515 does not change designation of the current bucket from the bucket 4725. The bucket processor 4520 takes out the input event data 4710 from the bucket 4725 and updates the input tables 4530 using the input event data 4710.

At stage 4703, the classifier 4525 has not classified another input event data because the classifier 4525 has not received another input event data for an input event. The bucket selector 4515 selects the bucket 4715 and designates the bucket 4715 as the new current bucket because the previous current bucket 4725 has become empty after the input event data 4710 was taken out from the bucket 4725. The bucket processor 4520 takes out the input event data 4705 from the new current bucket 4715 and updates the input tables 4530 using the input event data 4705.

In addition to a scheduling scheme based on LDP sets that has been described so far, different embodiments employ other different scheduling schemes to determine the order in which the input event data triggers the table mapping process. The different scheduling schemes include (i) a priority-based scheduling scheme, (ii) scheduling based on critical input event data and non-critical input event data, and (iii) scheduling based on start and end tags (also referred to as 'barriers' in some embodiments) that may be associated with input event data. These different scheduling schemes may be used alone or in combination. One of ordinary skill in the art will recognize that other scheduling schemes may be employed in order to determine the order in which the input event data is used to update input tables.

In the priority-based scheme, the event classifier 4525 assigns a priority level to the input event data. In some embodiments, the event classifier 4525 attaches a tag to the input event data to indicate the priority level for the input event data. Usually, the event classifier 4525 assigns the same priority level to different input event data when the different input event data affects the same LDPS. Therefore, a bucket includes different input event data with the same priority level and this priority level is the priority level for the bucket.

In some embodiments, the bucket selector 4515 designates a bucket with the highest priority level as the current bucket. That is, when input event data for an input event, which the grouper 4505 places in a particular bucket other than the current bucket, has a priority level that is higher than the priority level of the current bucket, the particular bucket becomes the new current bucket even if the old current bucket had not become empty. Thus, from that instance in time, the bucket processor 4520 uses the input event data from the new current bucket to update the input tables 4710. In this manner, the input event data with a higher priority level gets ahead of the input event data with a lower priority level. When the input event data that the scheduler 4500 receives from the event classifier 4525 and the current bucket have the same priority level, the bucket selector 4500 does not change the designation of the current bucket.

Figure 48A:
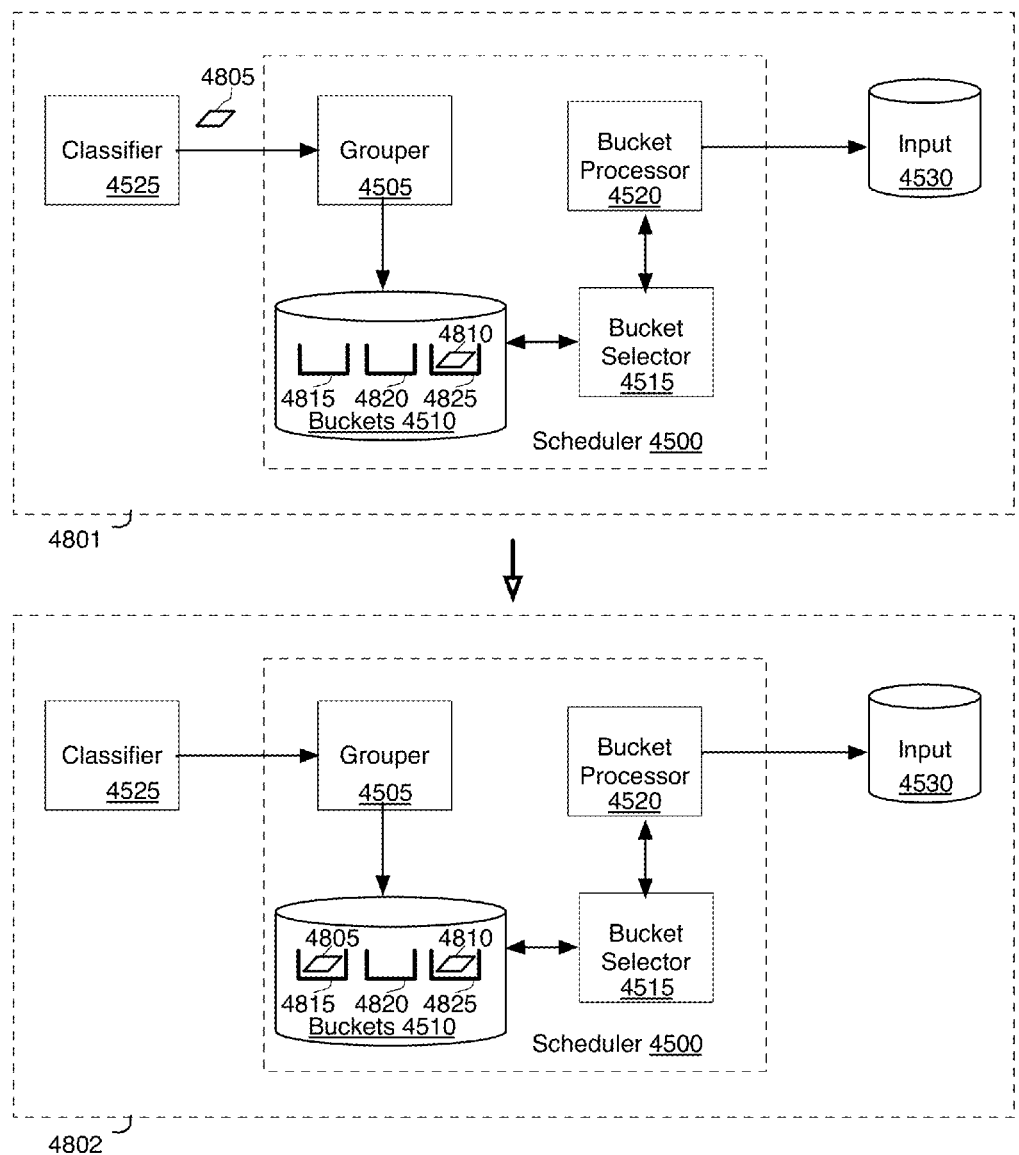
FIGS. 48A and 48B illustrate that the scheduler processes input event data for two different input events in three different stages.
Figure 48B:
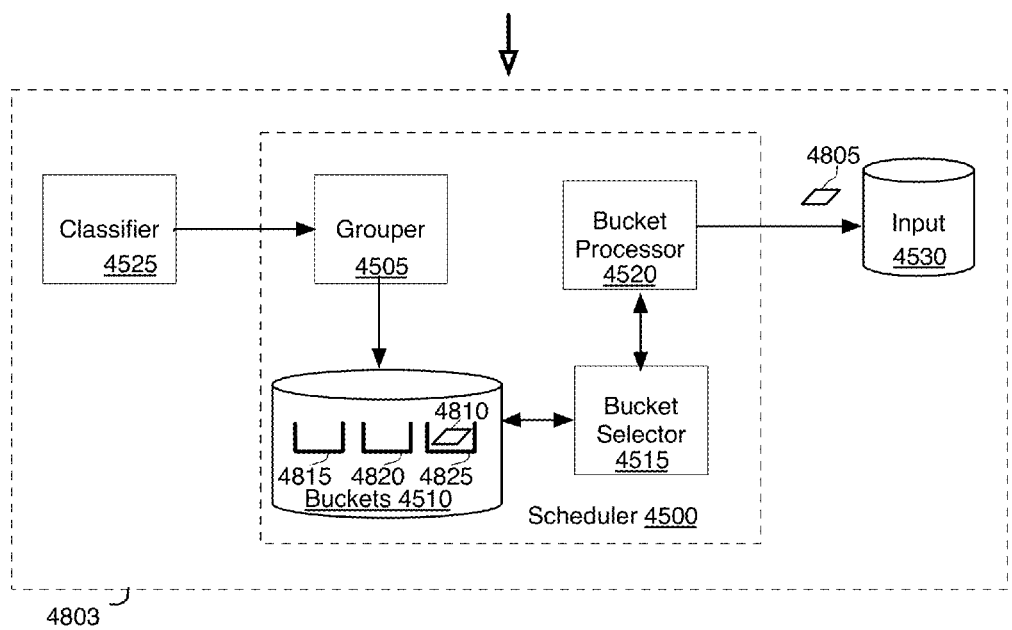

An example operation of the scheduler 4500 employing the priority-based scheduling scheme will now be described by reference to FIGS. 48A and 48B. FIGS. 48A and 48B illustrate that the scheduler 4500 processes input event data 4805 and 4810 for two different input events in three different stages 4801-4803. These figures also illustrate the classifier 4525 and the input tables 4530.

At stage 4801, the buckets 4510 includes three buckets 4815, 4820, and 4825. In the bucket 4825, the grouper 4505 previously placed the input event data 4810. The input event data 4810 has a priority level that the classifier 4525 assigned to the input event data 4810. The other two buckets 4815 and 4820 are empty. The buckets 4815-4825 are associated with three different LDP sets. The classifier 4525 sends the input event data 4805 that the classifier has assigned a priority level that is higher than the priority level of the input event data 4810. The input event data 4805 also affects the LDPS that is associated with the bucket 4815. The bucket 4825 is designated as the current bucket, from which the bucket processor 4520 is retrieving input event data to update one or more input tables 4530.

At stage 4802, the grouper 4505 places the input event data 4805 in the bucket 4815 because the input event data 4805 affects the same LDPS with which the bucket 4815 is associated. The rules engine (not shown) is still performing table mapping operations on the input tables 4530 which were previously updated by the bucket processor 4520 using the input event data (not shown). Thus, the input event data 4810 has not been taken out of the current bucket 4825 yet.

At stage 4803, the bucket selector 4515 designates the bucket 4815 as the new current bucket, even though the previous current bucket 4825 has not become empty, because the input event data 4805 has a priority level that is higher than the priority level of the input event data 4810 that is in the bucket 4825. The bucket processor 4520 then uses the input event data 4805, ahead of the input event data 4810, to update the input tables 4530.

In the scheduling scheme that is based on critical and non-critical input event data, the event classifier 4525 and the scheduler 4500 of some embodiments operate based on critical input event data and non-critical input event data. Critical input event data is input event data for a critical input event that should immediately update one or more managed switching elements for proper functioning of the network elements. For instance, a chassis (e.g., a host machine) disconnection or connection is a critical event. This is because a chassis may be hosting several managed switching elements. Thus the disconnection or connection of the chassis means deletion or addition of new managed switching elements for which other managed switching elements have to adjust to properly forward data packets. Another example of a critical input event is an event related to creation of the receiving end of a tunnel. The receiving end of a tunnel is critical because when the receiving end of a tunnel is not created, the packets going towards the receiving end will be dropped.

A non-critical input event data is input event data for a non-critical event that is not as important or critical to the proper functioning of the network elements. For instance, events related to testing a newly added node to see whether the node gets all the required (logical) flows before other nodes start sending packets to this node (else the node may drop packets) are non-critical events. Another example of a non-critical input data is an event related to creation of the sending end of a tunnel.

The event classifier 4525 in some embodiments classifies input event data based on whether the input event data is for a critical event or a non-critical event or neither of the two kinds of event. That is, the event classifier 4525 in some embodiments attaches a tag to the input event data to indicate that the input event data is a critical input event data or a non-critical input event data. In some embodiments, the event classifier 4525 attaches no such tag to input event data that is neither a critical input event data nor a non-critical input event data. Such input data may be attached with a tag for the priority-level and/or a tag for a LDPS so that the scheduler 4500 can handle this input event data with other scheduling schemes described above.

The scheduler 4500 in some embodiments immediately uses a critical input event data to modify one or more input tables 4530 when the scheduler 4500 receives the critical input event data. That is, the critical input event data gets ahead of any other input event data. On the other hand, the scheduler 4500 uses a non-critical input event data only when no other input event data held by the scheduler 4500 is critical input event data or input event data that is neither critical input event data nor non-critical input event data. A non-critical input event data is therefore the last input event data of a set of input event data used by the scheduler 4500.

Figure 49A:
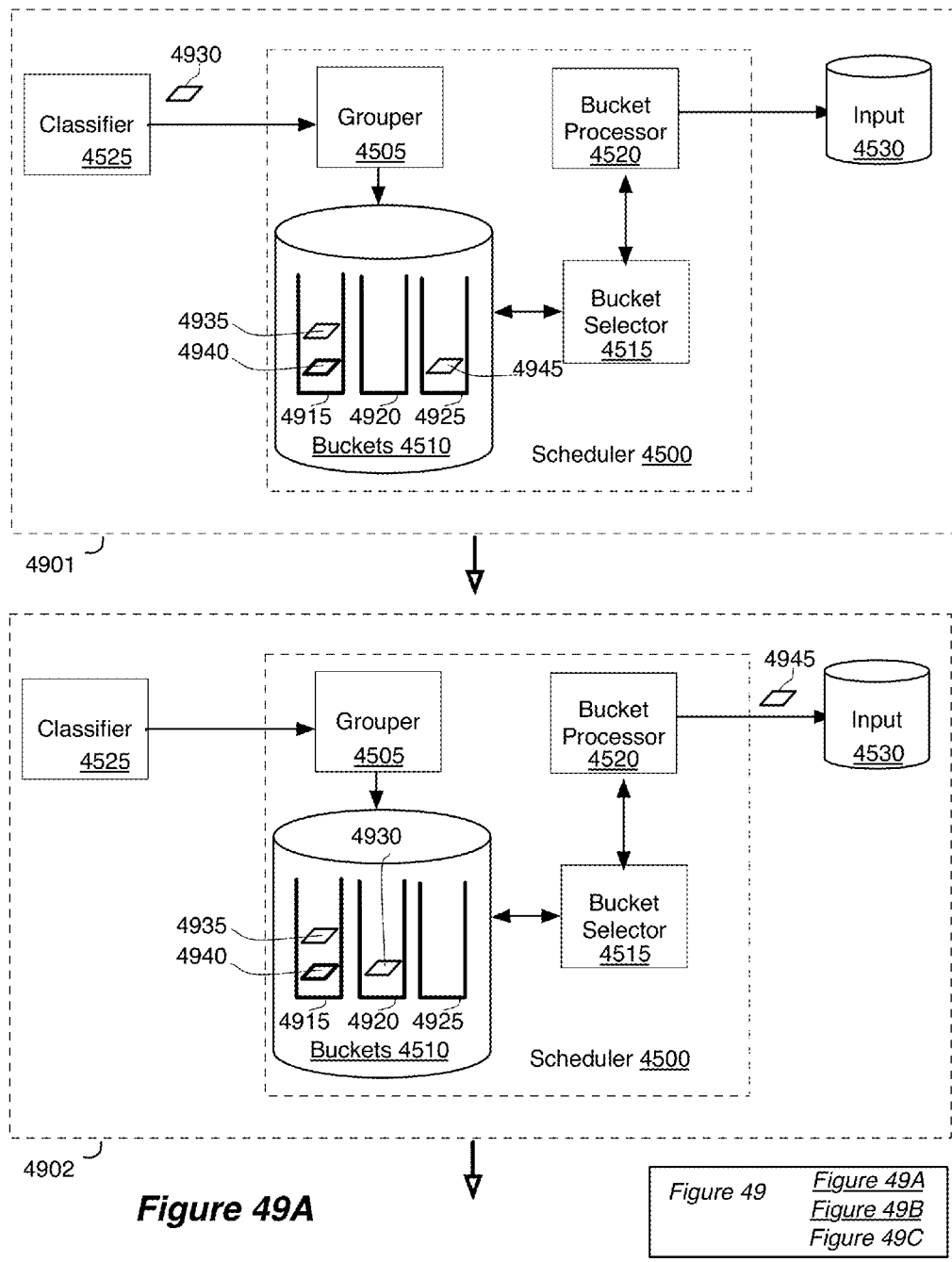
FIGS. 49A, 49B and 49C illustrate that the scheduler of some embodiments employs several different scheduling schemes including the scheduling scheme based on start and end tags.
Figure 49B:
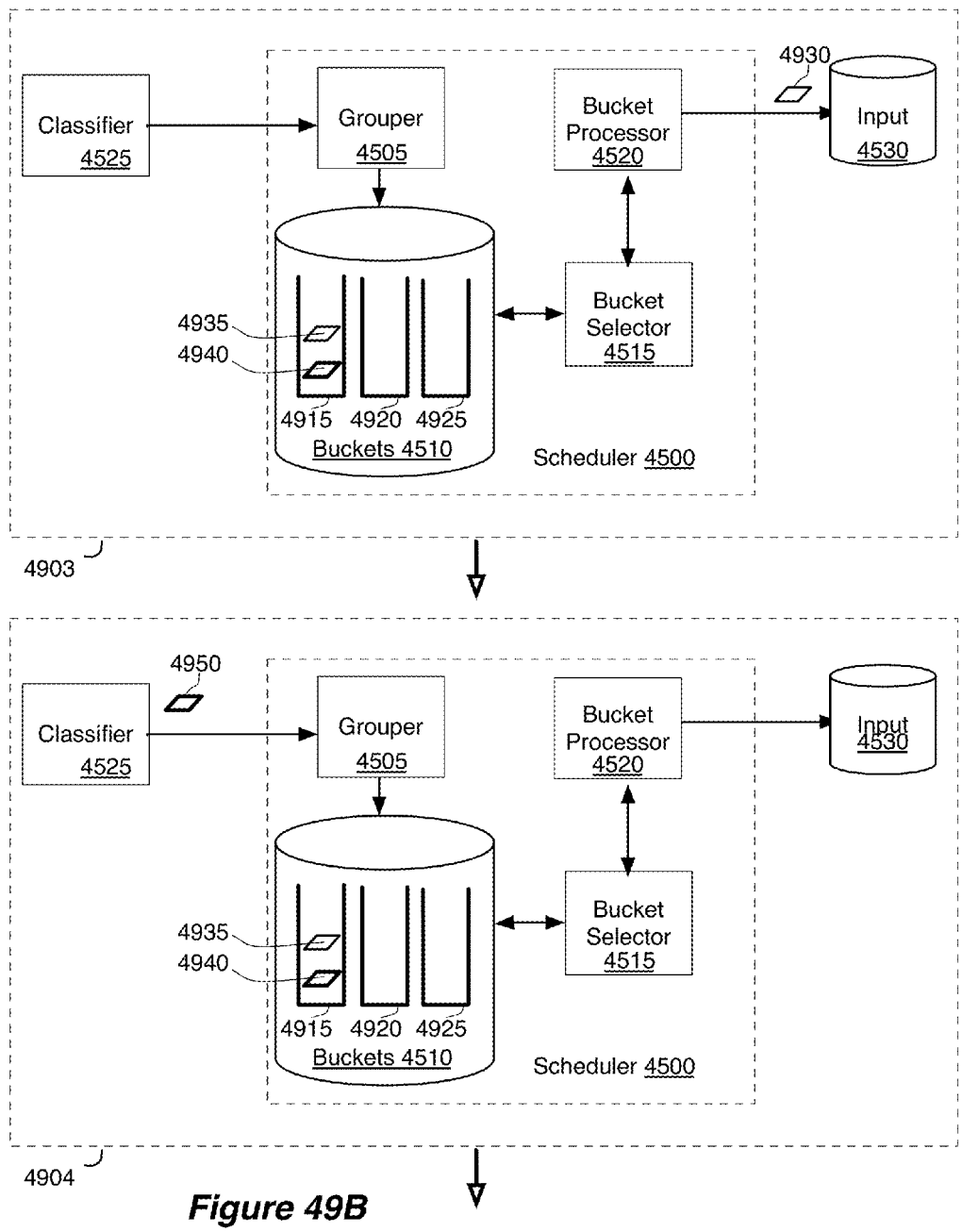
Figure 49C:
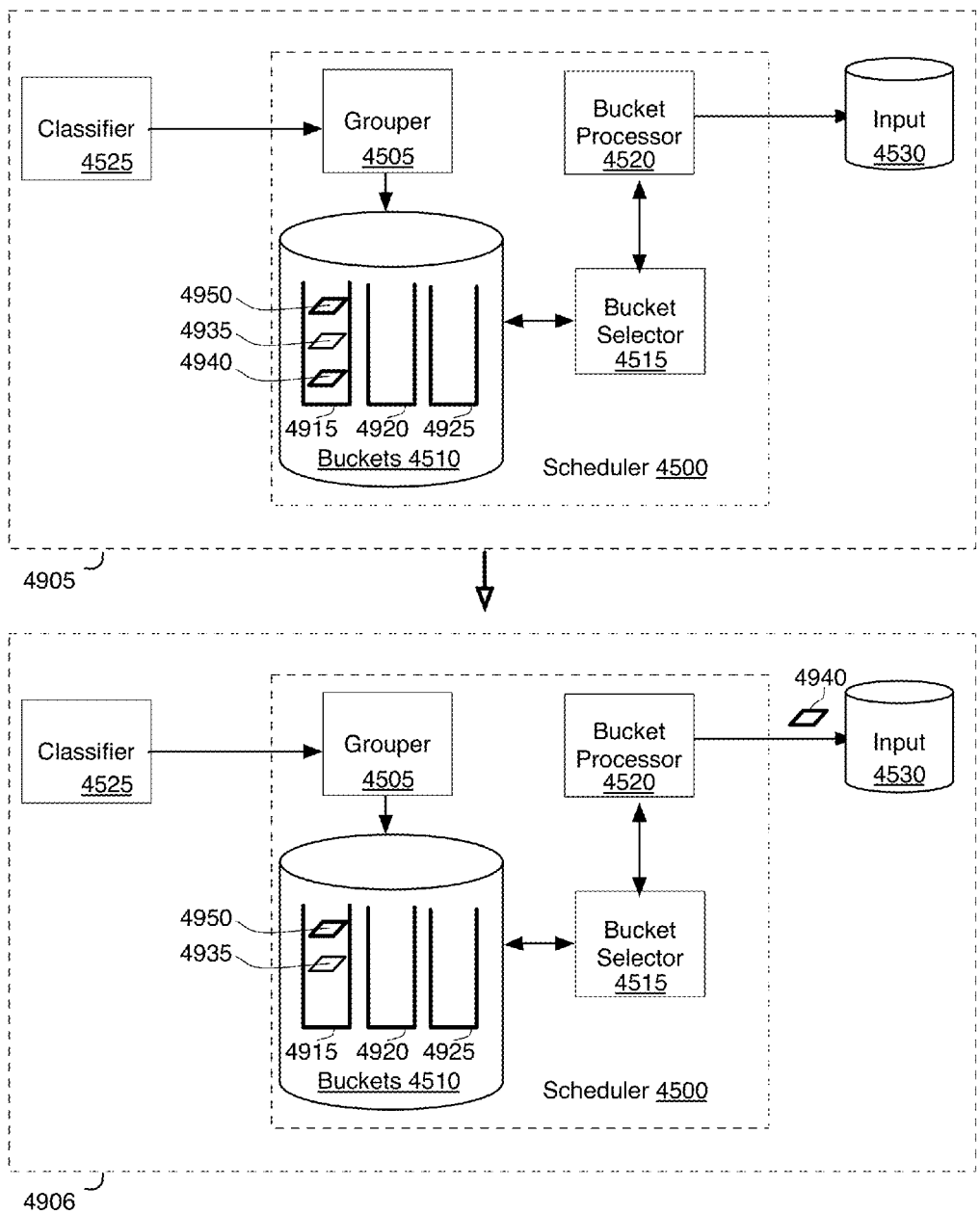

FIGS. 49A, 49B and 49C illustrate that the scheduler 4500 of some embodiments employs several different scheduling schemes including the scheduling scheme based on start and end tags. FIGS. 49A, 49B and 49C illustrate that the scheduler 4500 processes several input event data 4930-4950 for several different input events in six different stages 4901-4906. These figures also illustrate the classifier 4525 and the input tables 4530.

In the scheduling scheme based on start and end tags, input event data that the event classifier 4525 receives and classifies may have a start tag or an end tag attached to the input event data. In some embodiments, the start tag indicates that the input event data to which the start tag is attached is the first input event data of a group of input event data. The end tag indicates that the input event data to which the end tag is attached is the last input event data of the group of input event data. In some cases, a group of input event data is for different input events. In other cases, a group of input event data may be for a single input event.

In some embodiments, start tags and end tags are attached to input event data by the origin of the input event. The start tags and end tags are used to indicate that a group of input event data should be processed together and to indicate that a segment of a control data pipeline is completed so that the next segment of the control data pipeline can be performed in a distributed, multi-instance control system of some embodiments. For example, a controller application attaches the start tags and the end tags to the logical forwarding plane data that the controller application sends to a virtualization application. As another example, a virtualization application of one controller instance attaches these tags when the virtualization application is sending universal physical control plane data for a group of input events to another virtualization application of another controller instance so that the other virtualization application can recognize the end of universal physical control plane data and convert the universal physical control plane data to customized physical control plane data. Furthermore, in some embodiments, an origin of a group of input event data does not send out the group unless the origin has generated the whole group of input event data.

In some embodiments that use start and end tags, the bucket selector 4515 does not designate a particular bucket that contains input event data with a start tag as the current bucket until the grouper 4505 places another input event data with an end tag in the particular bucket. In other words, the bucket processor 4520 does not process a group of input event data until the whole group of input event data is received. In some embodiments, the bucket selector 4515 does not designate the particular bucket even if the bucket has the highest priority level among other buckets that each contain input event data.

An example operation of the scheduler 4500 that uses start and end tags will now be described. At stage 4901, the buckets 4510 includes three buckets 4915, 4920, and 4925 that each is associated with a different LDPS. In the bucket 4925, the grouper 4505 previously placed the input event data 4945. The input event data 4945 has a priority level that the classifier 4525 assigned to the input event data 4945. The bucket 4915 has two input event data 4935 and 4940. The input event data 4935 and 4940 in the bucket 4915 have an assigned priority level that is lower than the priority level assigned to input event data 4945 in the bucket 4925. The input event data 4940 is illustrated as bold parallelogram to indicate that the input event data 4940 has a start tag. That is, the input event data 4940 is the first input event data of a group of input event data. Also in the stage 4901, the classifier 4525 has classified the input event data 4930 and sends the input event data 4930 to the scheduler 4500. The input event data 4930 has an assigned priority level that is lower than the priority level assigned to input event data 4935 and 4940.

At stage 4902, the bucket processor 4520 retrieves the input event data 4945 from the bucket 4925 and updates the input tables 4530 because the bucket 4925 is the current bucket. The grouper 4505 places the input event data 4930 in the bucket 4920 because the event data 4930 affects the LDPS with which the bucket 4920 is associated. The bucket selector 4515 needs to designate a new current bucket because the old current bucket 4925 is now empty. The bucket selector 4515 designates the bucket 4920 as the new current bucket even though the priority level of the input event 4930 in the bucket 4920 is lower than the priority level of the input event data 4935 and 4940 in the bucket 4915. This is because input event data that has an end tag for the group of input event data that includes the input event data 4935 and 4940 has not arrived at the bucket 4915 of the scheduler 4500.

At stage 4903, the bucket processor 4520 retrieves the input event data 4930 from the bucket 4920 and updates the input tables 4530 because the bucket 4920 is the current bucket. At stage 4904, the classifier 4525 has classified the input event data 4950 and sends the input event data 4950 to the scheduler 4500. The input event data 4950, illustrated as a bold parallelogram, has an end tag to indicate that the input event data 4950 is the last input event data of the group of input event data that include the input event data 4935 and 4940. The bucket selector 4515 does not designate the bucket 4915 as the current bucket even though the bucket 4915 is the only non-empty bucket of the buckets 4510 because the input event data 4935 and 4940 do not make up a complete group of input event data.

At stage 4905, the grouper 4505 places the input event data 4950 in the bucket 4915 because the input event data 4950 affects the LDPS with which the bucket 4915 is associated. The bucket selector 4515 designates the bucket 4915 as the new current bucket because the bucket 4515 now has a complete group of input event data that consist of the input event data 4935, 4940, and 4950. At stage 4906, the bucket processor 4520 retrieves the input event data 4940 because the input event data 4940 is the oldest input event data in the current bucket. The bucket processor 4520 uses the input event data 4940 to update the input tables 4530.

It is to be noted that the six different stages 4901-4906 in FIGS. 49A, 49B and 49C, as well as any group of stages in other figures of this application, do not necessarily represent regular intervals of time. That is, for example, the length of time elapsed between a pair of consecutive stages is not necessarily the same as the length of time elapsed between another pair of consecutive stages.

Figure 50:
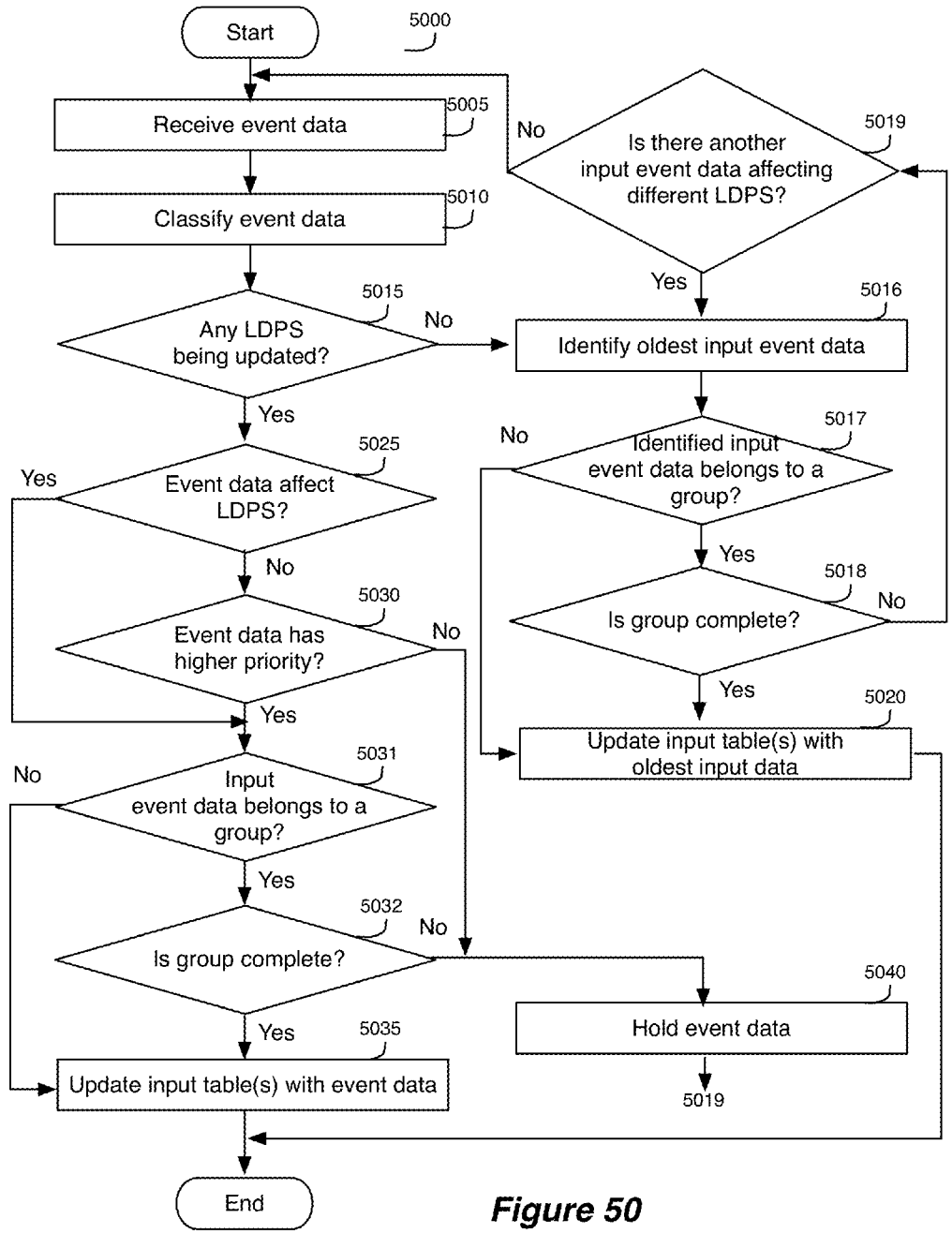
FIG. 50 conceptually illustrates a process that the control application of some embodiments performs to classify input event data and update input tables based on the input event data.

FIG. 50 conceptually illustrates a process 5000 that the control application of some embodiments performs to classify input event data and update input tables based on the input event data. Specifically, this figure illustrates that the process 5000 in some embodiments employs scheduling schemes based on LDP sets and priority levels assigned to event input data. The process 5000 in some embodiments is performed by an event classifier (e.g., the event classifier 4525) and a scheduler (e.g., the scheduler 4500). As shown in FIG. 50, the process 5000 initially receives (at 5005) data regarding an input event.

At 5010, the process 5000 classifies the received event data. In some embodiments, the process 5000 classifies the received event data based on a LDPS that the received event data affects. As mentioned above, input event data affects a LDPS when the input event data is about a change in the logical switch specified by the LDPS or about a change at one or more managed switching elements that implement the LDPS. Also, input event data affects a LDPS when the input event data is for defining or modifying the LDPS. In addition, the process 5000 in some embodiments assigns a priority level to the received event data.

Next, the process 5000 determines (at 5015) whether a LDPS is being updated. In some embodiments, the process 5000 inspects the rules engine to find out whether a LDPS is being updated by the rules engine. When the process 5000 determines (at 5015) that a LDPS is not being updated (i.e., when the process determines that the rules engine is not currently processing any input tables), the process 5000 identifies (at 5016) the oldest input event data. When there is no other input event data held, the process 5000 identifies the received input event data as the oldest input event data.

The process 5000 then determines (5017) whether the identified oldest input event data belongs to a group of input event data (i.e., whether the identified oldest input event data is in a batch of input event data that should be processed together to improve efficiency). The process 5000 in some embodiments determines that the identified oldest input event data belongs to a group of input event data when the identified oldest input event data has a start tag (or, a barrier). The process 5000 determines that the identified oldest input event data does not belong to a group of input event data when the identified oldest input event data does not have a start tag. When the process 5000 determines (5017) that the identified oldest input event data does not belong to a group of input event data, the process 5000 proceeds to 5020 to update the input tables with the identified oldest input event data.

When the process 5000 determines (5017) that the identified oldest input event data belongs to a group of event data, the process 5000 determines (5018) whether the group of input event data to which the identified oldest input event data belongs is a complete group. In some embodiments, the process 5000 determines (at 5018) that the group is complete when there is a particular input event data that affects the same LDPS that the identified oldest input event data affects and that particular input event data has an end tag.

When the process 5000 determines (at 5018) that the group of input event data to which the identified oldest input event data belongs is a complete group, the process 5000 updates (at 5020) the input tables with the identified oldest input event data. The process 5000 then ends. When the process 5000 determines (at 5018) that the group of input event data to which the identified oldest input event data belongs is not a complete group, the process 5000 proceeds to 5019 to determine whether there is another input event data that affects a LDPS different than the LDPS that the identified oldest input event data affects.

When the process determines (at 5019) that there is no such other input event data, the process 5000 loops back to 5005 to receive another input event data. When the process determines (at 5019) determines (at 5019) that there is such an input event data, the process 5000 loops back to 5016 to identify the oldest input event data among other input event data that do not affect the LDPS(s) that any of the previously identified oldest input event data affects.

When the process 5000 determines (at 5015) that a LDPS is currently being updated, the process 5000 determines (at 5025) whether the received input event data affects the LDPS that is being updated. In some embodiments, the input event data includes an identifier for a LDPS that the input event data affects. The process 5000 uses this identifier to determine whether the input event data affects the LDPS that is being updated.

When the process 5000 determines (at 5025) that the received input event data affects the LDPS that is being updated, the process 5000 proceeds to 5031, which will be described further below. When the process 5000 determines (at 5025) that the received input event data does not affect the LDPS that is being updated, the process 5000 in some embodiments determines (at 5030) whether the received input event data has a priority level that is higher than the priority level that was assigned to input event data that is being used to update the LDPS.

When the process 5000 determines (at 5030) that the priority level of the received input event data is higher, the processor proceeds to 5031, which will be described further below. Otherwise, the process 5000 holds (at 5040) the received input event data. That is, the process does not update the input tables based on the received input event data. As mentioned above, the process 5000 later uses the input event data that is held when the rules engine of the control application is done with updating the LDPS that is currently being updated.

At 5031, the process 5000 determines whether the received input event data belongs to a group of input event data. In some embodiments, the process 5000 determines that the received input event data belongs to a group of input event data when the received input event data has a start tag or an end tag. When the process 5000 determines (at 5031) that the received input event data does not belong to a group of input event data, the process 5000 proceeds to 5035, which will be described further below. Otherwise, the process 5000 proceeds to 5032 to determine whether the group to which the received input event data belongs is a complete group. The process 5000 in some embodiments determines that the group is complete when the received input event data has an end tag.

When the process 5000 determines (at 5032) that the group of input event data to which the received input event data belongs is a complete group, the process 5000 proceeds to 5035. When the process 5000 determines (at 5032) that the group of input event data to which the received input event data belongs is not a complete group, the process 5000 proceeds to 5040 to hold the received input event data.

After the process 5000 holds (at 5040) the received input event data, the process 5000 goes to 5019 to determine whether there is another input event data held that is held and affects a LDPS different than the LDPS being updated. When the process 5000 determines (at 5019) that there is no such input event data, the process 5000 loops back to 5005 to receive another input event data. When the process 5000 determines (at 5019) that three is such input event data, the process 5000 proceeds to 5016 to identify the oldest input event data among other input event data that do not affect the LDPS being updated.

At 5035, the process updates the input tables with the received input event data. When the received input event data has an end tag, the process 5000 in some embodiments uses the group of input event data to which the received input event data with an end tag belongs in order to update input tables.

By updating the input tables based on the input event data only when the input event data affects the LDPS that is being updated and by holding the input event data otherwise, the process 5000 effectively aggregates the input event data based on the LDPS. That is, the process 5000 aggregates all input event data for a LDPS that the process 5000 receives while the LDPS is being updated so that all the input event data for the LDPS are processed together by the rules engine of the control application.

V. Using Transactionality

Within networks, it is the network forwarding state that carries packets from their network entry points to their exits. Hop-by-hop, the state makes the network elements forward a packet to an element that is a step closer to the destination. Clearly, computing forwarding state that is in compliance with the configured network policies is crucial for the operation of the network: without the proper forwarding state, the network will not deliver packets to their destinations, nor will the forwarding be done according to the configured policies.

There are several challenges to updating the forwarding state (i.e., migrating from a previously computed state to a newly computed state) after the network configuration has changed. Several solutions are described below. These solutions consider the problem in two dimensions: correctness and efficiency. That is, these solutions consider how the state that is currently present in the network can guarantee that the network policies are obeyed correctly, not only before and after the update but also during the update. In terms of efficiency, these solutions consider how the cost of potentially large state updates can be minimized.

In the discussion below, the network control system includes a centralized cluster of controllers that compute the forwarding state for the forwarding elements, in order to manage the network forwarding elements. Also, in the discussion below, "network policy" includes any configurational aspects: not only security policies, but also policies regarding how to route the network traffic, as well as any physical (or logical) network configuration. Hence, in this discussion, "policy" is used for anything that relates to user-configured input.

A. Requirement for Transactions

A packet is what the forwarding state operates over. Hence, in the end, the only thing that matters is that a single packet is forwarded according to a single consistent policy, and not a mixture of states representing old and new policy. Subsequent packets may be treated by different versions of the policy, as long as the transition from an old version to a new version occurs in a manner that prevents a packet from being treated by a mixture of old and new policies.

The requirement for an atomic transition to a new policy implies that the updates to the forwarding state have to be transactional. However, as discussed above, it does not imply the whole network forwarding state should be atomically updated at the same time. In particular, the network control system of some embodiments relaxes this requirement in two regards:

1. For a stream of packets from a source towards one or more destinations, it is not critical to specify at which point the policy changes from an old one to new one. It is only essential that no packet get forwarded according to a mixture of policies. Each packet should either be forwarded according to the old policy or the new policy.

2. Similarly, the network control system of some embodiments allows different policies to be transiently applied to different streams of packets that ingress into the network at different locations. Again, these embodiments only require that a single packet experience only a single policy and not a mixture of the old and new policies.

B. Implementing Transactional Updates

Given these requirements and relaxations, the implementation of these transactional updates will now be considered. In M. Reitblatt, et al, "Updates for Software-Defined Networks: Change You Can Believe in!" In *ACM SIGCOMM Workshop on Hot Topics in Networks* (*HotNets*), Cambridge, Mass., November 2011 (the "Reitblatt article"), it has been proposed that packets be tagged at network ingress with a version of the forwarding state used at the ingress. Hence, when the packet makes progress through the network, any subsequent network element knows which version to use. This effectively realizes transactional, network-wide updates for any network forwarding state.

However, this approach comes with a few practical challenges. First, without assuming slicing of the network, updates to the network have to be serialized: the whole network has to be prepared for a particular version, then the ingresses are updated to use the prepared version, and only after that, the preparations for the next version can begin.

Second, the packet needs to have an explicit version tag and hence enough bits somewhere in the packet headers need to be allocated for the tag. If the network has a requirement to operate with legacy tunneling protocols, it might be challenging to find such free bits for the tag in the headers.

Hence, the network wide transactional updates (as described in the Reitblatt article), while powerful, come with practical challenges that ideally should be avoided. Thus, instead of this approach described in the Reitblatt article, the network control system of some embodiments exploits placement of the managed switching elements on the edge of the network. The network control system of some embodiments makes the logical forwarding decision (that is, a decision on which logical port(s) should receive the packet) at the first-hop, as described in U.S. patent application Ser. No. 13/222, 554; any subsequent steps are merely forwarding the packet based on this forwarding decision towards the selected destination.

This implies that the transactional updates across the network can be split into two parts: (1) transactional updates to the first-hop managed switching element, and (2) transactional updates to the path through the network from the first-hop managed switching element to the last-hop managed switching element. As long as these two can be implemented, the global transactions can be provided: by preparing any new required paths before updating the first-hop with the new policies, the overall state update becomes atomic. After these two steps, any network paths not required by the new first-hop state configuration can be removed. The composition of transactions to construct larger transactions will be further described below, as this principle has other uses in the network control system.

Figure 51:
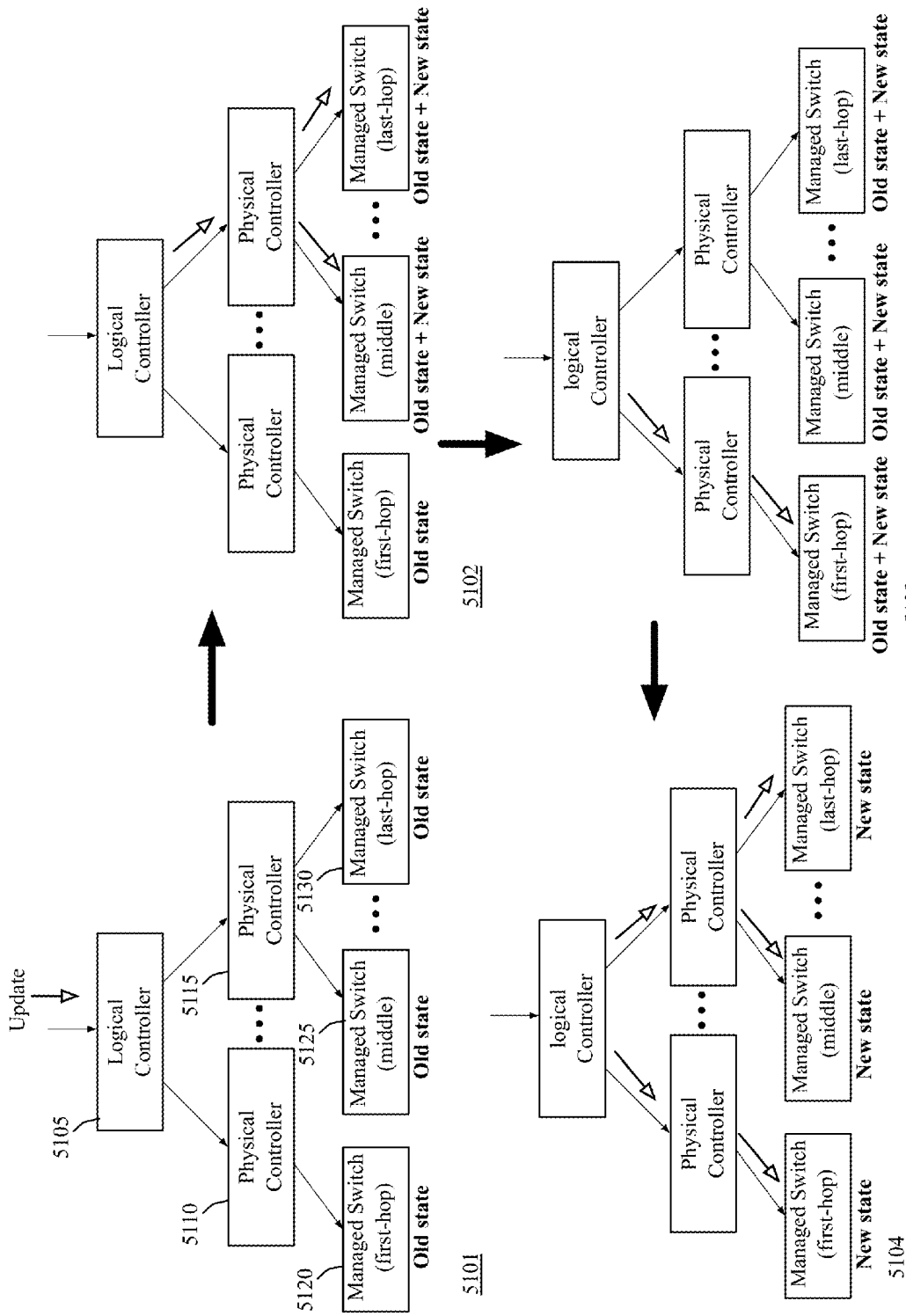
FIG. 51 conceptually illustrates an example architecture for a network control system of some embodiments that employs this two-step approach.

FIG. 51 conceptually illustrates an example architecture for a network control system 5100 of some embodiments that employs this two-step approach. Specifically, this figure illustrates in four different stages that updates to the managed switching elements that implement a LDPS are sent in two parts into two groups of managed switching elements. As shown, the network control system 5100 includes a logical controller 5105, physical controllers 5110 and 5015, and managed switching elements 5120-5130.

As mentioned above, a logical controller is a master of a LDPS and a physical controller is a master of managed switching elements. A master of the LDPS of some embodiments computes state updates (e.g., in universal control plane data) for all managed switching elements that implement the LDPS. A master of managed switching elements of some embodiments receives the state updates from the masters of LDPS and distributes the updates to those managed switching elements that implement the LDPS. The managed switching elements that receive the state updates may be some or all of the managed switching elements that the master of the managed switching elements manages.

In this example, the logical controller 5105 is a master of a LDPS, which is implemented by the managed switching elements 5120-5130. The physical controllers 5110 and 5115 are the masters of the managed switching elements 5120-5130. At stage 5101, the logical controller 5105 receives updates from the user (e.g., through an input translation controller, which is not depicted in this figure) for a LDPS that the user is managing. In this example, the updates represent a new policy (e.g., a new QoS policy defining new allowable bandwidth). The logical controller 5105 then computes the state updates (e.g., by an n Log engine that generates universal control plane data from input logical control plane data). In some embodiments, the logical controller 5105 identifies all the managed switching elements that implement the LDPS. In particular, for a path of a packet that will be forwarded from a first physical port to a second physical port that are mapped to a logical ingress port and logical egress port, respectively, the logical controller identifies the managed switching element that has the first physical port (i.e., the first-hop managed switching element) and the managed switching element that has the second physical port (i.e., the last-hop managed switching element). The logical controller then categorizes the first-hop managed switching element in one group and the last-hop managed switching element as well as other managed switching elements that are in the path of the packet in another group.

In this example, the managed switching element 5120 is a first-hop managed switching element identified by the logical controller 5105 and the managed switching element 5130 is the last-hop manage switch. The managed switching element 5125 is one of the "middle" managed and unmanaged switching elements (not shown) that forwards the packet towards the last-hop managed switching element 5130. As shown, the managed switching element 5120, the managed switching element 5130, and the middle switching elements have the old policy. Thus, the packets coming to the first physical port that is mapped to the logical ingress port are forwarded by these managed switching elements based on the old policy.

At the second stage 5102, the logical controller 5120, using its n Log engine, computes the state updates for the last-hop managed switching element 5130 and the middle switching elements including the manage switching element 5125 and sends the computed updates to these switching elements in a transactional manner (e.g., by putting in barriers in the stream of updates to the manage switching elements). In this example, the physical controller 5115 manages these switching elements and distributes the updates to these switching elements. As a result, these managed switching elements have both new and old policies while the first-hop managed switching element 5120 has only the old policy. However, because the first-hop managed switching element 5120 operates under the old policy, the packets coming to the first physical port that is mapped to the logical ingress port are forwarded by the managed switching elements 5120-5130 based on the old policy.

At the third stage 5103, the logical controller 5105, using its n Log engine, computes the state updates for the first-hop managed switching element 5120 and sends the computed updates to the managed switching element 5120 in a transactional manner. In this example, the physical controller 5110 manages the managed switching element 5120 and thus sends the updates from the logical controller to the managed switching element 5120. The first-hop managed switching element 5120 has the new policy and the old policy and so do the managed switching elements 5125 and 5130. The packets coming to the first physical port that is mapped to the logical ingress port are forwarded by the managed switching elements 5120-5130 based on the old policy or the new policy depending on the policy applied to the packets by the first-hop managed switching elements. In other embodiments, the logical controller 5105 may put a higher priority on the updates for the new policy to the first-hop managed switching element 5120 so that the packets are forwarded by the new policy.

At the fourth stage 5104, the logical controller 5105 sends instructions to the managed switching elements that implement the LDPS to remove the data for the old policy. The managed switching elements 5120-5130 then forwards the packets based on the new policy.

In some embodiments, the physical controllers identify the first-hop managed switching element and hold the updates to the first-hop managed switching elements in order to send the updates to the middle switching elements and the last-hop managed switching elements first. Therefore, in these embodiments, the logical controller 5105 will compute the updates to send to all of the managed switching elements that implement a LDPS and then let the physical controllers 5110 and 5115 send updates to the middle and last-hop switching elements before sending updates to the first-hop managed switching elements. Moreover, in some embodiments, only the edge switching elements are managed and the middle switching elements (with an exception of pool nodes) are unmanaged. In some such embodiments, all logical forwarding decisions are made in the first-hop switching elements and the middle switching elements are used merely as fabric for interconnecting switching elements.

Figure 52:
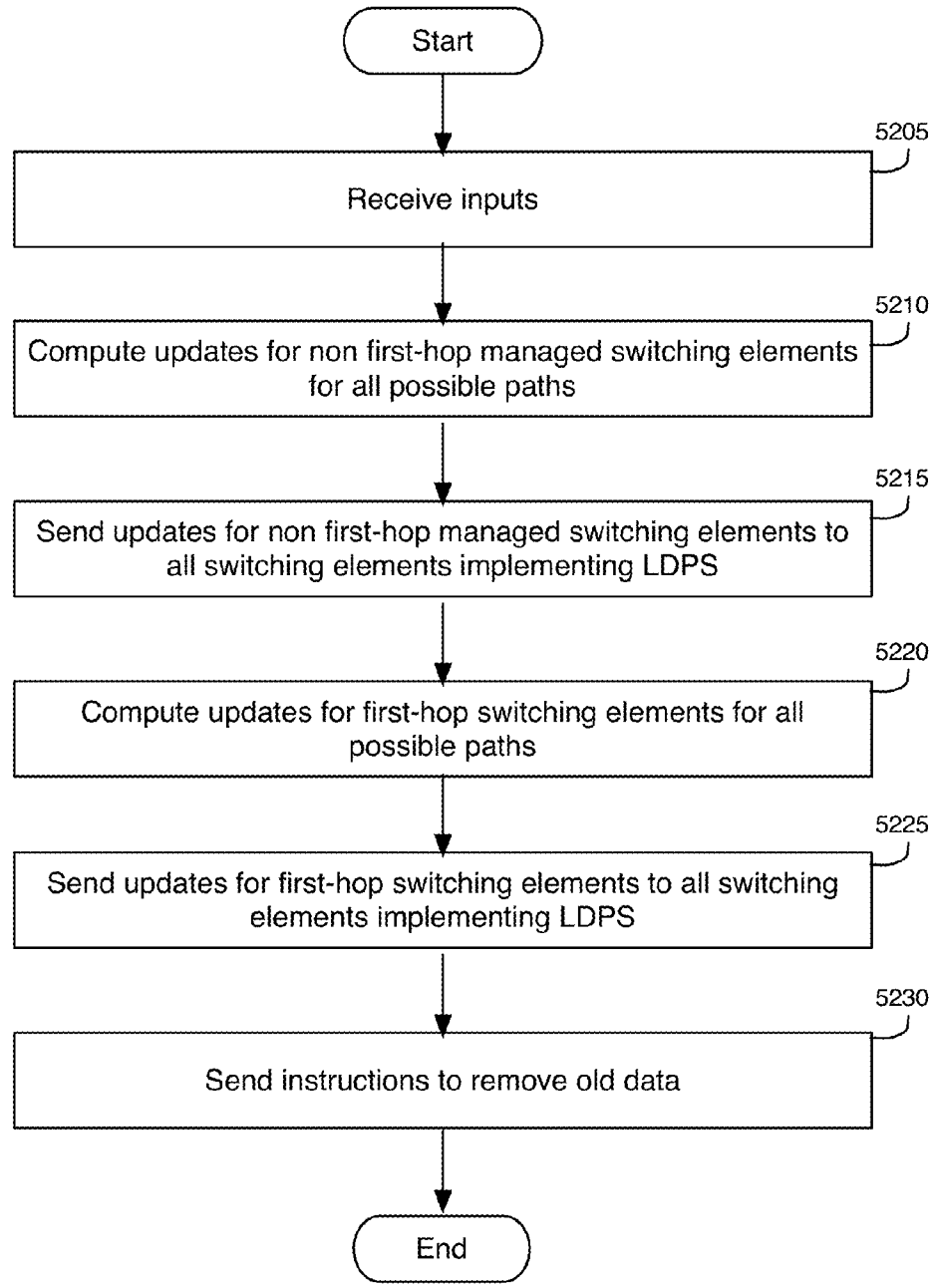
FIG. 52 conceptually illustrates a process that some embodiments perform to send the updates to the managed switching elements for all paths defined by the LDPS.

Also, it is to be noted that the steps shown in the four stages 5101-5104 in FIG. 51 are shown in terms of updates for one path defined in the LDPS. Because there may be many other paths in a logical switch defined by a LDPS, the logical controllers and the physical controllers have to perform the two-step process described in terms of the four stages 5101-5104 for all possible paths for the LDPS. The next figure, FIG. 52, conceptually illustrates a process 5200 that some embodiments perform to send the updates to the managed switching elements for all paths defined by the LDPS. The process 5200 in some embodiments is performed by a logical controller that is the master of a LDPS.

The process 5200 begins by receiving (at 5205) inputs from the user. In some embodiments, the process 5200 receives the inputs from an input translation controller, which translates the inputs in API calls into a format (e.g., data tuples) that an n Log engine can process. In some cases, the inputs specify a policy update to the LDPS.

Next, the process 5200 computes (at 5210) the updates for the middle switching elements and the last-hop managed switching elements for all possible paths of packets that are defined by the LDPS. As mentioned above, any logical port can be an ingress port and/or an egress port and therefore there could be many paths for packets between many possible pairs of logical ports. These logical ports are mapped to physical ports of the managed switching elements that implement the LDPS. Hence, any of the managed switching elements that implement the LDPS could be a first-hop for one path, a last-hop for another path, and a middle switching element for yet another path. Therefore, the process computes at 5210 only the updates for the managed switching elements to function as the middle switching elements or the last-hop managed switching elements. The process 5200 sends (at 5215) the computed (at 5210) updates to all managed switching elements that implement the logical switch.

The process 5200 then computes (at 5220) the updates for the managed switching elements to function as the first-hop managed switching elements. The updates computed at 5220 are for all possible paths defined by the LDPS data. The process 5200 then sends (at 5225) these updates to all managed switching elements that implement the LDPS.

Next, the process 5200 then sends (at 5225) instructions to remove data related to the old policy to all managed switching elements that implement the LDPS. The managed switching elements will remove the old policy data so that the managed switching elements forward the packets based on the new policy specified by the received updates. The process then ends.

In the approach described above, there is no requirement for encoding the packets with versions of any kind. At most, the number of required path configurations in the network may increase while any new paths (not required by the old configuration) are being prepared and before any old paths (not required by the new configuration) are not yet removed. Similarly, updating the forwarding state does not have to be ordered globally. Only serializing the updates per first-hop element is required. That is, if multiple first-hop elements require state updates, their updates can proceed in parallel, independently. Only the computation has to be transactional.

In some embodiments, the network control system might use the approach described in the Reitblatt article for updating the network-wide state in limited cases, where the forwarding state in the middle of the network changes enough that the old and new paths would be mixed. For instance, this could happen when the addressing scheme of the path labels change between software versions (of input translation application, control application, virtualization application, chassis control application, etc.). For that kind of condition, the system might want to dedicate a network-wide version bit (or a few bits) from the beginning of the path label/address, so that the structure of the path addressing can be changed if necessary. Having said this, one should note that as long as the label/address structure does not change, the network wide updates can be implemented as described above by adding new paths and then letting the first-hop edge migrate to the new paths after the rest of the path is ready.

C. Modeling the External Dependencies

The discussion above considered the requirements that are to be placed on the transactionality in the system and the implementation of transaction updates across the network (e.g., by separating the updates to the first-hop processing from the updates to the non-first-hop processing). The network control system also has to compute the update to the network forwarding state (e.g., universal physical control plane data).

Clearly, before updating anything transactionally, the network control system lets the UPCP computation converge given the policy changes. As described above, the network control system of some embodiments uses an n Log table mapping engine to implement the network controllers of the system. The n Log engine in some embodiments lets the computation reach its fixedpoint—that is, the n Log engine computes all the changes to the forwarding state based on the input changes received so far.

At the high-level, reaching a local fixedpoint is simple: it is sufficient to stop feeding any new updates to the computation engine (i.e., the n Log engine), and to wait until the engine has no more work to do. However, in networking, the definition of a fixedpoint is a bit wider in its interpretation: while the computation may reach a fixedpoint, it does not mean that the computation reached an outcome that can be pushed further down towards the managed switching elements. For example, when changing the destination port of a tunnel, the UPCP data may only have a placeholder for the physical port that the destination port maps to.

It turns out that the computation may depend on external changes that have to be applied before the computation can finish and reach a fixedpoint that corresponds to a forwarding state that can be used and pushed down. To continue with our example, the placeholder for the port number in the flow entry may only be filled after setting up a tunnel port that will result in a port number. In this case, the UPCP computation cannot be considered finished before the dependencies to any new external state (e.g., port numbers due to the created tunnel) are met.

Hence, these external dependencies have to be considered in the computation and included into the consideration of the "fixedpoint." That is, a fixedpoint is not reached until the computation finishes locally and no external dependencies are still unmet. In some embodiments, the n Log computation is built on adding and removing intermediate results; every modification of the configuration or to the external state results in additions and removals to the computed state.

In order to consider the external dependencies in the UPCP computation, the n Log computation engine should:

1) when a modification results in a state that should be added before the new UPCP data can be pushed down (e.g., when a tunnel has to be created to complete a UPCP flow entry), let the modification be applied immediately. The n Log computation engine has to consider fixedpoint unreachable until the results (e.g., the new port number) of the modification are returned to the n Log computation engine.

2) when a modification results in a state that would affect the current UPCP data (e.g., removing an old tunnel), though, the update cannot be let through before the transaction is committed (i.e., the new network forwarding state is implemented). It should be applied only after the transaction has been committed. Otherwise, the network forwarding could change before the transaction is committed. Supporting atomic modification of an external resource cannot be done with the above rules in place. Fortunately, most of the resource modifications can be modeled as additions/removals; for instance, in the case of changing the configuration of a port representing a tunnel towards a particular destination, the new configuration can be considered as a new port, co-existing transiently with the old port.

Hence, at the high-level, the above approach builds on the ability to add a new configuration next to the old one. In the case of networking managed resources within the datapaths, this is typically the case. In the case that constraints exist (say, for some reason, two tunnels towards the same IP cannot exist), the approach does not work and the atomicity of such changes cannot be provided.

D. Communication Requirements for Transactional Updates

The discussion above noted that it is sufficient to compute the updates in a transactional manner, and then push them to the first-hop edge switching elements. Hence, in addition to the computation, one more additional requirement is imposed to the system: transactional communication channels.

Accordingly, in some embodiments, the communication channel towards the switching elements (e.g., communication channels from input translation controllers to logical controllers, from logical controllers to physical controllers, from physical controllers to chassis controllers or managed switching elements, and/or from chassis controllers to managed switching elements) supports batching changes to units that are applied completely or not at all. In some of these embodiments, the communication channel only supports the concept of the "barrier" (i.e., start and end tags), which signals the receiver regarding the end of the transaction. A receiving controller or managed switching element merely queues the updates until it receives a barrier as described above. In addition, the channel has to maintain the order of the updates that are sent over, or at least guarantee that the updates that are sent before a barrier do not arrive at the receiver after the barrier.

In this manner, the sending controller can simply keep sending updates to the state as the computation makes progress and once it determines that the fixedpoint has been reached, it signals the receiving first-hop switching elements about the end of the transaction. As further described below, the communication channel in some embodiments also supports synchronous commits, so that the sending controller knows when a transaction has been processed (computed by reaching a fixedpoint) and pushed further down (if required). One should note that this synchronous commit may result in further synchronous commits internally, at the lower layers of the network control system, in the case of nested transactions as discussed below.

E. Nesting Transactions to Compose Distributed Transactions

By separating the beginning of the network from the rest of the network when it comes to the forwarding state updates as described above by reference to FIGS. 51 and 52, the network control system of some embodiments effectively creates a nested transaction structure: one global transaction can be considered to include two sub-transactions, one for first-hop ports and one for non-first-hop ports. The approach remains the same irrespective of whether the solution manages the non-first-hop ports at the finest granularity (by knowing every physical hop in the middle of the network and establishing the required state) or assumes an external entity can establish the connectivity across the network in a transactional manner.

In some embodiments, this generalizes to a principle that allows for creation of basic distributed transactions from a set of more fine-grained transactions. In particular, consider a network element that has multiple communication channels towards the element, with each channel providing transactionality but no support for transactions across the channels. That is, the channels have no support for distributed transactions. In such a situation, the very same composition approach works here as well. None of the other channels' state is used as long as one of the channels that can be considered as a primary channel gets its transaction applied. With this sort of construction, the secondary channels can again be 'prepared' before the primary channel commits the transaction (just like the non-first-hop ports were prepared before the edge committed its transaction). In this manner, the net result is a single global transaction that gets committed as the edge transaction gets committed.

Figure 53:
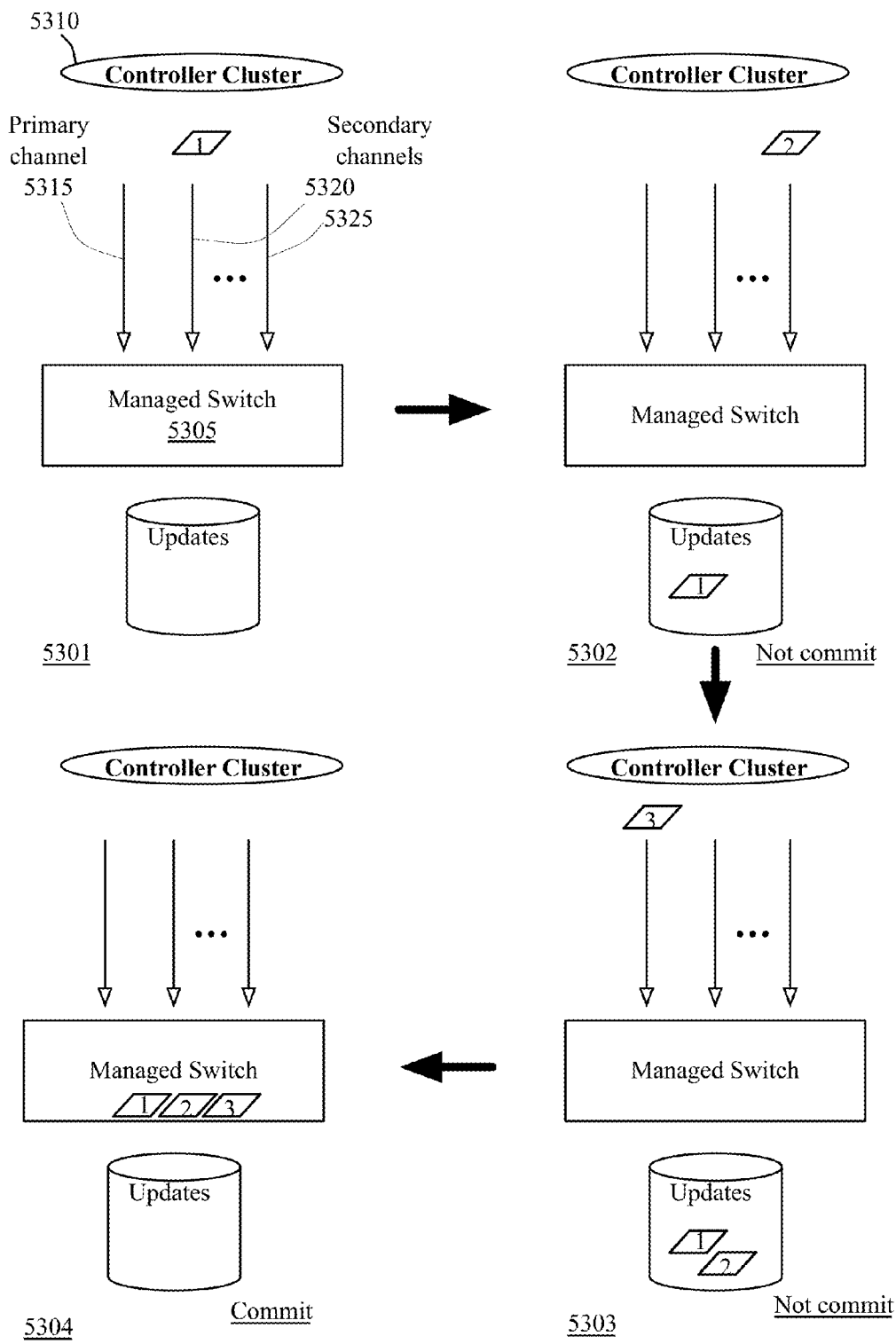
FIG. 53 illustrates an example managed switching element to which several controllers have established several communication channels to send updates to the managed switching element.

FIG. 53 illustrates an example managed switching element 5305 to which several controllers have established several communication channels to send updates to the managed switching element. In particular, this figure illustrates in four different stages 5301-5304 that the managed switching element 5305 does not use updates received through secondary channels until the updates from the primary channel arrives. This figure illustrates the several controllers as a controller cluster 5310. This figure also illustrates communication channels 5315-5325.

The controller cluster in this example includes logical and physical controllers. The physical controllers establish the channels 5315-5325 to the managed switching element 5305. As the physical controllers establish the channels with the managed switching element 5305, the physical controllers designate one of the channels as a primary channel and the rest of the channels as secondary channels. Different embodiments make these designations differently. For instance, some embodiments assign different priorities to different updates sent through different channels. More specifically, the physical controller that would have the primary channel to the managed switching element may send the updates with highest priority while the other physical controllers that would have the secondary channels to the managed switching element send the updates with lower priorities. Then the physical controllers send the low priority updates to the managed switching element over the secondary channels first and then send the highest priority updates to the manage switching element over the primary channel. The managed switching element holds the updates with the lower priority until the higher priority updates arrive. The managed switching element then "commits" the updates (i.e., use the updates to forward incoming packets) and thereby achieves an atomic transaction.

In this example, the controller cluster 5310 designates the channel 5315 as the primary channel and the channels 5320-5325 as the secondary channels. At stage 5301, updates 1 (depicted as number 1 enclosed by a parallelogram) are prepared and being sent to the managed switching element 5305 over the secondary channel 5320. The next stage 5302 shows that updates 2 are prepared and being sent to the managed switching element 5305 over another secondary channel 5325. The stage 5302 also shows that the updates 1 are stored without being "committed" by the managed switching element 5305. In other words, the managed switching element 5305 does not forward the packets it receives based on the updates 1.

The third stage 5303 shows that the updates 3 are prepared and being sent to the managed switching element 5305 over the primary channel 5315. The stage 5303 shows that the updates 1 and 2 are stored without being committed by the managed switching element 5305. The fourth stage 5303 shows that the updates 1-3 are committed by the managed switching element 5305 upon the arrival of the updates 3.

It is to be noted that the generalization allows for nesting the transactions to arbitrary depths, if so needed. In particular, a transactional system may internally construct its transactionality out of nested transactions. The ability to construct the transactionality out of nested transactions comes useful not only in the hierarchical structure that the controllers may form, but also in considering how the switching elements may internally provide a transactional interface for the controllers managing the switching elements, as discussed below.

Consider the managed switching elements. The network control system of some embodiments introduces transactionality to a communication channel without any explicit support for transactionality in the underlying managed resource, again by using the same principle of nesting. Consider a (software) datapath with an easily extendable table pipeline. Even if the flow table updates did not support transactions, it is easy to add a stage to the front of the existing pipeline and have a single flow entry decide which version of the state should be used. Hence, by then updating a single flow entry (which is transactional), the whole flow table can be updated transactionally. The details of this approach do not have to be exposed to the controllers above; however, effectively there is now a hierarchy of transactions in place.

Figure 54B:
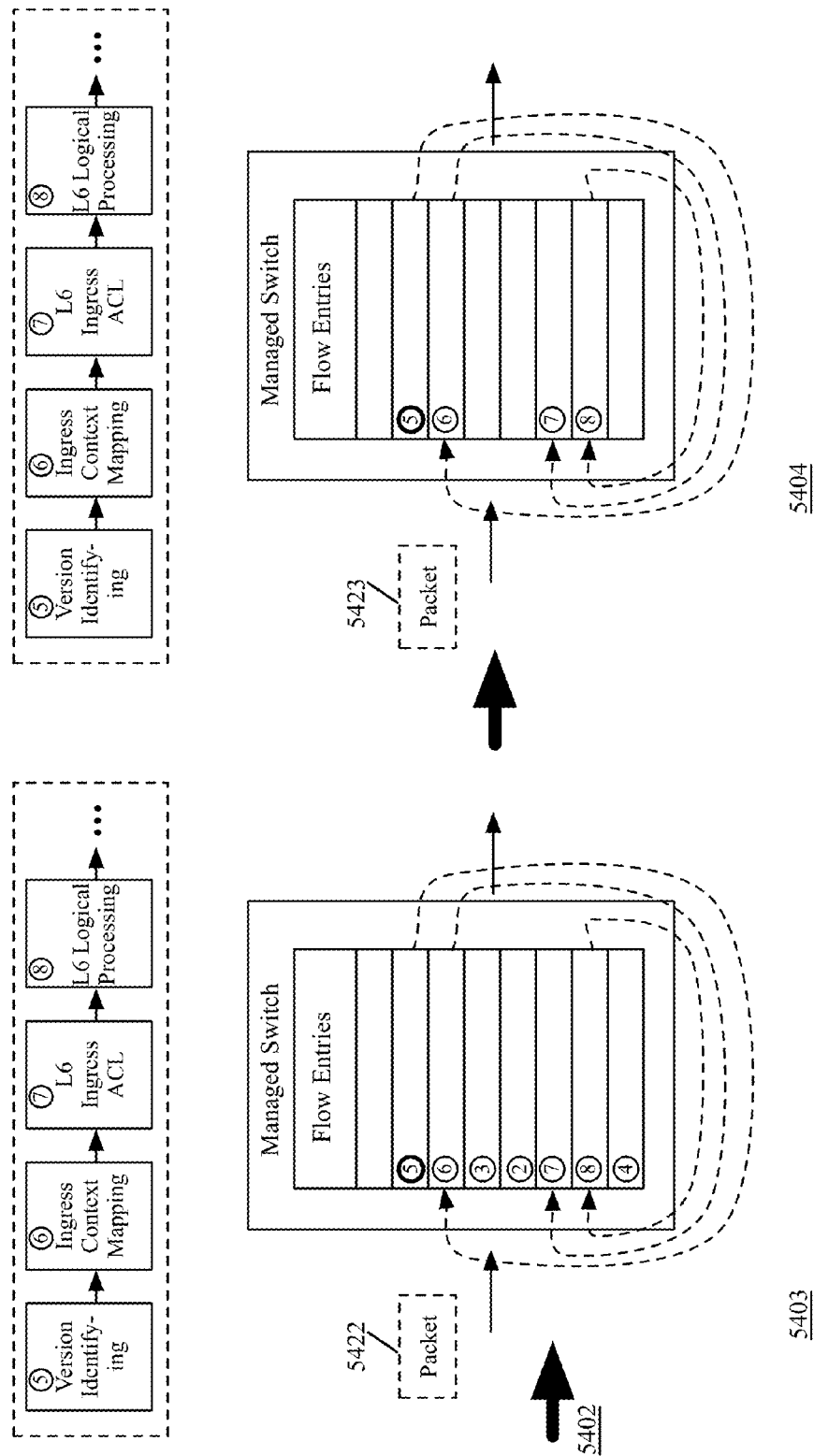

FIGS. 54A and 54B conceptually illustrate a managed switching element 5405 and a processing pipeline 5415 performed by the managed switching element 5405 to process and forward packets coming to the managed switching element 5405. In particular, these figures illustrate in four different stages 5401-5404 an example operation of the managed switching element 5405 to transition from an old version of flow entries to a new version of flow entries. These figures also illustrate packets 5420-5423 that represents packets coming into the managed switching element 5405. The managed switching element 5405 processes and forwards the packets represented by the packets 5420-5423 based on flow entries in a forwarding table 5410.

The first stage 5401 shows that the managed switching element 5405 performs the processing pipeline 5415 based on flow entries 1-4 in the forwarding table 5410. The flow entry 1 (depicted as an encircled number 1) specifies a version of flow entries that the managed switching element 5405 should be using. In this example, flow entries 2-4 have the same version specified by the flow entry 1.

Upon receiving the packet 5420, the managed switching element performs a version verifying operation of the processing pipeline 5415 based on the flow entry 1. The flow entry 1 further specifies that the packet 5420 be further processed by the managed switching element 5405 (e.g., by sending the packet 5420 to a dispatch port). The dispatch port of some embodiments allows the packet to enter the managed switching element 5405 again so that the managed switching element 5405 can further process the packet. The managed switching element 5405 further processes the packet 5420 based on the flow entries 2, 3, and then 4. The managed switching element 5405 allows the packet 5420 to re-enter the managed switching element 5405 by sending the packet to the dispatch port after processing the packet based on a flow entry. The last flow entry to be processed on the packet specifies that the packet be sent to the next-hop switching element (or to the destination). Packet processing by a managed switching element based on flow entries is described in U.S. patent application Ser. No. 13/177,535.

The second stage 5402 shows that several new flow entries 6-8 have been added to the forwarding table 5410. In some embodiments, the managed switching element 5405 adds these flow entries based on the inputs (e.g., customized physical control plane data) received from a controller cluster. In this example, the flow entries 6-8 have a version that is newer than the version of the flow entries 2-4 and the flow entries 6-8 specify the corresponding operations of the processing pipeline 5415 that the flow entries 2-4 specify, respectively. Upon receiving the packet 5421, the managed switching element 5405 at the stage 5402 still uses flow entries 1-4 to process the packet 5421.

The third stage 5403 shows that the managed switching element 5405 has replaced the flow entry 1 with the flow entry 5, which specifies that the managed switching element 5405 should use the flow entries with the newer version. Upon replacing the flow entries, the managed switching element 5405 then would use flow entries 6-8 because these entries are the newer version of flow entries. The flow entries are thereby updated to the newer version in a transactional manner. Upon receiving the packet 5423, the managed switching element 5405 performs the processing pipeline 5415 based on the flow entries 5-8. The fourth stage 5404 shows that the managed switching element 5405 removes the flow entries 2-4.

F. Re-Ordering External Input (Events) to Minimize Rate of Updates

While a typical user-driven change to the policy configuration causes a minor incremental change and this incremental change to the forwarding state can be computed efficiently, failover conditions may cause larger input changes to the n Log computation engine. Consider a receiving controller, which is configured to receive inputs from a source controller, after the source controller crashes and a new controller subsumes the source controller's tasks. While the new controller was a backup controller and therefore had the state pre-computed, the receiving controller still has to do the failover from the old source to a new source.

In some embodiments, the receiving controller would simply tear down all the input received from the crashed controller (revert the effects of the inputs) and then feed the new inputs from the new controller to the n Log computation engine even if it would be predictable that the old and new inputs would most likely be almost identical, if not completely identical. While the transactionality of the computation would prevent any changes in the forwarding state from being exposed before the new source activates and computation reaches its fixedpoint, the computational overhead could be massive: the entire forwarding state would be computed twice, first to remove the state, and then to re-establish the state.

In some embodiments, the receiving controller identifies the changes in the inputs from the old and new source and would compute forwarding state changes only for the changed inputs. This would eliminate the overhead completely. However, with transactional computation and with the ability to reach a fixedpoint, the receiving controller of some embodiments can achieve the same result, without identifying the difference. To achieve a gradual, efficient migration from an input source to another without identifying the difference, the network control system simply does not start by tearing down the inputs from the old source but instead feeds the inputs from the new source to the computation engine while the inputs from the old source are still being used. The network control system then waits for the fixedpoint for the inputs from the new source, and only after that, deletes the inputs from the old source.

By re-ordering the external inputs/events in this manner, the n Log computation engine of some embodiments can detect the overlap and avoid the overhead of completely tearing down the old state. (This therefore requires the n Log computation engine to be clever enough to optimize away the computation for duplicate states.) Without needing to tear down the state from the old source, the receiving controller does not commit the transaction until the fixedpoint from the new source arrives. Once the fixedpoint arrives, the receiving controller pushes any changes to the forwarding state (i.e., the output state) due to the changed inputs to the consuming switching elements. If the changes are significant, this approach comes with the cost of increased transient memory usage.

Figure 55:
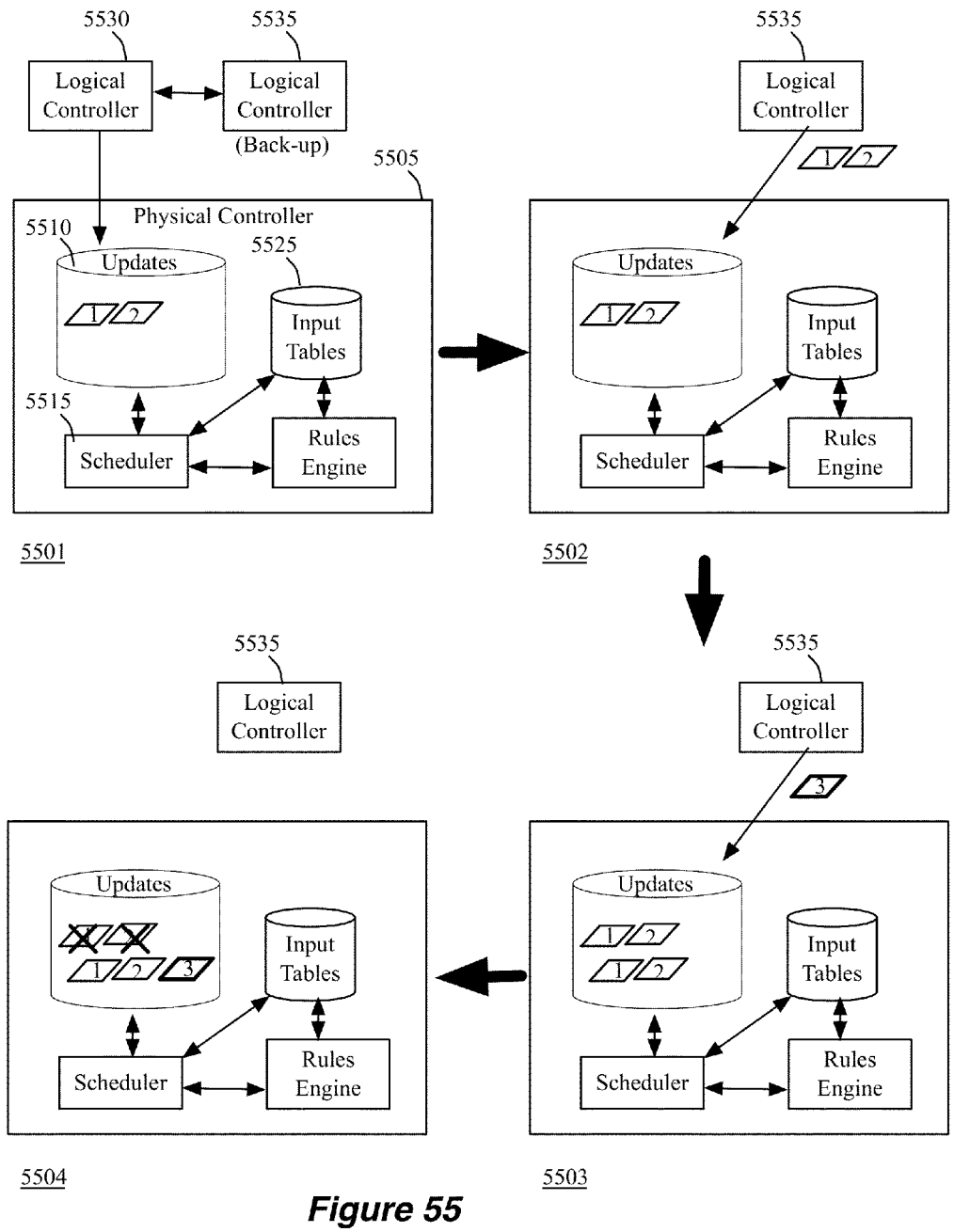
FIG. 55 conceptually illustrates an example physical controller that receives inputs from a logical controller.

FIG. 55 conceptually illustrates an example physical controller 5505 that receives inputs from a logical controller 5530. In particular, this figure illustrates in four different stages 5501-5504 the physical controller 5505's handling of inputs when the logical controller 5530 fails and a logical controller 5535 that is a back-up logical controller for the logical controller 5530, takes over the task of computing and sending updates to the physical controller 5505. As shown, the physical controller 5505 includes a scheduler 5515, a rules engine 5520, input tables 5525, and an updates repository 5510.

The physical controller 5505 in this example runs an integrated application 2405 described above by reference to FIG. 43. For simplicity of discussion, not all components (e.g., an event classifier, a translator, an importer, an exporter, etc.) of the physical controller 5505 are shown in FIG. 55. The input tables 5525 and the rules engine 5520 are similar to the input tables 2415 and the rules engine 2410 described above. The scheduler 5515 is similar to the scheduler 4305 in FIG. 43. The scheduler 5515 also uses the updates repository 5510 to manage the input event data from other controllers including the logical controller 5530. The updates repository 5510 is a storage structure for storing the input event data that the scheduler 5515 receives.

The first stage 5501 shows that the scheduler has stored input event data 1 and 2 (depicted as numbers 1 and 2 enclosed by parallelograms). In this example, the scheduler 5515 does not push the event data 1 and 2 to the input tables 5525 because the scheduler 5515 has not received a barrier that indicates a complete set of transactional inputs have arrived from the logical controller 5530. In this example, the input event data 1 and 2 are input event data generated and sent to the managed switching element 5505 after the last barrier, which defines the end of a set of transactional inputs, is generated but before the barrier is sent to the managed switching element 5505.

The next stage 5502 shows that the logical controller 5530 has failed and the logical controller 5535, as the back-up of the logical controller 5530, subsumed the role of the logical controller 5530 by sending the input event data 1 and 2. As mentioned above, the logical controller 5535, as a back-up to the logical 5530, has identical input event data (i.e., output data from the perspective of these logical controllers) as the logical 5530 does.

The third stage 5503 shows that the back-up logical controller 5535 has computed and is sending input event data 3, which contains a barrier that indicates the end of a set of input event data. This stage also shows that the duplicates input event data 1 and 2 are stored in the updates repository 5510 and the scheduler has not sent these duplicates to the input tables 5525 because the barrier has not arrived yet.

The fourth stage 5504 shows that, upon receiving the input event data 3 with the barrier, the scheduler 5515 has deleted (deletion indicated by crossing out) input event data 1 and 2 received from the failed logical controller 5530. The scheduler 5515 would then update the input tables 5525 using the input event data 1-3 so that the rules engine 5520 can detect the changes in the input tables 5525 and perform table mapping operations based on the changes.

FIG. 55 illustrates a failover example in terms of logical controllers and physical controllers. However, one of the ordinary skill in the art will recognize similar operations may be performed by input translation controllers and logical controllers, or physical controllers and chassis controllers when an input translation controller sending inputs to a logical controller fails or when a physical controller sending inputs to a chassis controller fails.

G. Transactions in Hierarchical Forwarding State Computation

Consider a hierarchical setting where there are two or more layers of computational elements (e.g., logical controllers and physical controllers) feeding updates to the switching elements that may be receiving transactional updates from multiple controllers. In this situation, the topmost controllers compute their updates in a transactional manner, but the controllers below them may receive updates from multiple topmost controllers; similarly, the switching elements may receive updates from multiple second level controllers.

The transactions may flow down without any changes in their boundaries; that is, a top-level transaction processed at the second level controller results in a transaction fed down to the switching elements containing only the resulting changes of that incoming transaction from the topmost controller. However, the consistency of the policies can be maintained even if the transactions are aggregated on their way down towards the switching elements. Nothing prevents the second level controller from aggregating multiple incoming transactions (possibly from different topmost controllers) into a single transaction that is fed down to the switching elements. It is a local decision to determine which is the proper level of aggregation (if any). For instance, the system may implement an approach where the transactions are not aggregated by default at all, but in overload conditions when the number of transactions in the queues grows, the transactions are aggregated in hope of transactions (from the same source) having overlapping changes that can cancel each other. In the wider network context, one could consider this approach as one kind of route flap dampening.

Figure 56:
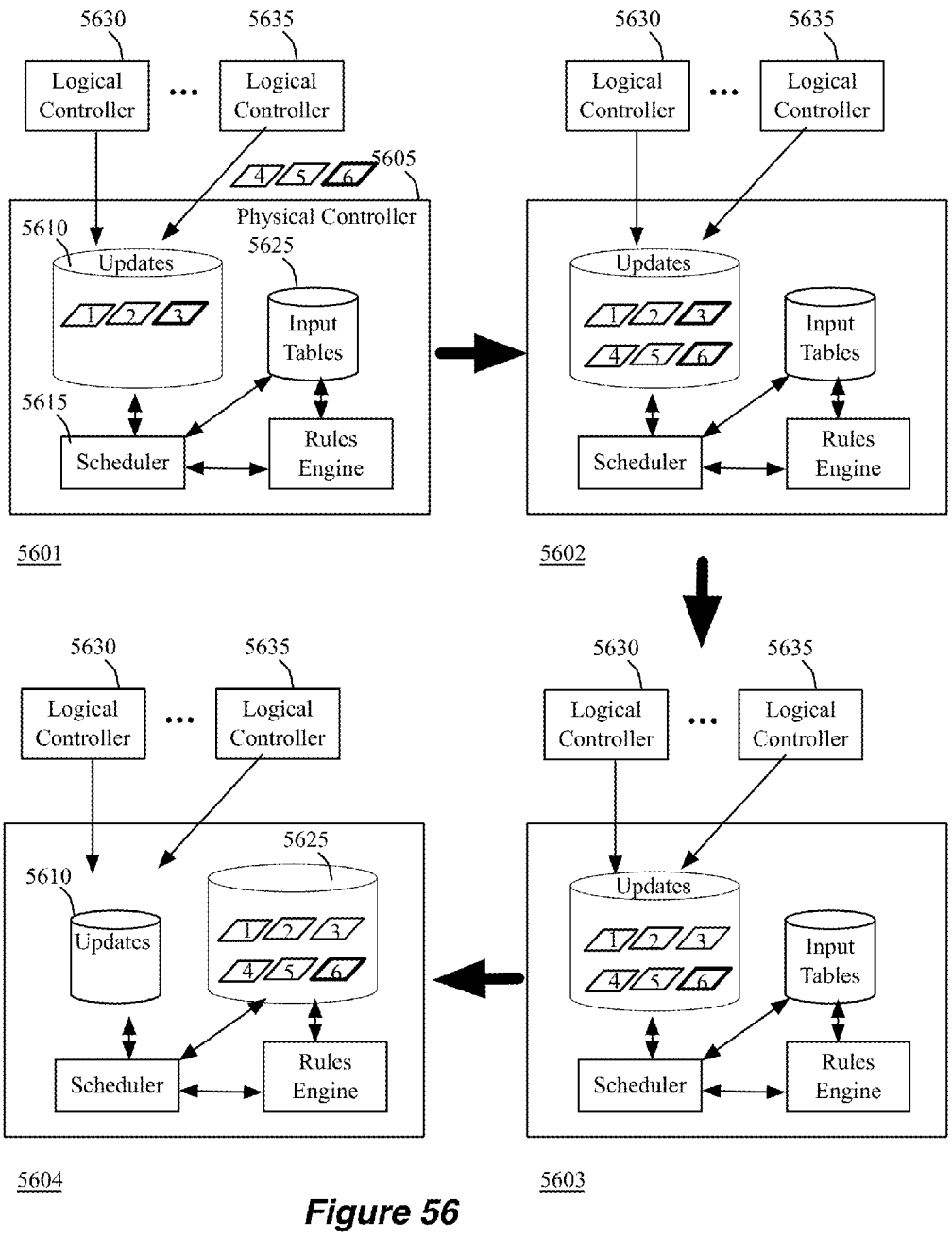
FIG. 56 conceptually illustrates an example physical controller that receives inputs from logical controllers.

FIG. 56 conceptually illustrates an example physical controller 5605 that receives inputs from logical controllers 5630-5635. In particular, this figure illustrates in four different stages 5601-5604 that physical controller 5605 aggregates several sets of input event data from several different logical controllers into a single set of input event data. As shown, the physical controller 5605 includes a scheduler 5615, a rules engine 5620, input tables 5625, and an updates repository 5610. The physical controller 5605 in this example runs an integrated application 2405 described above by reference to FIG. 43. For simplicity of discussion, not all components (e.g., an event classifier, a translator, an importer, an exporter, etc.) of the physical controller 5605 are shown in FIG. 56.

The input tables 5625 and the rules engine 5620 are similar to the input tables 2415 and the rules engine 2410 described above. The scheduler 5615 is similar to the scheduler 4305 in FIG. 43. The scheduler 5615 also uses the updates repository 5615 to manage the input event data from other controllers including the logical controller 5630. The updates repository 5610 is a storage structure for storing the input event data that the scheduler 5615 receives.

The scheduler 5615 of some embodiments monitors the input tables 5625 and/or communicates with the rules engine 5620 to find out the amount of updates to the input tables 5625 that have not been processed by the rules engine 5620. Based on the amount of updates that have not been processed, the scheduler 5615 determines whether to combine sets of input event data into a single set of input event data to update the input tables 5625. The scheduler 5615 of different embodiments determine when to combine sets of input event data differently. For instance, the scheduler 5615 uses the number of sets of input event data that have not been processed by the rules engine 5620, where each set of input event data is defined by a barrier (or start and end tags described above). When the number of sets of input event data is over a certain threshold value (e.g., five), the scheduler 5615 combines several sets of input event data in the updates repository 5625 into a single set of input event data with one barrier.

Alternatively or conjunctively, the scheduler 5615 of some embodiments uses the data size of the input event data that have not been processed by the rules engine 5620. In these embodiments, the scheduler 5615 combines several set of input event data in the updates repository 5625 into a single set of input event before sending them to the input tables 5620 when the size of unprocessed input data in the input tables 5610 is over a threshold value (e.g., several hundreds of bytes). One of the ordinary skills in the art would recognize that there may be other ways to determine when to combine sets of input data events into a single set.

The first stage 5601 shows that the scheduler 5615 has stored input event data 1-3 (depicted as numbers 1-3 enclosed by parallelograms) received from the logical controller 5630. The logical controller 5630 is one of several logical controllers from which the physical controller 5605 receives input event data. In this example, the input event data 3 has a barrier (indicated by a bold parallelogram) indicating the end of a set of input event data (e.g., one set of transactional input event data). However, the scheduler 5615 has not pushed the event data 1-3 to the input tables because, for example, the input event data 1-3 does not affect the same LDPS that the rules engine 5620 is currently processing. The stage 5601 also shows that the logical controller 5635, which is another of the logical controllers that send input event data to the physical controller 5605, is sending the input event data 4-6. The input event data 6 has a barrier (indicated by a bold parallelogram) indicating the end of a set of input event data.

The next stage 5602 shows that two sets of input event data, one set having the input event data 1-3 and another set having the input event data 4-6, are stored in the updates repository 5610. However, the scheduler 5615 has not pushed the event data 1-6 to the input tables because, for example, the input event data 1-6 does not affect the same LDPS that the rules engine 5620 is currently processing. Also, the scheduler 5615 pushes other event data (not shown) from other logical controllers to the input tables 5625.

The third stage 5603 shows that the scheduler 5615 has combined the input event data 1-6 into a single set of input event data with one barrier attached to or included in the input event data 6. In this example, the scheduler 5630 combines the input event data 1-6 because the number of sets of input event data that have not been processed by the rules engine 5620 is now over a threshold value (e.g., five). The fourth stage 5604 shows that the scheduler 5630 has pushed the input event data 1-6 together as one set of input event data to the input tables 5620 after the rules engine 5620 has processed the sets of input event data in the input tables 5620.

The example shown in FIG. 56 is described in terms of logical controllers and physical controllers. However, one of the ordinary skill in the art will recognize similar operations may be performed by input translation controllers and logical controllers, or physical controllers and chassis controllers when a logical controller receives inputs from several input translation controllers or when a chassis controller receives inputs from several physical controllers.

In some embodiments, the transactions can be spliced to smaller ones. If that is to be done, the splicing controller (or switch) should understand which changes result in a policy-compliant, forwarding state version.

H. Example Use Cases
1. API

As mentioned above, the inputs defining LDP sets in the form of API calls are sent to an input translation controller supporting the API. The network control system of some embodiments renders the API updates atomic. That is, a configuration change migrates the system from the old state to the new state in atomic manner. Specifically, after receiving an API call, the API receiving code in the system updates the state for an n Log engine and after feeding all the updates in, the API receiving code in the system waits for a fixedpoint (to let the computation converge) and signals the transaction to be ended by committing the changes for the n Log. After this, the forwarding state updates will be sent downwards to the controllers below in the cluster hierarchy, or towards the switching elements—all in a single transactional update. The update will be applied in a transactional manner by the receiving element.

In some embodiments, the API update can be transmitted across a distributed storage system (e.g., the PTDs in the controllers) as long as the updates arrive as a single transactional update to the receiver. That is, as long as the update is written to the storage as a single transactional update and the n Log processing controller receives the update as a single transaction, it can write the update to the n Log computation process as a single transactional update, as the process for pushing the state updates continues as described above.

2. Controller Failover

Consider a master controller that manages a set of LDP sets. In some embodiments, the controller has a hot backup computing the same state and pushing that state downwards in a similar manner as the master. One difference between the master and the hot backup is that the stream from the backup is ignored until the failover begins. Now as the master dies, the receiving controller/switching element can switch over to the backup by gradually migrating from the old state to the new state as follows.

Instead of the removing/shutting down the stream of state updates from the old master and letting the computation converge towards a state where there is now an active stream of updates coming from the controllers above, it merely turns on the new master, lets the computation converge, and effectively merges the old and new stream. That is, this is building on the assumption that both sources produce almost identical streams. After doing this, the controller waits for the computation to converge, by waiting for the fixedpoint and only after it has reached the fixedpoint, it removes the old stream completely. Again, by waiting for the fixedpoint, the controller lets the computation converge towards the use of the new source only. After this, the controller can finalize the migration from the old source to the new source by committing the transaction. This signals the n Log runtime to effectively pass the barrier from the controllers/switching elements below as a signal that the state updates should be processed.

I. Upgrade Event

Similar to the API and failover operations, the migration from a controller version to another controller version (i.e., software versions) benefits from the transactions and fixedpoint computation support in the system. In this use case, an external upgrade driver runs the overall upgrade process from one controller version to another. It is the responsibility of that driver to coordinate the upgrade to happen in a way that packet loss does not occur.

The overall process that the driver executes to compose a single global transaction of smaller sub-transactions is as follows:

(1) Once a need for upgrading the forwarding state is required, the driver asks for the computation of the new state for the network middle (fabric) to start. This is done for all the controllers managing the network middle state, and the new middle state is expected to co-exist with the old one.

(2) The driver then waits for each controller to reach a fixedpoint and then commits the transaction, synchronously downwards to the receiving controllers/switching elements. The driver does the committing in a synchronous manner because after the commit the driver knows the state is active in the switching elements and is usable by the packets.

(3) After this, the driver asks for the controllers to update towards the new edge forwarding state that will also use the new paths established in (1) for the middle parts of the network.

(4) Again, the driver asks for the fixedpoint from all controllers and then once reaching the fixedpoint, also synchronously commits the updates.

(5) The update is finalized when the driver asks for the removal of the old network middle state. This does not need to wait for fixedpoint and commit; the removal will be pushed down with any other changes the controllers will eventually push down.

J. On-Demand Request Processing

In some cases, the API request processing may be implemented using the n Log engine. In that case, the request is fed into the n Log engine by translating the request to a set of tuples that will trigger the n Log computation of the API response, again represented as a tuple. When the tuple request and response have a one-to-one mapping with request and response tuples, waiting for the response is easy: the API request processing simply waits for a response that matches with the request to arrive. Once the response that matches with the request arrives, the computation for the response is ready.

However, when the request/response do not have a one-to-one mapping, it is more difficult to know when the request processing is complete. In that case, the API request processing may ask for the fixedpoint of the computation after feeding the request in; once the fixedpoint is reached, the request has all the responses produced. As long as the request and response tuples have some common identifier, it is easy to identify the response tuples, regardless of the number of the response tuples. Thus, this use case does not require the use of commits as such, but the enabling primitive is the fixedpoint waiting.

VI. Distribution of Network State Between Switching Elements

As described above, in the network virtualization solution of some embodiments a controller instance uses a network information base (NIB) data structure to send physical control plane data to the managed switching elements. In other embodiments, a controller instance does not use the NIB data structure but instead directly sends the physical control plane data to the managed switching elements over one or more communication channels.

In the network virtualization system, the virtualization application manages the network state to implement LDP sets over a physical network. The network state is not a constant, and as the state changes, updates to the state must be distributed to the managed switching elements throughout the network. These updates to the network state may appear for at least three reasons. First, when the logical policy changes because the network policy enforced by the logical pipeline is reconfigured (e.g., the updating of access control lists by an administrator of the LDPS), the network state changes. Second, workload operational changes result in a change to the network state. For instance, when a virtual machine (VM) migrates from a first hypervisor to a second hypervisor (a first managed edge switching element to a second managed edge switching element), the logical view remains unchanged. However, the network state requires updating due to the migration, as the logical port to which the VM attaches is now at a different physical location. Third, physical reconfiguration events, such as device additions, removals, upgrades and reconfiguration, may result in changes to the network state.

These three different types of changes resulting in network state updates have different implications in terms of network state inconsistency (i.e., in terms of the network state not being up-to-date for a given policy or physical configuration). For instance, when the network state is not up to date because of a new policy, the logical pipeline remains operational and merely uses the old policy. In other words, while moving to enforce the new policies quickly is essential, it is typically not a matter of highest importance because the old policy is valid as such. Furthermore, the physical reconfiguration events come without time pressure, as these events can be prepared for (e.g., by moving VMs around within the physical network).

However, when the network state shared among the switching elements has not yet captured all of the operational changes (e.g., VM migrations), the pipeline may not be functional. For example, packets sent to a particular logical destination may be sent to a physical location that no longer correlates to that logical destination. This results in extra packet drops that translate to a non-functional logical network, and thus the avoidance of such out-of-date network states should be given the utmost priority.

Accordingly, the virtualization application faces several challenges to maintain the network state. First, the virtualization itself requires precise control over the network state by the network controllers in order to enforce the correct policies and to implement the virtualization. Once the controllers (i.e., the control plane) become involved, the timescale for distributing updates becomes much longer than for solutions that exist purely within the data plane (e.g., traditional distributed Layer 2 learning). Second, the responsibility for the entire network state places a scalability burden on the controllers (i.e., controller cluster) because the volume of the network state itself may become a source of complications for the controller cluster.

Given these challenges, it is preferable to offload the state update dissemination mechanisms to the managed switching elements to the largest extent possible, at least for the time critical state updates. Similarly, even for state updates that do not require rapid dissemination, moving updates to the managed switching elements provides benefits for scaling of the logical network.

The differences in the operating environments between the controllers and the managed switching elements have implications on the state update dissemination mechanisms used. For instance, the CPU and memory resources of managed switching elements tend to be constrained, whereas the servers on which the controllers run are likely to have high-end server CPUs. Similarly, the controllers within a controller cluster tend to run on a number of servers, several orders of magnitude less than the number of managed switching elements within a network (e.g., tens or hundreds of controllers compared to tens of thousands of switching elements). Thus, while the controller clusters may favor approaches amenable to a limited number of controllers, the managed switching elements should ideally rely on mechanisms scalable to tens of thousands (or more) of switching elements.

Figure 57:
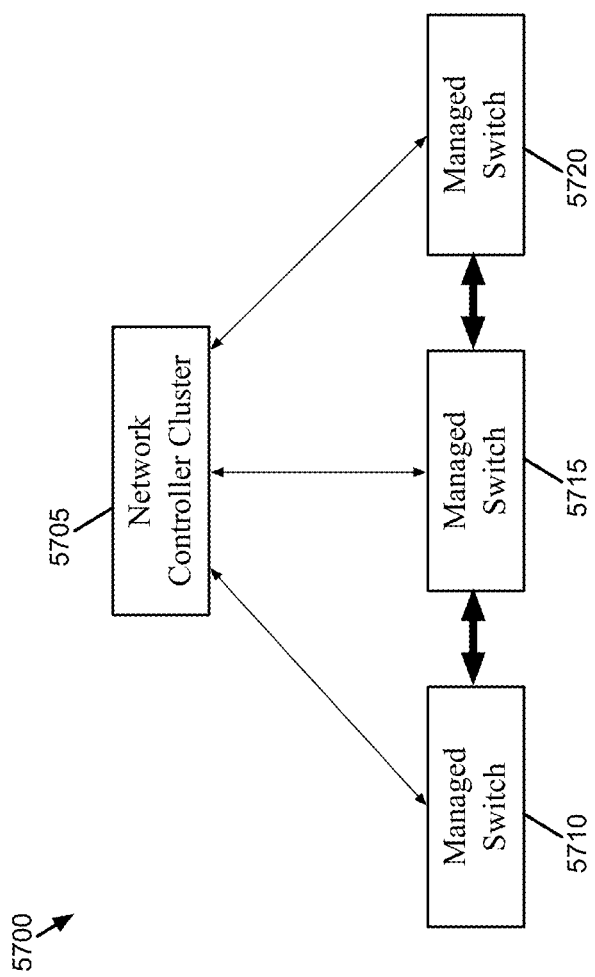
FIG. 57 conceptually illustrates an example architecture of a network control system, in which the managed switching elements disseminate among themselves at least a portion of the network state updates.

FIG. 57 conceptually illustrates an example architecture of a network control system 5700, in which the managed switching elements disseminate among themselves at least a portion of the network state updates. The network control system 5700 includes a network controller cluster 5705 as well as managed switching elements 5710-5720. The network controller cluster 5705 may be a single network controller or several (e.g., tens, hundreds) network controllers that operate together in a distributed fashion. Furthermore, in some embodiments, the network controller cluster 5700 represents a set of both logical and physical controllers that operate together in order to implement a LDPS within several managed switching elements. The operation of logical and physical controllers is described in part by reference to FIG. 27, above.

The arrows in FIG. 57 illustrate the transfer of control data within the network control system 5700. In the above FIG. 27, there is no direct communication of control data between the managed switching elements (network traffic would be passed directly between the managed switching elements, of course). However, in the network control system 5700, control data is sent (i) between the controller cluster 5705 and the managed switching elements 5710-5720 as well as (ii) directly between the managed switching elements. In some embodiments, policy changes to the network state (e.g., ACL rules) are propagated down from the network controller cluster 5705 to the managed switching elements 5710-5720, while operational updates to the network state (e.g., VM migration information) are propagated directly between the managed switching elements. In addition, some embodiments also propagate the operational updates upward to the controller cluster 5705, so that the network controller(s) are aware of the VM locations as well.

A. Push-Based vs. Pull-Based Solutions

At a high level, the network state can be disseminated using two different approaches. First, the network control systems of some embodiments use a push-based approach that pushes state to the network state recipients. Such a solution proactively replicates the state to entities (e.g., switching elements) that might need the state, whether or not those entities actually do need the update. The entire state is replicated because any missing state information could cause an incorrect policy (e.g., allowing the forwarding of packets that should be dropped) or an incorrect forwarding decision, and the entity pushing the state (e.g., a network controller, a switch) will not know in advance what specific information the receiving entity needs.

On the other hand, the network control systems of some embodiments use a pull-based approach. Rather than automatically sending state information for every state update to every entity that might need the update, in a pull-based approach, the entities that actually do need the state update retrieve that information from other entities. Thus, unlike in the push-based approach, extra network state updates are not disseminated. However, because the state is not fetched until a packet requiring the state information is received by a managed switching element, a certain level of delay is inherent in the pull-based system. Some embodiments reduce this delay by caching the pulled state information, which itself introduces consistency issues, as a switching element should not use cached network state information that is out of date. That is, if a switching element pulls state information and then caches it, the switching element may continue to use the cached information even after it becomes out of date. As such, the pull-based approach of some embodiments uses mechanisms to revoke out of date state information from caches around the network.

The process for pushing state information in a push-based system builds on existing state synchronization mechanisms of some embodiments. The managed switching elements disseminate the state updates as reliable streams of deltas (i.e., indicating changes to the state). By applying these deltas to the already-existing state information, the receiving managed switching elements can reconstruct the complete network state. This does not make any assumptions about the structure of the state information.

Pull-based systems of some embodiments, on the other hand, require the state to be amenable to partitioning. If every single update to the network state for a single LDPS required a managed switching element to retrieve the complete network state for the LDPS, the large amount of wasted resources would make such dissemination inefficient. However, in some embodiments, the network state information is easily divisible into small pieces of information. That is, a switching element can map each received packet to a well-defined, small portion of the state that the switching element can retrieve without also retrieving unnecessary information about the rest of the network. Thus, for each packet received, the managed switching element can quickly determine whether it already has the necessary state information or whether this information should be retrieved from another switch.

Thus, even with the need for cache consistency, the pull-based approaches of some embodiments tend to be simpler and more lightweight than the push-based approaches. However, given the restrictions, both in terms of state fetching delays and state structure, the network control systems of some embodiments are designed to disseminate only certain network state updates through the pull-based approaches.

In network control systems that remove the dissemination of the time-critical state updates from the controller cluster, relying instead on the managed switching elements, the controller cluster becomes decoupled from the time scales of the physical events, although the controllers will nevertheless need to be involved in part with some relatively short time range physical events (e.g., VM migration). However, these operations are typically known in advance and can therefore be prepared for accordingly by the controllers (e.g., by pushing the VM-related state information before or during the VM migration so that it is readily available once the migration finishes).

B. Network State Information Disseminated Through Pull-Based Approach

As indicated above, some embodiments distribute the most time-critical network state updates directly between managed switching elements using a pull-based approach. The network state updates with the most time pressure are the workload operational changes (e.g., VM migration), whereas logical policy updates do not have such pressure. Specifically, the most time-critical network state information relates to mapping a first destination-specific identifier to a second destination-specific identifier with lower granularity. When a VM moves from one location to another location, the binding between the logical port to which the VM is assigned and the physical location of that port changes, and without a quick update, packets sent to the VM will be forwarded to the wrong physical location. Similarly, when a MAC address moves from a first logical port to a second logical port, the binding between the MAC address and the logical port should be quickly updated, lest packets sent to the MAC address be sent to the wrong logical port (and thus most likely the wrong location). The same need for timely updates applies to the binding between a logical IP address and a MAC address, in case the logical IP address moves from a first virtual interface to a second virtual interface.

This network state information is easily divisible into partitions. The binding of a logical IP address to a MAC address is defined per IP address, the binding of a MAC address to a logical port is partitioned over MAC addresses, and finally, the binding of a logical port to a physical location is partitioned over the logical ports. Because the boundaries between these different "units" of network state information can be clearly identified, the binding states are ideal candidates for pull-based dissemination.

In addition to the time-critical address and port bindings, the network control system of some embodiments uses the pull-based approach to update some destination-specific state updates that do not have the same time sensitivity. For instance, when the physical encapsulation (e.g., the tunneling between managed switching elements) uses destination-specific labels for multiplexing packets destined to different logical ports onto the same tunnel between the same physical ports, the labels used are destination-specific and hence can be disseminated using a pull-based mechanism. For example, the sending switching element would know a high level port identifier of the destination port and would use that identifier to pull the mapping to a more compact label (e.g., a label assigned by the destination). In addition, the tunnel encapsulation information itself may also be distributed through the pull-based mechanisms. This tunnel encapsulation information might include tunneling details, such as security credentials to use in establishing a direct tunnel between a sender and a destination. This is an example of state information that would not need to be pushed to every managed switching element in a network, as it only affects the two switching elements at either end of the tunnel.

C. Key-Value Pairs to Disseminate State Information

To implement the pull-based dissemination of network state information directly between managed switching elements, the network control system of some embodiments employs a dissemination service that uses a key-value pair interface. By implementing such an interface on the data plane level, the network control system can operate at data plane time scales, at least with regard to network state information distributed through this interface.

In the following description, the key-value pair interface of some embodiments employs three different operations. However, one of ordinary skill in the art will recognize that different embodiments may use more, fewer, or different operations to implement pull-based network state dissemination.

The three operations used by the key-value pair interface of some embodiments include a register operation, an unregister operation, and a lookup operation. The register operation of some embodiments publishes a key-value pair to a dissemination service (e.g., to specific managed switching elements designated as registry nodes) for a particular set time, while the unregister operation of some embodiments retracts a published key-value pair before its set time has expired. The lookup operation of some embodiments is used to pull a value that corresponds to a known key, and returns either the published value for the key or a "not found". In some embodiments, the key-value interface is the interface to both the service clients and the clients for the registry nodes. Managed switching elements issue both lookup operations, in order to pull state information from the registry nodes, as well as register operations to publish their state information to the registry nodes.

Figure 58:
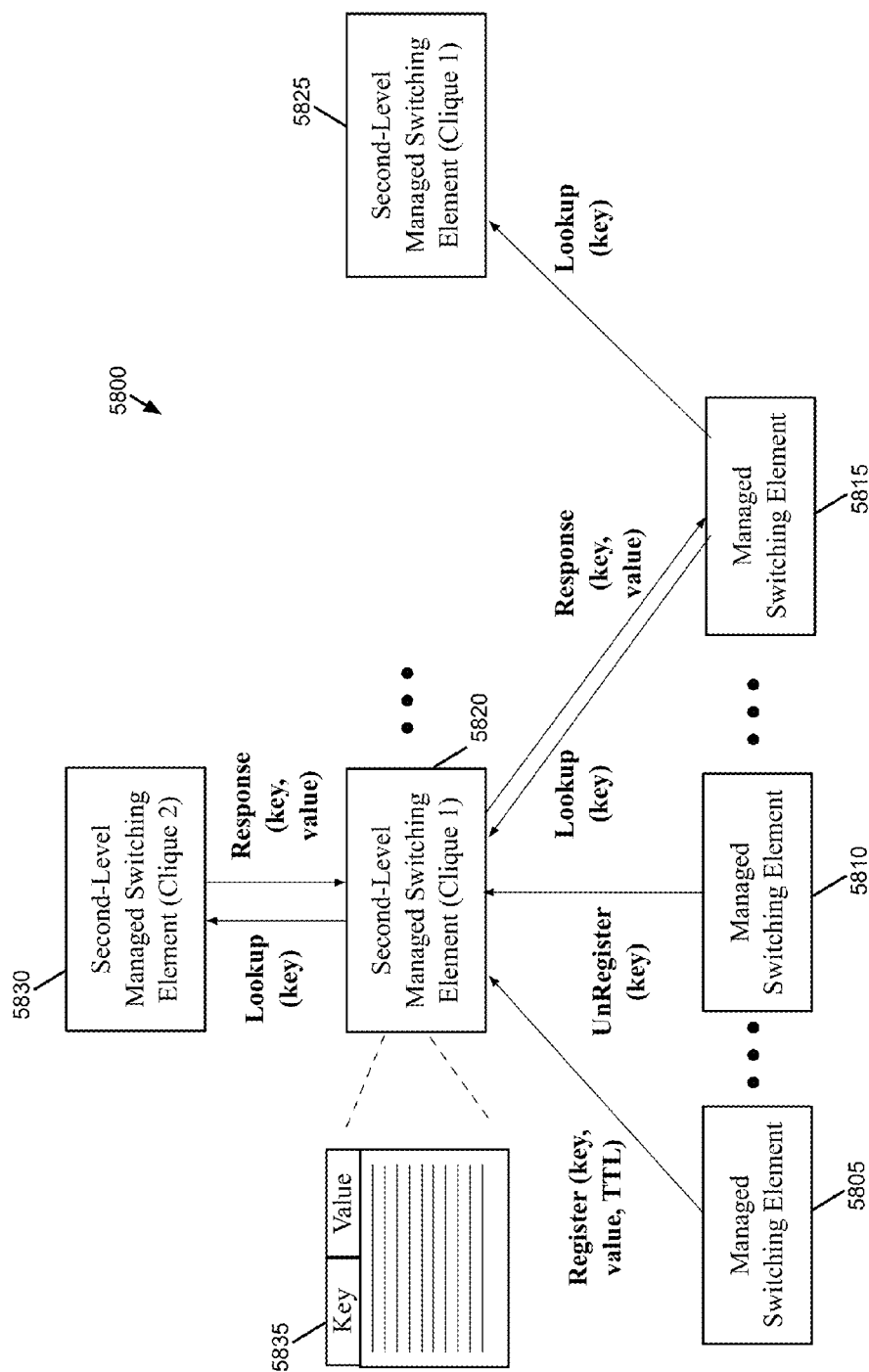
FIG. 58 illustrates examples of the use of these operations within a managed network.

FIG. 58 illustrates examples of the use of these operations within a managed network 5800. As shown, the managed network 5800 includes three managed edge switching elements 5805-5815, and three second-level managed switching elements 5820-5830. The second-level managed switching elements 5820 and 5825 are part of a first clique, along with the three managed edge switching elements 5805-5815, while the second-level managed switching element 5820 is part of a second clique. In some embodiments, all of the managed switching elements within a clique are coupled to each other via a full mesh tunnel configuration, while the second-level managed switching elements in the clique couple to second-level managed switching elements in other cliques.

The edge managed switching element 5805 publishes its mappings to the second-level managed switching element 5820 via a register operation, that takes as its parameters a key, a value, and a time to live (TTL). In some embodiments, each managed switching element publishes its mappings to each registry node to which it connects (e.g., each of the registry nodes within its clique). In other embodiments, a managed switching element selects a subset of the registry nodes to which it publishes its information (e.g., using a deterministic function, such as a hash, that accepts the key value as input). The selected registry nodes have as few disjointed failure domains as possible in some embodiments, in order to maximize the availability of the published mappings The second-level managed switching elements in a network (e.g., the pool nodes) serve as the registry nodes for the network in some embodiments.

To issue a register operation in some embodiments, a managed switching element sends a special packet to the one or more registry nodes. This packet contains header information that separates the packet from network traffic over the LDP sets, and identifies the packet as a register operation. The registry nodes of some embodiments contain a local daemon for handling network state updates. After identifying a register packet as such, the registry node automatically sends the packet to the local daemon for the creation of a new flow table entry based on the received information. Alternatively, the registry nodes of some embodiments use special flow entries to dynamically create new flow entries based on the information in the received register packet, avoiding having to send the packet to a daemon. The established flow entries of some embodiments are designed to match any lookup messages sent with the corresponding key, and to generate the proper response packets, as will be described below.

In some embodiments, the key in the key-value pair represents a first piece of network state information over which the network state is partitioned, and the value represents a second piece of network state information that is bound to the key. For instance, examples of key value pairs include (logical IP, MAC), (MAC, logical port), and (logical port, physical location). The TTL for a published key-value pair represents the length of time before the key-value pair expires. However, in some embodiments, the managed edge switching elements are expected to re-register mappings well before the TTL expires (e.g., after half of the TTL time has elapsed), in order to ensure that the network state is kept up to date.

As shown, the registry node 5820 stores a table 5835 of key-value pairs that it has received (e.g., from the register messages sent by the managed edge switching elements). These pairs store, for example, logical IP to MAC address bindings, MAC to logical port bindings, and logical port to physical location bindings. In addition, each row in the table stores the TTL for the binding pair. In some embodiments, this table is implemented as the dynamically created flow entries stored by the registry node. If the TTL for an entry is reached, some embodiments automatically remove the entry from the table 5835 (i.e., remove the flow entry for the pair) if the pair has not been republished.

In FIG. 58, the managed edge switching element 5810 issues an unregister operation by sending a packet to the registry node 5820. The unregister operation of some embodiments only includes a single parameter, the key that is being unregistered. The switching element 5810 would have previously sent a register packet to the registry node indicating a mapping of the key to a particular value. Upon receiving the unregister packet, the registry node 5820 removes the entry for the key (and its mapped value) from its table 5835.

FIG. 58 also illustrates the managed edge switching element 5815 issuing a lookup operation by sending a packet to the second-level managed switching element 5820, which takes as its parameter a key for which the issuing switching element needs to know the corresponding value. For example, as described below, the managed switching element 5815 might have a packet to be sent to a particular MAC address, and needs to know the logical port to which the particular MAC address is bound. When a managed switching element receives a packet to process (i.e., a logical network traffic packet), the switching element determines whether it can process the packet with its current network state information. When it lacks information, the switching element (in some embodiments, a daemon operating at the switch) sends a lookup packet to one or more registry nodes in order to pull the desired network state information. As shown, the switching element 5815 also sends a lookup packet to the second-level switching element 5825.

The flow entries established at the registry node 5820 in table 5835 are created to match any lookup messages issued to pull a corresponding key, and to generate the proper response. To create such a response, the registry node looks for a match within its flow entries. When the registry node matches one of its created flow entries, it creates a response packet by changing the type of the received lookup packet to a response packet and embedding both the key and its bound value, and then sends the response packet back to the requesting managed switching element.

When the registry node does not find a match within its tables, the registry node sends the message to any remote cliques within the network. In the situation illustrated in FIG. 58, the registry node 5820 does not have a match for the key looked up by the edge switching element 5815. As such, the registry node 5820 sends the lookup packet to the second-level managed switching element 5830, part of a remote clique. The network state table at switching element 5830 includes an entry for the key-value pair, and sends back a response packet that includes the key and value. When the remote clique does not have a match, the switching element 5815 replies with an empty response (i.e., a "not found" response). The second-level switching element 5830 both forwards this response packet to the managed switching element 5815 and caches the key-value pair (e.g., creates a new entry in the table 5835) in some embodiments. In some embodiments, the lookup and subsequent response have symmetric travel routes. Because the delivery of these packets is unreliable in both directions, the original issuer of the lookup packet (e.g., switching element 5815) should be prepared to re-issue the query as necessary after a proper timeout. By avoiding any contact with the network controllers, the processing of the lookup (state-pulling) packets at the registry nodes remains completely at the data plane and thus remains efficient, providing low latency response times.

Much like the register packets, the lookup packets of some embodiments (and the responses) contain header information that separates the packet from network traffic over the LDP sets, and identifies the packet as a lookup operation. In addition to this type-identification information, the packets include an issuer identifier so that the response can be sent back to the issuer without having to hold any state about the pending lookup operation in the registry nodes. In addition, of course, the packet contains the key for which the originating switching element wishes to pull the corresponding value.

The lookup response packet of some embodiments contains the requested key-value pair along with the TTL value for the pair. In addition, the packet contains an issuer identifier so that if the response is relayed via an intermediate registry node, then the packet identifies the destination for the response. In addition, the lookup packet contains a second identifier that identifies the publishing switch, which is useful in revocation processing, discussed below.

D. Edge Switching Element Processing

Figure 59:
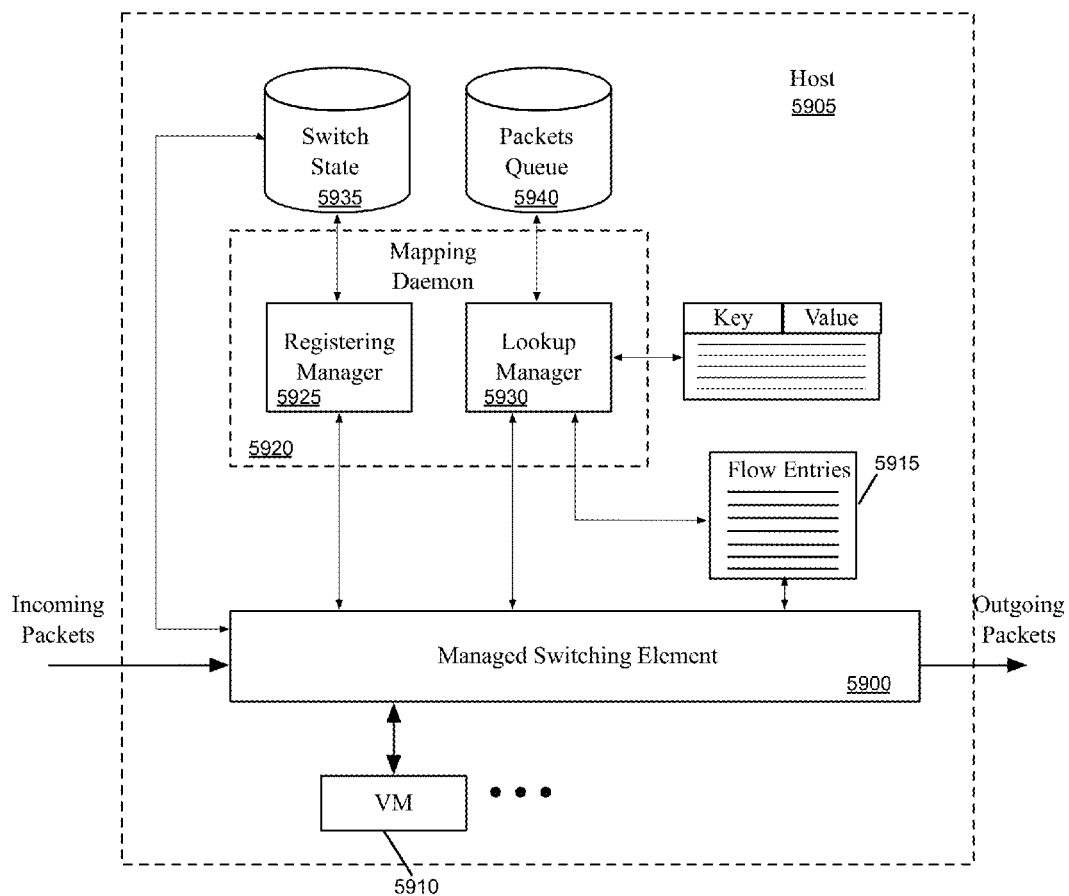
FIG. 59 conceptually illustrates the architecture of an edge switching element in a pull-based dissemination network of some embodiments.

FIG. 59 conceptually illustrates the architecture of an edge switching element 5900 in a pull-based dissemination network of some embodiments. As shown, the edge switching element 5900 is a software switching element that operates within a host machine 5905. Other embodiments implement the managed edge switching elements in hardware switching elements. At least one virtual machine 5910 also operates on the host 5905.

Incoming packets arrive at the managed switching element 5900, either from the VM 5910 (as well as other VMs running on the host 5905) or from other managed switching elements. The managed switching element 5900 contains a set of flow entries 5915 that it uses to forward incoming packets. However, in a pull-based system, the flow entries 5915 may not include the information necessary for the managed switching 5900 to make a forwarding decision for the packet. In this case, the switching element 5900 requests information from a mapping daemon 5920 that also operates on the host 5905.

As shown, the mapping daemon includes a registration manager 5925 and a lookup manager 5930. The registration manager of some embodiments monitors the local switching element state 5935, which includes a configuration database as well as the flow entries 5915. When a change is detected in the local switching element state, the registration manager 5925 causes the switching element 5900 to issue a register packet to one or more registry nodes registering the state information for the switch. This state information may include, e.g., the MAC address and logical port of a new VM operating on the host 5905, etc.

The lookup manager 5930 receives from the switching element 5900 any logical network traffic packets that require lookups in order to be processed by the switching element. That is, the flow entries offload to the mapping daemon 5920 any packets that the flow entries cannot process and that require lookups. In some embodiments, a single logical packet may trigger multiple lookups to the daemon 5920 before passing through the entire processing pipeline to be ready for the encapsulation and delivery to the physical next-hop (e.g., a first lookup to identify the logical port for a packet's destination MAC address and then a second lookup to determine the physical location corresponding to the returned logical port).

In some embodiments, the daemon 5920 uses (e.g., contains) a queue 5940 to store packets while waiting for the lookup responses needed to forward the packets from the registry nodes. If the daemon becomes overloaded, some embodiments allow the daemon to drop packets by either not issuing any lookups or issuing the lookups and only dropping the corresponding packet. Once the packet has been queued, the daemon issues a lookup packet (through the managed switching element 5900) and sends it back to the data plane for further processing. The daemon sends a copy of the lookup packet to several local registry nodes in some embodiments. Depending on the reliability goals of the system, the daemon may issue multiple calls in parallel or wait for a first call to fail in order to retry sending to a new registry node.

Once a response packet is received back at the switching element 5900, the response is cached in the daemon. As shown, in some embodiments, the lookup manager 5930 manages a cache of key-value pairs that also stores TTL information for each pair. In addition, the switching element of some embodiments (or the daemon, in other embodiments) adds a flow entry (along with a TTL) that corresponds to the key-value pair to the flow table 5915. Thus, any packets sent to the particular destination that are required for the pulled state information, can be processed completely on the data plane. The daemon 5920 later inspects the flow entry to determine whether it is actively used in some embodiments. When this is the case, the daemon issues a new lookup packet before the TTL expires, in order to keep the key-value pair up to date.

E. Cache Consistency

Certain situations can result in potential problems in the pull-based system, if an aspect of the network state has changed while switching elements are still using an older cached version of the state. For instance, in some embodiments if a switching element issues a lookup message and then receives a valid response, the switching element caches the result (e.g., by creating a flow entry) for the TTL time in order to avoid issuing a new lookup message for every packet that uses the state information. However, if the publisher of the state information changes the key-value pair, the now-invalid entry will remain cached until the TTL expires, at which point the switching element would issue a new lookup message in some embodiments. To address this potential situation, some embodiments attempt to shorten the time of inconsistency to the absolute minimum while maintaining the pull-based model.

When a switching element has an entry in its cache that stores invalid state information and receives a packet that needs the state information, the switching element will forward the packet using that incorrect state information. In some embodiments, the physical switching element that receives the incorrectly-forwarded packet detects the use of the incorrect state. The packet may have been sent to a destination that is no longer attached to the receiving switch, or the bindings used in the packet are known to be wrong. To detect this, the receiving switching element of some embodiments matches over the bindings based on its local state information and therefore validates the bindings. If the switching element is unable to find a match, it determines that the state information used to forward the packet is invalid.

Upon detecting that the invalid state has been used, the receiving switching element of some embodiments sends a special revocation packet that includes the key of the key-value pair used to create the invalid binding. The revocation packet also includes the packet's publisher identifier. In some embodiments, the switching element sends the revocation packet either directly to the sender or via the pool nodes. In order to send such a packet, the destination switching element has to determine the sender. When there is a direct tunnel between the source and the destination this can be determined easily. However, when the source (that used the incorrect bindings) and the destination are located at different cliques, the packet encapsulation needs to store enough information for the receiving switching element to identify the source. Accordingly, some embodiments require the source managed switching element to include an identifier in the encapsulation.

In some embodiments, once the original packet sending switching element receives the revocation, the switching element not only revokes the key-value pair from its cache (assuming the current cache entry was originally published by the sender of the revocation packet), but additionally sends this revocation packet to the registry nodes to which it sends its queries for the particular key (and from which it may have received the now invalid state information). These registry nodes, in some embodiments, forward the revocation to registry nodes at other cliques and then remove the cached entries matching the key and publisher from their caches (i.e., from their flow entry tables). Using this technique, any switching element that holds invalid cached state information in its flow entries will converge towards the removal of the invalid information, with only a transient packet loss (e.g., only the first packet sent using the invalid state information).

F. Negative Caching

As indicated above, in some cases when a switching element issues a lookup packet in order to pull state information, the registry nodes will not yet have the requested state information and therefore reply with a packet indicating the requested information is not found. In this case, the expectation is that the state information will be available at the registry soon (either directly from the publishing switch, or from registry nodes in other cliques), as otherwise packets that require such a lookup operation should not be sent (unless someone is trying to maliciously forge packets).

In order to limit the extra load under such transient conditions caused by the publisher of the state information being slower than the switching element pulling the state information, and to limit the effect of malicious packet forging, when the switching element receives a "not found" response, some embodiments cache that result as the switching element would with a positive response. However, the switching element sets the TTL to a significantly lower time value than would be the case for a positive response. As the result is assumed to be only due to the transient conditions, the lookup should be retried as soon as the system expects that the value should be available. Unlike the expired/invalid lookup results described in the previous section, these cached "not found" results are not removed quickly and automatically without the short TTL value. As they do not result in packets being sent to an incorrect destination (or any destination at all), there is no revocation packet send back to cause a correction to an inconsistency.

G. Security Issues

In a push-based network control system, in which the controller cluster pushes all of the network state information to the managed switching elements, the security model for the network state at the switching elements is clear. So long as the channel to the switching elements from the controllers remains secure and the switching elements themselves are not breached, then the state information at the switching elements remains correct.

However, in the pull-based system described herein, in which the switching elements obtain at least some of the network state information from the registry nodes (other switching elements), the security model changes. Not only must the registry nodes be trusted, but additionally, the communication channels for transmitting the control-related messages (e.g., register/unregister, lookup/response, revoke, etc.) must be secured, to prevent malicious entities from tampering with the messages at the physical network level. These communication channels include the channels between the registry nodes and other switching elements, as well as between the switching elements themselves.

Some embodiments rely on a more content-oriented approach to securing these channels for exchanging control messages (as opposed to ordinary network data plane traffic). For instance, in some embodiments, the publisher of a key-value pair cryptographically signs its register messages (as well as unregister and revocation messages), under the assumption that a receiver of the messages can verify the signature and thus the validity of the data contained therein. For these cryptographic signatures and for distribution of the necessary public keys, some embodiments rely on standard public-key infrastructure (PKI) techniques.

VII. Logical Forwarding Environment

Several embodiments described above and below provide network control systems that completely separate the logical forwarding space (i.e., the logical control and forwarding planes) from the physical forwarding space (i.e., the physical control and forwarding planes). These control systems achieve such a separation by using a mapping engine to map the logical forwarding space data to the physical forwarding space data. By completely decoupling the logical space from the physical space, the control systems of these embodiments allow the logical view of the logical forwarding elements to remain unchanged while changes are made to the physical forwarding space (e.g., virtual machines are migrated, physical switches or routers are added, etc.).

More specifically, the control system of some embodiments manages networks over which machines (e.g. virtual machines) belonging to several different users (i.e., several different tenants in a private or public hosted environment with multiple hosted computers and managed forwarding elements that are shared by multiple different related or unrelated tenants) may exchange data packets for separate LDP sets. That is, machines belonging to a particular user may exchange data with other machines belonging to the same user over a LDPS for that user, while machines belonging to a different user exchange data with each other over a different LDPS implemented on the same physical managed network. In some embodiments, a LDPS (also referred to as a logical forwarding element (e.g., logical switch, logical router), or logical network in some cases) is a logical construct that provides switching fabric to interconnect several logical ports, to which a particular user's machines (physical or virtual) may attach.

In some embodiments, the creation and use of such LDP sets and logical ports provides a logical service model that to an untrained eye may seem similar to the use of a virtual local area network (VLAN). However, various significant distinctions from the VLAN service model for segmenting a network exist. In the logical service model described herein, the physical network can change without having any effect on the user's logical view of the network (e.g., the addition of a managed switching element, or the movement of a VM from one location to another does not affect the user's view of the logical forwarding element). One of ordinary skill in the art will recognize that all of the distinctions described below may not apply to a particular managed network. Some managed networks may include all of the features described in this section, while other managed networks will include different subsets of these features.

In order for the managed forwarding elements within the managed network of some embodiments to identify the LDPS to which a packet belongs, the network controller clusters automatedly generate flow entries for the physical managed forwarding elements according to user input defining the LDP sets. When packets from a machine on a particular LDPS are sent onto the managed network, the managed forwarding elements use these flow entries to identify the logical context of the packet (i.e., the LDPS to which the packet belongs as well as the logical port towards which the packet is headed) and forward the packet according to the logical context.

In some embodiments, a packet leaves its source machine (and the network interface of its source machine) without any sort of logical context ID. Instead, the packet only contains the addresses of the source and destination machine (e.g., MAC addresses, IP addresses, etc.). All of the logical context information is both added and removed at the managed forwarding elements of the network. When a first managed forwarding element receives a packet directly from a source machine, the forwarding element uses information in the packet, as well as the physical port at which it received the packet, to identify the logical context of the packet and append this information to the packet. Similarly, the last managed forwarding element before the destination machine removes the logical context before forwarding the packet to its destination. In addition, the logical context appended to the packet may be modified by intermediate managed forwarding elements along the way in some embodiments. As such, the end machines (and the network interfaces of the end machines) need not be aware of the logical network over which the packet is sent. As a result, the end machines and their network interfaces do not need to be configured to adapt to the logical network. Instead, the network controllers configure only the managed forwarding elements. In addition, because the majority of the forwarding processing is performed at the edge forwarding elements, the overall forwarding resources for the network will scale automatically as more machines are added (because each physical edge forwarding element can only have so many machines attached).

In the logical context appended (e.g., prepended) to the packet, some embodiments only include the logical egress port. That is, the logical context that encapsulates the packet does not include an explicit user ID. Instead, the logical context captures a logical forwarding decision made at the first hop (i.e., a decision as to the destination logical port). From this, the user ID (i.e., the LDPS to which the packet belongs) can be determined implicitly at later forwarding elements by examining the logical egress port (as that logical egress port is part of a particular LDPS). This results in a flat context identifier, meaning that the managed forwarding element does not have to slice the context ID to determine multiple pieces of information within the ID.

In some embodiments, the egress port is a 32-bit ID. However, the use of software forwarding elements for the managed forwarding elements that process the logical contexts in some embodiments enables the system to be modified at any time to change the size of the logical context (e.g., to 64 bits or more), whereas hardware forwarding elements tend to be more constrained to using a particular number of bits for a context identifier. In addition, using a logical context identifier such as described herein results in an explicit separation between logical data (i.e., the egress context ID) and source/destination address data (i.e., MAC addresses). While the source and destination addresses are mapped to the logical ingress and egress ports, the information is stored separately within the packet. Thus, at managed switching elements within a network, packets can be forwarded based entirely on the logical data (i.e., the logical egress information) that encapsulates the packet, without any additional lookup over physical address information.

In some embodiments, the packet processing within a managed forwarding element involves repeatedly sending packets to a dispatch port, effectively resubmitting the packet back into the switch. In some embodiments, using software switches provides the ability to perform such resubmissions of packets. Whereas hardware forwarding elements generally involve a fixed pipeline (due, in part, to the use of an ASIC to perform the processing), software forwarding elements of some embodiments can extend a packet processing pipeline as long as necessary, as there is not much of a delay from performing the resubmissions.

In addition, some embodiments enable optimization of the multiple lookups for subsequent packets within a single set of related packets (e.g., a single TCP/UDP flow). When the first packet arrives, the managed forwarding element performs all of the lookups and resubmits in order to fully process the packet. The forwarding element then caches the end result of the decision (e.g., the addition of an egress context to the packet, and the next-hop forwarding decision out a particular port of the forwarding element over a particular tunnel) along with a unique identifier for the packet that will be shared with all other related packets (i.e., a unique identifier for the TCP/UDP flow). Some embodiments push this cached result into the kernel of the forwarding element for additional optimization. For additional packets that share the unique identifier (i.e., additional packets within the same flow), the forwarding element can use the single cached lookup that specifies all of the actions to perform on the packet. Once the flow of packets is complete (e.g., after a particular amount of time with no packets matching the identifier), in some embodiments the forwarding element flushes the cache. This use of multiple lookups, in some embodiments, involves mapping packets from a physical space (e.g., MAC addresses at physical ports) into a logical space (e.g., a logical forwarding decision to a logical port of a logical switch) and then back into a physical space (e.g., mapping the logical egress context to a physical outport of the switch).

Such logical networks, that use encapsulation to provide an explicit separation of physical and logical addresses, provide significant advantages over other approaches to network virtualization, such as VLANs. For example, tagging techniques (e.g., VLAN) use a tag placed on the packet to segment forwarding tables to only apply rules associated with the tag to a packet. This only segments an existing address space, rather than introducing a new space. As a result, because the addresses are used for entities in both the virtual and physical realms, they have to be exposed to the physical forwarding tables. As such, the property of aggregation that comes from hierarchical address mapping cannot be exploited. In addition, because no new address space is introduced with tagging, all of the virtual contexts must use identical addressing models and the virtual address space is limited to being the same as the physical address space. A further shortcoming of tagging techniques is the inability to take advantage of mobility through address remapping.

VIII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 60:
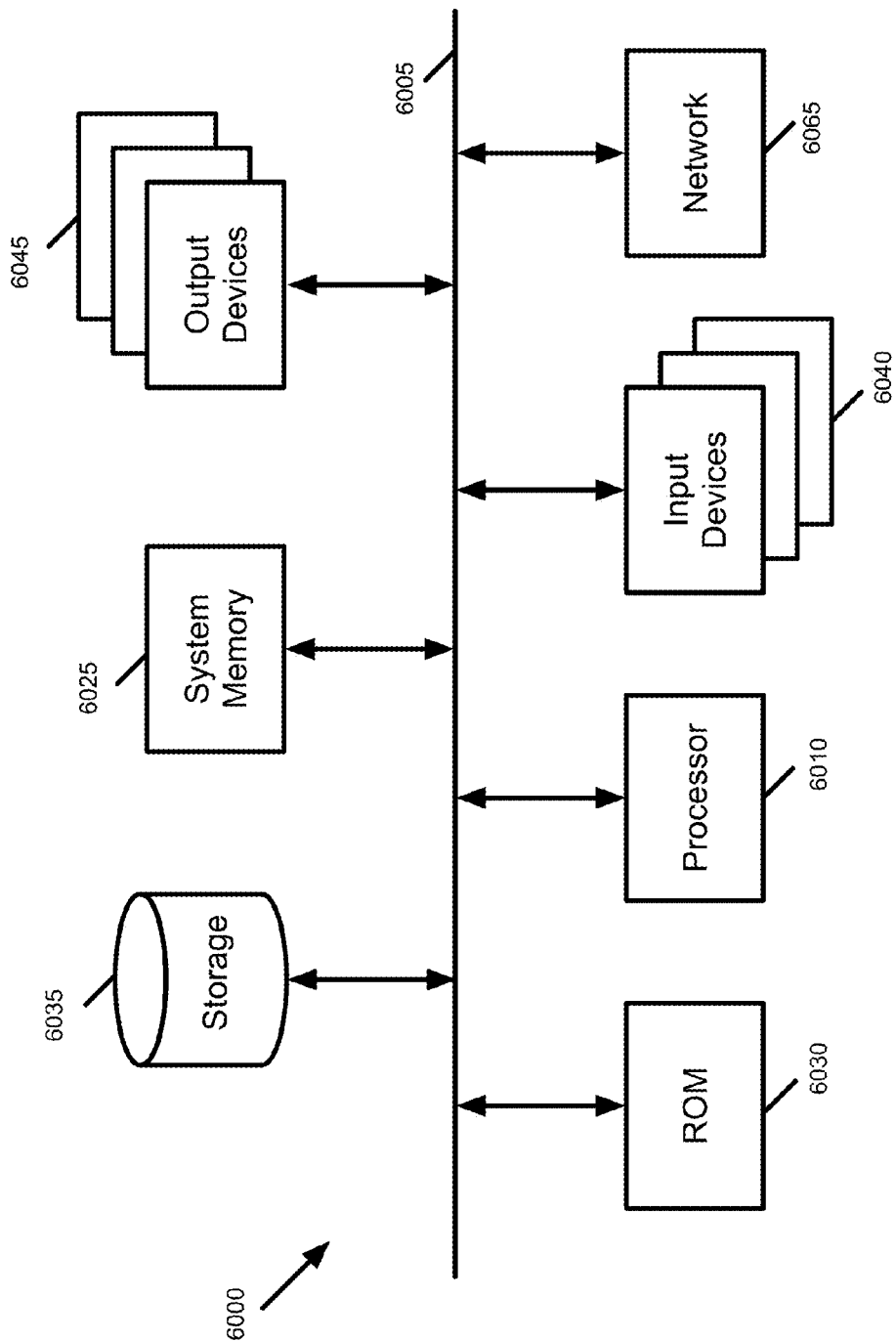
FIG. 60 conceptually illustrates an electronic system with which some embodiments of the invention are implemented.

FIG. 60 conceptually illustrates an electronic system 6000 with which some embodiments of the invention are implemented. The electronic system 6000 can be used to execute any of the control, virtualization, or operating system applications described above. The electronic system 6000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 6000 includes a bus 6005, processing unit(s) 6010, a system memory 6025, a read-only memory 6030, a permanent storage device 6035, input devices 6040, and output devices 6045.

The bus 6005 collectively represents all system, peripheral, and chipset buses that communicatively connect the numerous internal devices of the electronic system 6000. For instance, the bus 6005 communicatively connects the processing unit(s) 6010 with the read-only memory 6030, the system memory 6025, and the permanent storage device 6035.

From these various memory units, the processing unit(s) 6010 retrieve instructions to execute and data to process in order to execute the processes of the invention. The processing unit(s) may be a single processor or a multi-core processor in different embodiments.

The read-only-memory (ROM) 6030 stores static data and instructions that are needed by the processing unit(s) 6010 and other modules of the electronic system. The permanent storage device 6035, on the other hand, is a read-and-write memory device. This device is a non-volatile memory unit that stores instructions and data even when the electronic system 6000 is off. Some embodiments of the invention use a mass-storage device (such as a magnetic or optical disk and its corresponding disk drive) as the permanent storage device 6035.

Other embodiments use a removable storage device (such as a floppy disk, flash drive, etc.) as the permanent storage device. Like the permanent storage device 6035, the system memory 6025 is a read-and-write memory device. However, unlike storage device 6035, the system memory is a volatile read-and-write memory, such a random access memory. The system memory stores some of the instructions and data that the processor needs at runtime. In some embodiments, the invention's processes are stored in the system memory 6025, the permanent storage device 6035, and/or the read-only memory 6030. From these various memory units, the processing unit(s) 6010 retrieve instructions to execute and data to process in order to execute the processes of some embodiments.

The bus 6005 also connects to the input and output devices 6040 and 6045. The input devices enable the user to communicate information and select commands to the electronic system. The input devices 6040 include alphanumeric keyboards and pointing devices (also called "cursor control devices"). The output devices 6045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 60, bus 6005 also couples electronic system 6000 to a network 6065 through a network adapter (not shown). In this manner, the computer can be a part of a network of computers (such as a local area network ("LAN"), a wide area network ("WAN"), or an Intranet, or a network of networks, such as the Internet. Any or all components of electronic system 6000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 13, 15, 20, 33, 34, 50, and 52) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments were described above in which a user provides LDP sets in terms of logical control plane data. In other embodiments, however, a user may provide LDP sets in terms of logical forwarding plane data. In addition, several embodiments were described above in which a controller instance provides physical control plane data to a switching element in order to manage the switching element. In other embodiments, however, the controller instance may provide the switching element with physical forwarding plane data. In such embodiments, the relational database data structure would store physical forwarding plane data and the virtualization application would generate such data.

Furthermore, in several examples above, a user specifies one or more logical switches. In some embodiments, the user can provide physical switching element configurations along with such logic switching element configurations. Also, even though controller instances are described that in some embodiments are individually formed by several application layers that execute on one computing device, one of ordinary skill will realize that such instances are formed by dedicated computing devices or other machines in some embodiments that perform one or more layers of their operations.

Also, several examples described above show that a LDPS is associated with one user. One of the ordinary skill in the art will recognize that then a user may be associated with one or more sets of LDP sets in some embodiments. That is, the relationship between a LDPS and a user is not always a one-to-one relationship as a user may be associated with multiple LDP sets. Thus, one of ordinary skill in the art would understand that the invention is not to be limited by the foregoing illustrative details.

What is claimed is:

1. A controller computer for managing a plurality of managed forwarding elements that implement different logical networks, the controller computer comprising:
   an interface that receives input logical control plane data in terms of input events, said input logical control plane data comprising updates to logical control planes of logical networks, wherein each logical network is implemented by a set of managed forwarding elements;
   a converter that converts the input logical control plane data for each logical network to output logical forwarding plane data for the logical network by processing the input events, said logical forwarding plane data for subsequent translation into physical control plane data for the set of managed forwarding elements that implements the logical network; and
   an input scheduler that (i) categorizes the input events into different groups related to different logical networks, and (ii) defines a schedule for supplying each group of the input events for each logical network to the converter in a manner that ensures that each group of input events related to each logical network is processed together by the converter.

2. The controller computer of claim 1, wherein a particular input event represents a change in a state of at least one managed forwarding element in the set of managed forwarding elements.

3. The controller computer of claim 1, wherein the input logical control plane data are at least partially supplied by at least one user.

4. The controller computer of claim 1, wherein the set of managed forwarding elements implements each logical network by forwarding data packets between a set of end machines that are logically connected through logical forwarding elements of the logical network, wherein the set of managed forwarding elements forwards the data packets between the end machines according to forwarding rules defined by the output logical forwarding plane data.

5. The controller computer of claim 4, wherein each managed forwarding element in at least a subset of managed forwarding elements operates on a different host machine that also hosts one or more end machines in the set of end machines.

6. The controller computer of claim 1 further comprising a classifier for assigning a priority level to data for each input event, wherein the input scheduler supplies an input event with a higher priority level ahead of a group of input events with lower priority level.

7. The controller computer of claim 1, wherein the output logical forwarding plane data is converted into output physical control plane data to be sent to a plurality of other controllers through a plurality of communication channels, the controller computer further comprising an output scheduler for (i) queuing the output physical control plane data in a plurality of storage structures each of which corresponds to one of the other controllers and (ii) sending the output physical control plane data to the other controllers from the corresponding storage structures.

8. The controller computer of claim 7, wherein the output scheduler sends output physical control plane data from a particular storage structure when the particular storage structure has more than a threshold amount of output physical control plane data.

9. The controller computer of claim 7, wherein the output scheduler sends output physical control plane data from a particular storage structure periodically.

10. The controller computer of claim 1, wherein each logical network comprises a set of logical forwarding elements that logically connects a set of end machines to each other, wherein the logical forwarding plane data comprises a plurality of logical flow entries that specify forwarding rules for forwarding data between logical addresses of each set of logical forwarding elements that are is implemented by the set of managed forwarding elements.

11. The controller computer of claim 1, wherein the translated physical control plane data is universal physical control plane data that define a set of forwarding rules that is common for every managed forwarding element in the set of managed forwarding elements.

12. The controller computer of claim 11, wherein a set of other controllers performs the further translations of the universal physical control plane data to a set of customized physical control plane data that is customized for each managed forwarding element in the set of managed forwarding elements.

13. The controller computer of claim 12, wherein each controller in the set of other controllers executes on a same host machine on which a corresponding managed forwarding element operates.

14. The controller computer of claim 12, wherein each the controller in the set of other controllers is a controller computer that is separate from a host machine on which a corresponding managed forwarding element operates.

15. A non-transitory machine readable medium of a controller computer that stores a program which when executed by at least one processing unit of the controller computer manages a plurality of managed forwarding elements that implement different logical networks, the program comprising sets of instructions for:

receiving input logical control plane data in terms of input events, said input logical control plane data comprising updates to logical control planes of logical networks, wherein each logical network is implemented by a set of managed forwarding elements;

categorizing the input events data into different groups related to different logical networks;

defining a schedule for supplying each group of the input events for each logical network to a converter in a manner that ensures that each group of input events related to each logical network is processed together by the converter; and converting, by the converter, the input logical control plane data for each logical network to output logical forwarding plane data for the logical network, said logical forwarding plane data for subsequent translation into physical control plane data for the set of managed forwarding elements that implements the logical network.

16. The machine readable medium of claim 15, wherein a particular input event represents a change in a state of at least one managed forwarding element in the set of managed forwarding elements.

17. The machine readable medium of claim 15, wherein the input logical control plane data are at least partially supplied by at least one user.

18. The machine readable medium of claim 15, wherein the set of managed forwarding elements implements each logical network by forwarding data packets between a set of end machines that are logically connected through logical forwarding elements of the logical network, wherein the set of managed forwarding elements forwards the data packets between the end machines according to forwarding rules defined by the output logical forwarding plane data.

19. The machine readable medium of claim 18, wherein each managed forwarding element in the set of managed forwarding elements operates on a different host machine that also hosts one or more end machines in the set of end machines.

20. The machine readable medium of claim 15, wherein each logical network comprises a set of logical forwarding elements that logically connects a set of end machines to each other, wherein the logical forwarding plane data comprises a plurality of logical flow entries that specify forwarding rules for forwarding data between logical addresses of each set of logical forwarding elements that is implemented by the set of managed forwarding elements.

* * * * *